United States Patent
Marsden et al.

(10) Patent No.: US 11,714,880 B1
(45) Date of Patent: Aug. 1, 2023

(54) HAND POSE ESTIMATION FOR MACHINE LEARNING BASED GESTURE RECOGNITION

(71) Applicant: Ultrahaptics IP Two Limited, Bristol (GB)

(72) Inventors: Jonathan Marsden, San Mateo, CA (US); Raffi Bedikian, San Francisco, CA (US); David Samuel Holz, San Francisco, CA (US)

(73) Assignee: Ultrahaptics IP Two Limited, Bristol (GB)

( * ) Notice: Subject to any disclaimer, the term of this patent is extended or adjusted under 35 U.S.C. 154(b) by 0 days.

(21) Appl. No.: 16/508,231

(22) Filed: Jul. 10, 2019

Related U.S. Application Data

(63) Continuation of application No. 15/432,872, filed on Feb. 14, 2017, now abandoned.
(Continued)

(51) Int. Cl.
  *G06K 9/62* (2006.01)
  *G06K 9/00* (2006.01)
  (Continued)

(52) U.S. Cl.
  CPC ....... *G06K 9/6269* (2013.01); *G06K 9/00355* (2013.01); *G06K 9/4604* (2013.01); *G06T 7/13* (2017.01); *G06T 2207/10028* (2013.01)

(58) Field of Classification Search
  None
  See application file for complete search history.

(56) References Cited

U.S. PATENT DOCUMENTS 4,990,838 A   2/1991 Kawato et al.
5,659,764 A   8/1997 Sakiyama et al.
(Continued)

OTHER PUBLICATIONS

Tang et al., "Opening the Black Box: Hierarchical Sampling Optimization for Estimating Human Hand Pose", 2015 IEEE International Conference on Computer Vision p. 3325-3333 (Year: 2015).*
(Continued)

*Primary Examiner* — Randolph I Chu
(74) *Attorney, Agent, or Firm* — Haynes Beffel & Wolfeld LLP; Ernest J. Beffel, Jr.; Paul A. Durdik

(57) ABSTRACT

The technology disclosed performs hand pose estimation on a so-called "joint-by-joint" basis. So, when a plurality of estimates for the 28 hand joints are received from a plurality of expert networks (and from master experts in some high-confidence scenarios), the estimates are analyzed at a joint level and a final location for each joint is calculated based on the plurality of estimates for a particular joint. This is a novel solution discovered by the technology disclosed because nothing in the field of art determines hand pose estimates at such granularity and precision. Regarding granularity and precision, because hand pose estimates are computed on a joint-by-joint basis, this allows the technology disclosed to detect in real time even the minutest and most subtle hand movements, such a bend/yaw/tilt/roll of a segment of a finger or a tilt an occluded finger, as demonstrated supra in the Experimental Results section of this application.

21 Claims, 90 Drawing Sheets
(36 of 90 Drawing Sheet(s) Filed in Color)

Related U.S. Application Data

(60) Provisional application No. 62/335,534, filed on May 12, 2016, provisional application No. 62/296,561, filed on Feb. 17, 2016.

(51) Int. Cl.
*G06T 7/13* (2017.01)
*G06K 9/46* (2006.01)

(56) References Cited

U.S. PATENT DOCUMENTS

| | | | | |
|---|---|---|---|---|
| 8,854,433 | B1* | 10/2014 | Rafii | G06F 3/017 |
| | | | | 348/47 |
| 8,971,572 | B1* | 3/2015 | Yin | G06K 9/00624 |
| | | | | 382/103 |
| 9,002,099 | B2 | 4/2015 | Litvak et al. | |
| 9,058,663 | B2 | 6/2015 | Andriluka et al. | |
| 9,383,895 | B1* | 7/2016 | Vinayak | G06F 3/04883 |
| 9,501,716 | B2 | 11/2016 | Fleishman et al. | |
| 9,690,984 | B2 | 6/2017 | Butler et al. | |
| 10,048,765 | B2* | 8/2018 | Tang | G06F 3/012 |
| 10,733,381 | B2 | 8/2020 | Fuchizaki | |
| 2006/0087510 | A1* | 4/2006 | Adamo-Villani | G06F 3/017 |
| | | | | 345/474 |
| 2008/0094351 | A1 | 4/2008 | Nogami et al. | |
| 2009/0102845 | A1* | 4/2009 | Takemoto | G06K 9/00375 |
| | | | | 345/426 |
| 2009/0103780 | A1 | 4/2009 | Nishihara et al. | |
| 2010/0235786 | A1* | 9/2010 | Maizels | G06F 3/011 |
| | | | | 715/810 |
| 2012/0117514 | A1 | 5/2012 | Kim et al. | |
| 2012/0309532 | A1* | 12/2012 | Ambrus | A63F 13/213 |
| | | | | 463/36 |
| 2013/0253705 | A1* | 9/2013 | Goldfarb | A61F 2/72 |
| | | | | 700/260 |
| 2013/0257734 | A1* | 10/2013 | Marti | G06F 3/0426 |
| | | | | 345/168 |
| 2013/0259391 | A1 | 10/2013 | Kawaguchi et al. | |
| 2013/0329011 | A1 | 12/2013 | Lee et al. | |
| 2013/0336524 | A1 | 12/2013 | Zhang et al. | |
| 2014/0079300 | A1* | 3/2014 | Wolfer | G06K 9/036 |
| | | | | 382/124 |
| 2014/0232631 | A1* | 8/2014 | Fleischmann | G06F 3/011 |
| | | | | 345/156 |
| 2014/0267666 | A1* | 9/2014 | Holz | G06K 9/209 |
| | | | | 348/77 |
| 2014/0363076 | A1 | 12/2014 | Han et al. | |
| 2015/0023607 | A1* | 1/2015 | Babin | G06K 9/6221 |
| | | | | 382/225 |
| 2015/0077326 | A1* | 3/2015 | Kramer | G06F 3/0325 |
| | | | | 345/156 |
| 2015/0193124 | A1* | 7/2015 | Schwesinger | G06F 3/017 |
| | | | | 715/863 |
| 2015/0253863 | A1 | 9/2015 | Babin et al. | |
| 2015/0278589 | A1 | 10/2015 | Mazurenko et al. | |
| 2015/0290795 | A1 | 10/2015 | Oleynik | |
| 2015/0310629 | A1 | 10/2015 | Utsunomiya et al. | |
| 2015/0331493 | A1* | 11/2015 | Algreatly | G06F 3/0233 |
| | | | | 345/156 |
| 2016/0018985 | A1* | 1/2016 | Bennet | G06F 3/011 |
| | | | | 345/175 |
| 2016/0125243 | A1 | 5/2016 | Arata et al. | |
| 2016/0171340 | A1 | 6/2016 | Fleishman et al. | |
| 2016/0196672 | A1 | 7/2016 | Chertok et al. | |
| 2016/0246369 | A1 | 8/2016 | Osman | |
| 2016/0259417 | A1* | 9/2016 | Gu | G06F 3/014 |
| 2016/0313798 | A1 | 10/2016 | Connor | |
| 2017/0060254 | A1* | 3/2017 | Molchanov | G06F 3/011 |
| 2017/0168586 | A1 | 6/2017 | Sinha et al. | |
| 2017/0177077 | A1* | 6/2017 | Yang | G06F 3/012 |
| 2017/0192514 | A1* | 7/2017 | Karmon | G06K 9/00382 |
| 2017/0193288 | A1* | 7/2017 | Freedman | G06T 7/248 |
| 2017/0193289 | A1* | 7/2017 | Karmon | G06K 9/00355 |
| 2017/0206405 | A1 | 7/2017 | Molchanov et al. | |
| 2017/0278304 | A1* | 9/2017 | Hildreth | G02B 27/0172 |
| 2017/0329403 | A1* | 11/2017 | Lai | G06F 3/014 |
| 2018/0024641 | A1 | 1/2018 | Mao et al. | |
| 2018/0039334 | A1* | 2/2018 | Cohen | G06F 3/017 |
| 2018/0067545 | A1* | 3/2018 | Provancher | A63F 13/218 |
| 2018/0101247 | A1* | 4/2018 | Lee | G06F 3/0346 |
| 2018/0101520 | A1 | 4/2018 | Fuchizaki | |
| 2019/0147233 | A1 | 5/2019 | Cherveny et al. | |

OTHER PUBLICATIONS

Athitsos et al. "Estimating 3D Hand Pose from a Cluttered Image", 2003 IEEE Computer Society Conference on Computer Vision and Pattern Recognition (CVPR'03) (Year: 2003).*

Xu et al. "Estimate Hand Poses Efficiently from Single Depth Images", Int J ComputVis (2016) 116:21-45 (Year: 2016).*

Chua et al. "Model based 3D hand posure estimation from a single 2D image", 2002 Elsevier Science (Year: 2002).*

Erol et al. "Vision-based hand pose estimation: A review", Computer Vision and Image Understanding 108 (2007) 52-73 (Year: 2007).*

Khamis et al. "Learning an Efficient Model of Hand Shape Variation from Depth Images", 2015 IEEE Conference on Computer Vision and Pattern Recognition (CVPR) (Year: 2015).*

Krejovetal. "Combining Discriminative and Model Based Approaches for Hand Pose Estimation", 2015 11th IEEE International Conference and Workshops on Automatic Face and Gesture Recognition (FG) (Year: 2015).*

Oberwegeretal. "Training a Feedback Loop for Hand Pose Estimation", 2015 IEEE International Conference on Computer Vision (ICCV) (Year: 2015).*

Oberweger et al. "DeepPrior++: Improving Fast and Accurate 3D Hand Pose Estimation", ICCV Workshops 2017 (Year: 2017).*

Sridharetal. "Interactive Markerless Articulated Hand Motion Tracking Using RGB and Depth Data", International Conference on Computer Vision (ICCV) 2013 (Year: 2013).*

Stenger et al. "Model-Based 3D Tracking of an Articulated Hand", Computer Vision and Pattern Recognition, 2001. (Year: 2001).*

Stenger et al. "Model-Based Hand Tracking Using a Hierarchical Bayesian Filter", IEEE Transactions on Pattern Analysis and Machine Intelligence, vol. 28, No. 9, Sep. 2006 (Year: 2006).*

Taylor et al. "User-Specific Hand Modeling from Monocular Depth Sequences", CVPR2014. (Year: 2014).*

Ahmed, "A Neural Network based Real Time Hand Gesture Recognition System", Dec. 2012, 6 pages.

Chan, "PCANet: A Simple Deep Learning Baseline for Image Classification?", Aug. 28, 2014, 15 pages.

Chen, "Automatic Generation of Statistical Pose and Shape Models for Atriculated Joints", Feb. 2, 2014, 12 pages.

Choi, "A Collaborative Filtering Approach to Real-Time Hand Pose Estimation", 2015, 9 pages.

"CS231n Convolutional Neural Networks for Visual Recognition", Mar. 28, 2016, 16 pages.

Gibiansky, "Convolutional Neural Networks", Feb. 24, 2014, 7 pages.

Girshick, "Region-based Convolutional Networks for Accurate Object Detection and Segmentation", May 25, 2015, 16 pages.

Han, "Space-Time Representation of People Based on 3D Skeletal Data", Jan. 21, 2016, 20 pages.

Hasan, "Static hand gesture recognition using neural networks", Jan. 12, 2012, 36 pages.

Hijazi, "Using Convolutional Neural Networks for Image Recognition", 2015, 12 pages.

Huang, "Large-scale Learning with SVM and Convolutional Nets", 2006, 8 pages.

Hussein, "Human Action Recognition Using a Temporal Hierarchy of Covariance Descriptors on 3D Joint Locations", 2013, 7 pages.

Ibraheem, "Vision Based Gesture Recognition Using Neural Networks Approaches: A Review", 2012, 14 pages.

Karlgaard, "Adaptive Huber-Based Filtering Using Projection Statistics", Aug. 18-21, 2008, 21 pages.

(56) References Cited

OTHER PUBLICATIONS

Knutsson, "Hand Detection and Pose Estimation using Convolutional Neural Networks", 2015, 118 pages.
Krizhevsky, "ImageNet Classification with Deep Convolutional Neural Networks", 2012, 9 pages.
Liu, "Implementation of Training Convolutional Neural Networks", Jun. 4, 2015, 10 pages.
Li, "Fast and Robust Method for Dynamic Gesture Recognition Using Hermite Neural Network", May 2012, 6 pages.
Li, "Heterogeneous Multi-task Learning for Human Pose Estimation with Deep Convolutional Neural Network", Jun. 13, 2014, 8 pages.
McCartney, "Gesture Recognition with the Leap Motion Controller", 2015, 7 pages.
Molchanov, "Hand Gesture Recognition with 3D Convolutional Neural Networks", Jun. 2015, 7 pages.
Oberweger, "Hands Deep in Deep Learning for Hand Pose Estimation", Feb. 9-11, 2015, 10 pages.
Oikonomidis, Efficient Model-based 3D Tracking of Hand Articulations using Kinect, 2011, 11 pgs.
Pfister, "Deep Convolutional Neural Networks for Efficient Pose Estimation in Gesture Videos", Dec. 2013, 16 pages.
Presti, "3D Skeleton-based Human Action Classification", 2011, 29 pages.
Qian, "Realtime and Robust Hand Tracking from Depth", 8 pages.
Sharp, "Accurate, Robust, and Flexible Realtime Hand Tracking", Apr. 18-23, 2015, 10 pages.
Sinha, "DeepHand: Robust Hand Pose Estimation by Completing a Matrix Imputed with Deep Features", Jun. 2016, pgs.
Socher, "Convolutional-Recursive Deep Learning for 3D Object Classification", 2012, 9 pages.
Supancic III, "Depth-based hand pose estimation: methods, data, and challenges", May 6, 2015, 15 pages.
Tompson, "Real-Time Continuous Pose Recovery of Human Hands Using Convolutional Networks", Aug. 2014, 11 pages.
"Using Neural Nets to Recognize Handwritten Digits", Mar. 28, 2016, 55 pages.
Wang, "Human Action Recognition with Depth Cameras" Chapter 2, 2014, 31 pages.
Xu, "Efficient Hand Pose Estimation from a Single Depth Image", 2013, 7 pages.
Zheng, "A Project on Gesture Recognition with Neural Networks for 'Introduction to Artificial Intelligence' Classes", 2010, 14 pages.
Sharp, Toby, et al., "Accurate, Robust, and Flexible Real-Time Hand Tracking", Proceedings of the 33rd Annual ACM Conference on Human Factors in Computing Systems, Apr. 18, 2015, pp. 3633-3642.
U.S. Appl. No. 15/432,872—Notice of Allowance dated Oct. 10, 2018, 18 pages.
U.S. Appl. No. 15/432,876—Office Action dated Jan. 14, 2019, 14 pages.
U.S. Appl. No. 15/432,869—Notice of Allowance dated Nov. 29, 2018, 10 pages.
U.S. Appl. No. 15/432,872—Notice of Allowance dated Apr. 10, 2019, 10 pages.
U.S. Appl. No. 15/432,869—Notice of Allowance dated Jun. 26, 2019, 8 pages.
U.S. Appl. No. 15/432,869—Notice of Allowance dated Aug. 21, 2020, 9 pages.
Mekala, et al., "Real-time Sign Language Recognition based on Neural Network Architecture", 2011 IEEE 43rd Southeastern Symposium on System Theory, Mar. 14-16, 2011, pp. 195-199.
U.S. Appl. No. 15/432,876—Notice of Allowance dated Sep. 3, 2020, 9 pages.
U.S. Appl. No. 15/432,876—Notice of Allowance dated Feb. 3, 2021, 17 pages.
U.S. Appl. No. 15/432,869—Notice of Allowance dated Apr. 29, 2021, 15 pages.
U.S. Appl. No. 15/432,869—Notice of Allowance dated Dec. 8, 2021, 8 pages.
U.S. Appl. No. 15/432,876—Notice of Allowance dated Aug. 12, 2021, 12 pages.
U.S. Appl. No. 15/432,876—Notice of Allowance dated May 14, 2021, 9 pages.

* cited by examiner

106

Sub-sampling Layers

| 44 | 51 | 66 | 61 |
|---|---|---|---|
| 34 | 10 | 21 | 50 |
| 21 | 9 | 4 | 35 |
| 75 | 44 | 1 | 3 |

Feature Map 602

| 51 | 66 |
|---|---|
| 75 | 35 |

Max Pooling 606

| 35 | 50 |
|---|---|
| 38 | 11 |

Average Pooling 604

FIG. 6

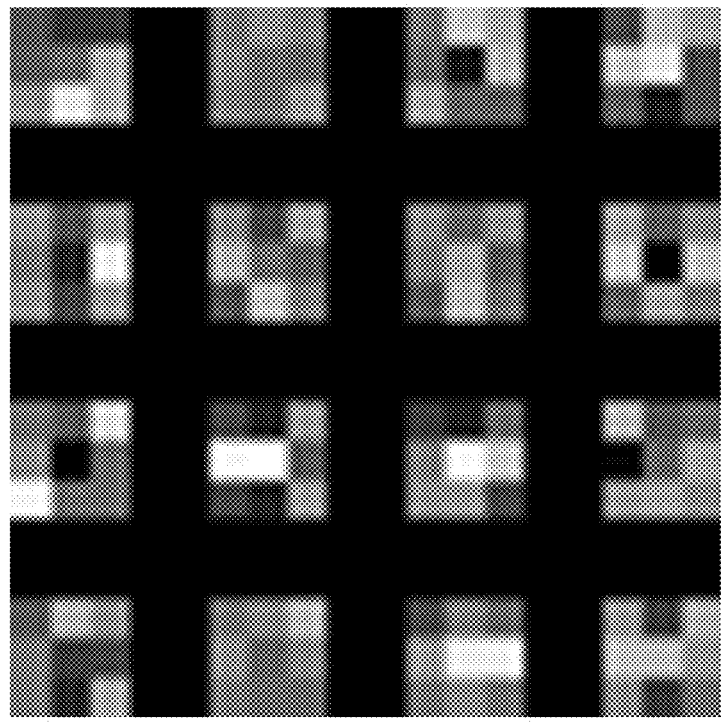
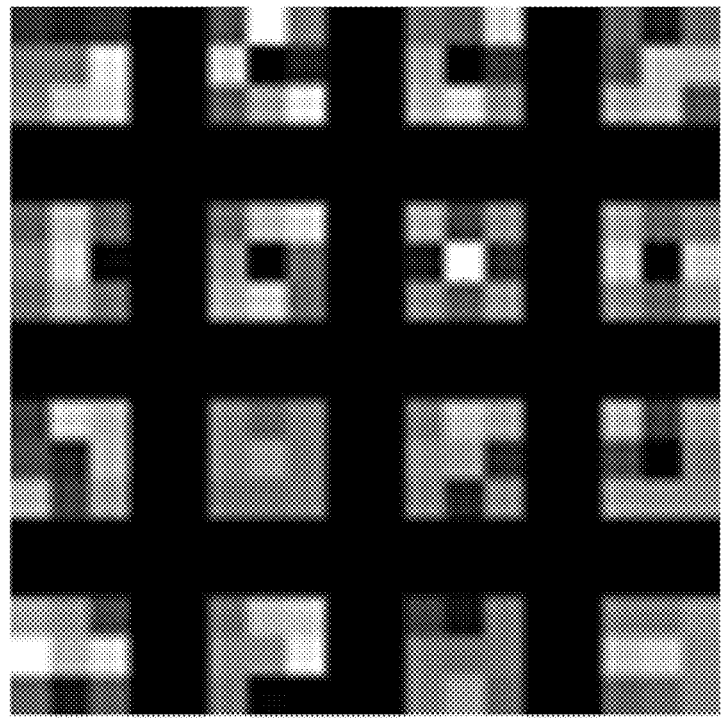
FIG. 9

1000

1400
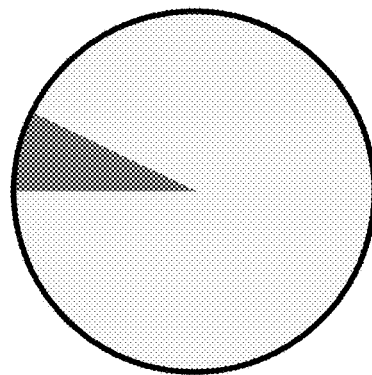
☐ Training Data 102
■ Validation Data
First Master Network
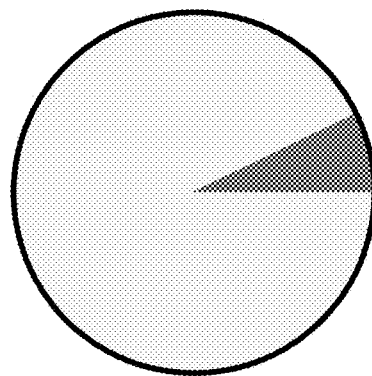
☐ Training Data 102
■ Validation Data
Second Master Network
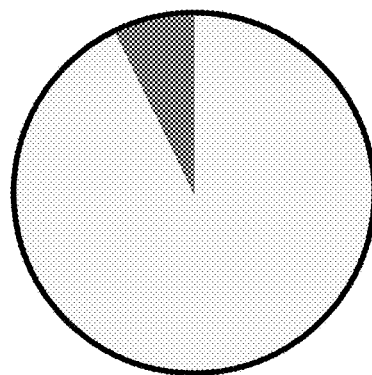
☐ Training Data 102
■ Validation Data
Third Master Network
FIG. 14

84 Dimensional Pose Space with each Point Representing a Hand Pose with 28 Hand Joints in 3D $(x_0, y_0, z_0)$

Atemporal Master-Expert Synergy

Training a first set of atemporal generalist neural networks using simulated hand position images 2002

↓

Subdividing the simulated hand position images into overlapping specialist categories 2004

↓

Training a first set of atemporal specialist neural networks using the specialist categories 2006

↓

Receiving a first set of estimates of hand position parameters from the generalist neural networks during testing 2008

↓

Identifying a second set of atemporal specialist neural networks during testing based on the first set of estimates 2010

↓

Receiving a second set of estimates of hand position parameters from the specialist neural networks during testing 2012

↓

Determining a final set of estimates of hand position parameters during training based on the first and second set of estimates 2014

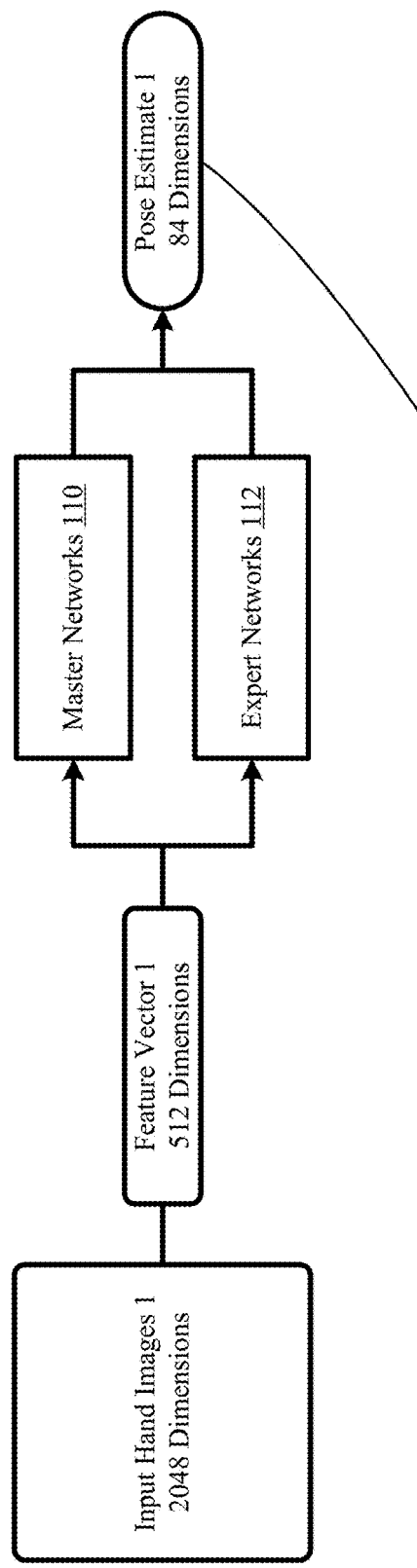
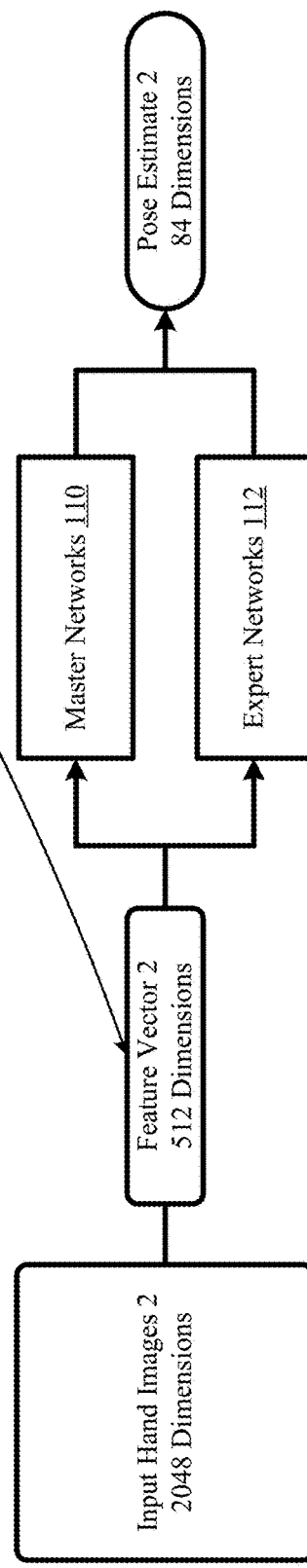
FIG. 22

2400

Temporal Master-Expert Synergy

Training a first set of temporal generalist neural networks using a current set of simulated hand position images and one or more temporally linked prior pose estimates and/or randomly generated image data 2402

↓

Subdividing a dataset of simulated hand position images into overlapping specialist categories 2404

↓

Training a first set of temporal specialist neural networks using the specialist categories and corresponding one or more temporally linked prior pose estimates in the specialist categories 2406

↓

Receiving a first set of estimates of hand position parameters from the temporal generalist neural networks during testing based on a real hand position image and one or more prior pose estimates 2408

↓

Identifying a second set of temporal specialist neural networks during testing based on the first set of estimates 2410

↓

Receiving a second set of estimates of hand position parameters from the specialist neural networks during testing based on the real hand position image and one or more temporally linked prior pose estimates 2412

↓

Determining a final set of estimates of hand position parameters during training based on the first and second set of estimates 2414

3D Joint Estimates for a Single Joint from Multiple Expert Networks in Current Frame 1

3D Joint Estimates for a Single Joint from Multiple Expert Networks in Current Frame 1

3508

Extracted ImagePatch

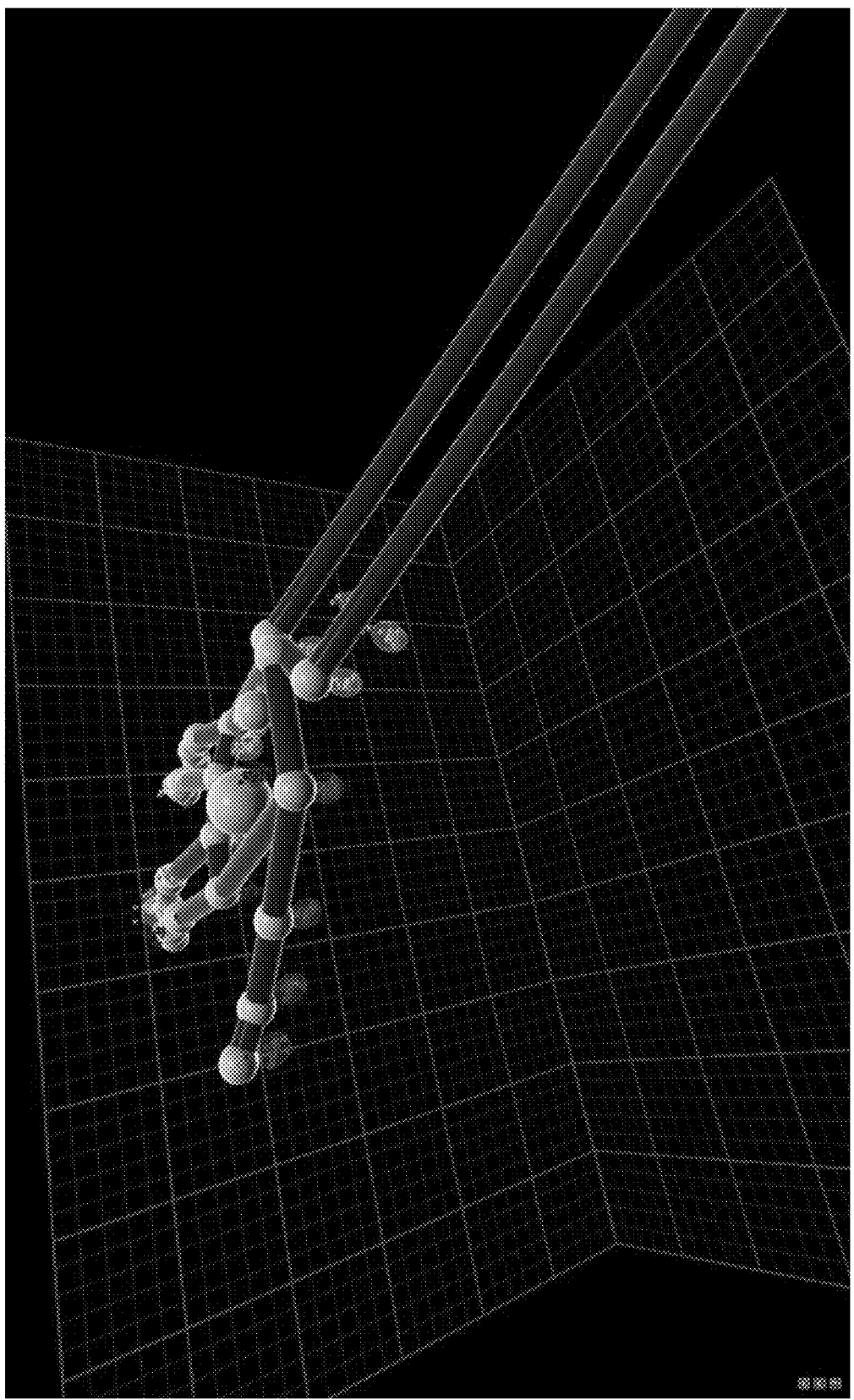

| Attribute | | | | |
|---|---|---|---|---|
| Name | Right Hand | | | |
| Position | 87.795 | 245.222 | -18.043 | |
| Rotation | 0.000 | 5.000 | -15.000 | |
| Arm Pitch | 23.386 | | | |
| Arm Yaw | 20.551 | | | |
| Scale | 1.000 | | | |
| Stubbiness | 1.008 | | | |
| Gender | Male | | | |
| Skin Tone | Medium | | | |

FIG. 45

HAND POSE ESTIMATION FOR MACHINE LEARNING BASED GESTURE RECOGNITION

RELATED APPLICATIONS

This application is a continuation of U.S. patent application Ser. No. 15/432,872, entitled "HAND POSE ESTIMATION FOR MACHINE LEARNING BASED GESTURE RECOGNITION," filed Feb. 14, 2017, which claims priority to U.S. Provisional Patent Application Nos. 62/335,534, entitled "HAND POSE ESTIMATION FOR MACHINE LEARNING BASED GESTURE RECOGNITION", filed May 12, 2016 and 62/296,561, entitled, "IMAGE BASED TRACKING", filed Feb. 17, 2016, all of which are hereby incorporated by reference for all purposes.

This application is related to U.S. patent application Ser. No. 15/432,869, entitled, "MACHINE LEARNING BASED GESTURE RECOGNITION," filed Feb. 14, 2017. The related application is hereby incorporated by reference for all purposes.

This application is related to U.S. patent application Ser. No. 15/432,876, entitled, "HAND INITIALIZATION FOR MACHINE LEARNING BASED GESTURE RECOGNITION," filed Feb. 14, 2017. The related application is hereby incorporated by reference for all purposes.

FIELD OF THE TECHNOLOGY DISCLOSED

The technology disclosed generally relates to using machine learning for estimating hand poses from raw hand images, and in particular relates to using convolutional neural networks for regressing hand pose estimates from input hand images.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Conventional motion capture approaches rely on markers or sensors worn by the subject while executing activities and/or on the strategic placement of numerous bulky and/or complex equipment in specialized and rigid environments to capture subject movements. Unfortunately, such systems tend to be expensive to construct. In addition, markers or sensors worn by the subject can be cumbersome and interfere with the subject's natural movement. Further, systems involving large numbers of cameras tend not to operate in real time, due to the volume of data that needs to be analyzed and correlated. Such considerations have limited the deployment and use of motion capture technology.

Consequently, there is a need for improved devices with greater portability and techniques for capturing the motion of objects in real time without fixed or difficult to configure sensors or markers.

Furthermore, the traditional paradigms of indirect interactions through standard input devices such as mouse, keyboard, or stylus have their limitations, including skewed fields of view and restrictively receptive interfaces. Particularly in the Augmented reality (AR) and virtual reality (VR) context, such traditional paradigms greatly diminish the user experience. Accordingly, the technology disclosed allows users to interact with the virtual interfaces generated in AR/VR environment using free-form in-air gestures. AR/VR technologies refers to the real time registration of 2D or 3D computer generated imagery onto a live view of a real world physical space or virtual space. A user is able to view and interact with the augmented and virtual imagery in such a way as to manipulate the virtual objects in their view.

However, existing human-AR/VR systems interactions are very limited and unfeasible. Current AR/VR systems are complex as they force the user to interact with AR/VR environment using a keyboard and mouse, or a vocabulary of simply hand gestures. Further, despite strong academic and commercial interest in AR/VR systems, AR/VR systems continue to be costly and requiring expensive equipment, and thus stand unsuitable for general use by the average consumer.

An opportunity arises to provide an economical approach that provides advantages of AR/VR for enhanced and sub-millimeter precision interaction with virtual objects without the draw backs of attaching or deploying specialized hardware.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

Figure 1:
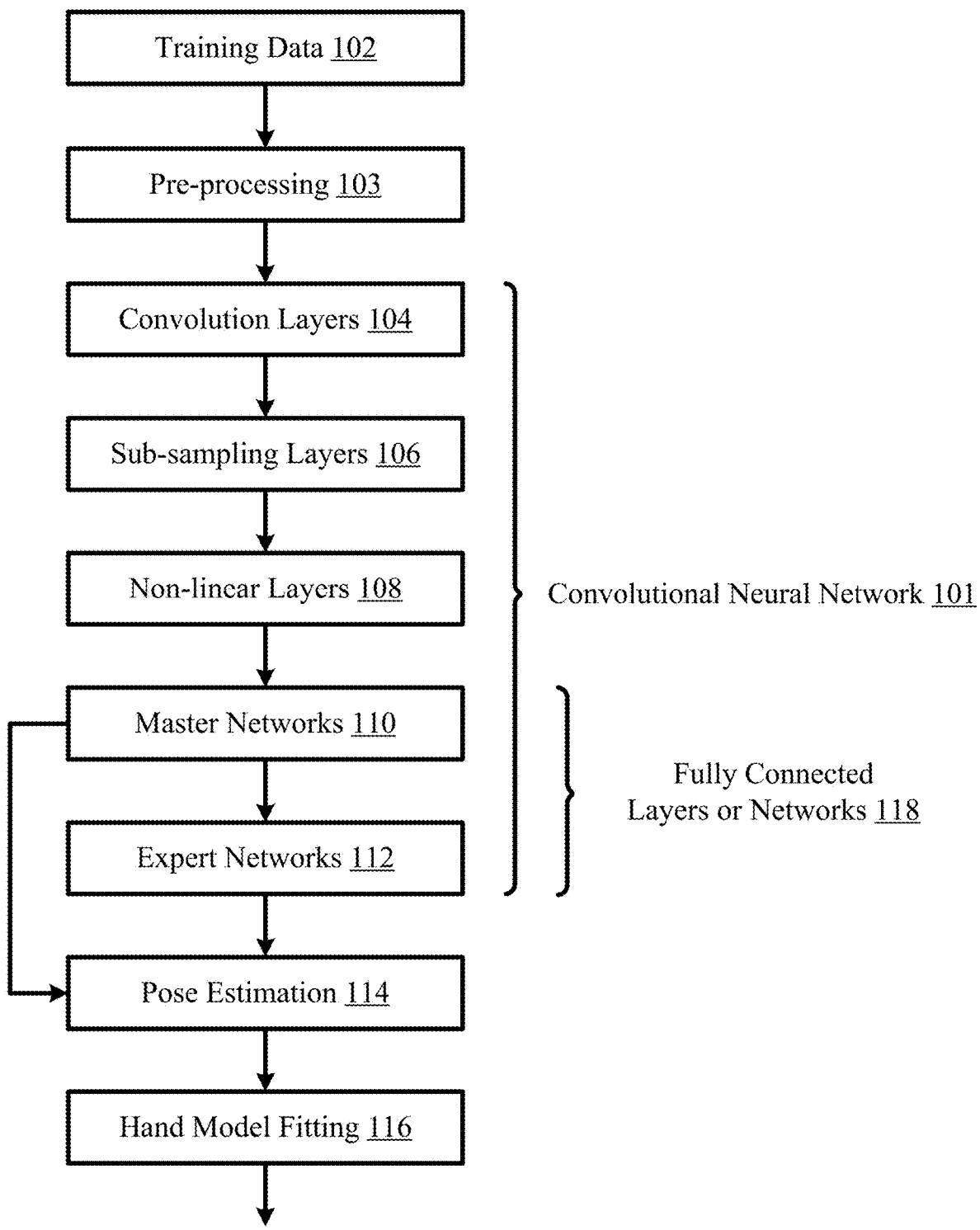

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 1 illustrates a training pipeline of one implementation of the technology disclosed.

Figure 2:
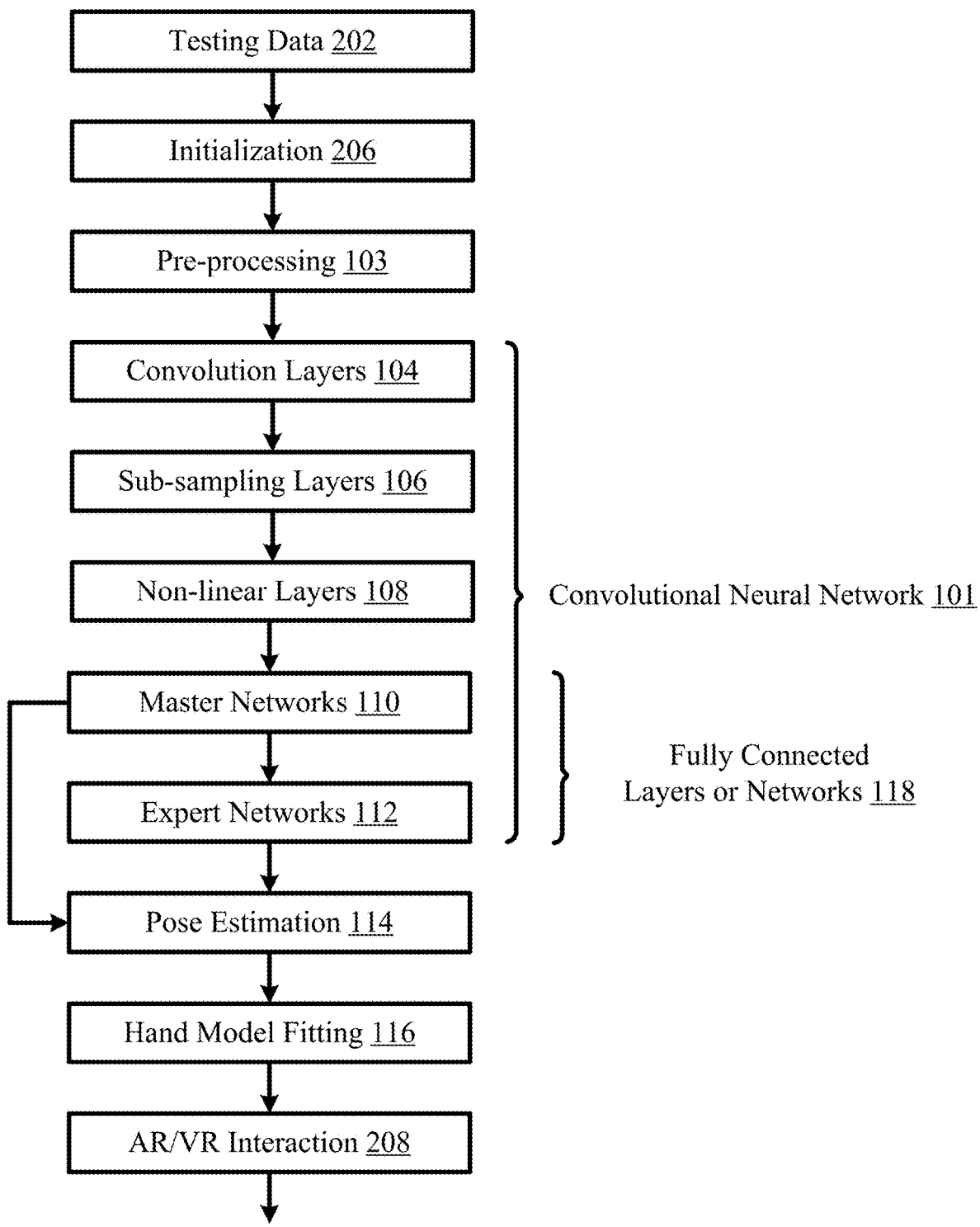

FIG. 2 illustrates a testing pipeline of one implementation of the technology disclosed.

Figure 3:
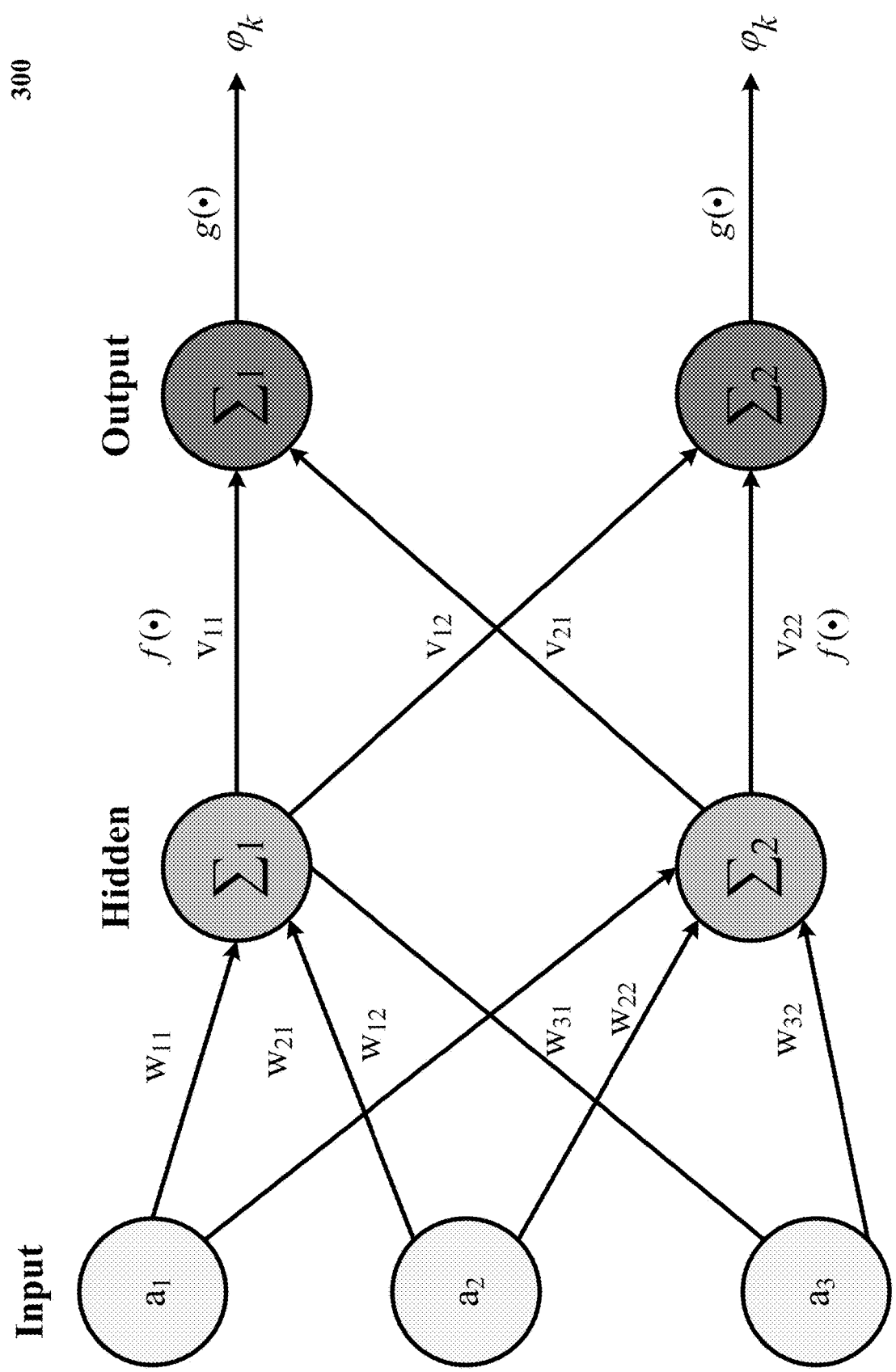

FIG. 3 shows one implementation of a fully connected neural network with multiple layers.

Figure 4:
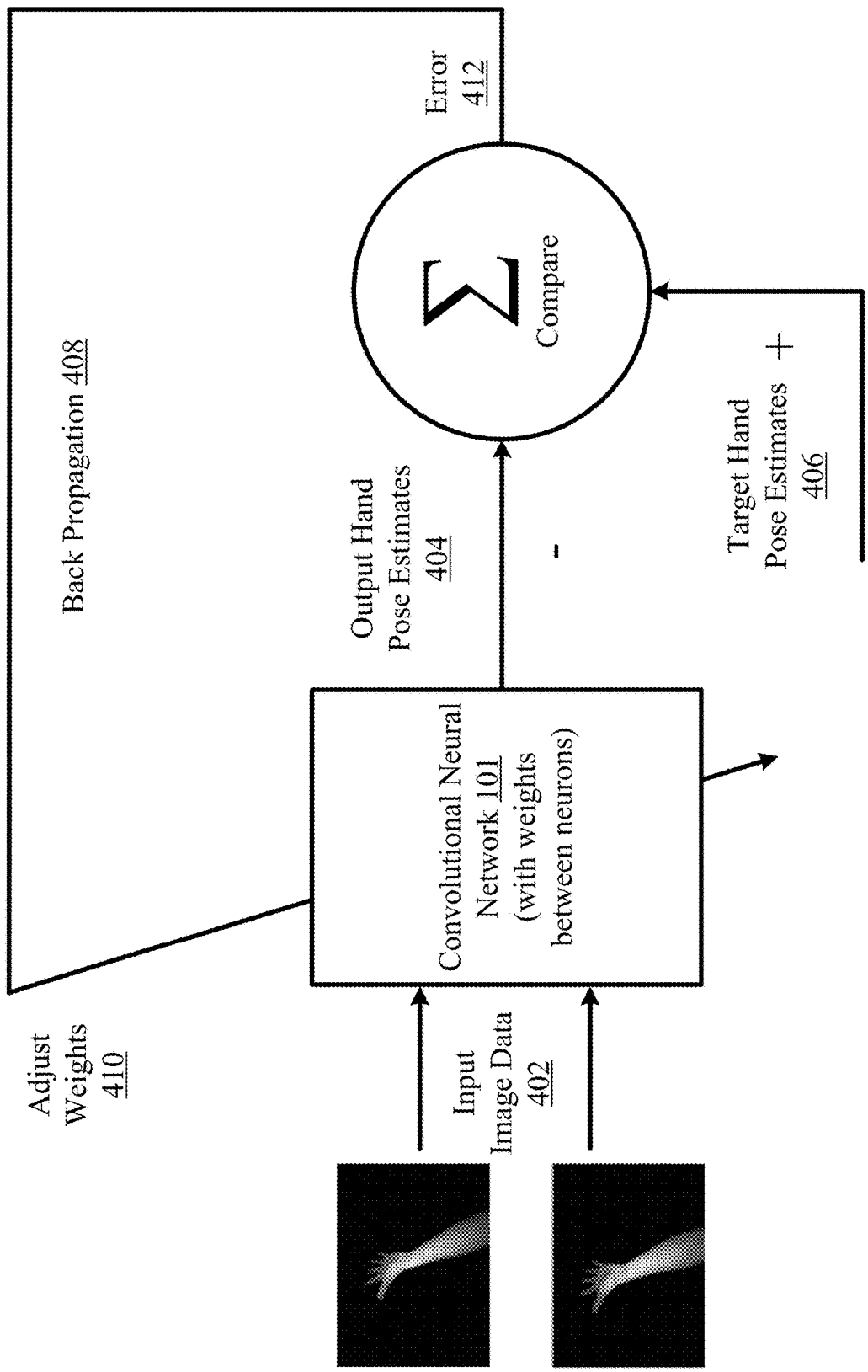

FIG. 4 depicts a block diagram of training a convolutional neural network in accordance with one implementation of the technology disclosed.

Figure 5A:
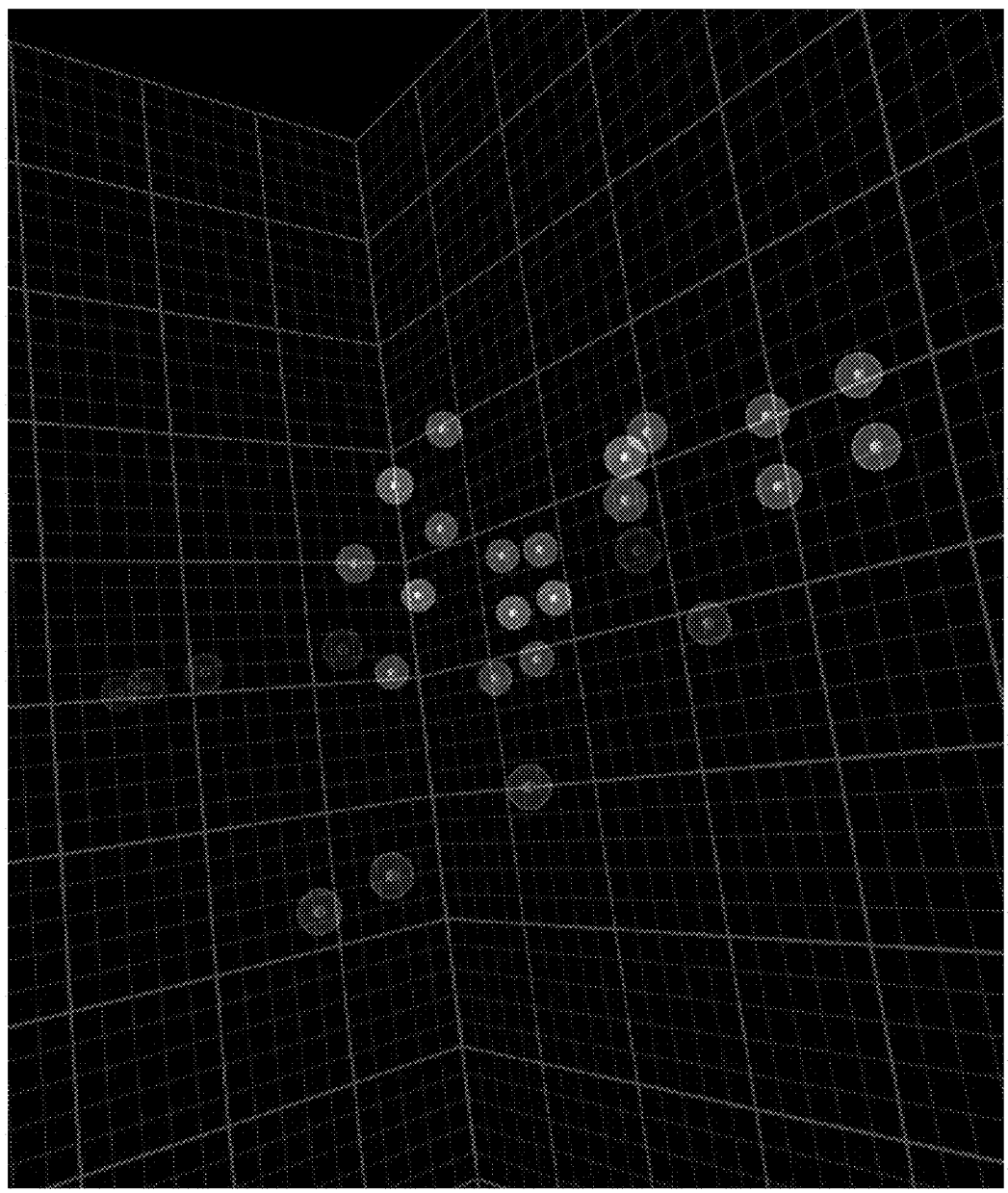
Figure 5B:
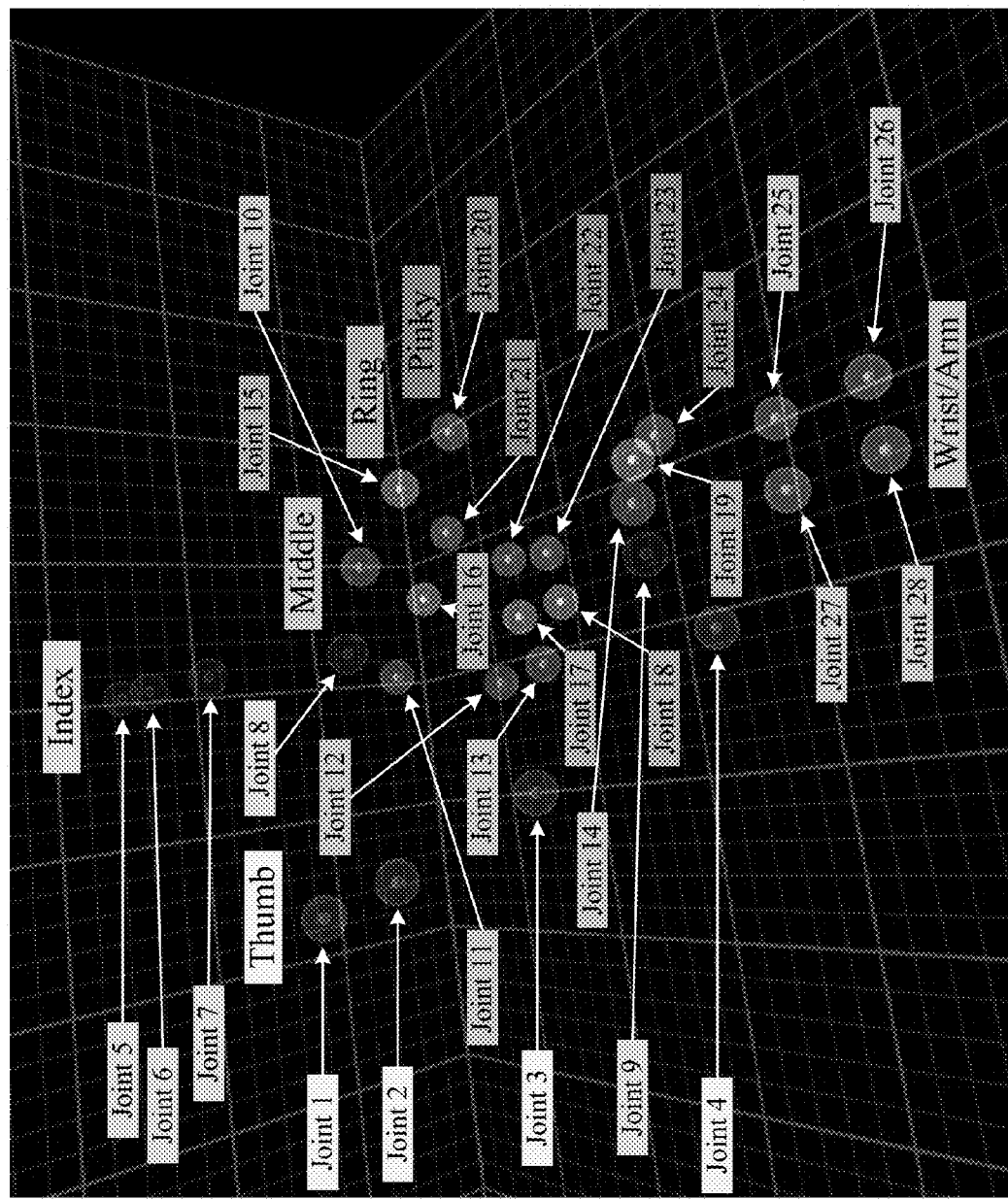

FIGS. 5A and 5B show one implementation of ground truth hand pose estimates with twenty-eight (28) joint locations of the hand in three-dimensions (3D).

FIG. 6 is one implementation of sub-sampling layers in accordance with one implementation of the technology disclosed.

Figure 7:
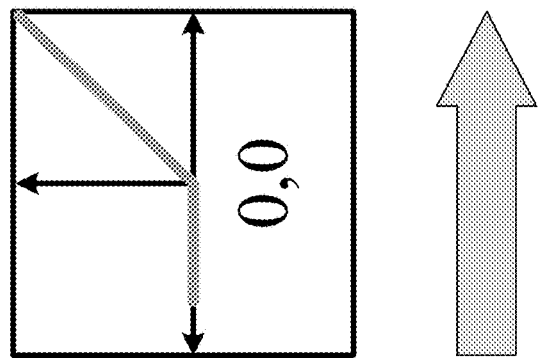

FIG. 7 shows one implementation of non-linear layers in accordance with one implementation of the technology disclosed.

Figure 8:
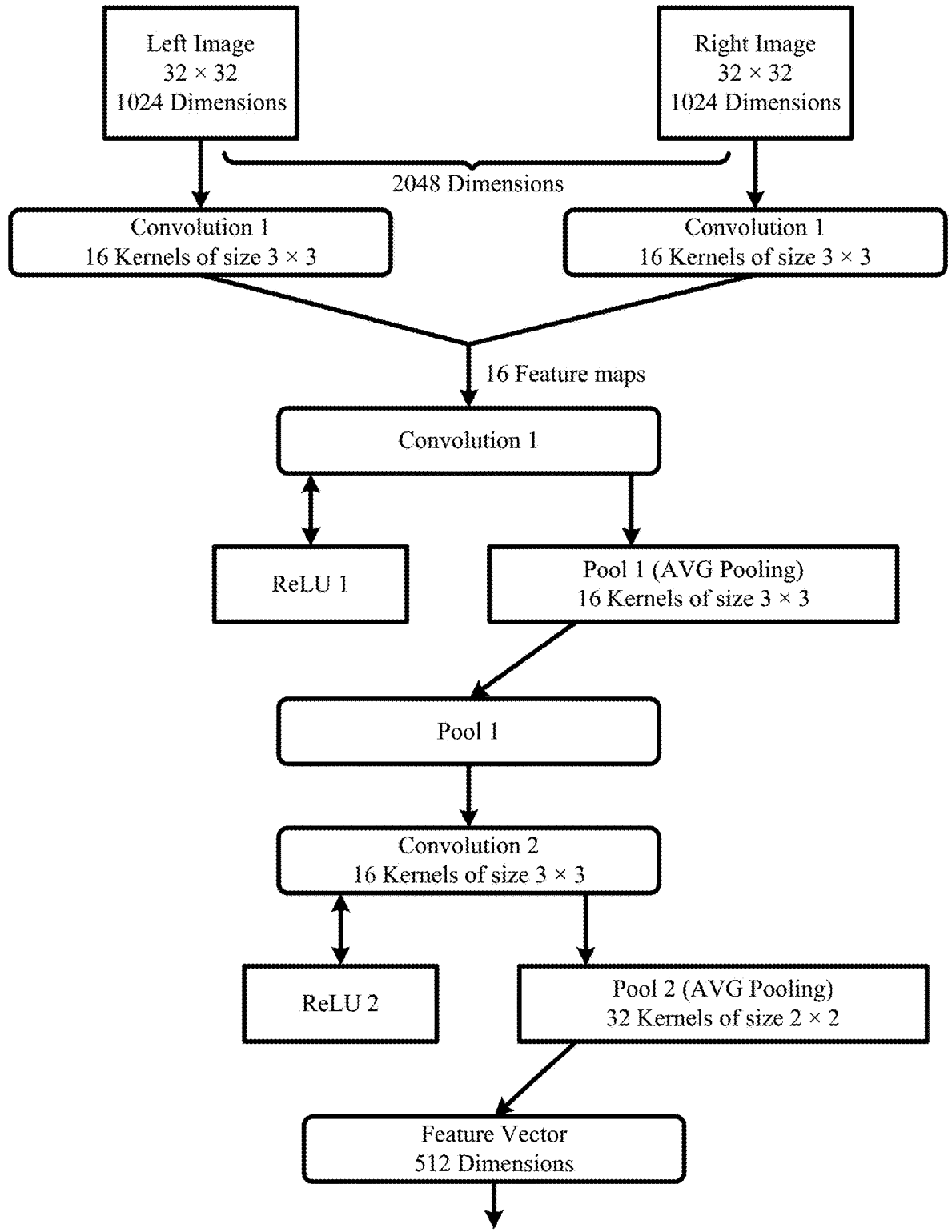

FIG. 8 depicts one implementation of a two-layer convolution of the convolution layers.

FIG. 9 illustrates real images of two sets of sixteen (16) 3×3 convolution kernels learned and used for feature extraction from stereoscopic images.

Figure 10:
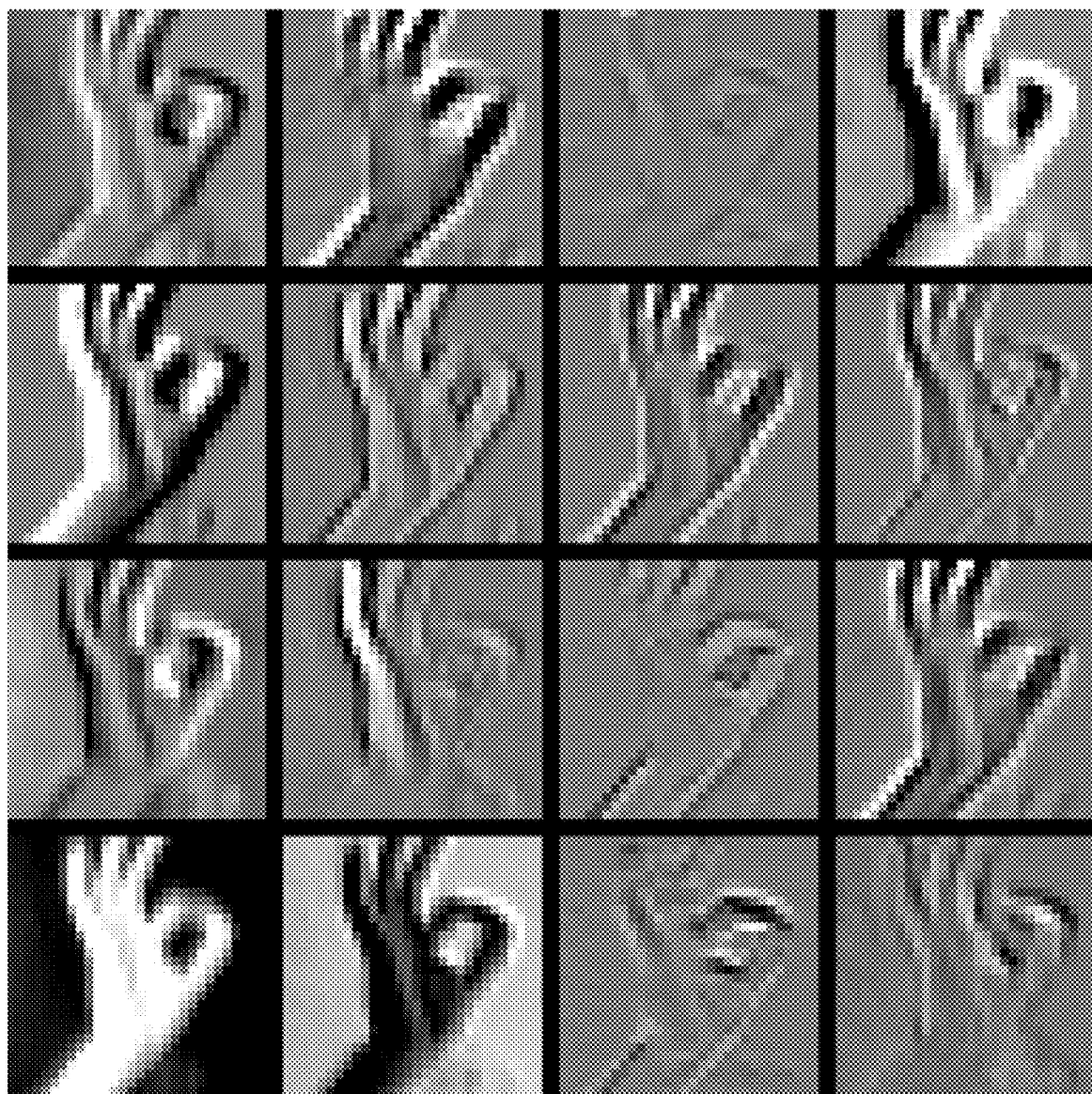

FIG. 10 illustrates a real image of the resulting feature map produced by the convolution kernels shown in FIG. 9.

Figure 11:
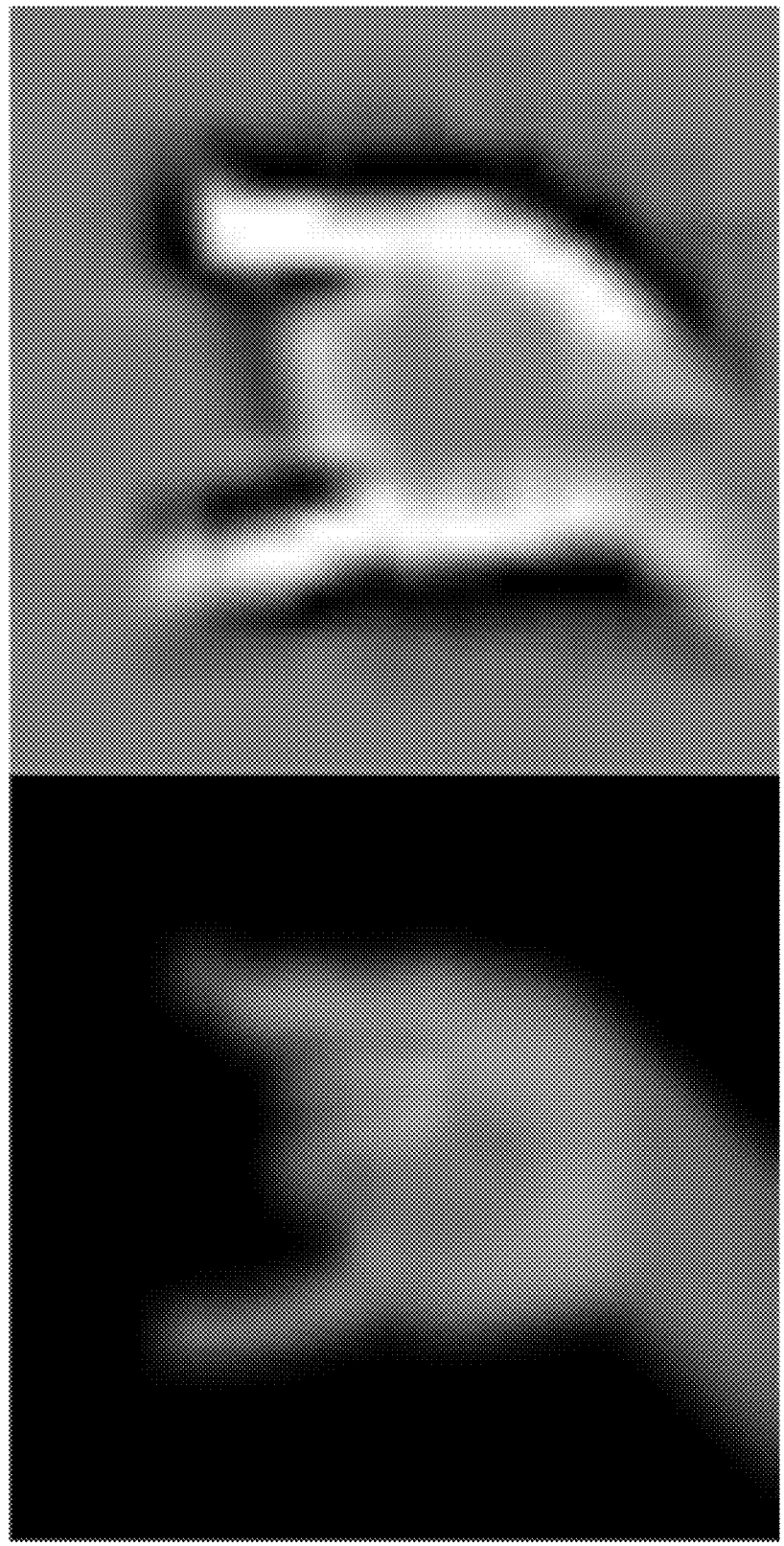

FIG. 11 illustrates how the learned convolution kernels applied locally to an input image (on the left) produce a convolved image (on the right) that is robust to the background and the clutter.

Figure 12:
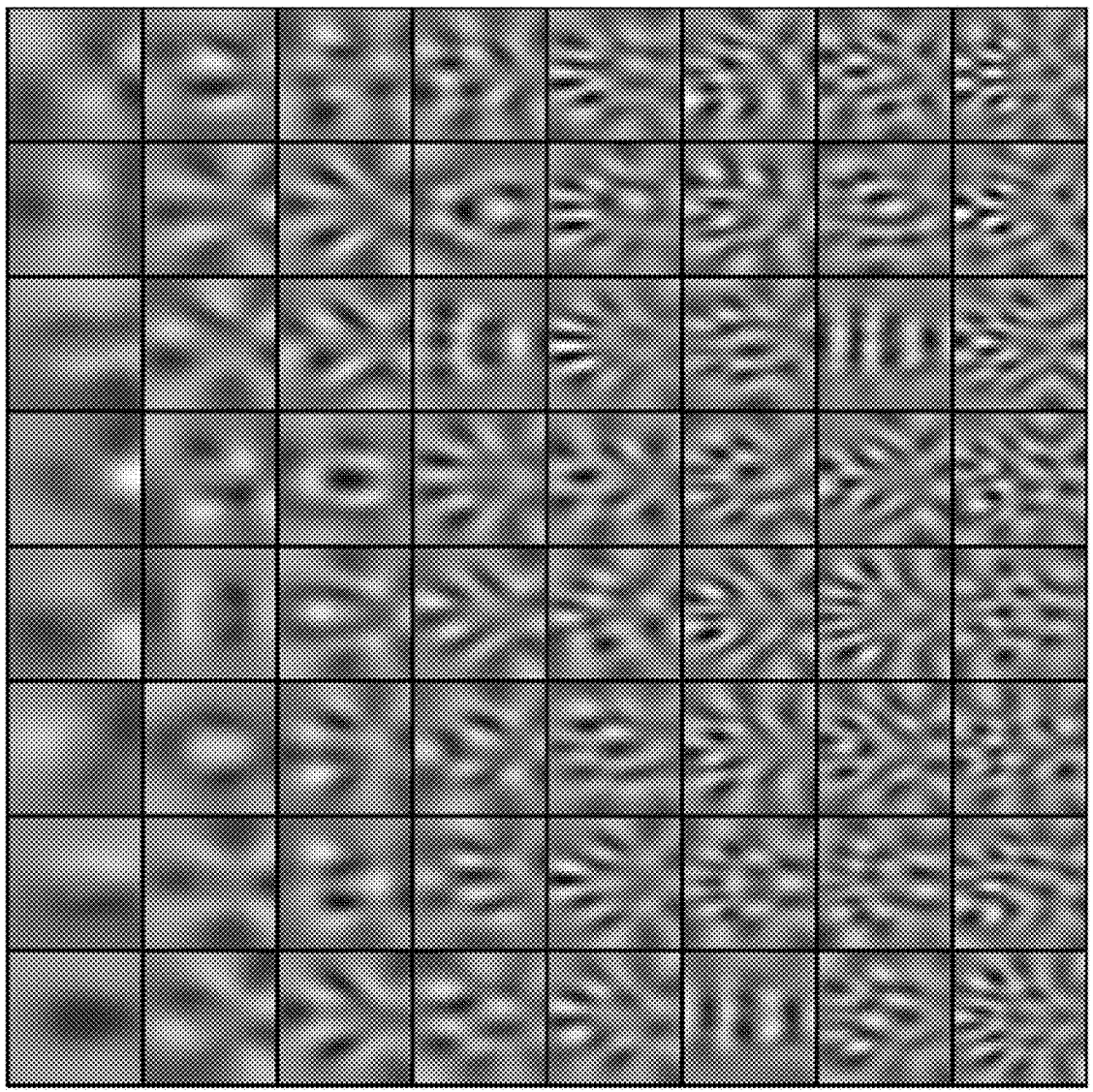

FIG. 12 depicts one implementation of a principal component analysis (PCA) basis used for feature extraction in accordance with one implementation of the technology disclosed.

Figure 13:
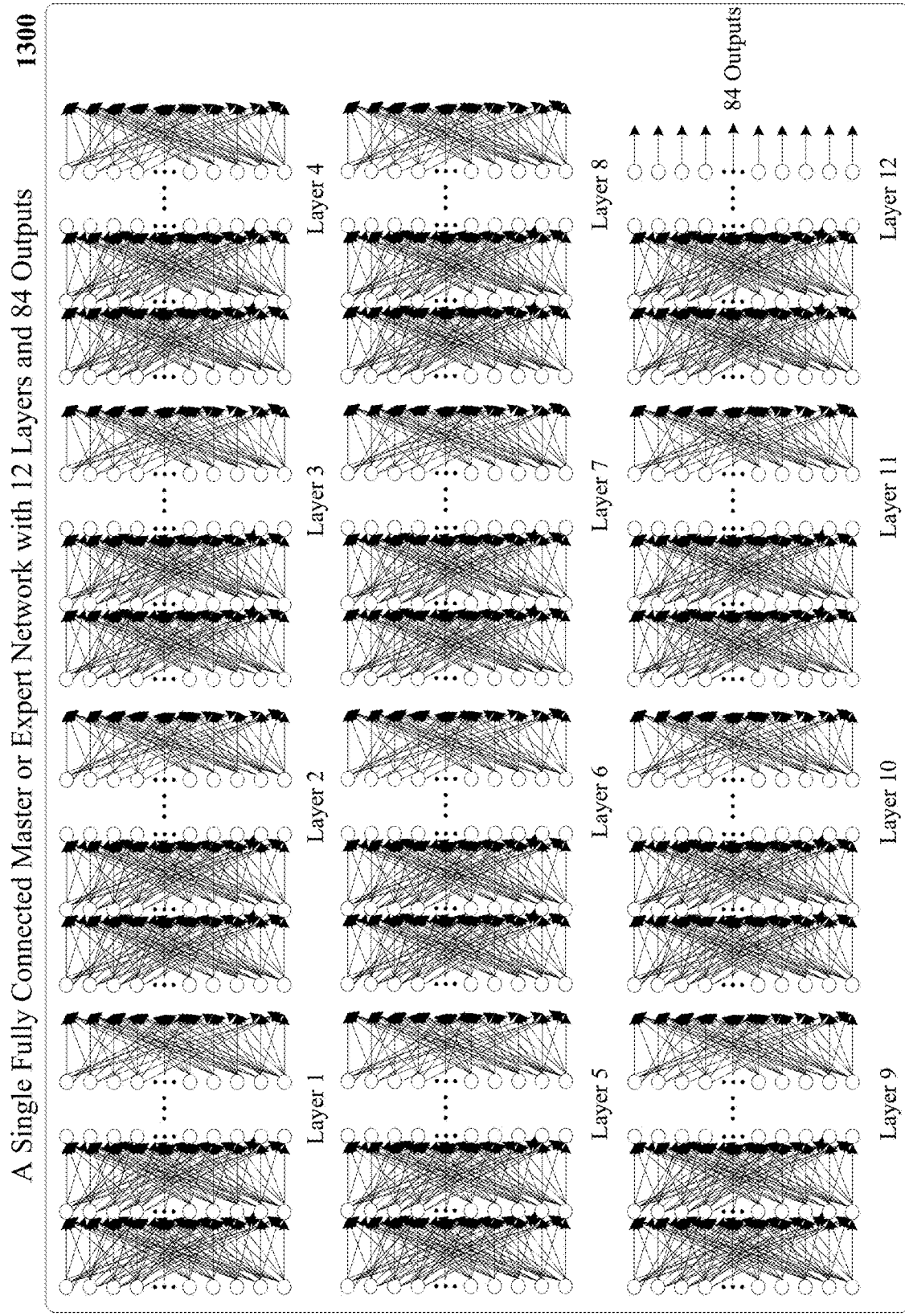

FIG. 13 illustrates one implementation of a fully connected master network or a fully connected expert network.

FIG. 14 depicts one implementation of three (3) master networks that are trained on different versions of training data created by the validation data split.

Figure 15:
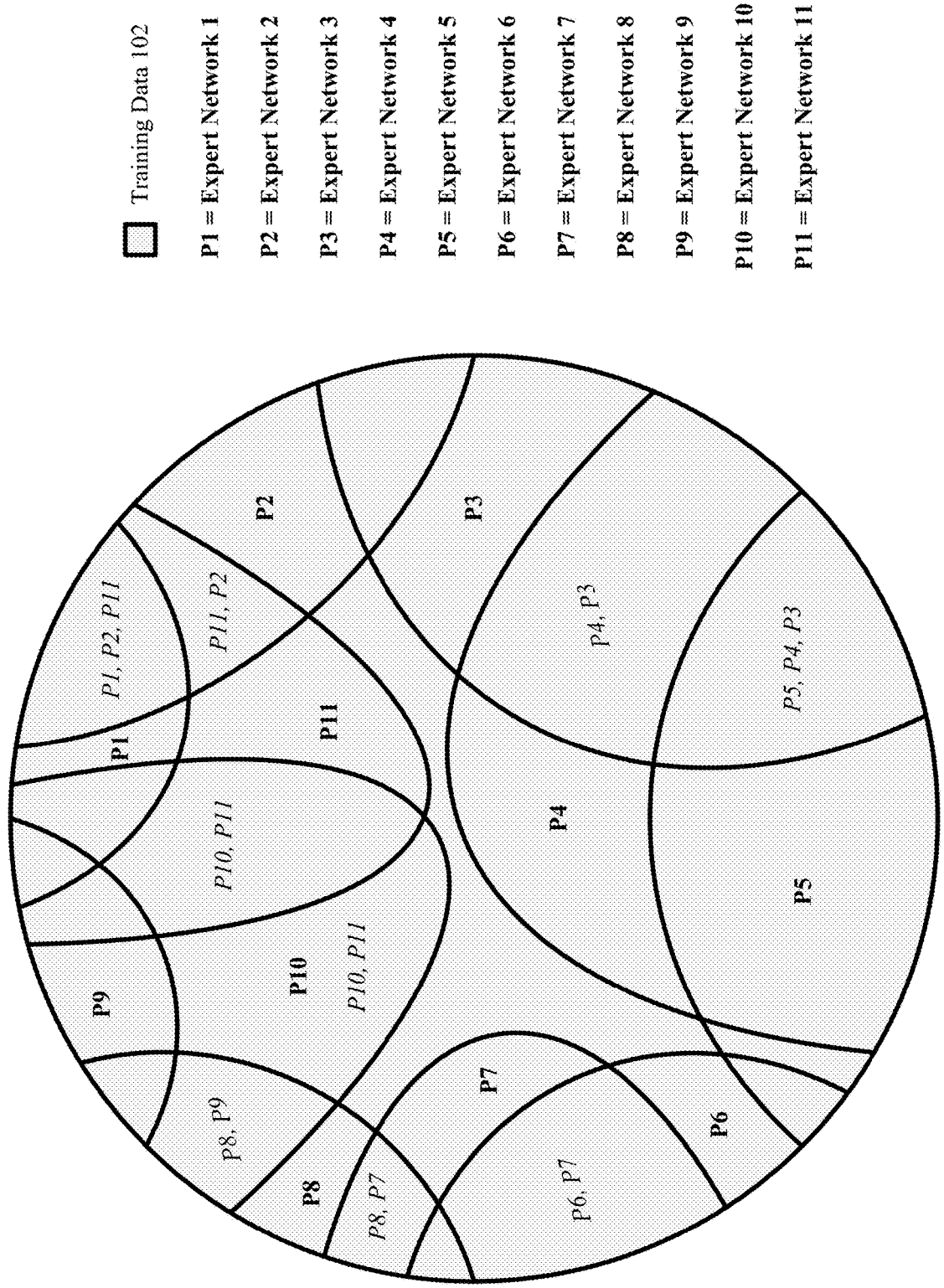

FIG. 15 shows one implementation of partitioning training data on which expert networks are trained.

Figure 16:
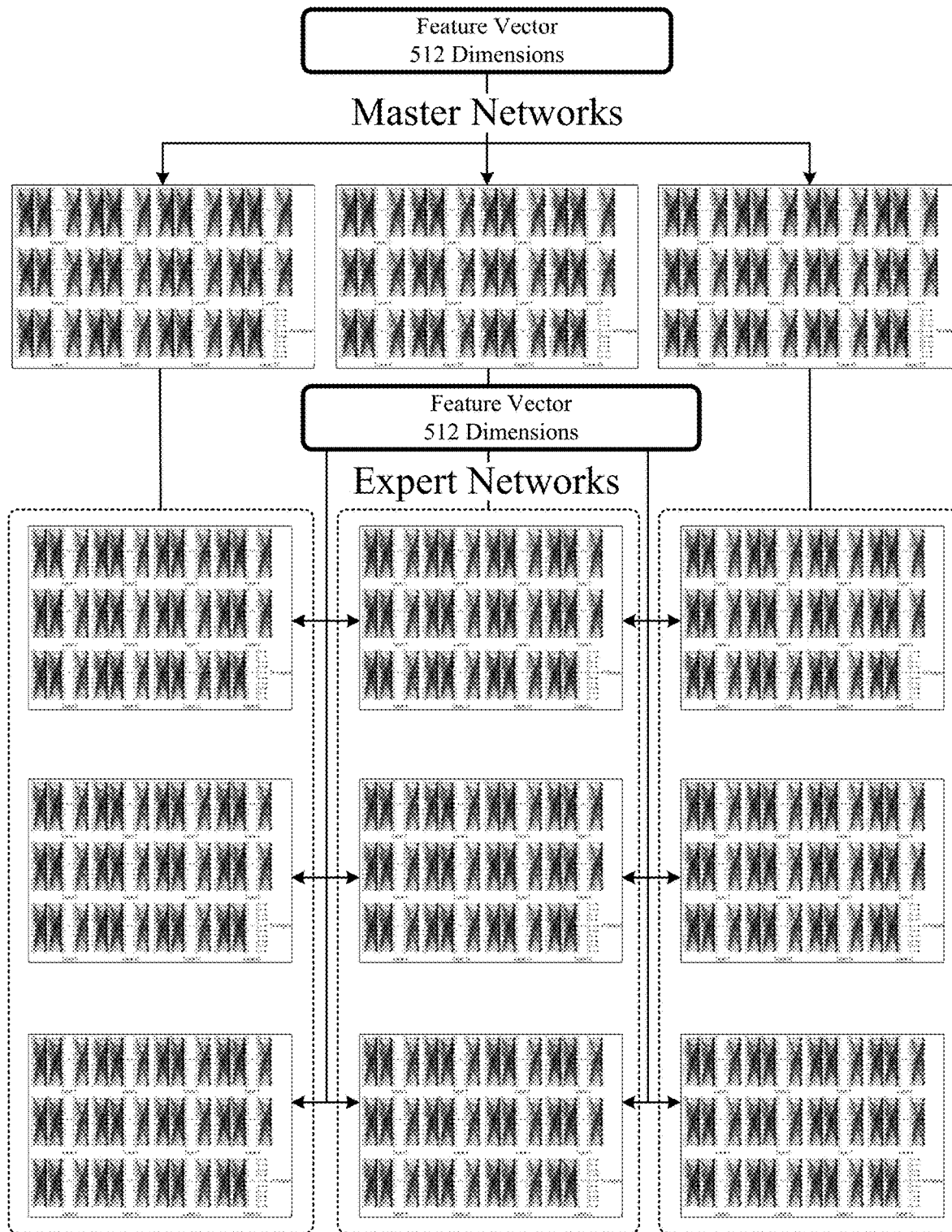

FIG. 16 illustrates one implementation of synergy between the master networks and expert networks during testing.

Figure 17:
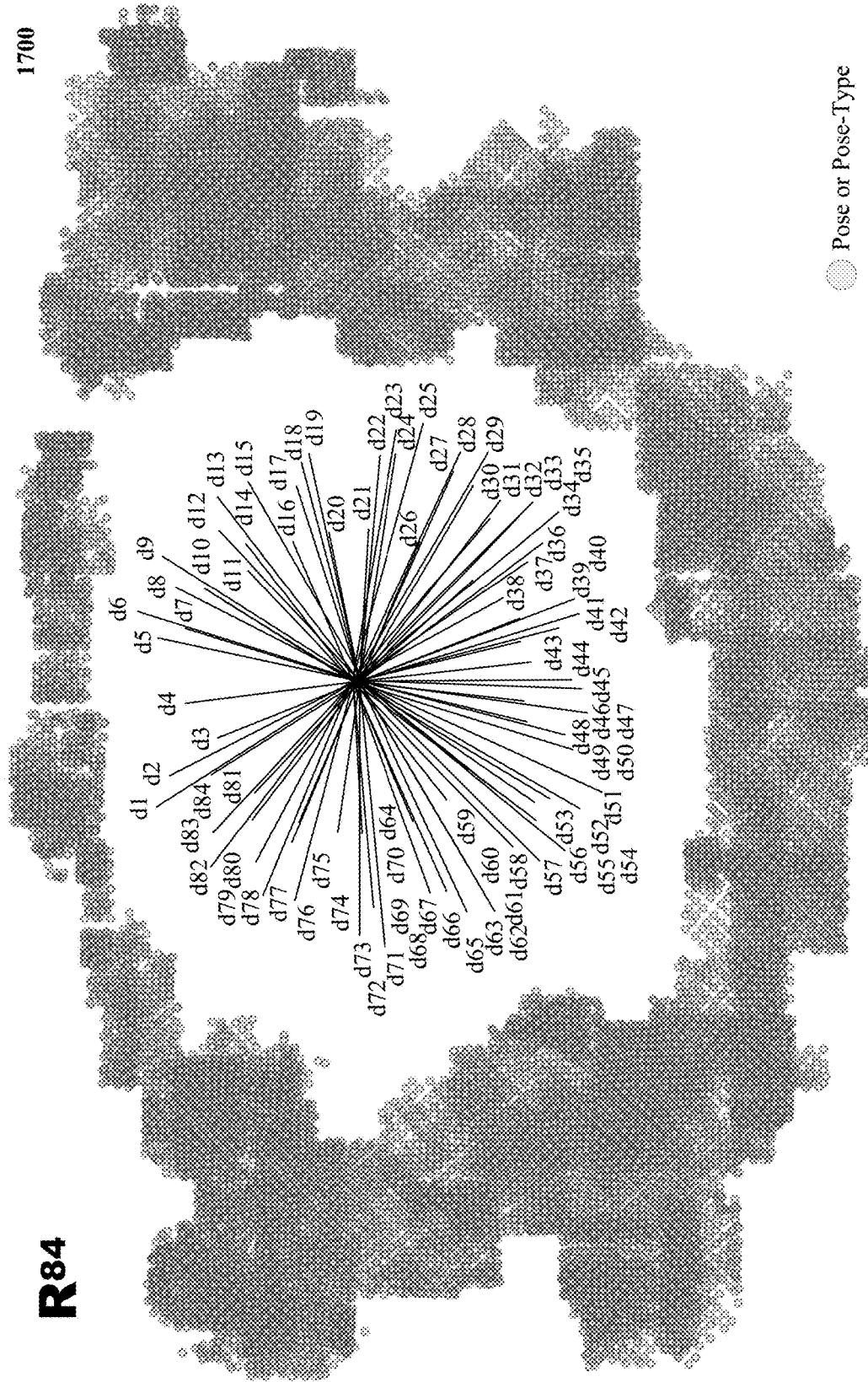

FIG. 17 illustrates one implementation of a pose space of training data in an eighty-four (d1-d84) dimensional coordinate system representing eighty-four (84) dimensional hand poses comprised of twenty-eight (28) 3D ($x_0$, $Y_0$, $z_0$) hand joints.

Figure 18:
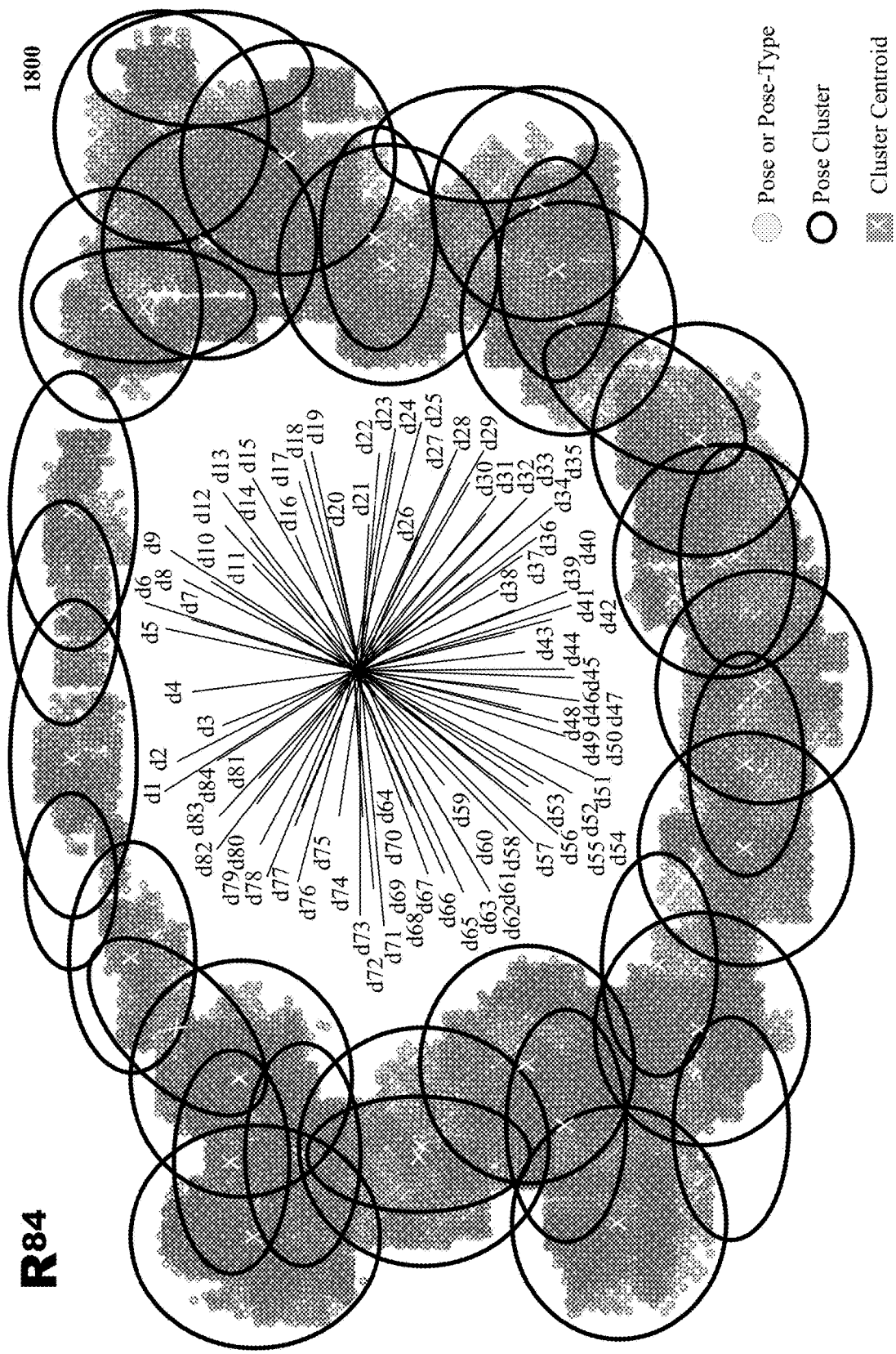

FIG. 18 illustrates one implementation of a clustered pose space.

Figure 19:
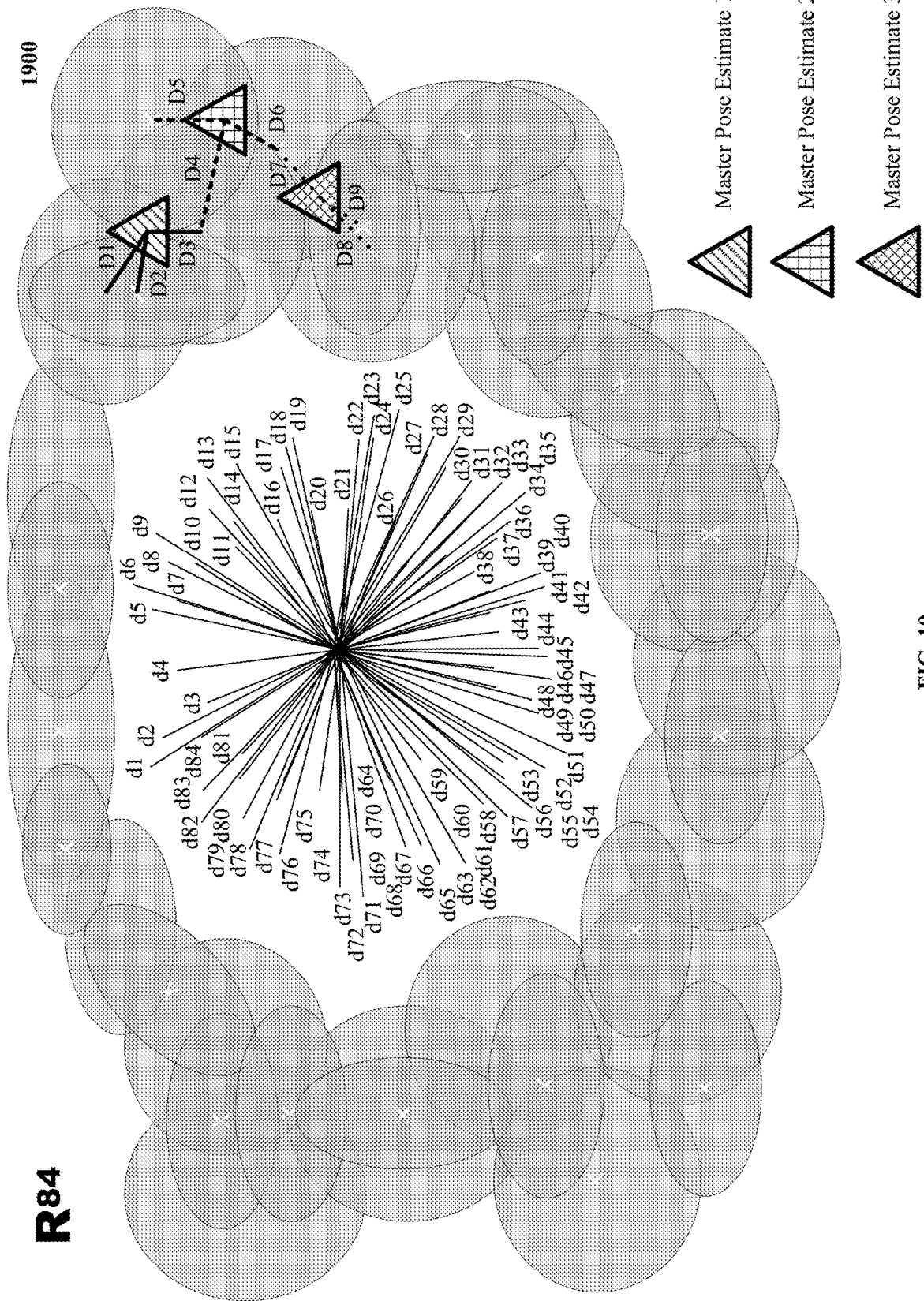

FIG. 19 shows one implementation of synergy between master networks and expert networks in pose space.

FIG. 20 shows a representative method of synergy between atemporal master networks and atemporal expert networks in accordance with one implementation of the technology disclosed.

Figure 21:
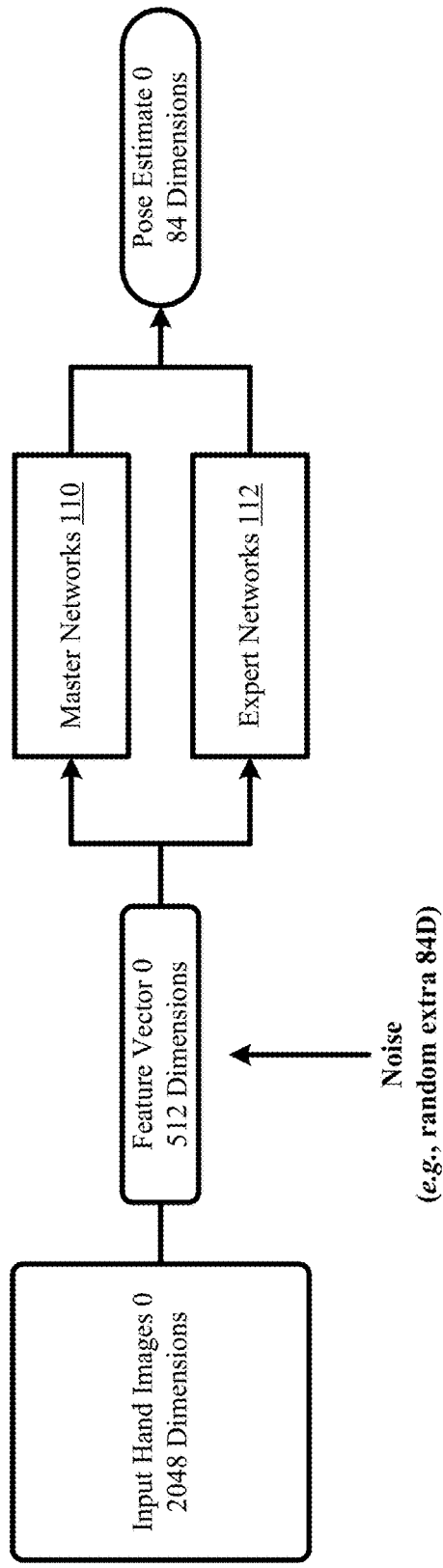

FIG. 21 is one implementation of training temporal master networks and temporal expert networks.

FIG. 22 is one implementation of using temporal master networks and temporal expert networks during testing/tracking.

Figure 23:
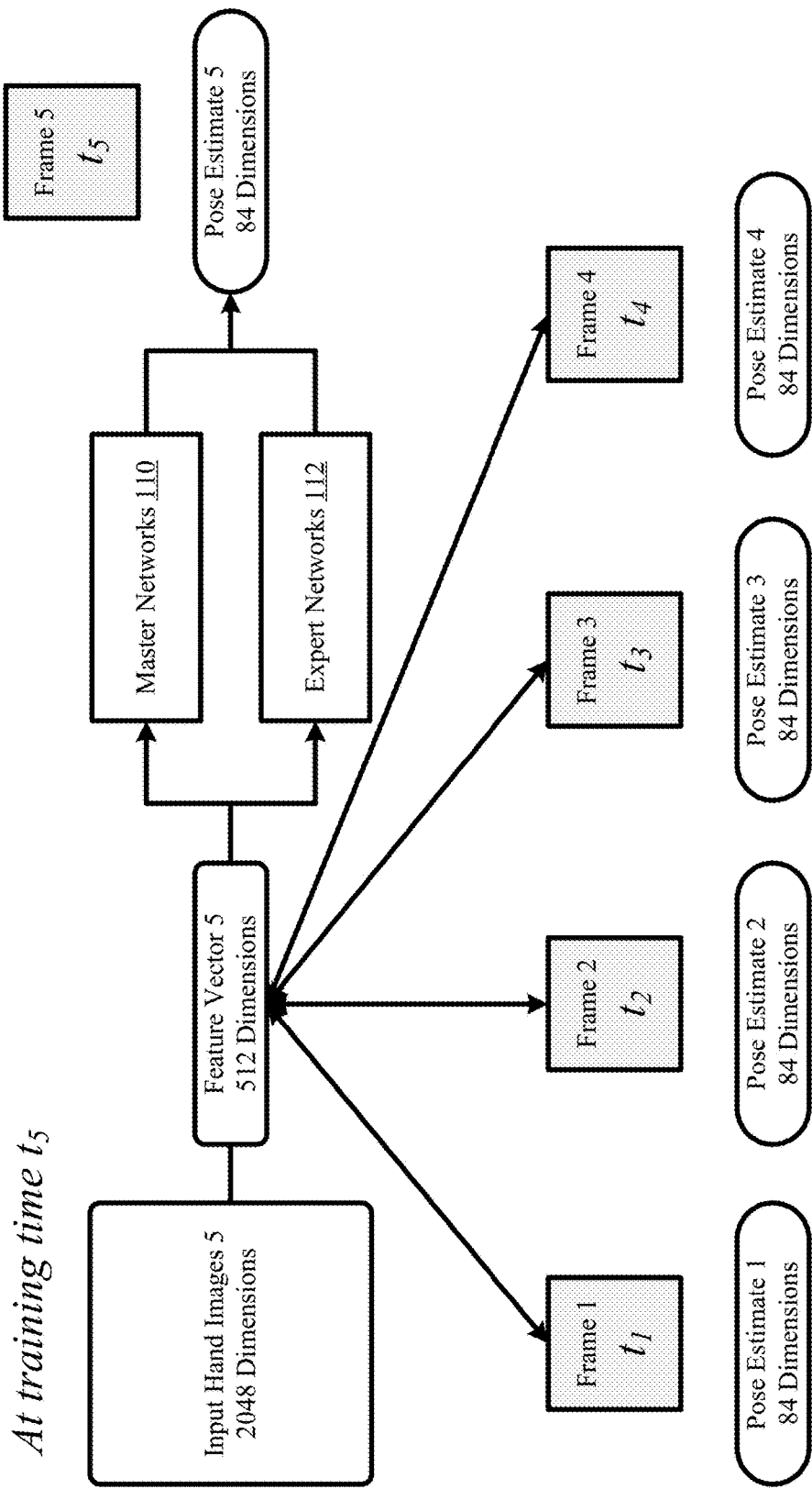

FIG. 23 illustrates one implementation of temporal master networks and temporal expert networks serving as recurrent neural networks (RNNs) based on long short term memory (LSTM).

FIG. 24 shows a representative method of synergy between temporal master networks and temporal expert networks in accordance with one implementation of the technology disclosed.

Figure 25:
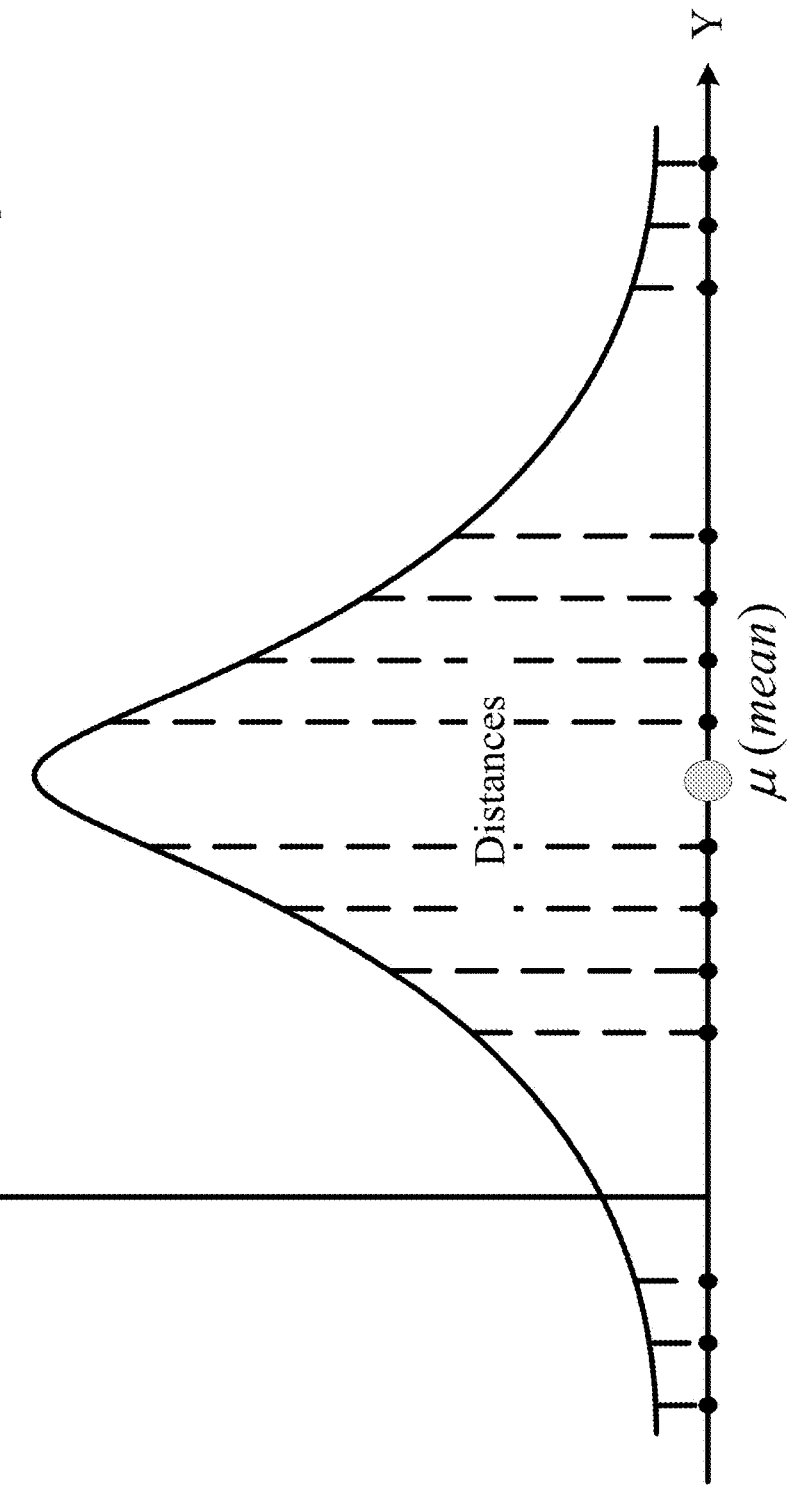

FIG. 25 shows one implementation of a probability distribution function (sample covariance matrix) that illustrates outlier-robust covariance propagation in accordance with one implementation of the technology disclosed.

Figure 26:
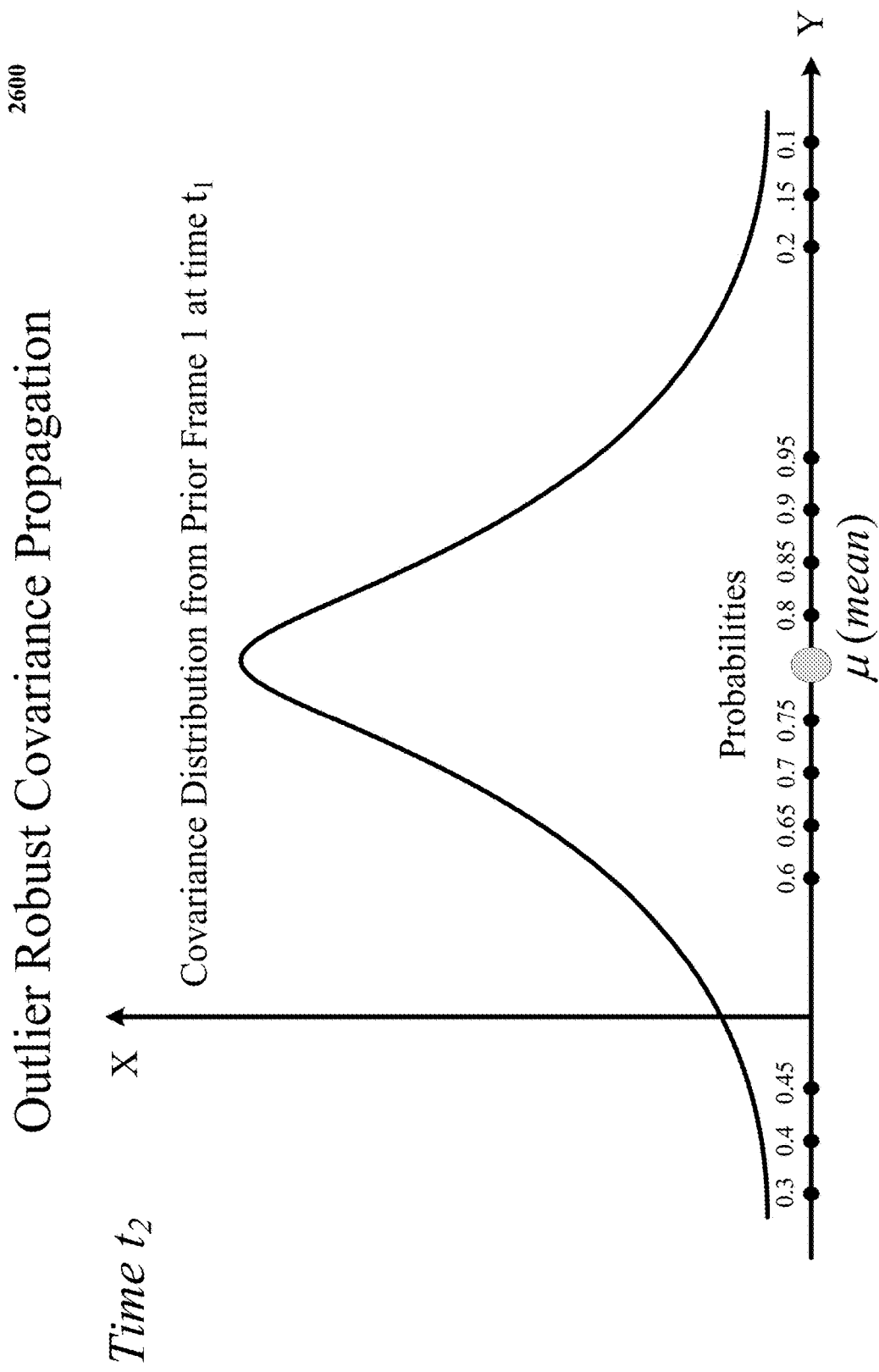

FIG. 26 illustrates the probabilities of the distances of 3D joint estimates (circles) in current frame from the probability distribution function (sample covariance matrix) calculated in FIG. 25.

Figure 27:
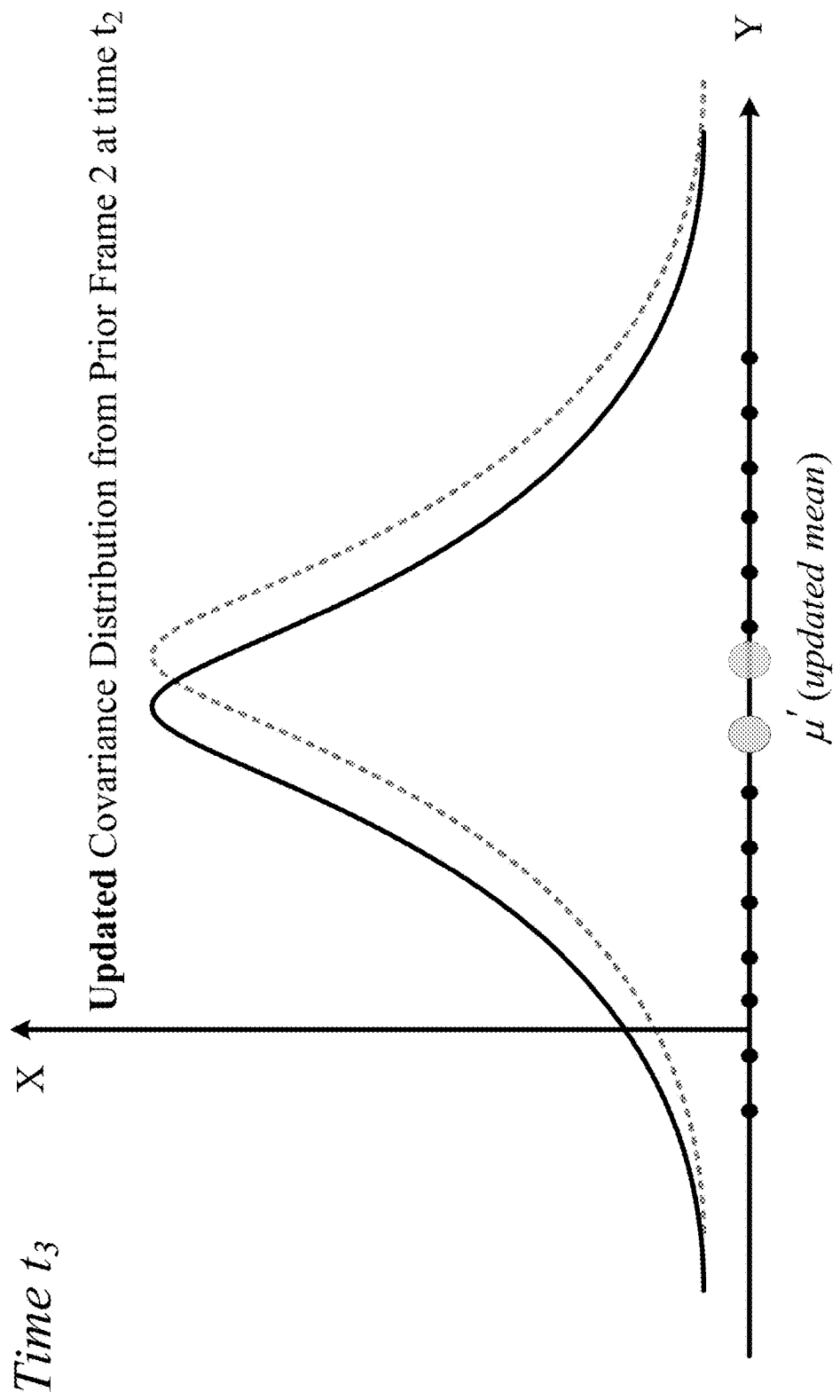

FIG. 27 shows one implementation of a sample covariance matrix propagated from a prior frame to a current frame.

Figure 28:
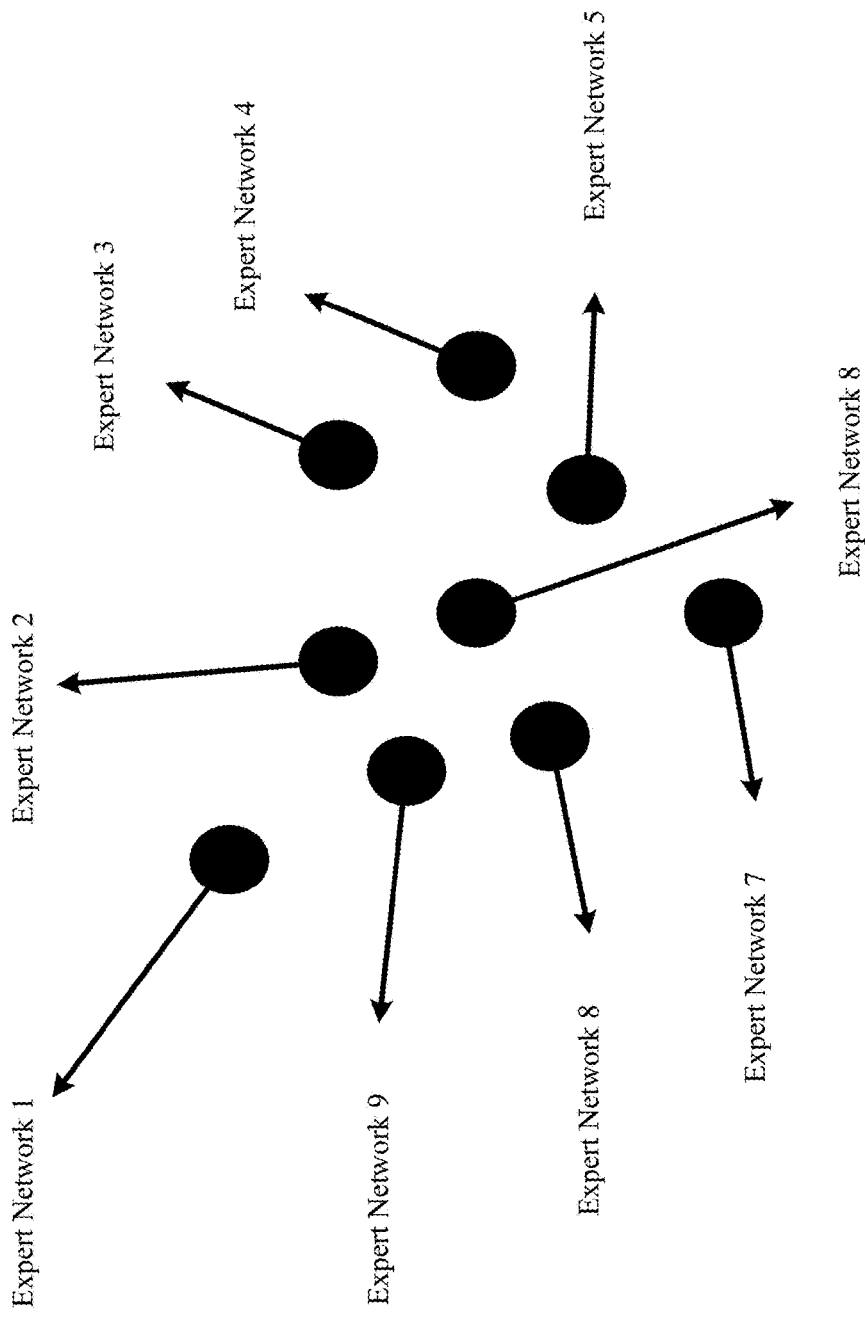

FIG. 28 shows one implementation of a plurality of 3D joint location estimates produced by a plurality of expert networks for a single hand joint.

Figure 29:
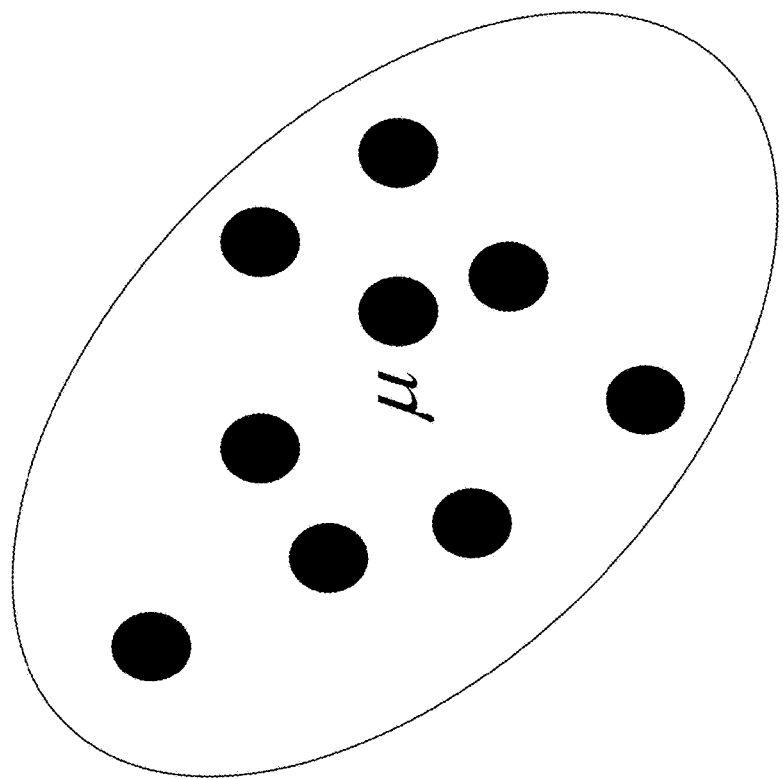

FIG. 29 illustrates one implementation of a covariance distribution and mean calculated for 3D joint location estimates.

Figure 30:
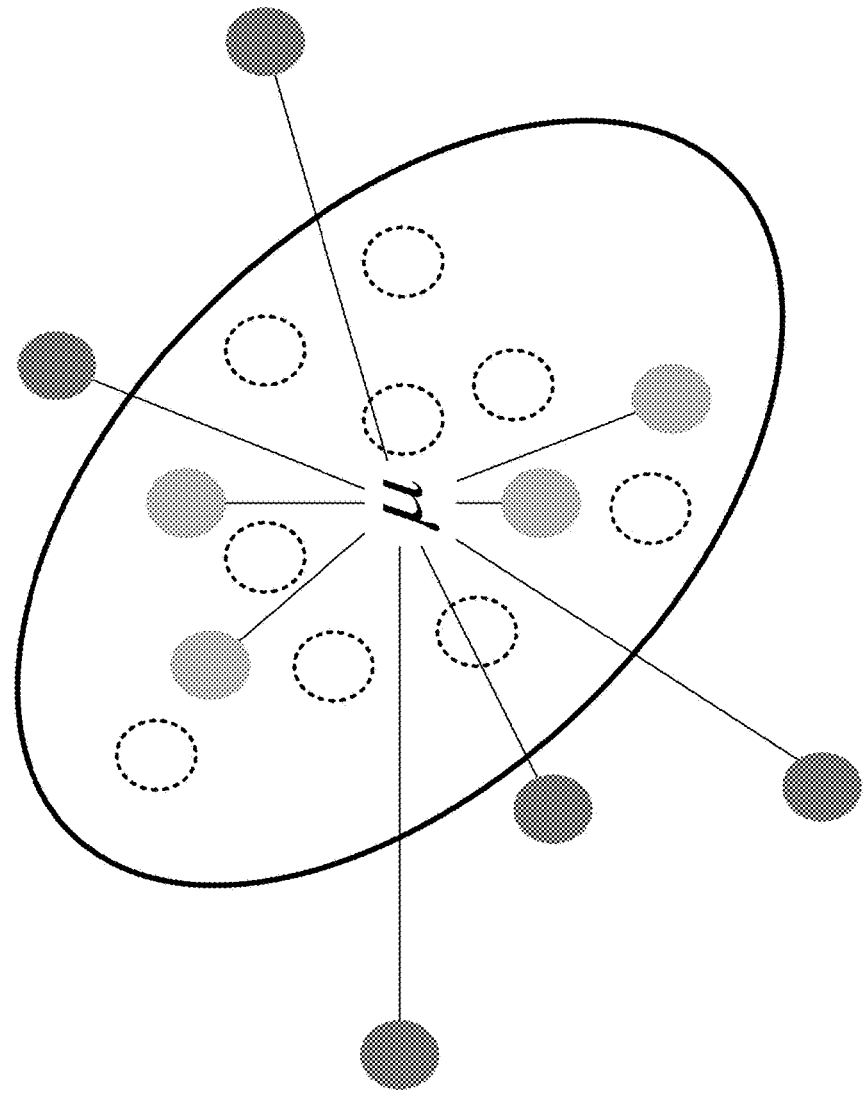

FIG. 30 depicts one implementation of new 3D joint location estimates produced by a plurality of expert networks for the same hand joints shown in FIGS. 28 and 29.

Figure 31:
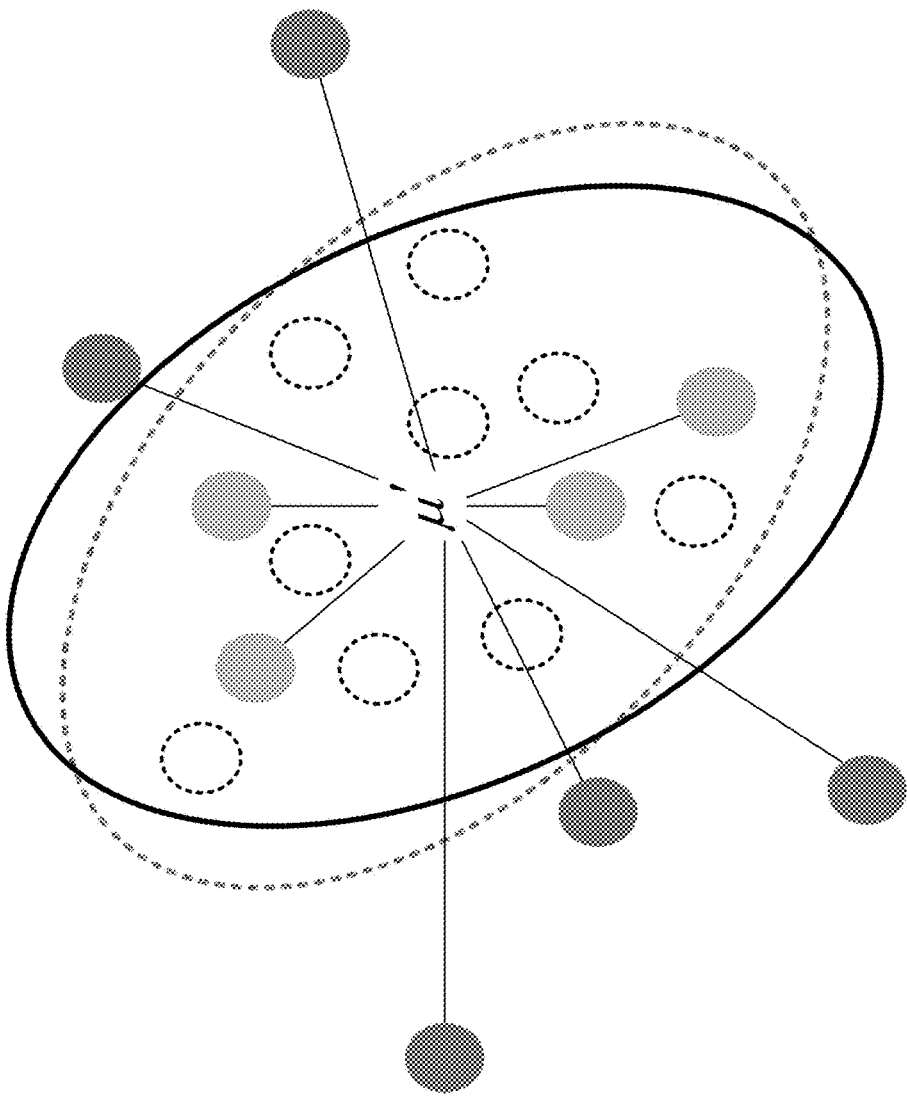
Figure 32A:
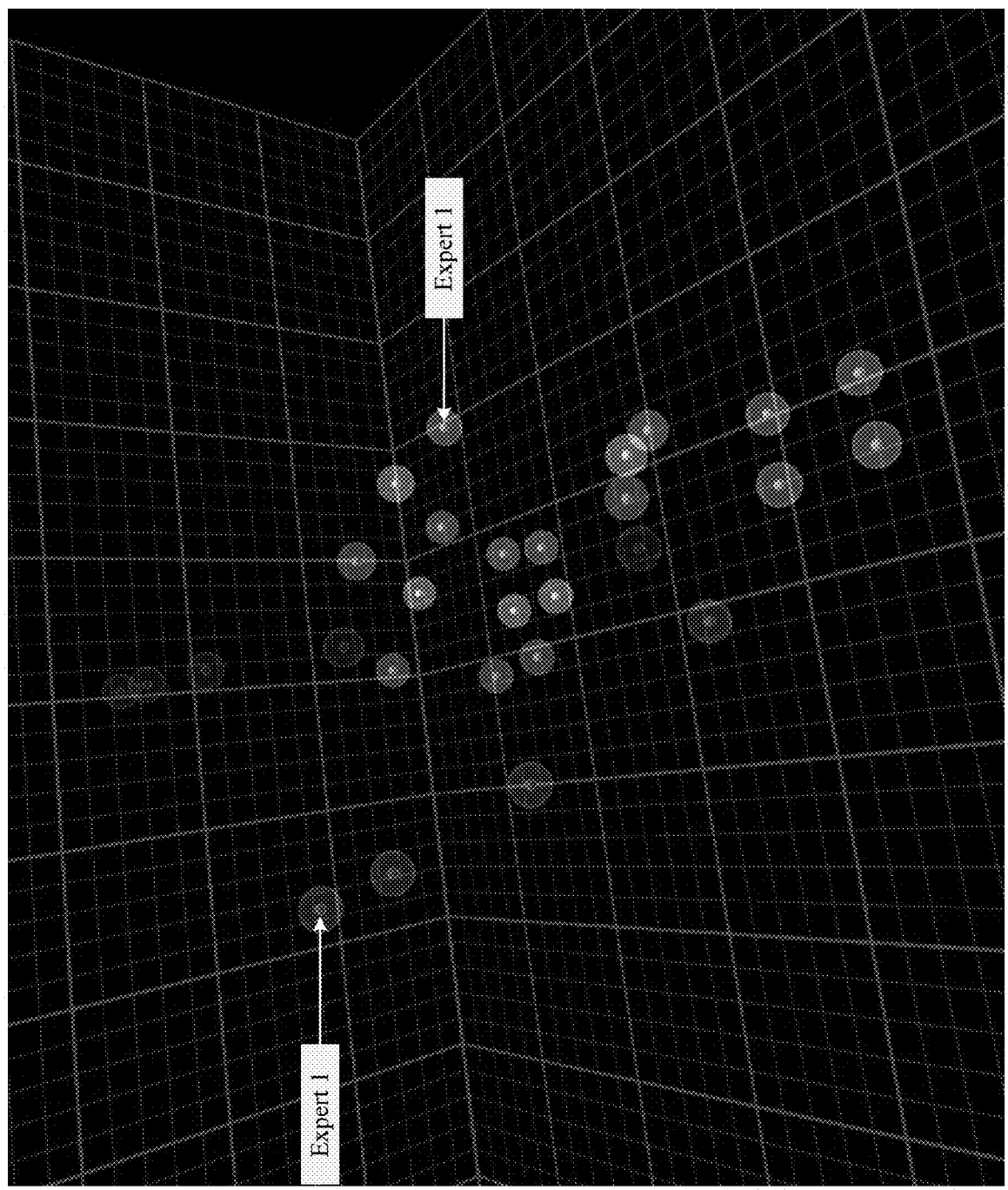
Figure 32B:
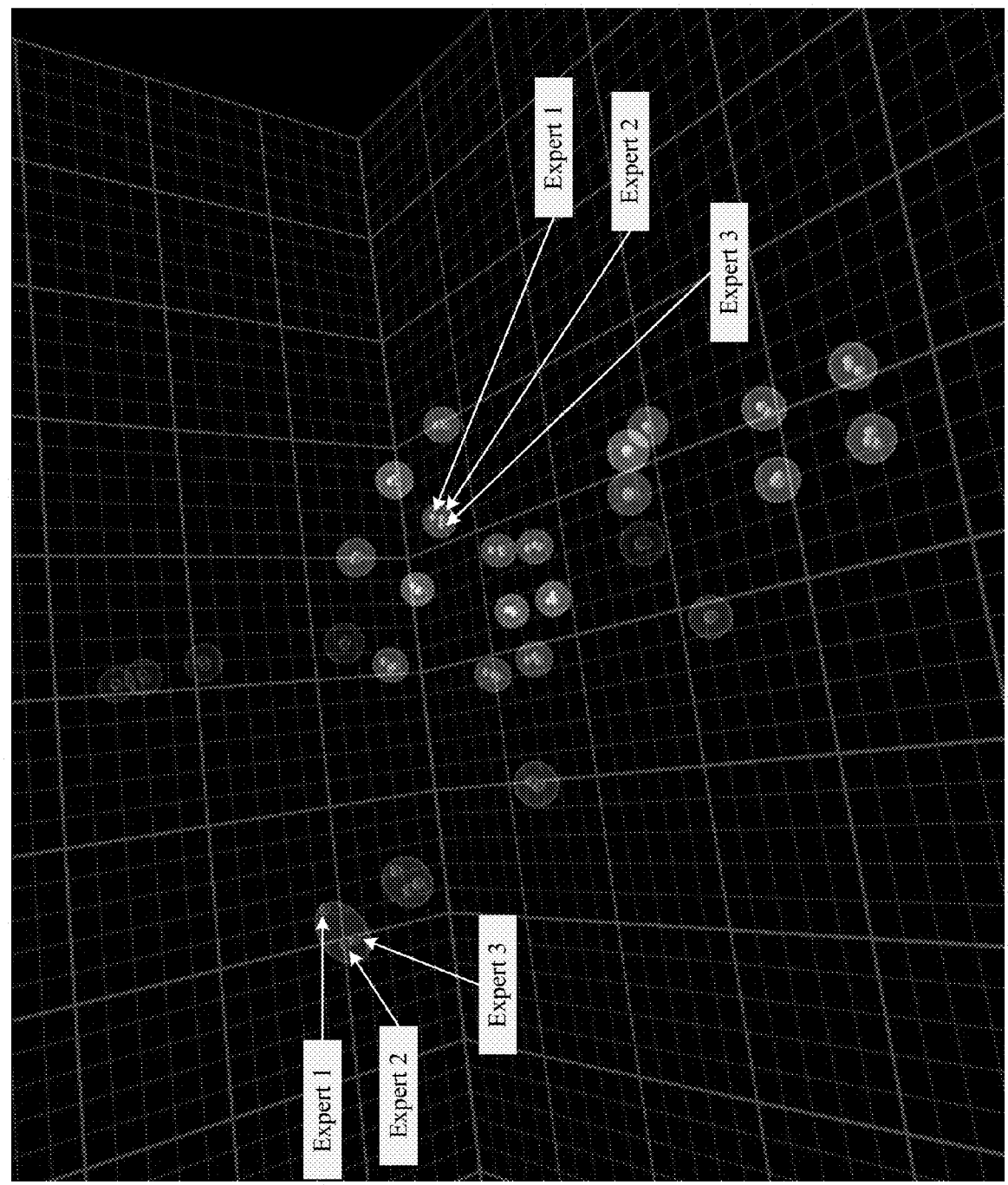
Figure 32C:
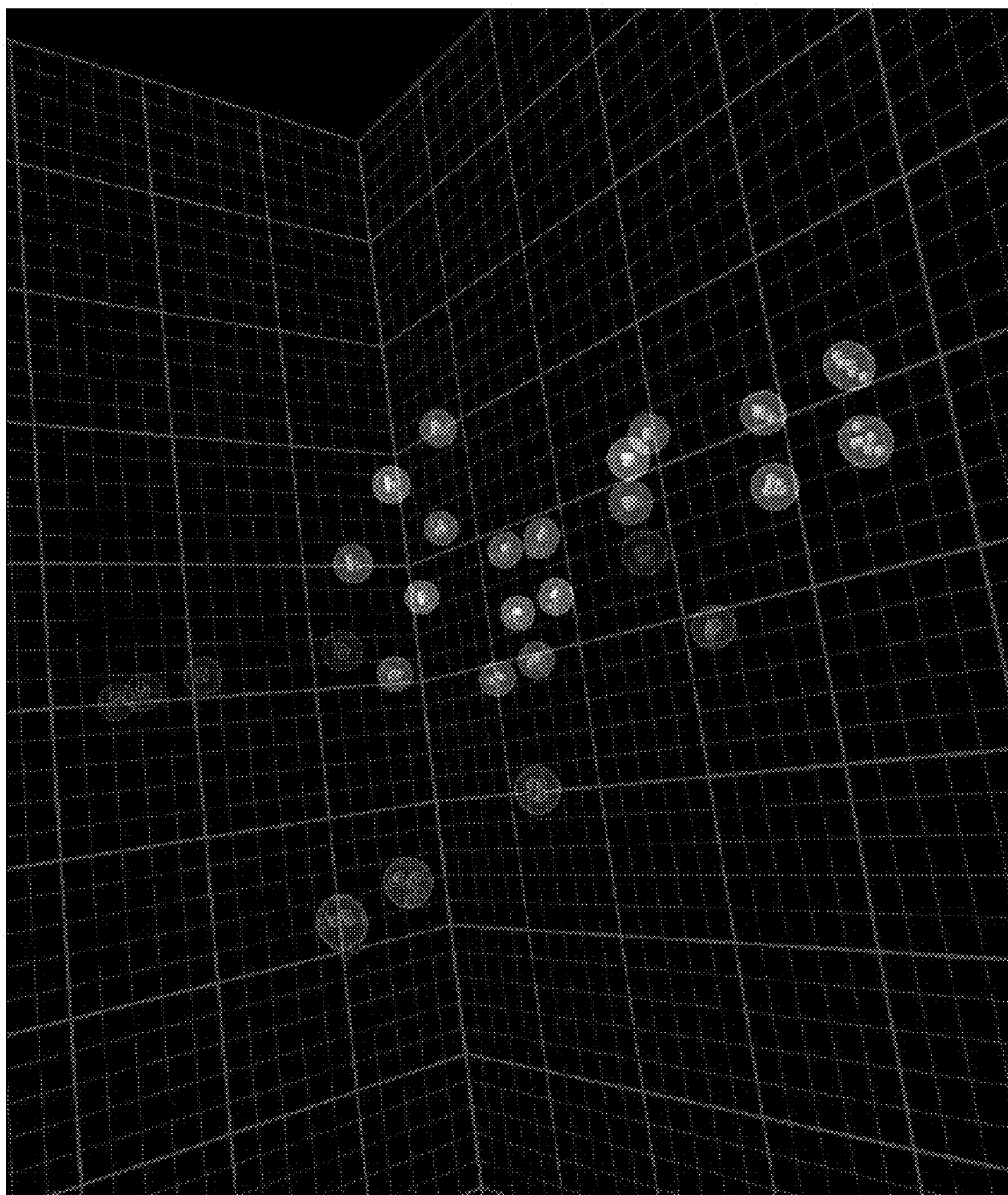
Figure 32D:
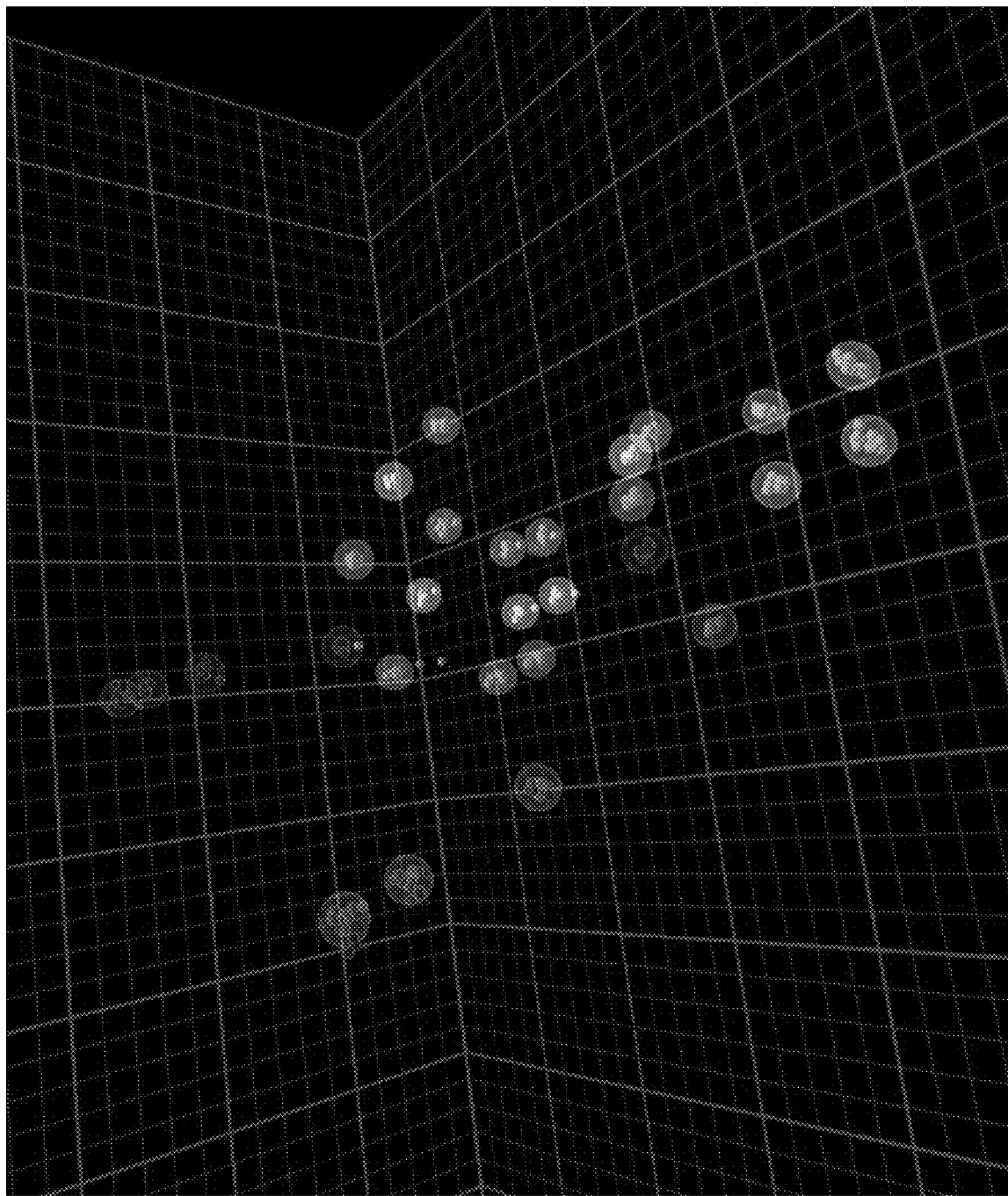

FIG. 31 shows one implementation of determination of inlier and outlier 3D joint location estimates.

FIGS. 32A, 32B, 32C and 32D show a temporal sequence of the outlier-robust covariance propagations simultaneously and concurrently calculated for all twenty-eight (28) joints of the hand.

Figure 33:
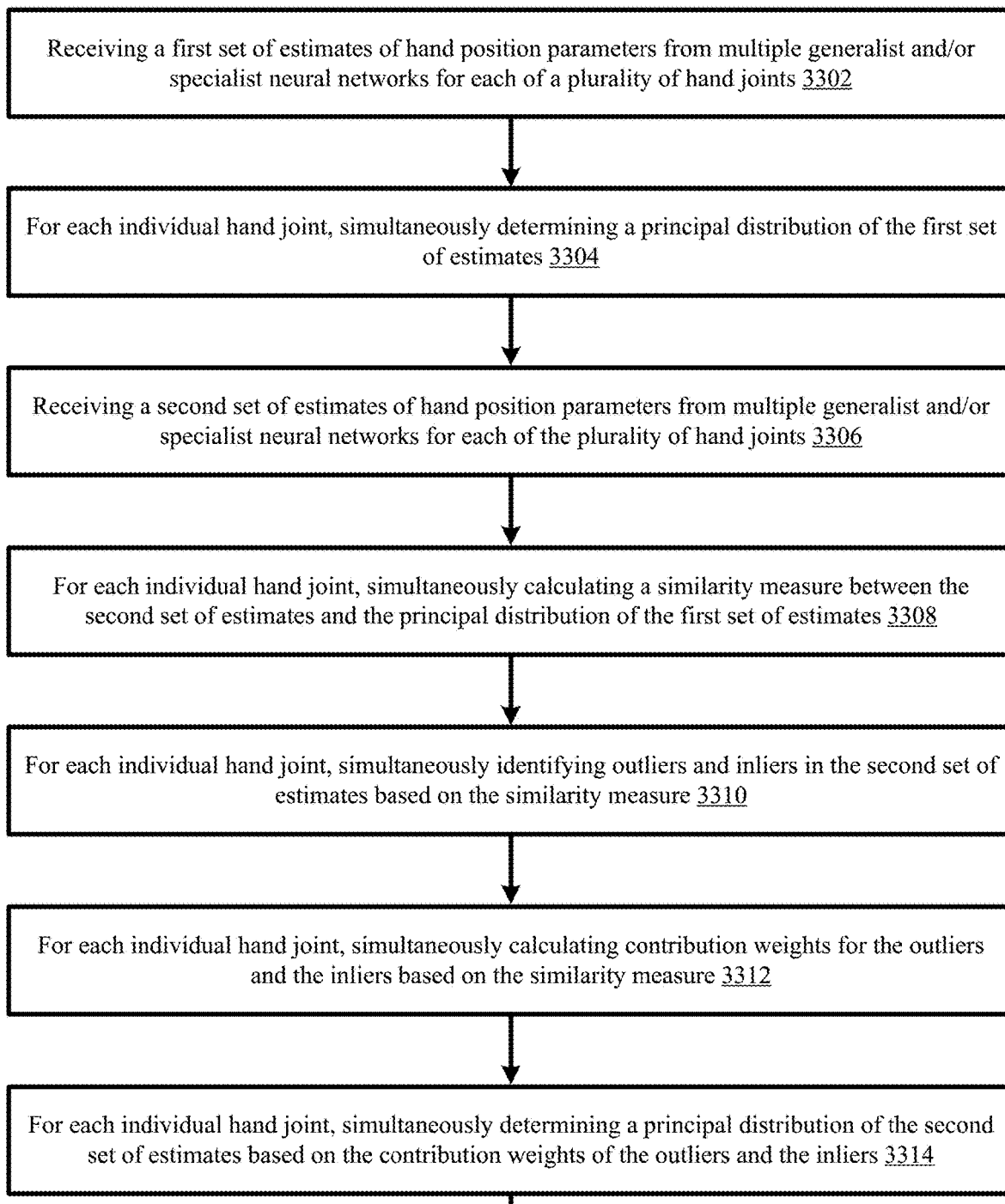

FIG. 33 shows a representative method of hand pose estimation using outlier-robust covariance propagation in accordance with one implementation of the technology disclosed.

Figure 34:
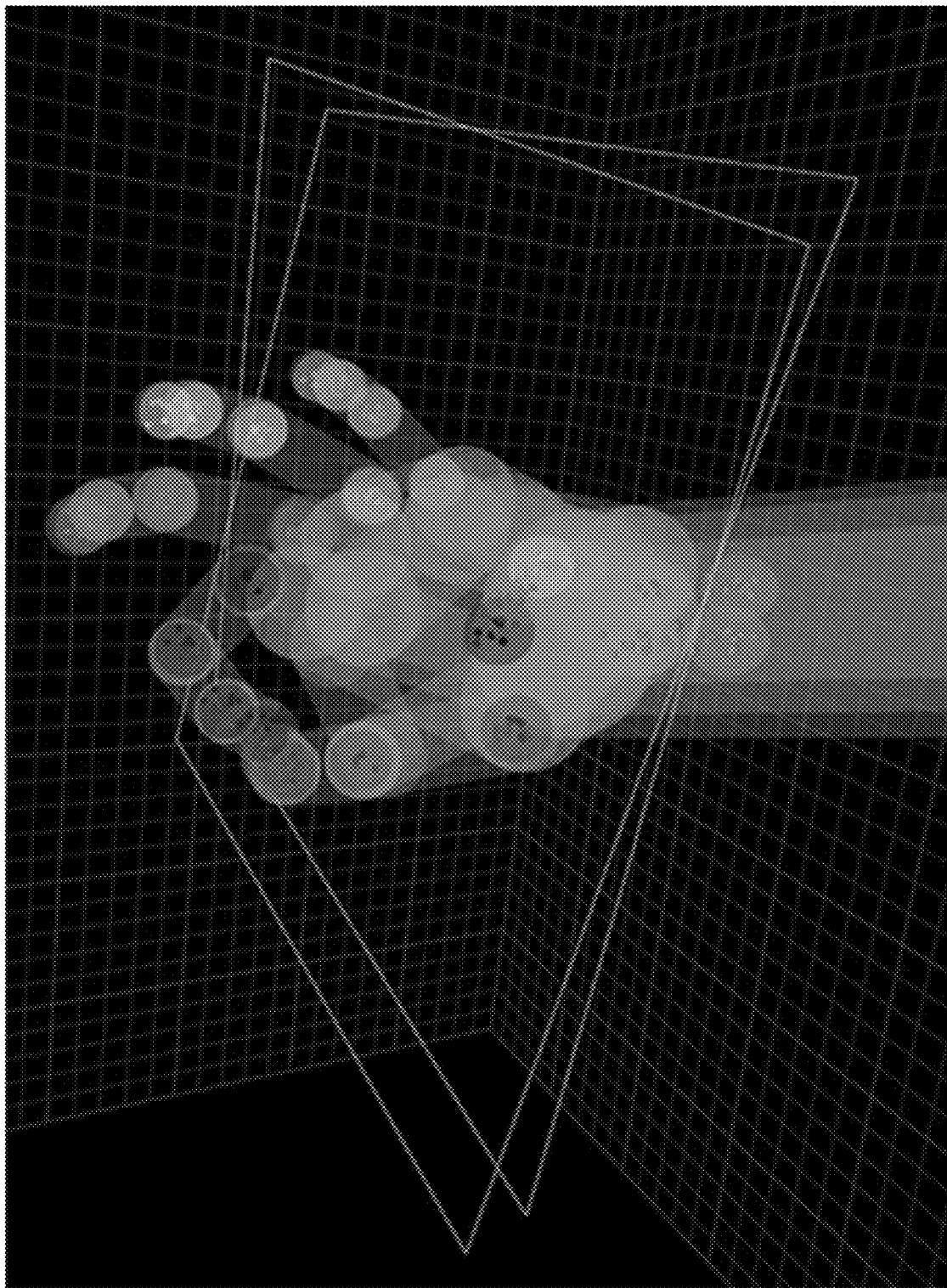

FIG. 34 illustrates one implementation of a fitted hand based on the 3D joint locations of the twenty-eight (28) hand joints.

Figure 35A:
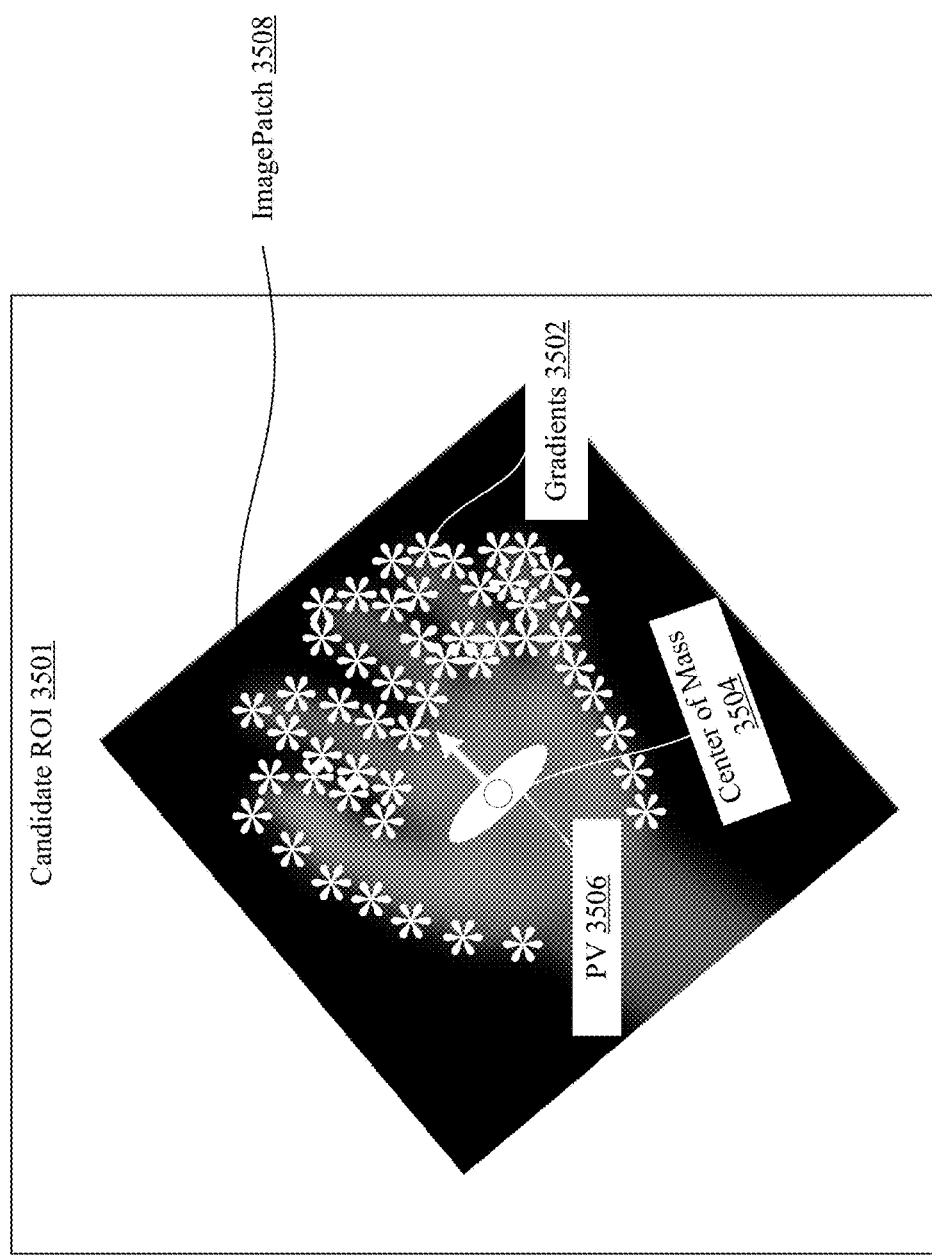

FIG. 35A illustrates one implementation of spatial normalization.

Figure 35B:
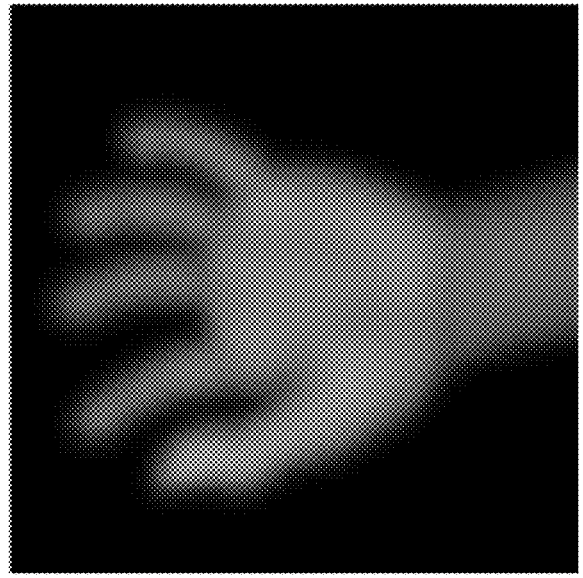

FIG. 35B depicts one implementation of a rotated and extracted ImagePatch.

Figure 35C:
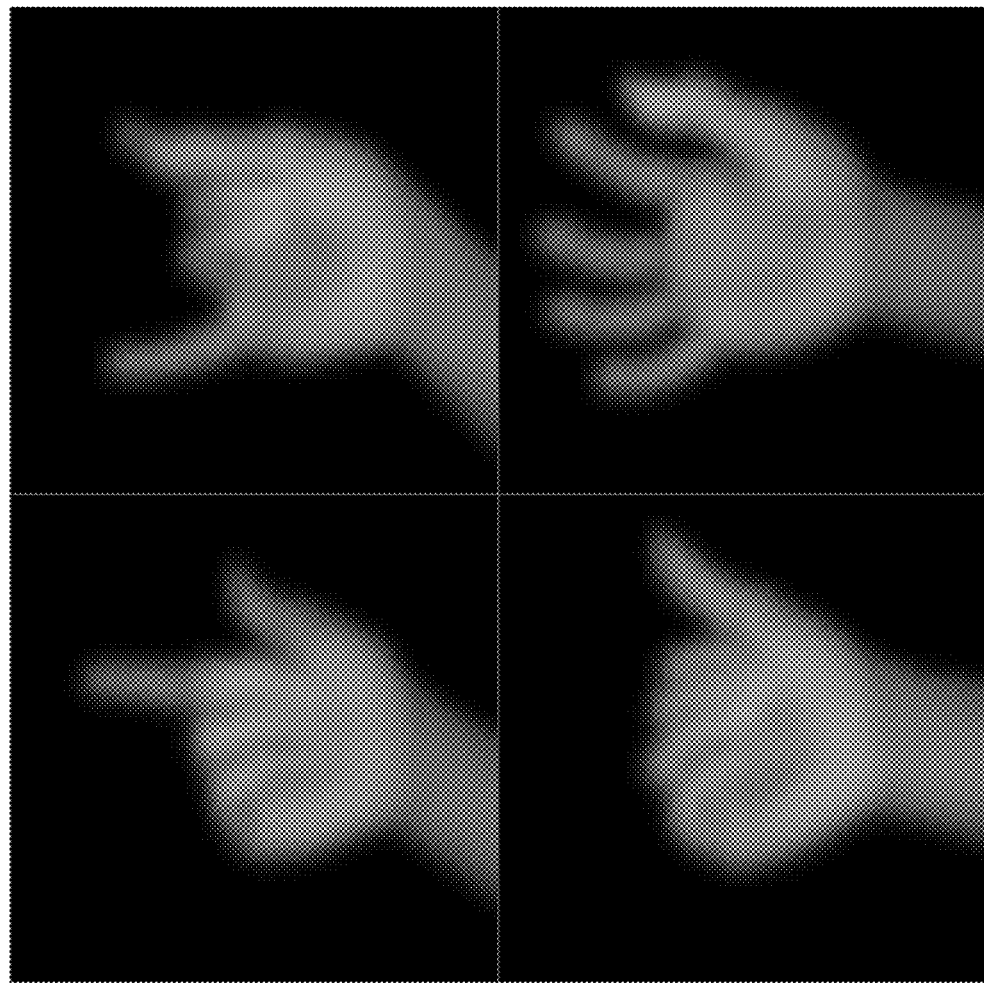

FIG. 35C shows other examples of extracted ImagePatches.

Figure 35D:
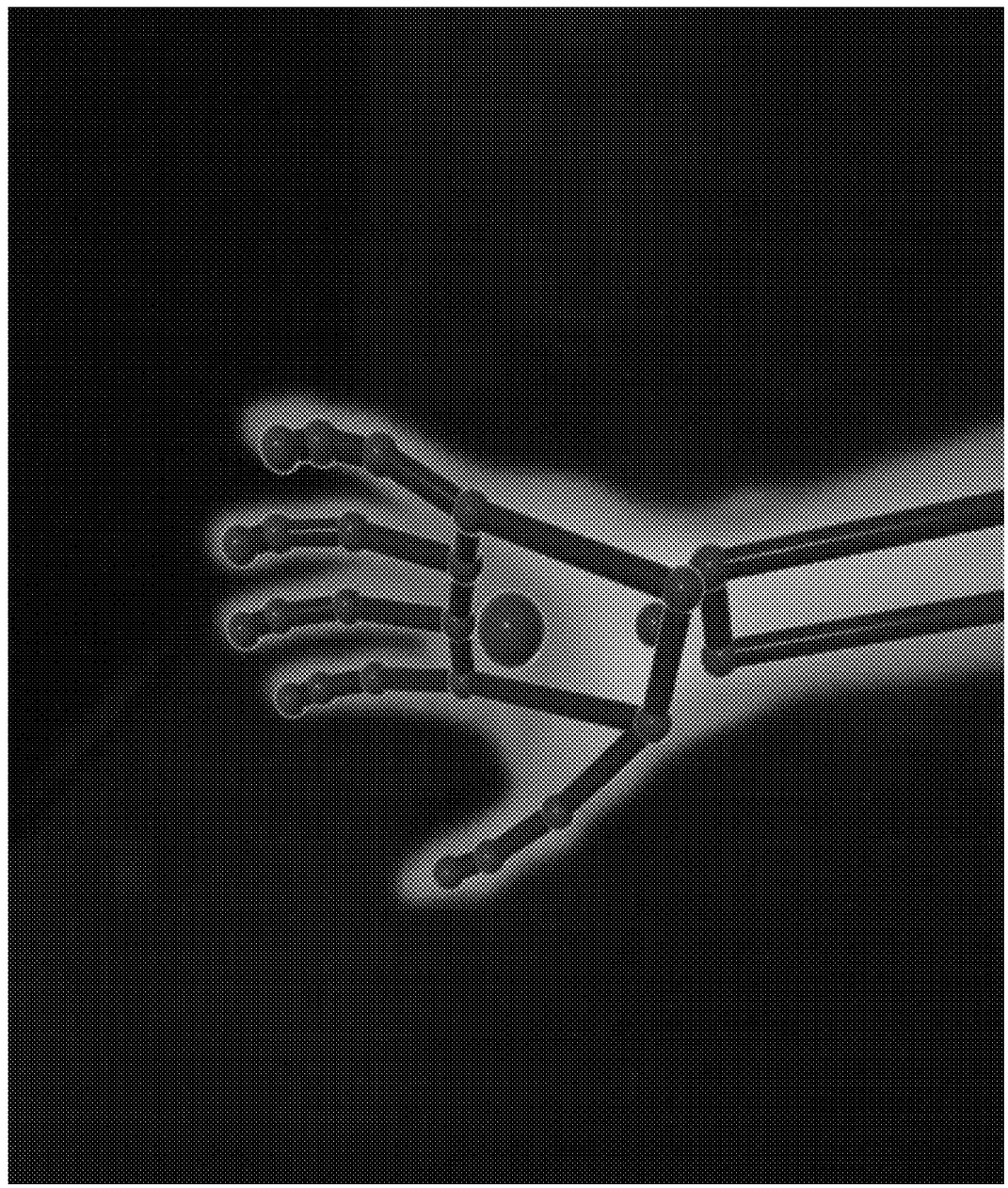

FIG. 35D is one implementation of a 3D virtual hand initialized for an ImagePatch shown in FIG. 35B.

Figure 36:
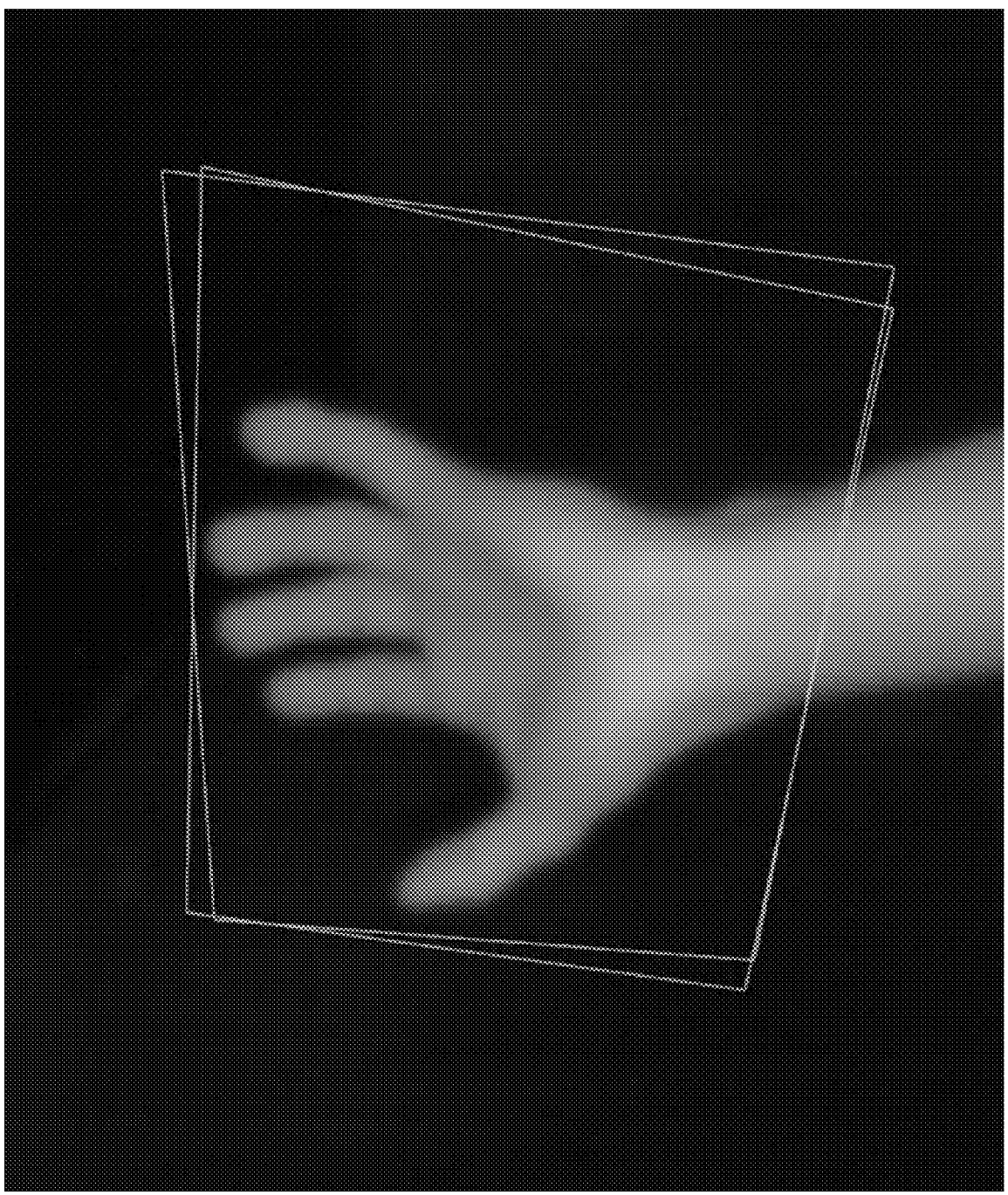

FIG. 36 shows one implementation of ImageRects fitted on an ImagePatch.

Figure 37:
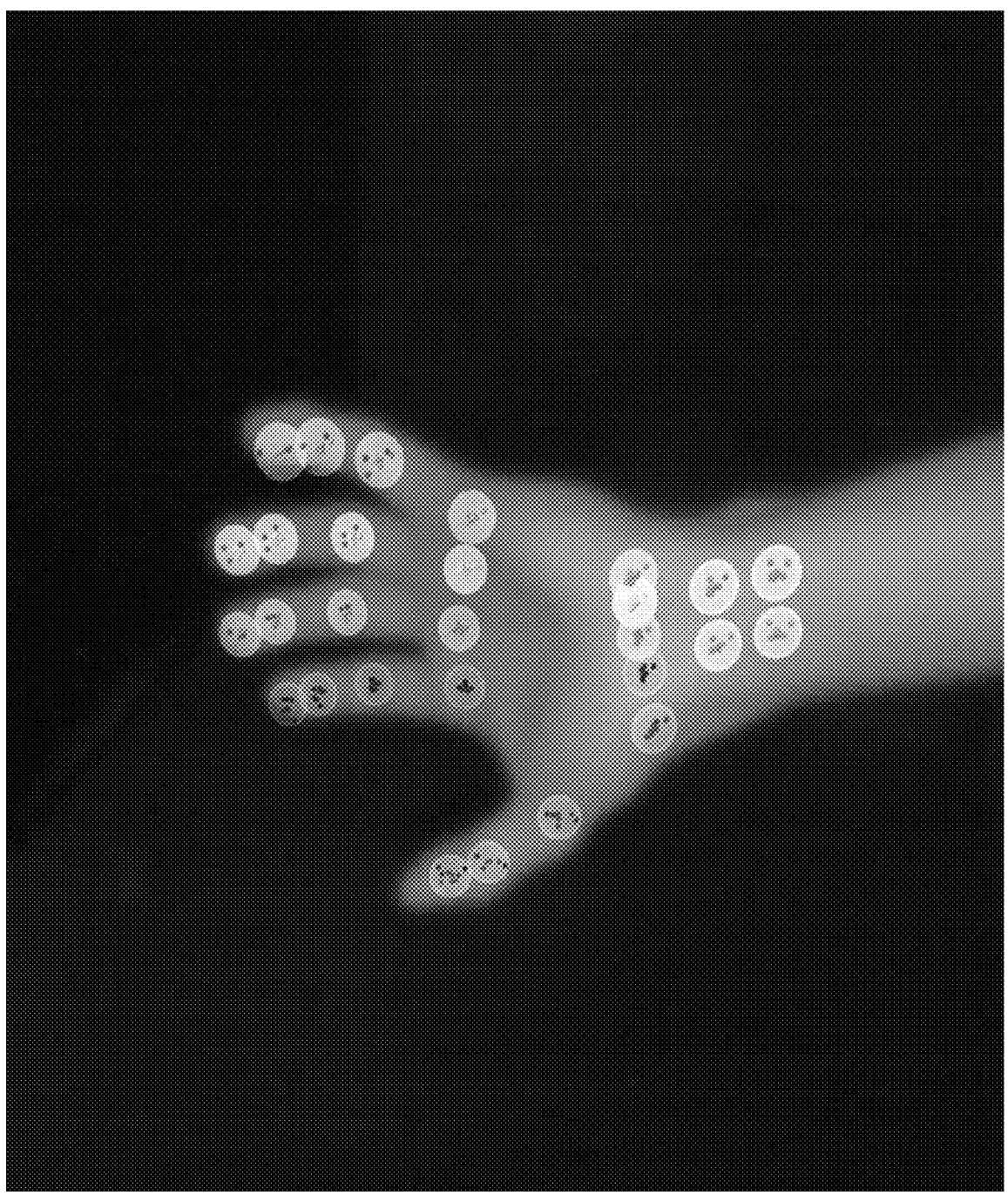

FIG. 37 is one implementation of extrapolating a previous frame's fitted hand model into a current frame.

Figure 38:
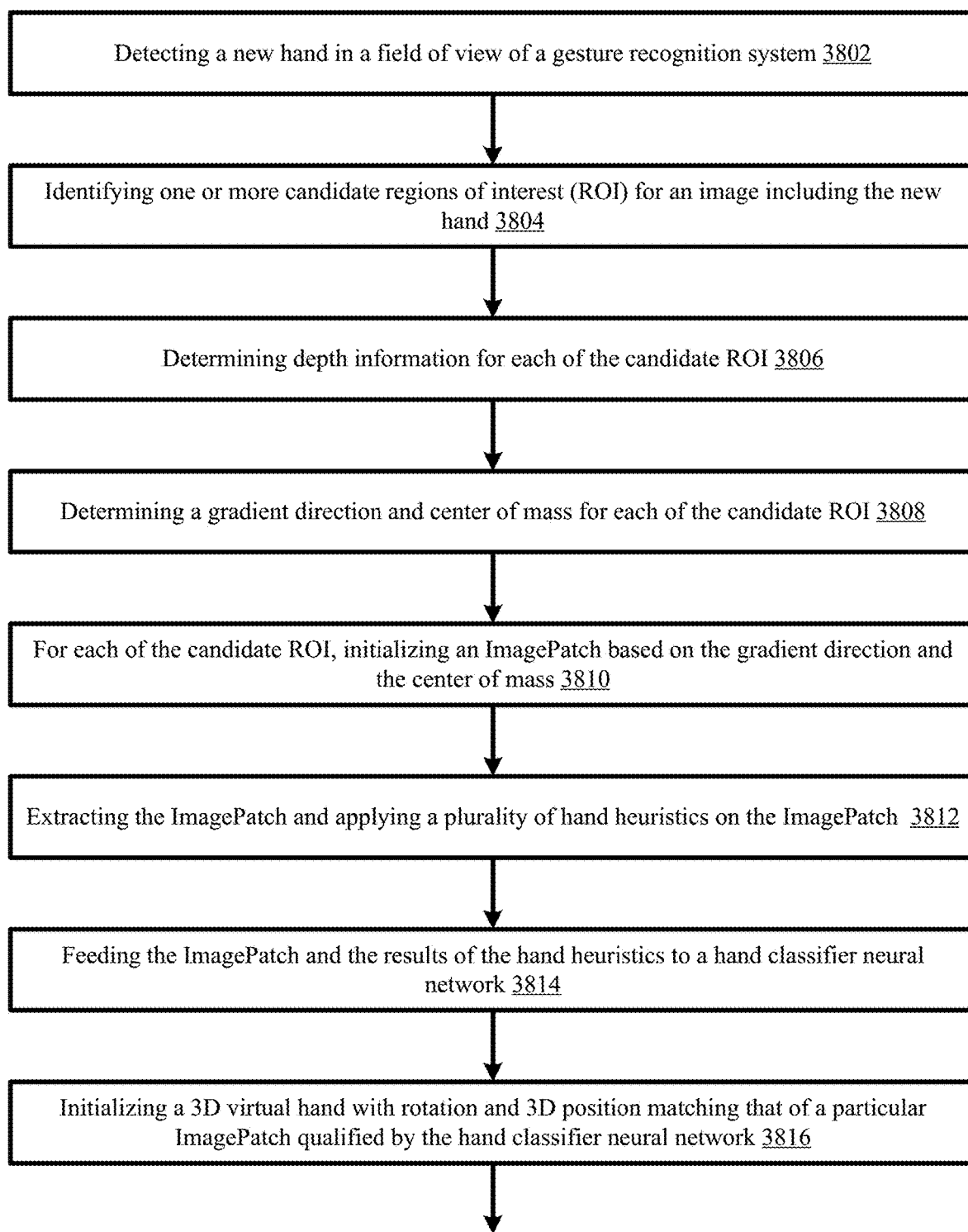
Figure 39A:
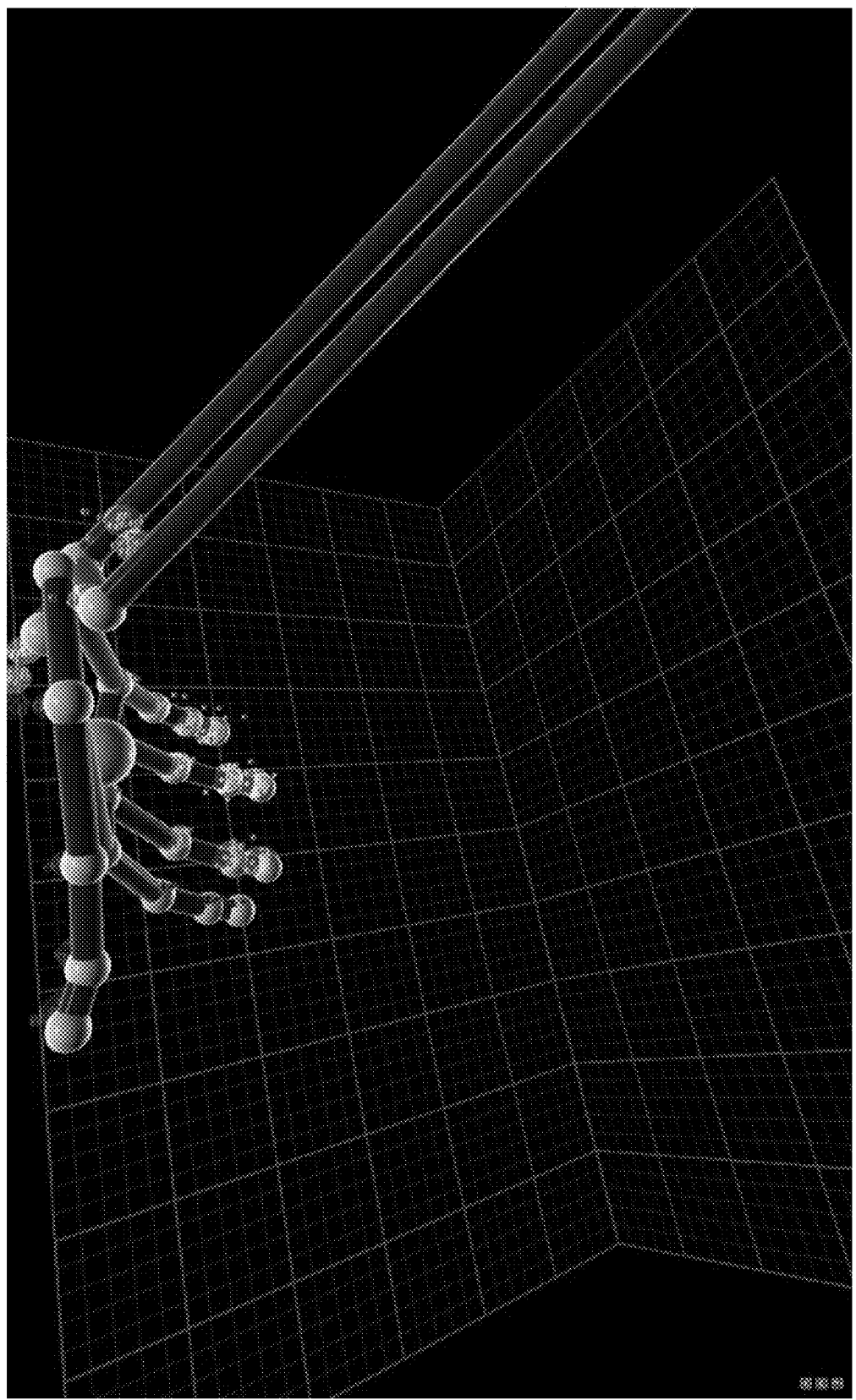
Figure 39C:
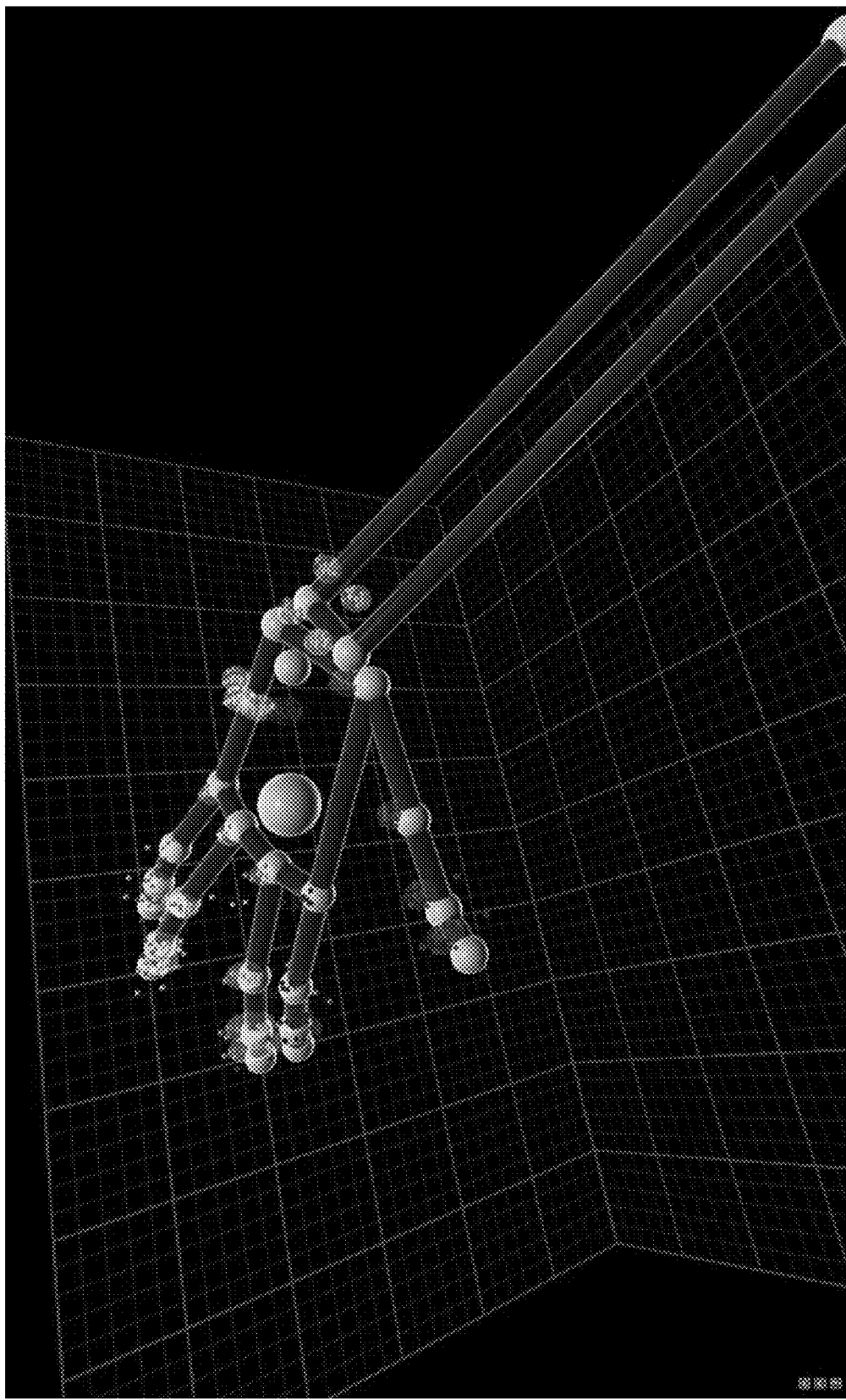
Figure 39D:
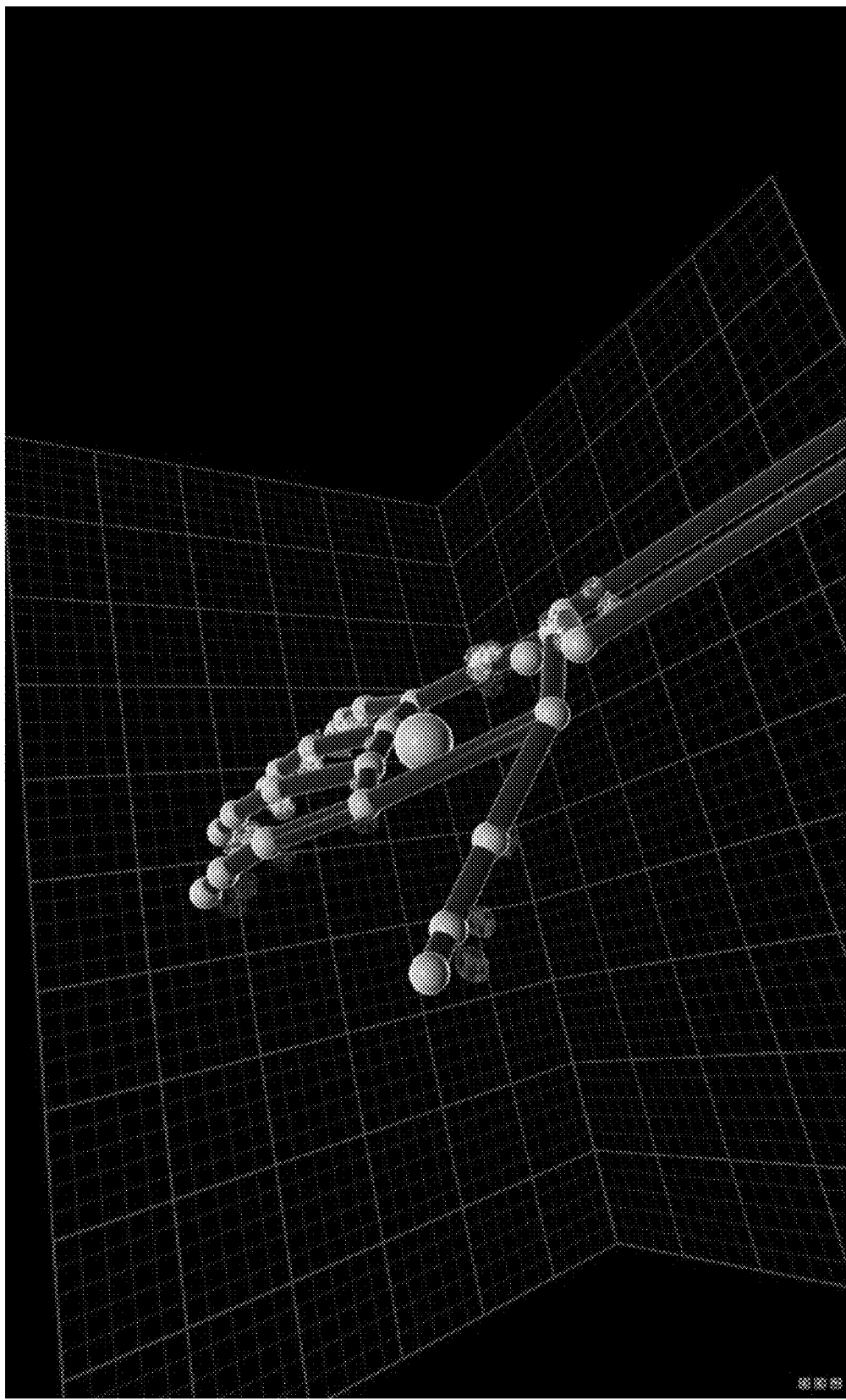
Figure 39E:
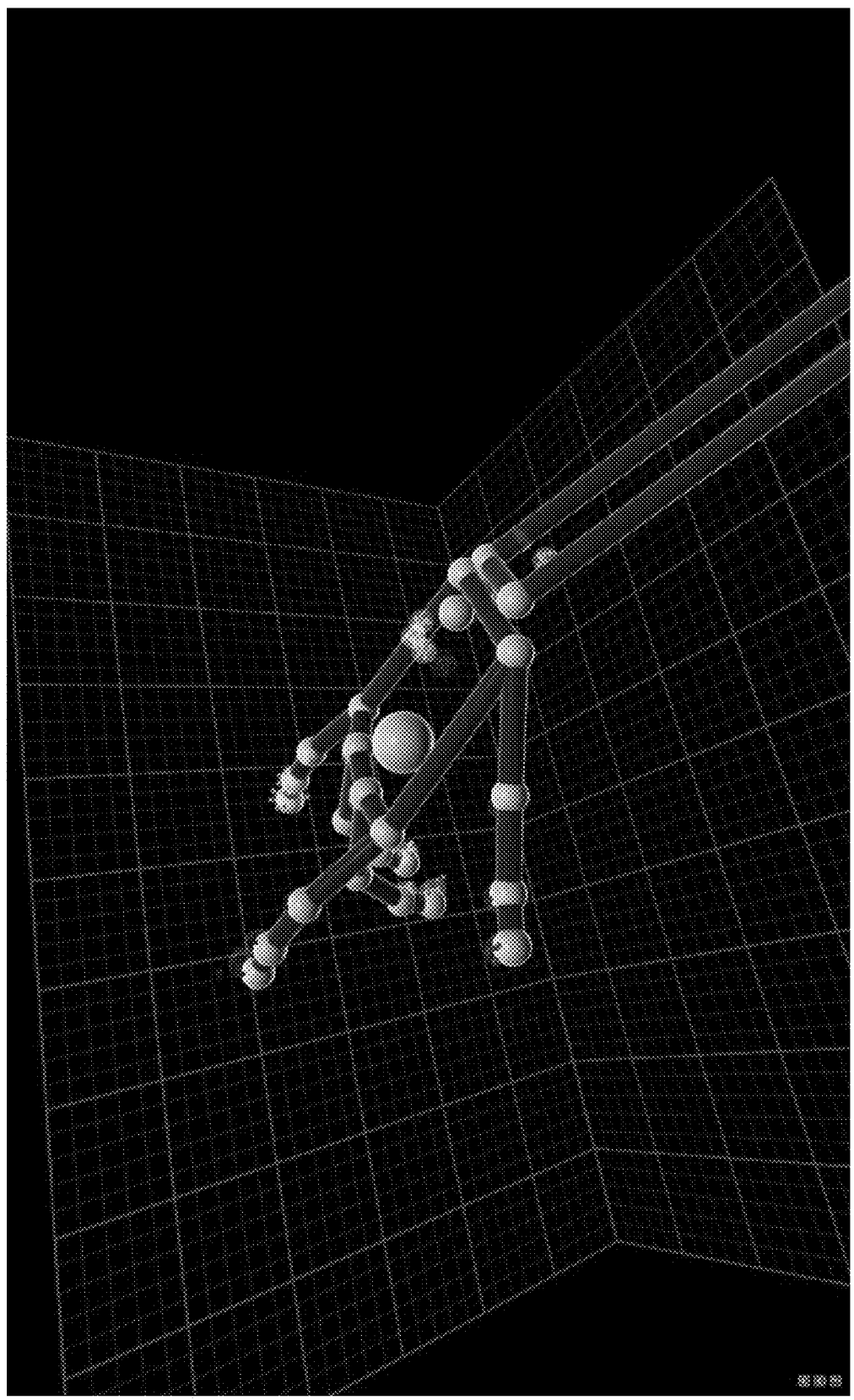
Figure 39F:
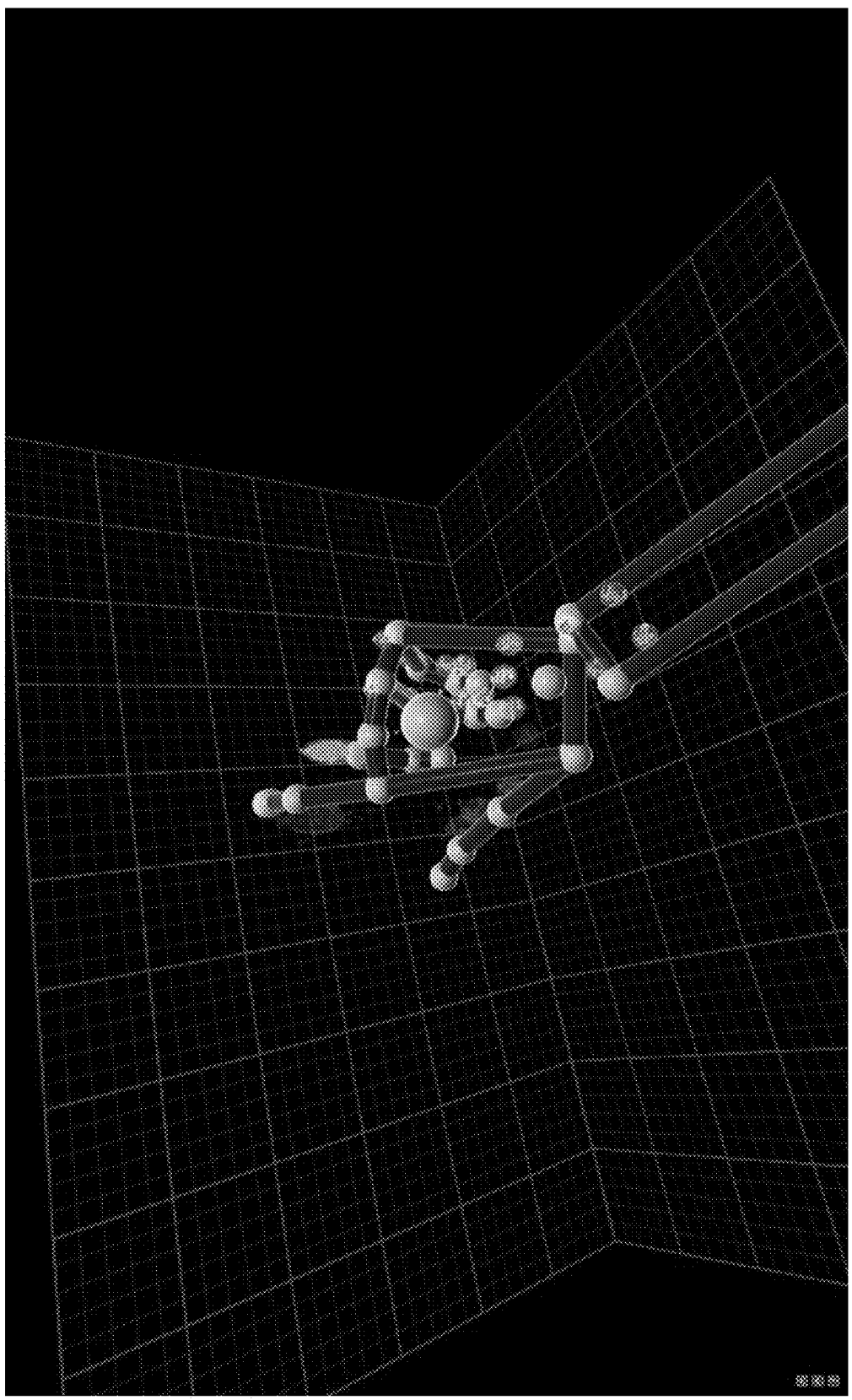
Figure 39G:
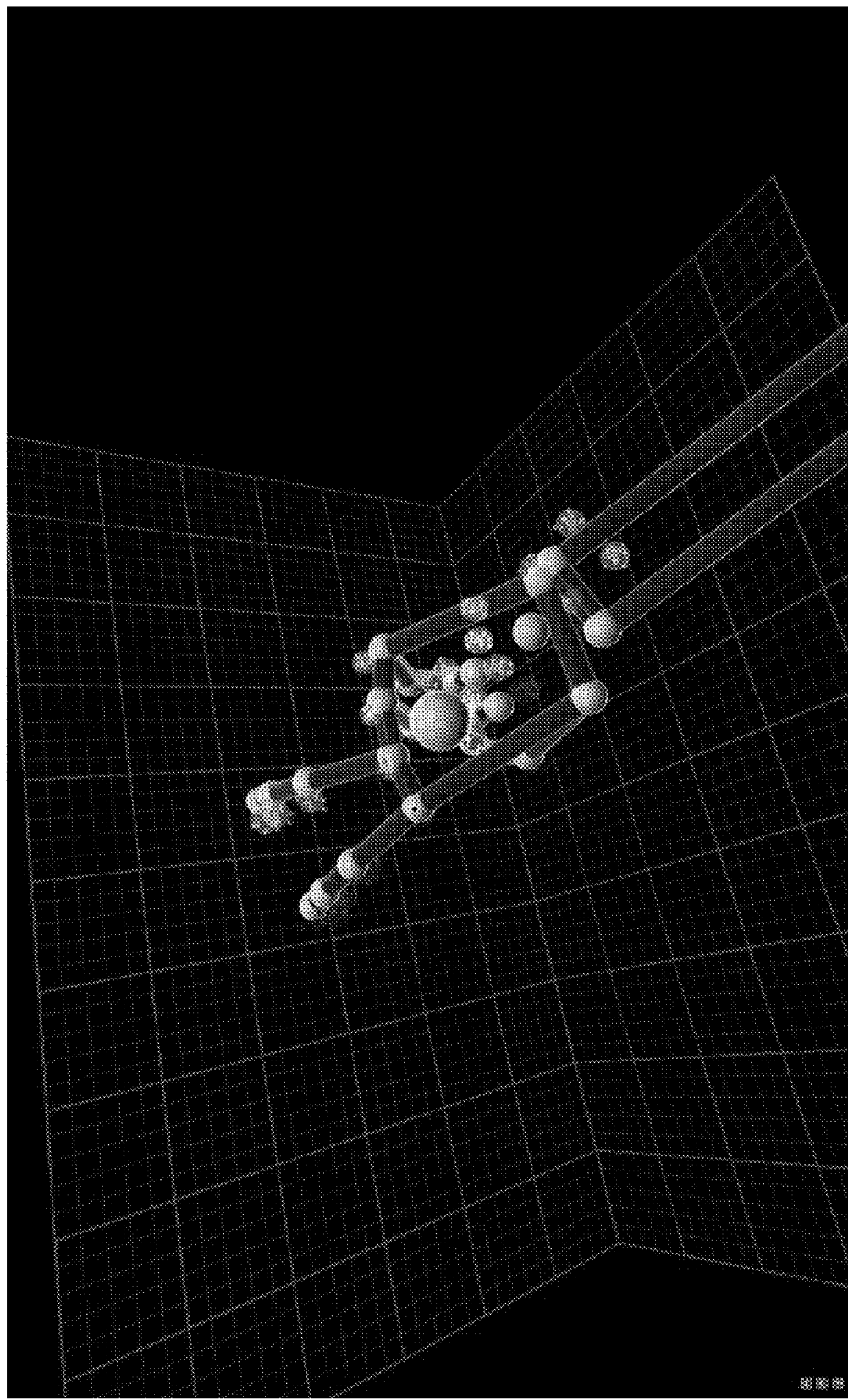
Figure 39H:
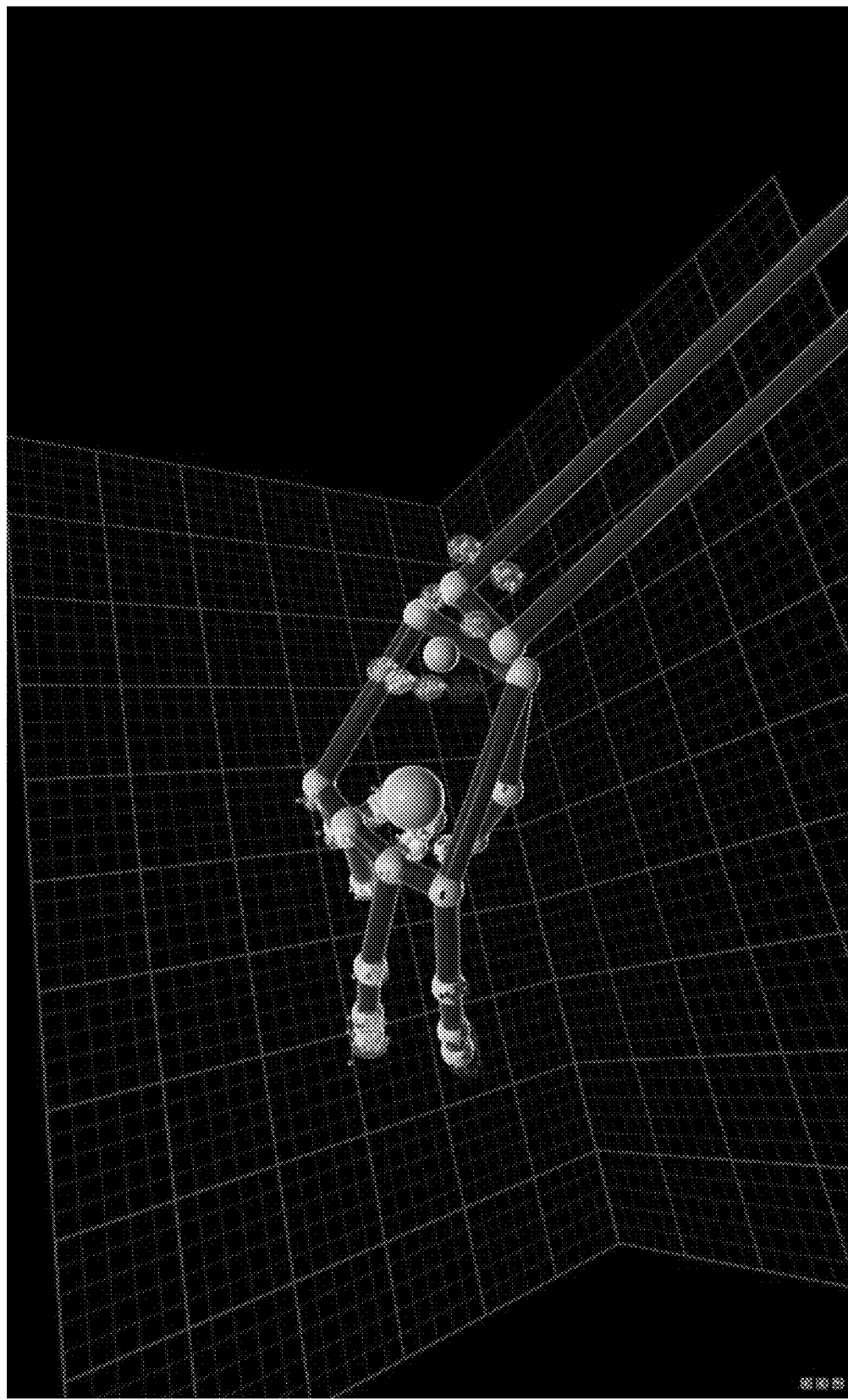
Figure 39I:
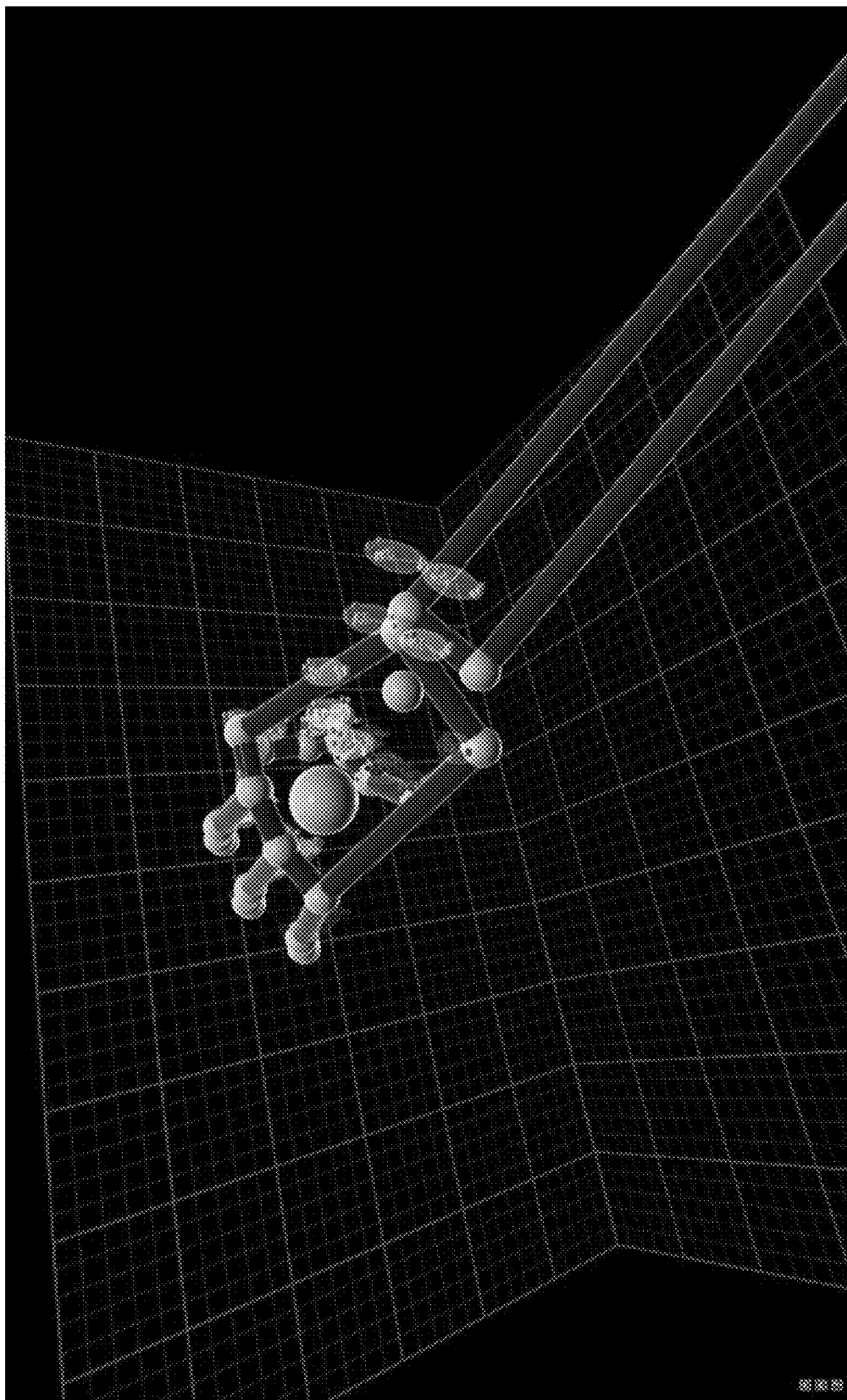
Figure 39J:
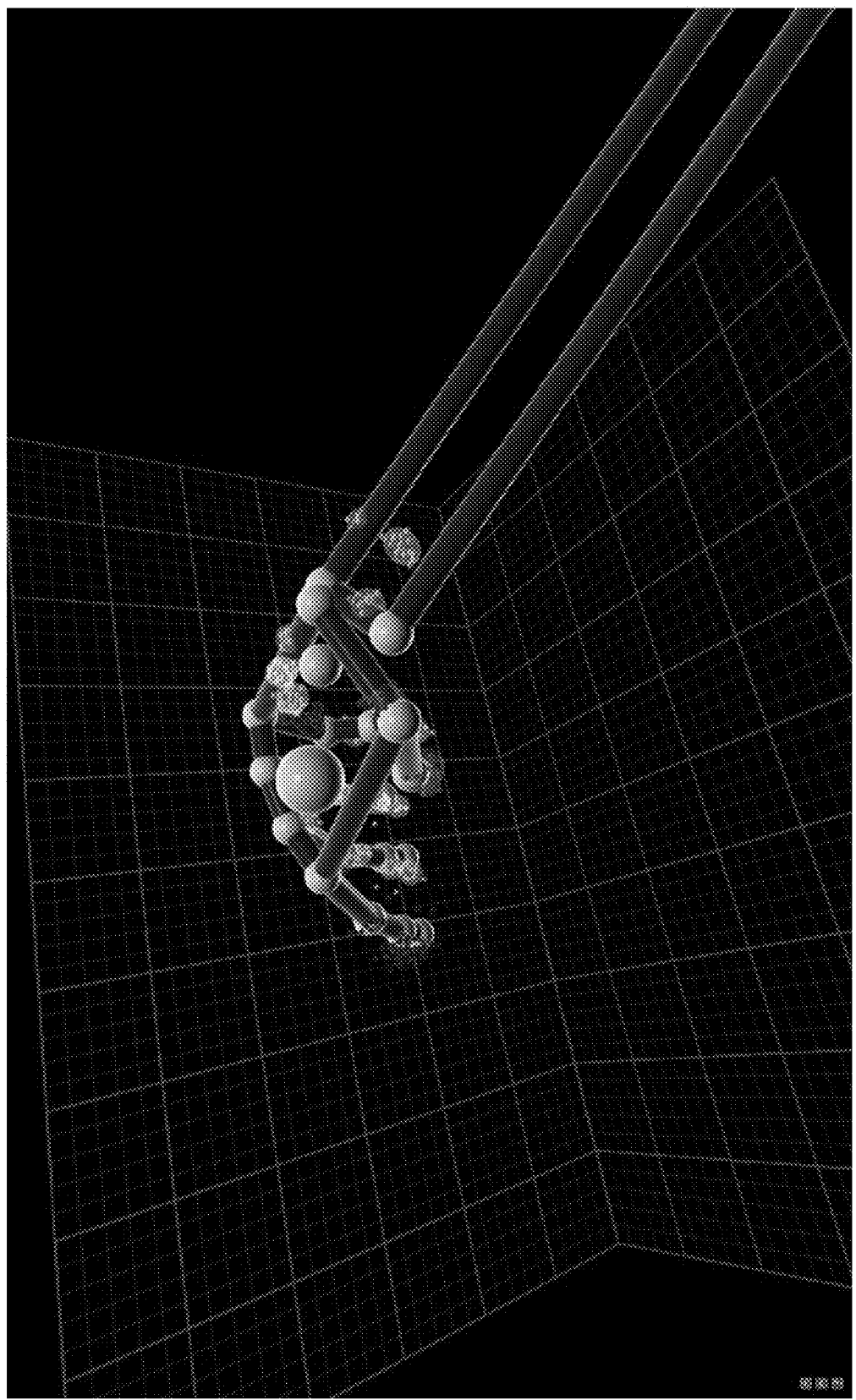
Figure 39K:
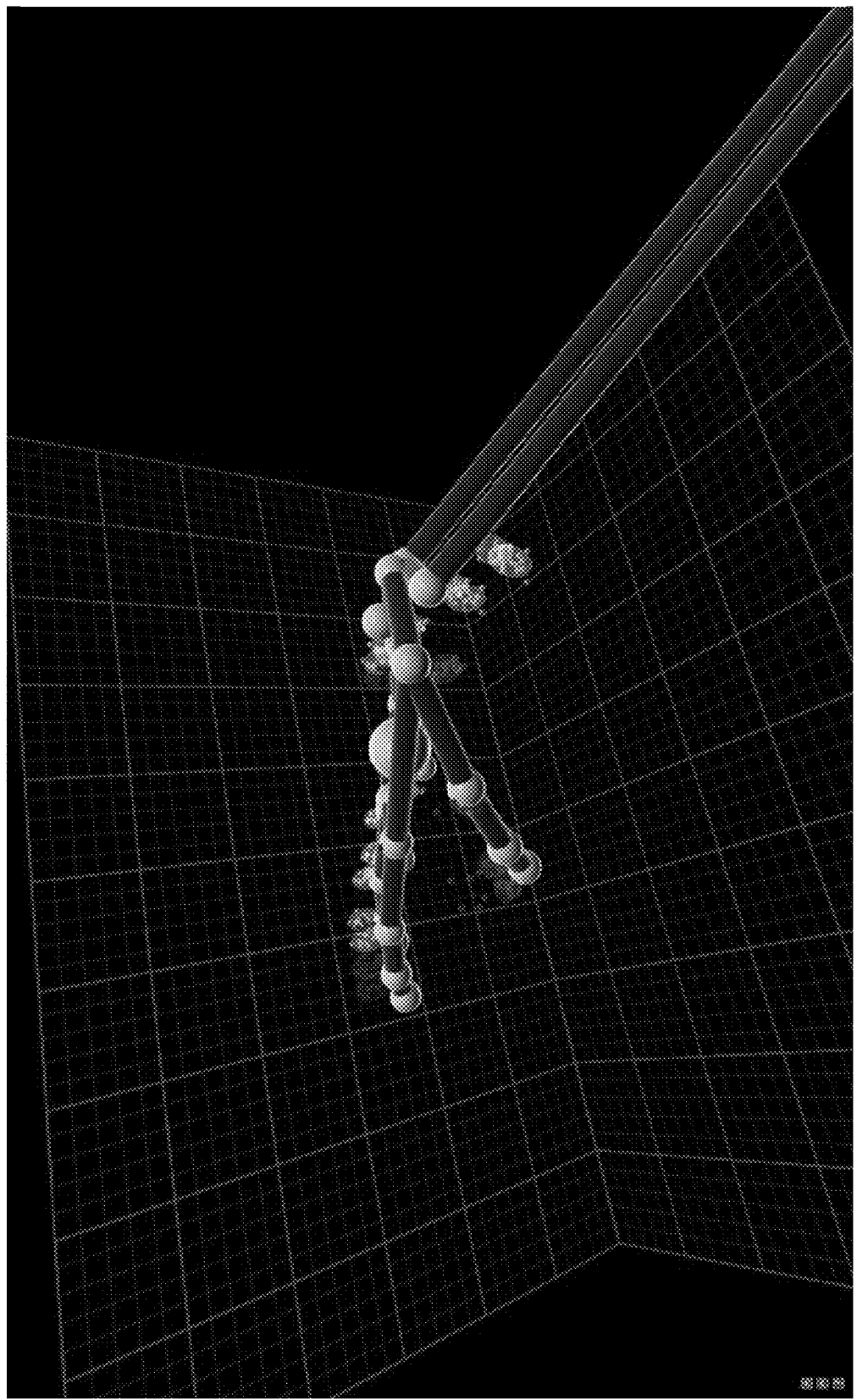
Figure 39L:
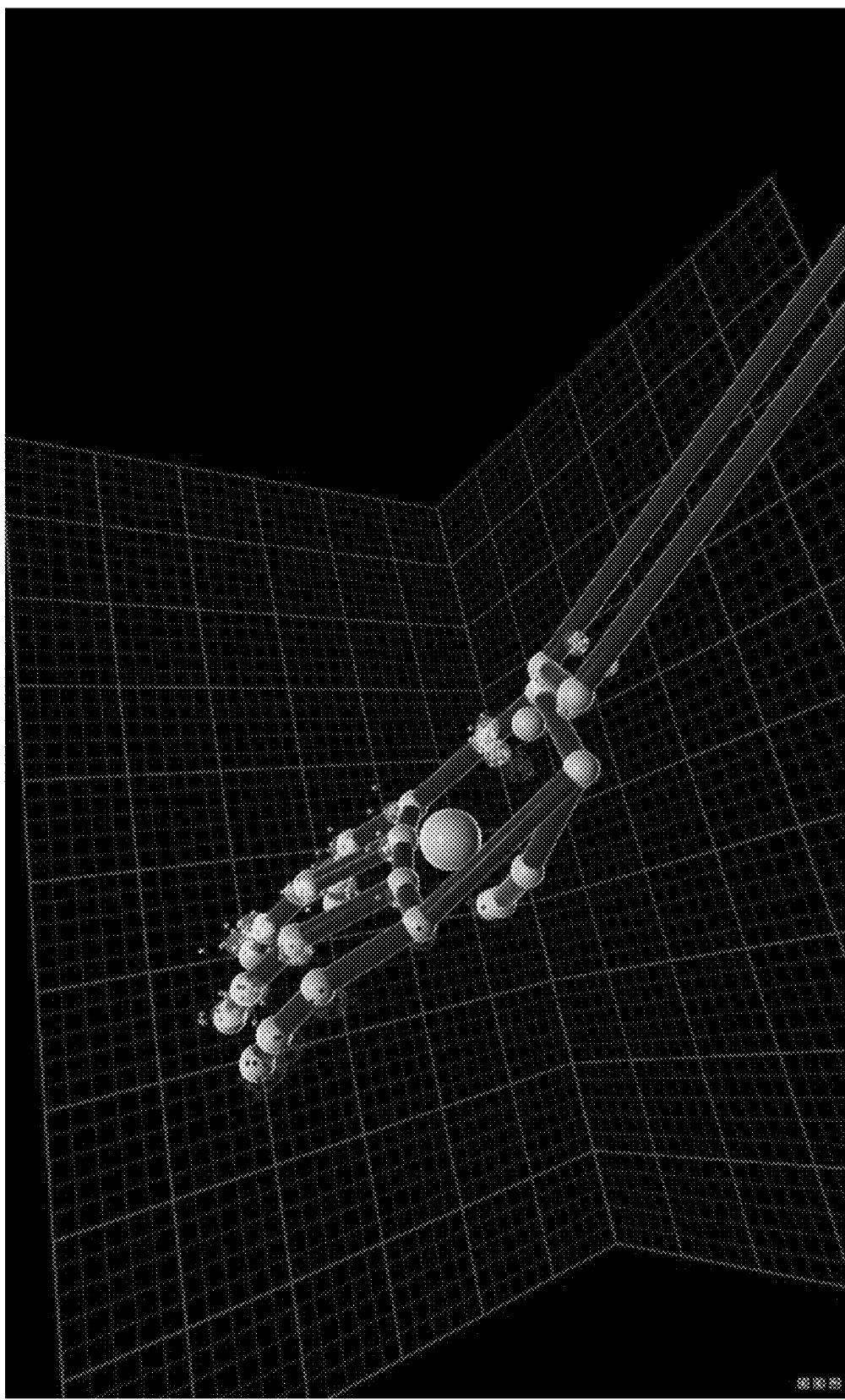
Figure 39M:
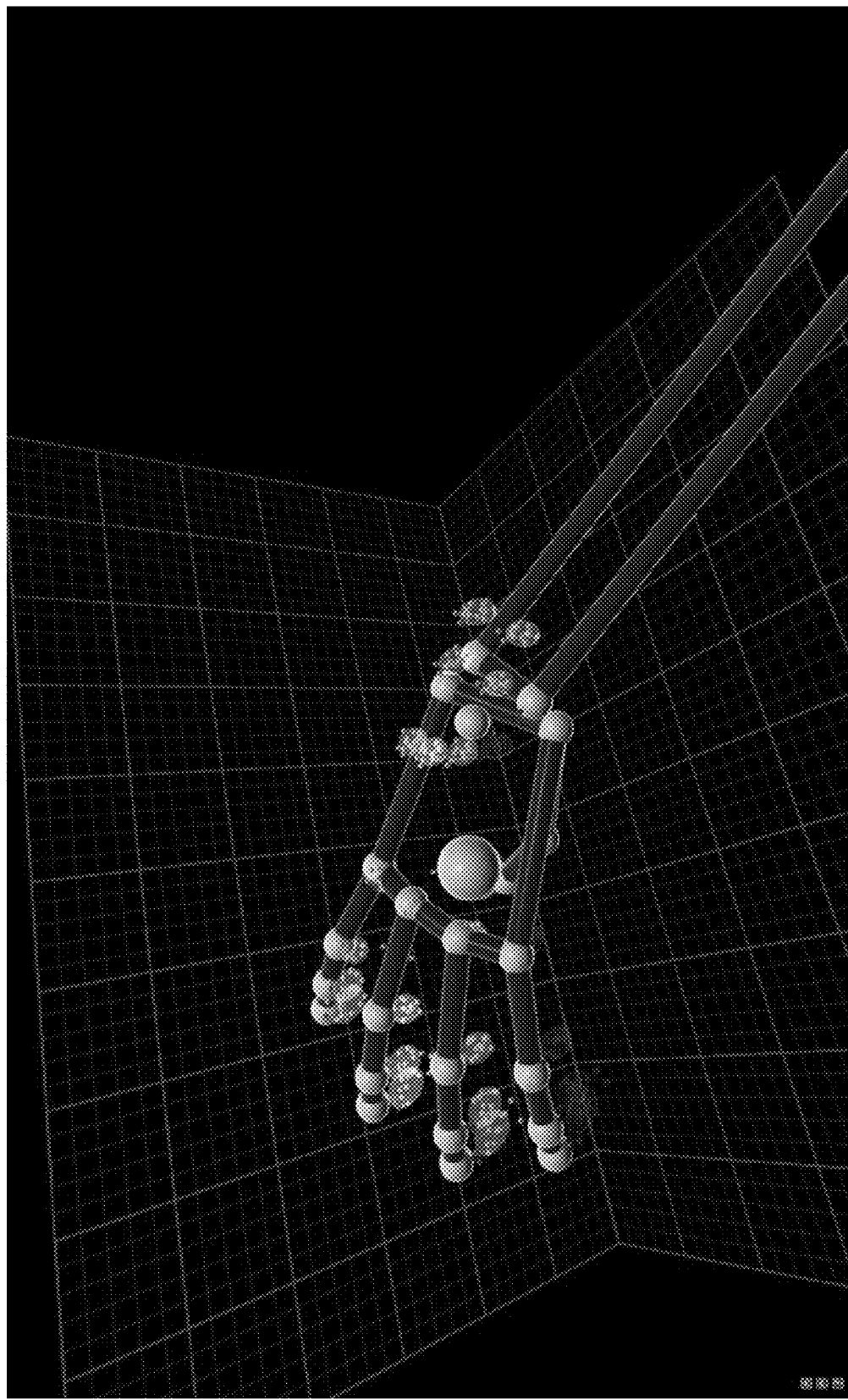
Figure 39N:
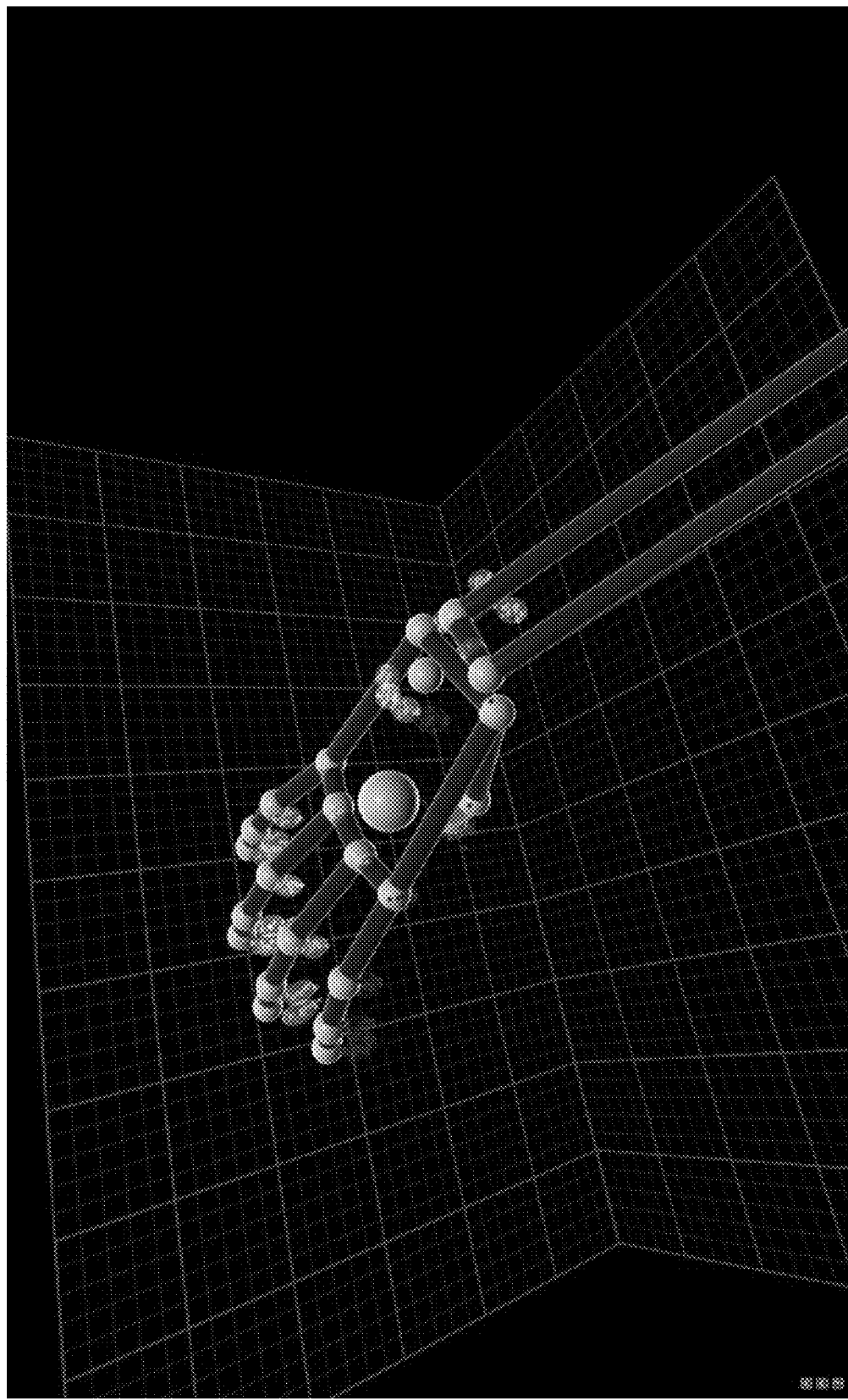
Figure 39O:
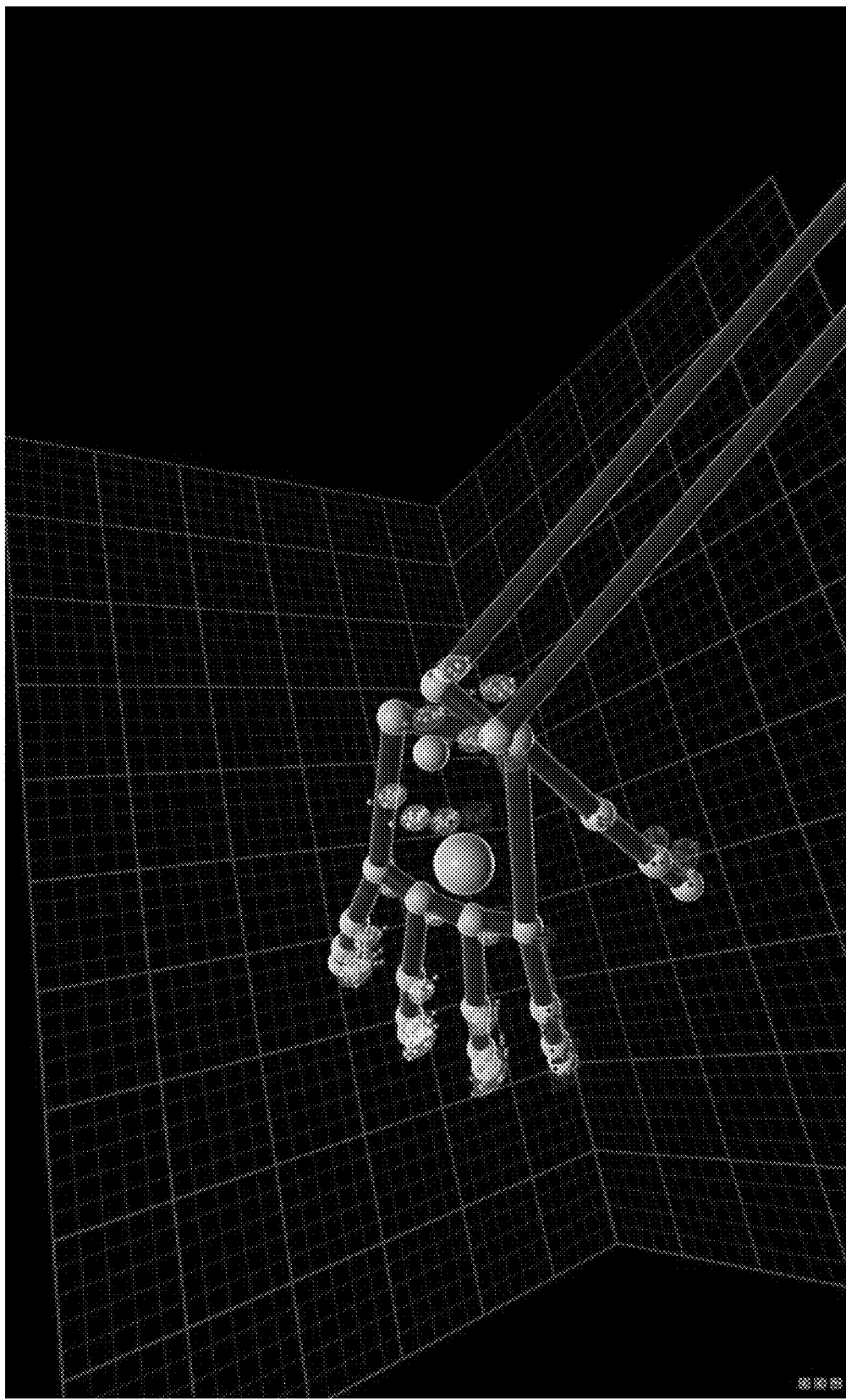

FIG. 38 shows a representative method of initialization of a hand in accordance with one implementation of the technology disclosed.

FIGS. 39A, 39B, 39C, 39D, 39E, 39F, 39G, 39H, 39I, 39J, 39K, 39L, 39M, 39N and 39O show multiple frames in a time continuous gesture sequence of hand poses represented by skeleton hand models fitted to joint covariances in for the gesture sequences.

Figure 40A:
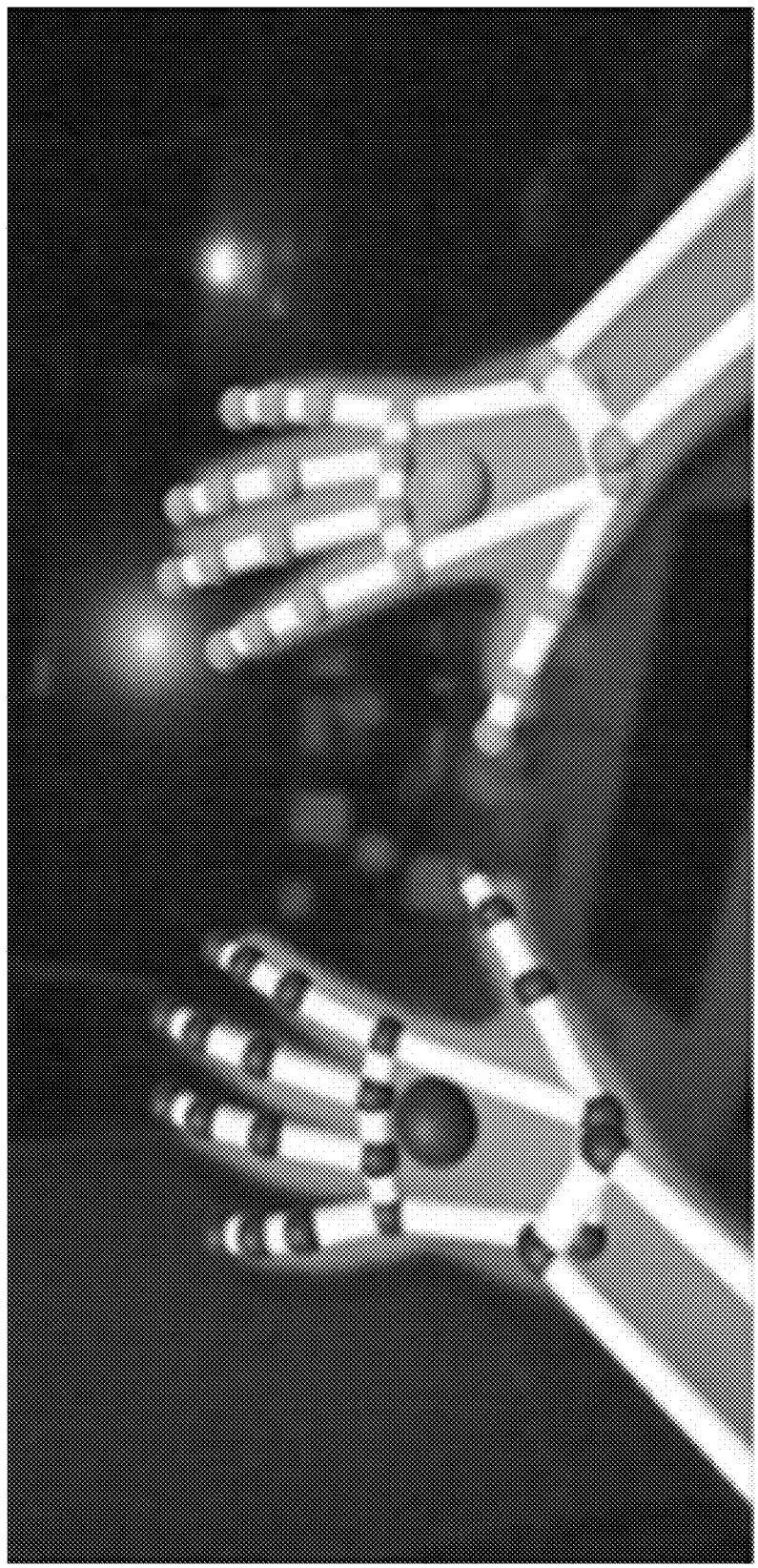
Figure 40B:
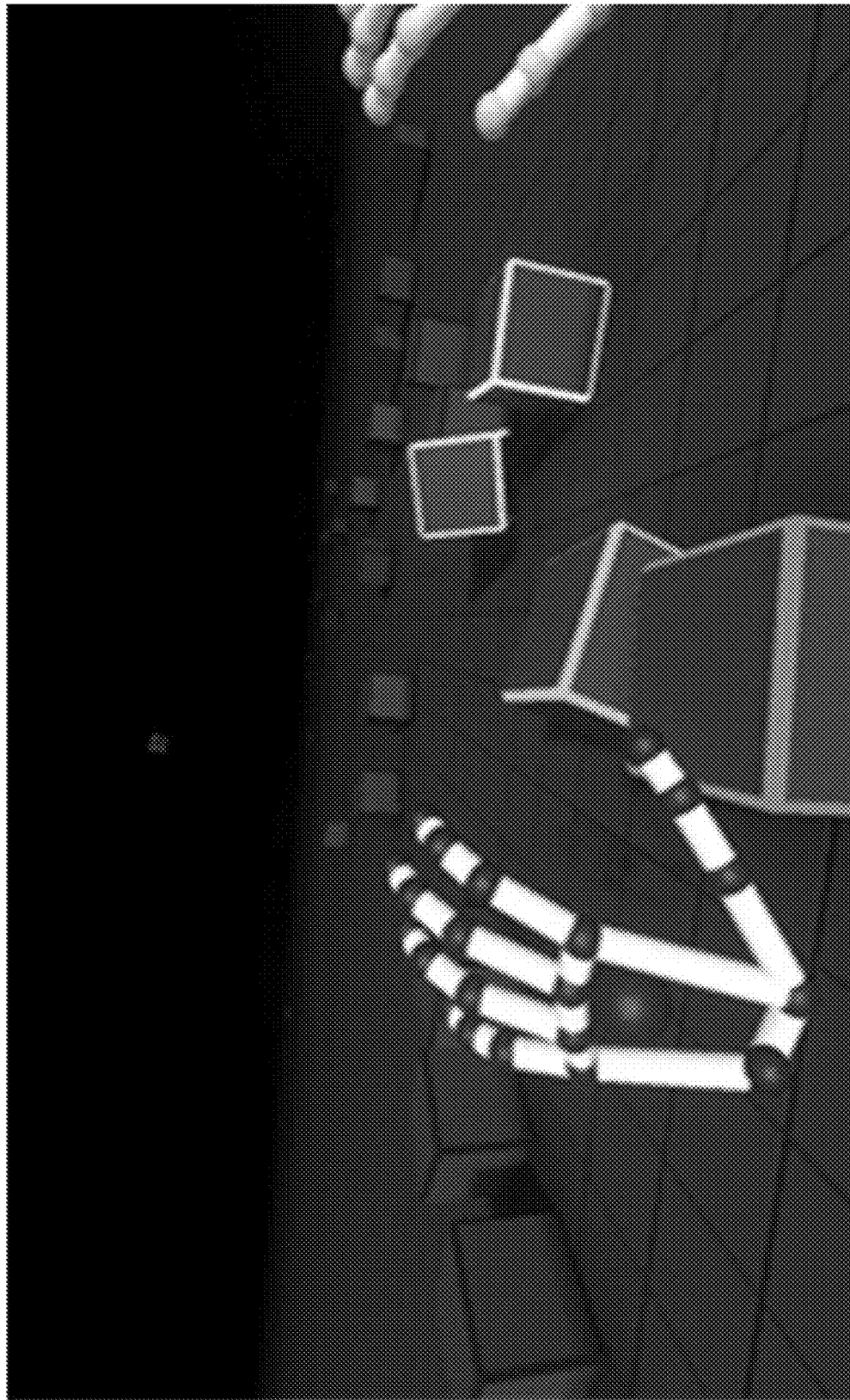
Figure 40C:
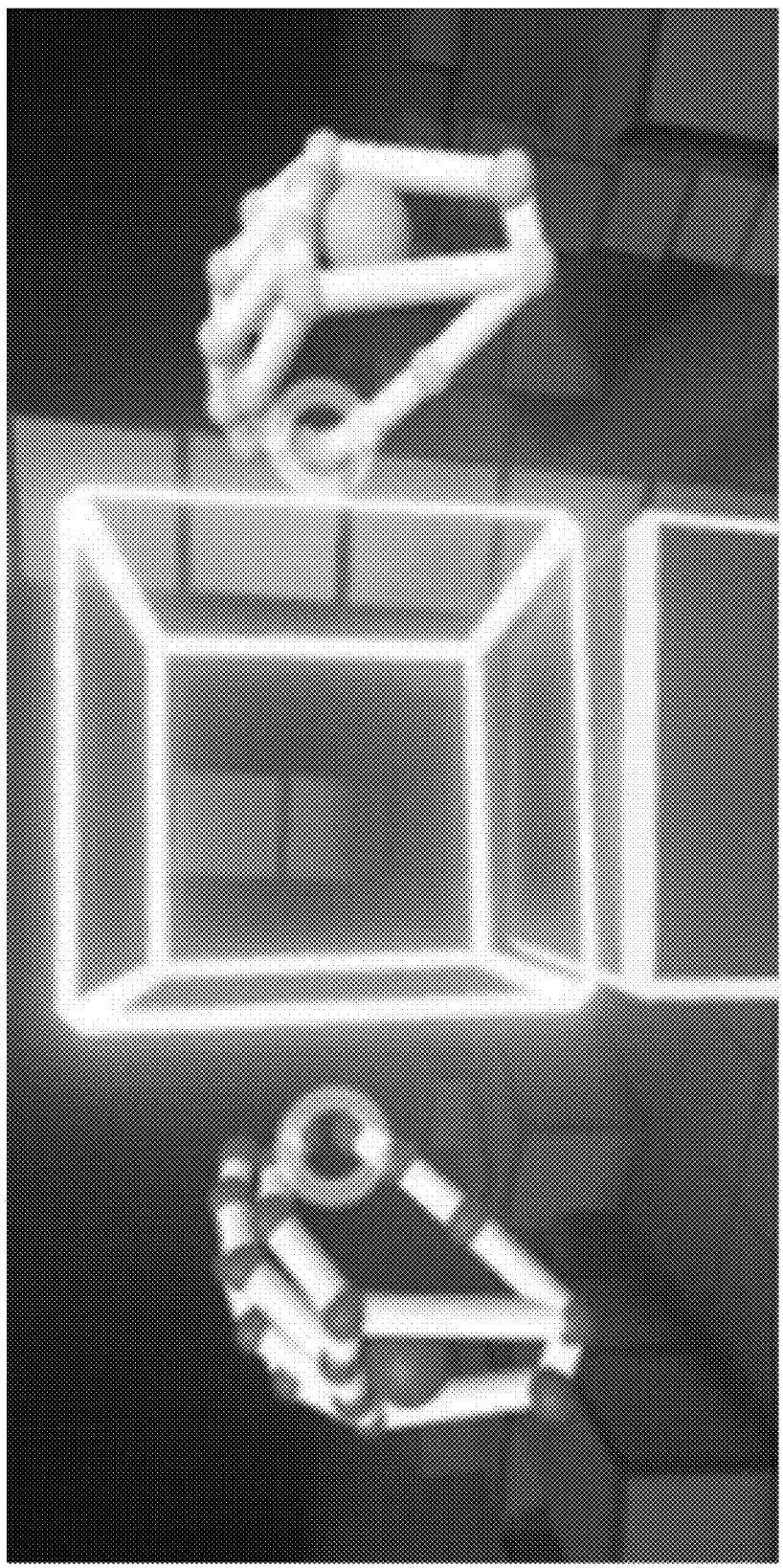

FIGS. 40A, 40B and 40C show one implementation of skeleton hand models fitted to estimated joint covariances interacting with and manipulating virtual objects (e.g., depicted boxes) in an augmented reality (AR)/virtual reality (VR) environment.

Figure 41:
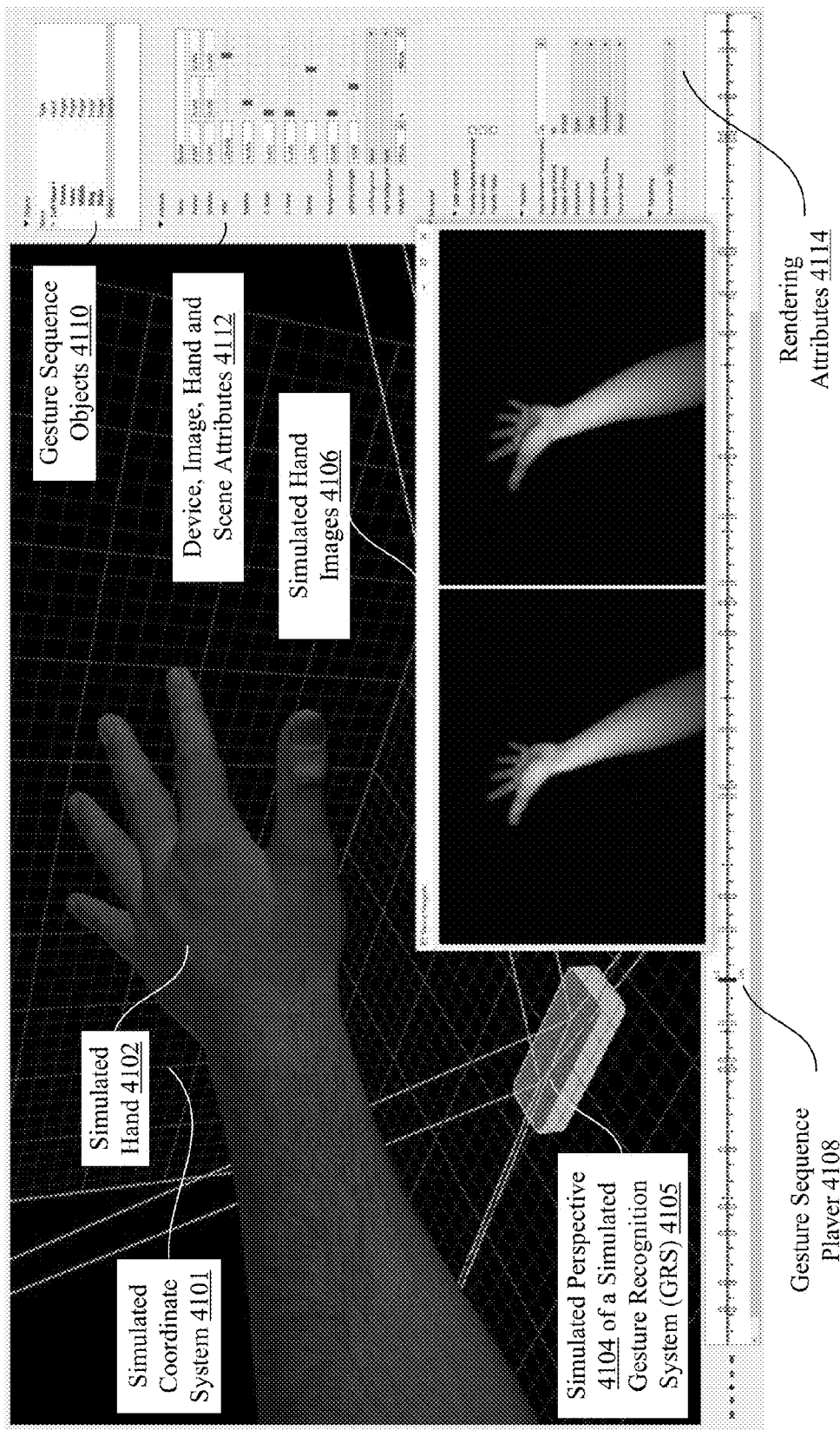

FIG. 41 depicts one implementation of a computer graphic simulator that prepares sample simulated hand positions of gesture sequences for training of neural networks.

Figure 42:
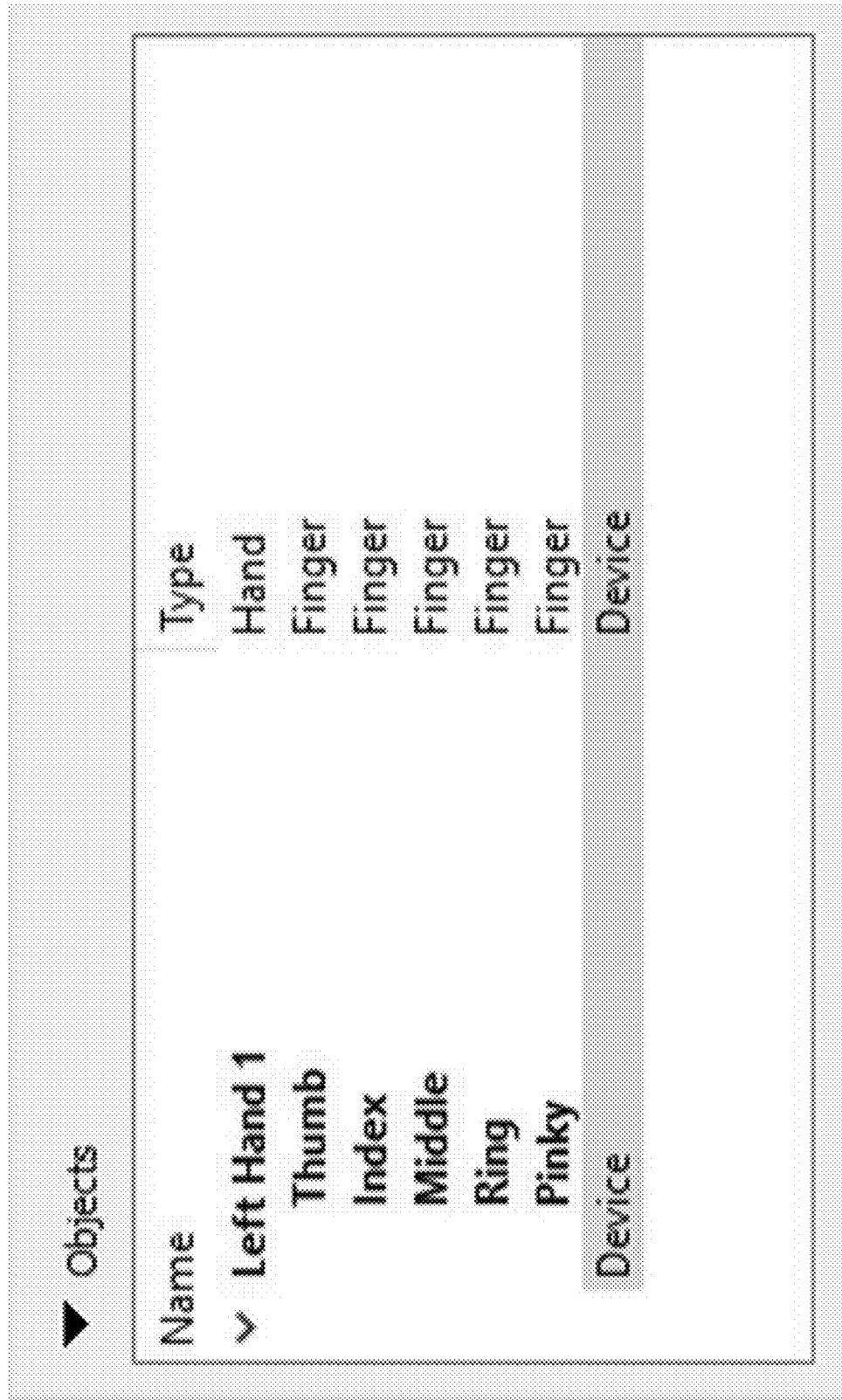

FIG. 42 illustrates a graphical user interface (GUI) implementation of a computer graphics simulator visually rendering gesture sequence objects for configuration and specification.

Figure 43:
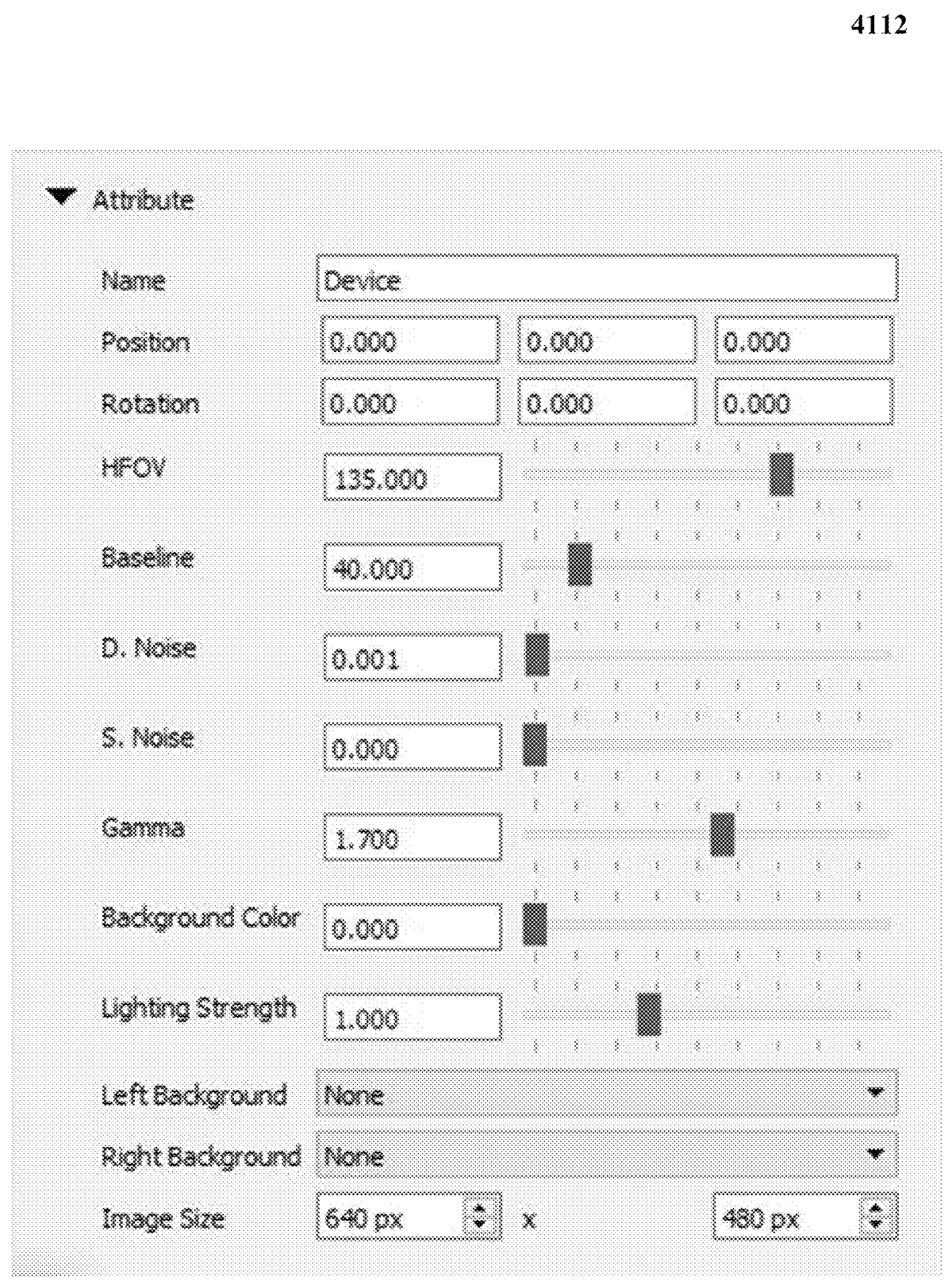

FIG. 43 illustrates a graphical user interface (GUI) implementation of a computer graphics simulator visually rendering device, image, hand and scene attributes for configuration and specification.

Figure 44:
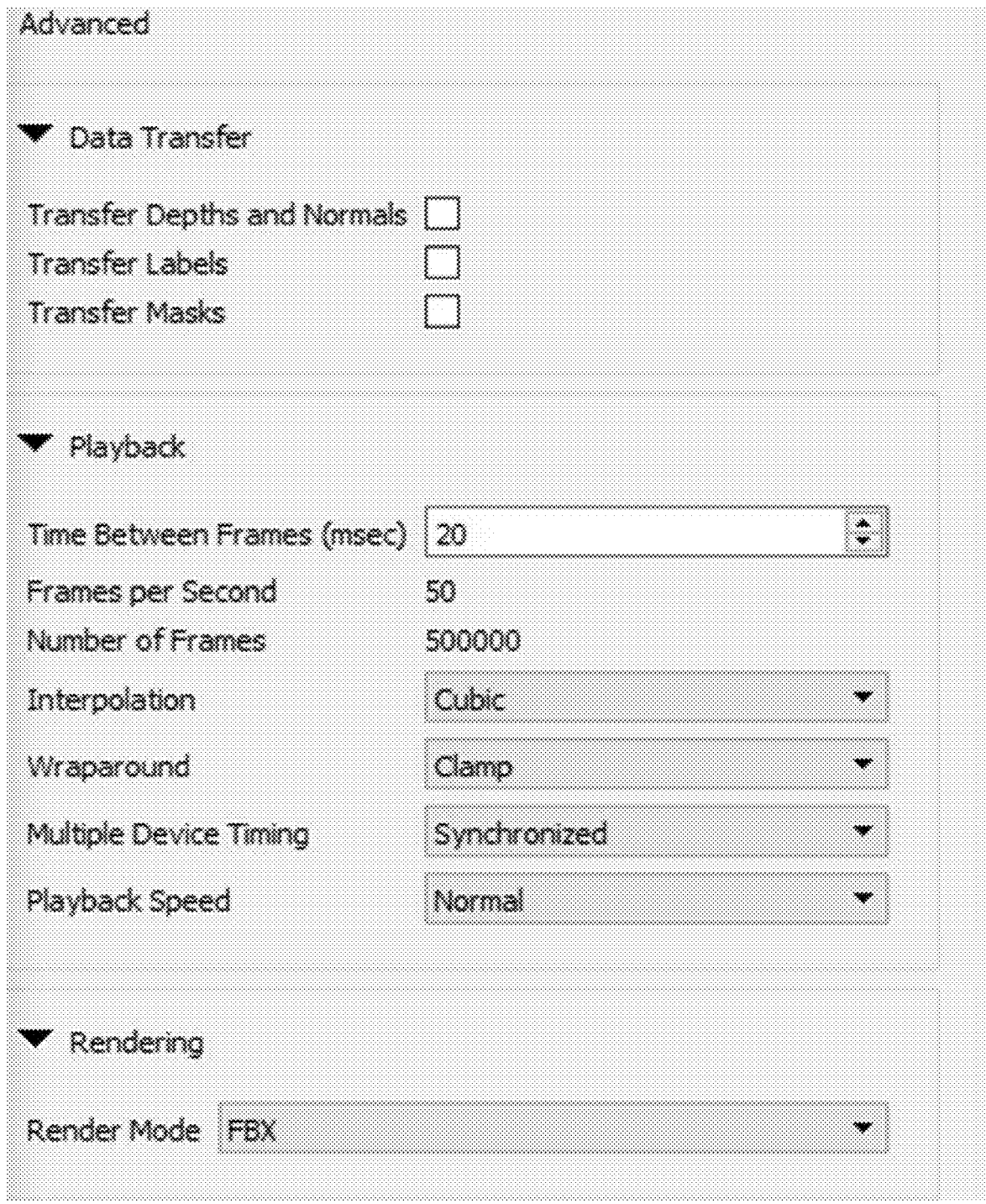

FIG. 44 illustrates a graphical user interface (GUI) implementation of a computer graphics simulator visually displaying rendering attributes for configuration and specification.

FIG. 45 illustrates a graphical user interface (GUI) implementation of a computer graphics simulator visually rendering hand attributes for configuration and specification.

Figure 46:
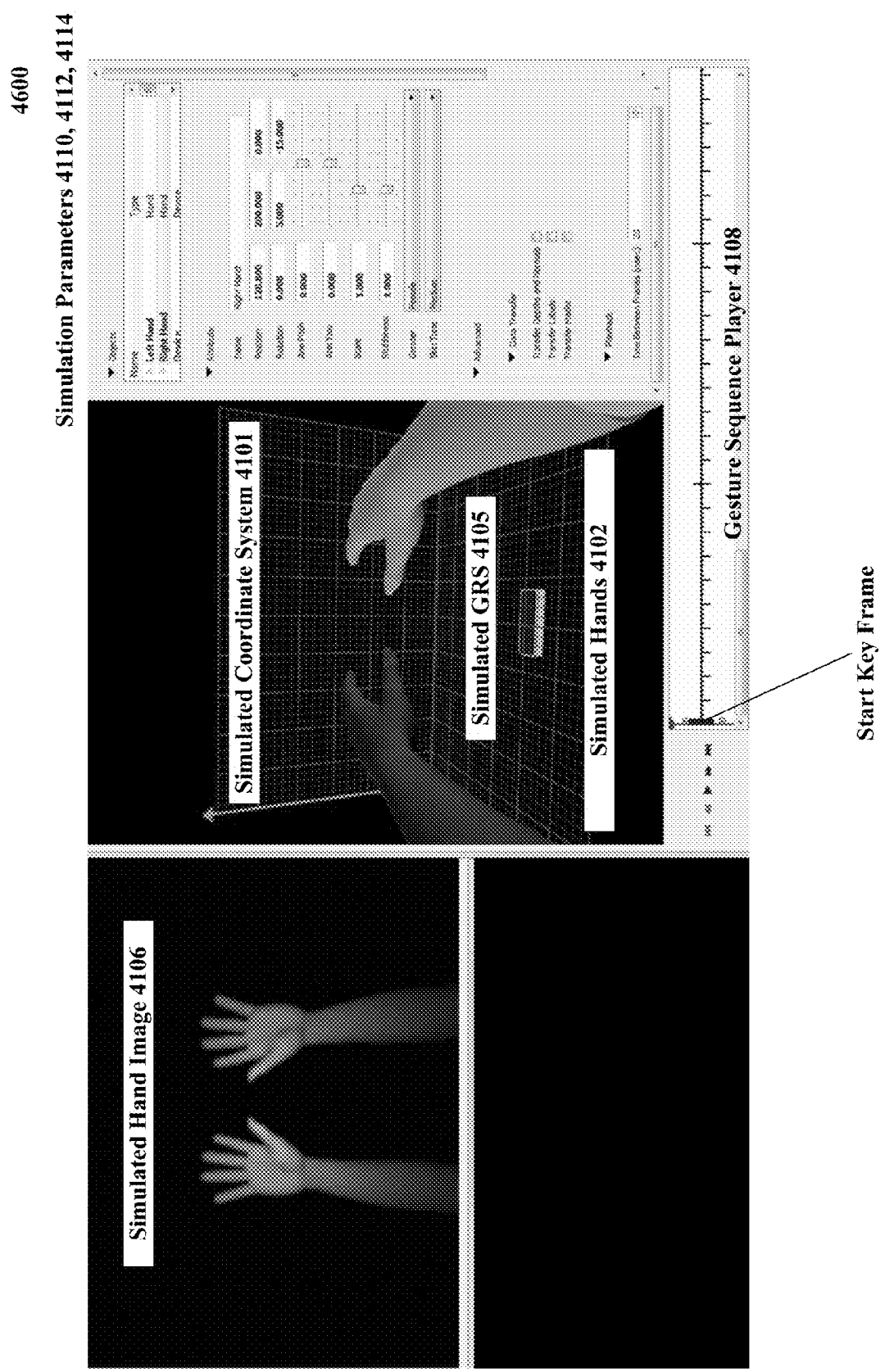

FIG. 46 shows one implementation of a start key frame of a simulated gesture sequence generated by a computer graphic simulator.

Figure 47:
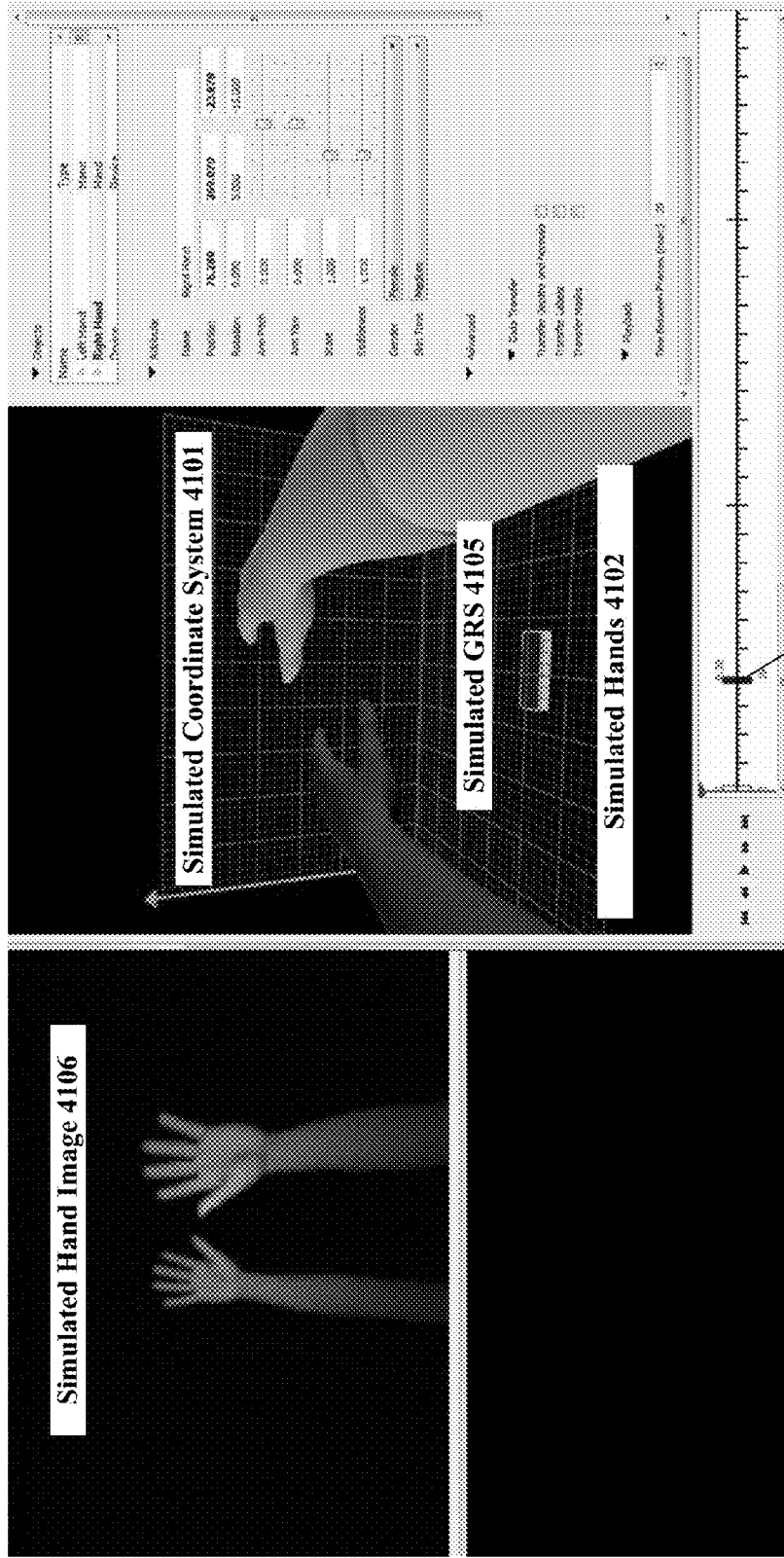

FIG. 47 shows one implementation of an intermediate key frame of a simulated gesture sequence generated by a computer graphic simulator.

Figure 48:
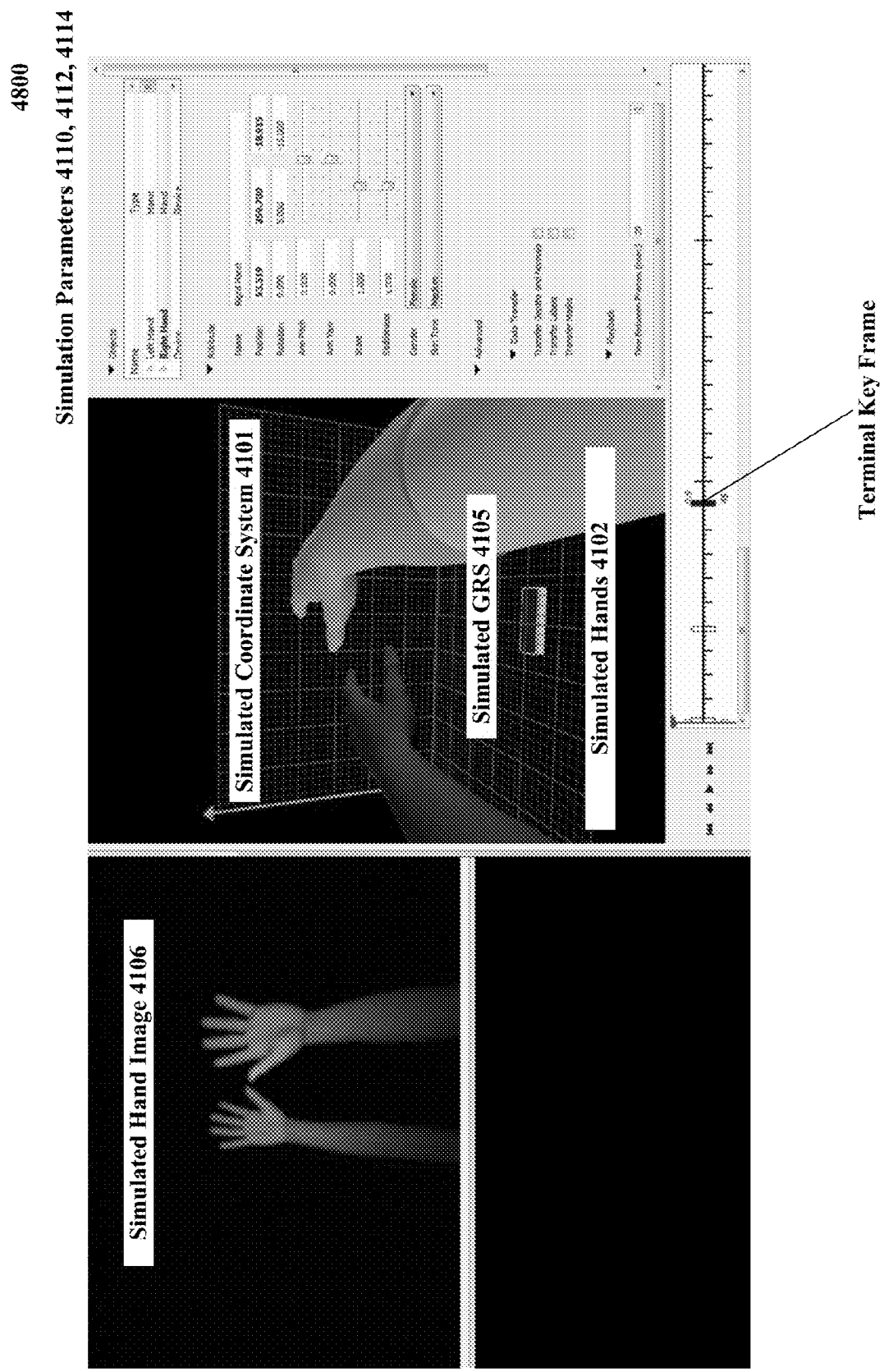

FIG. 48 shows one implementation of a terminal key frame of a simulated gesture sequence generated by a computer graphic simulator.

Figure 49:
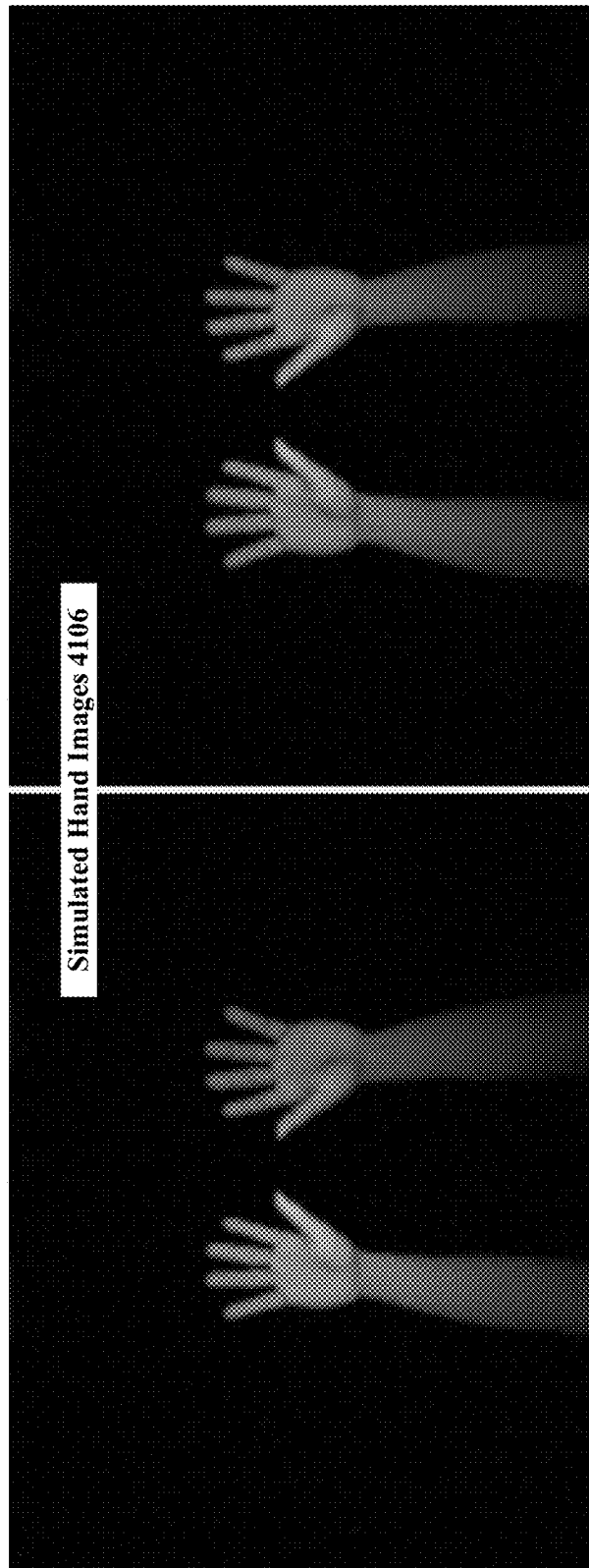

FIG. 49 is one implementation of simulated hand images in the form of grayscale stereoscopic or binocular images based on a simulated 3D mesh hand model.

Figure 50:
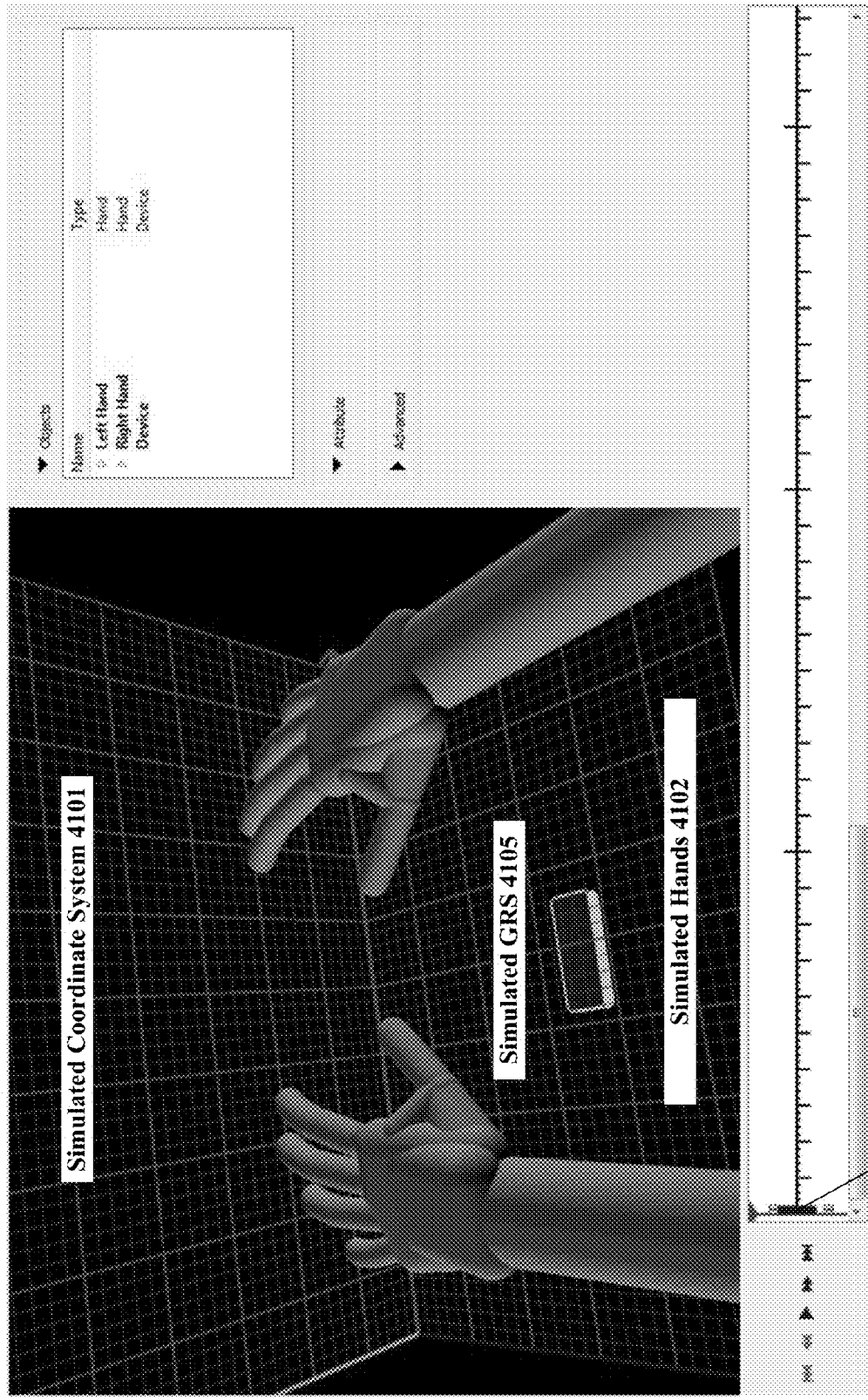

FIG. 50 shows one implementation of generating simulated hand poses and gesture sequences as 3D capsule hand models using a computer graphic simulator.

Figure 51:
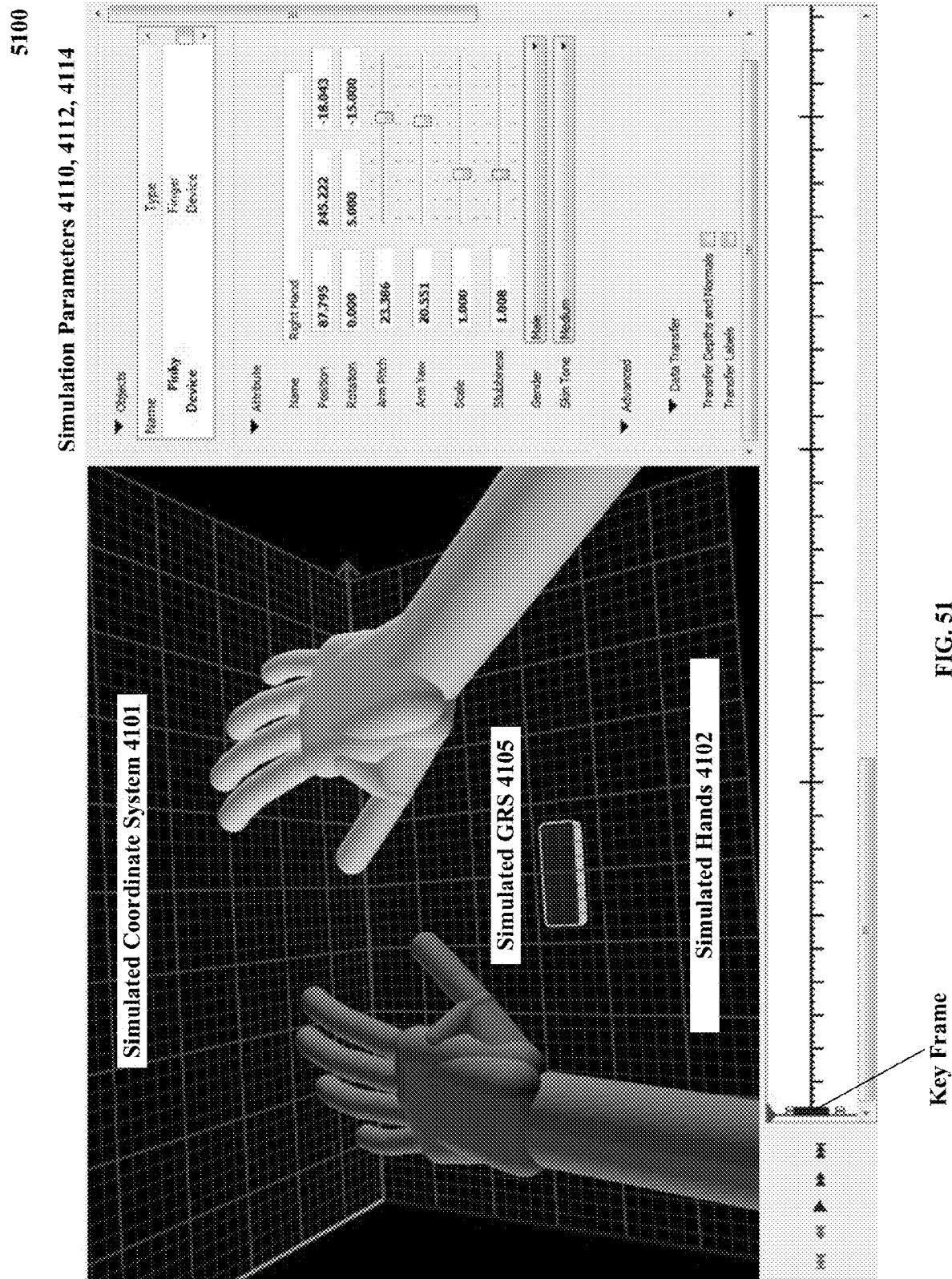

FIG. 51 illustrates one implementation of modification of a simulation parameter in a given key frame of simulated hand poses and gesture sequences generated as 3D capsule hand models.

Figure 52:
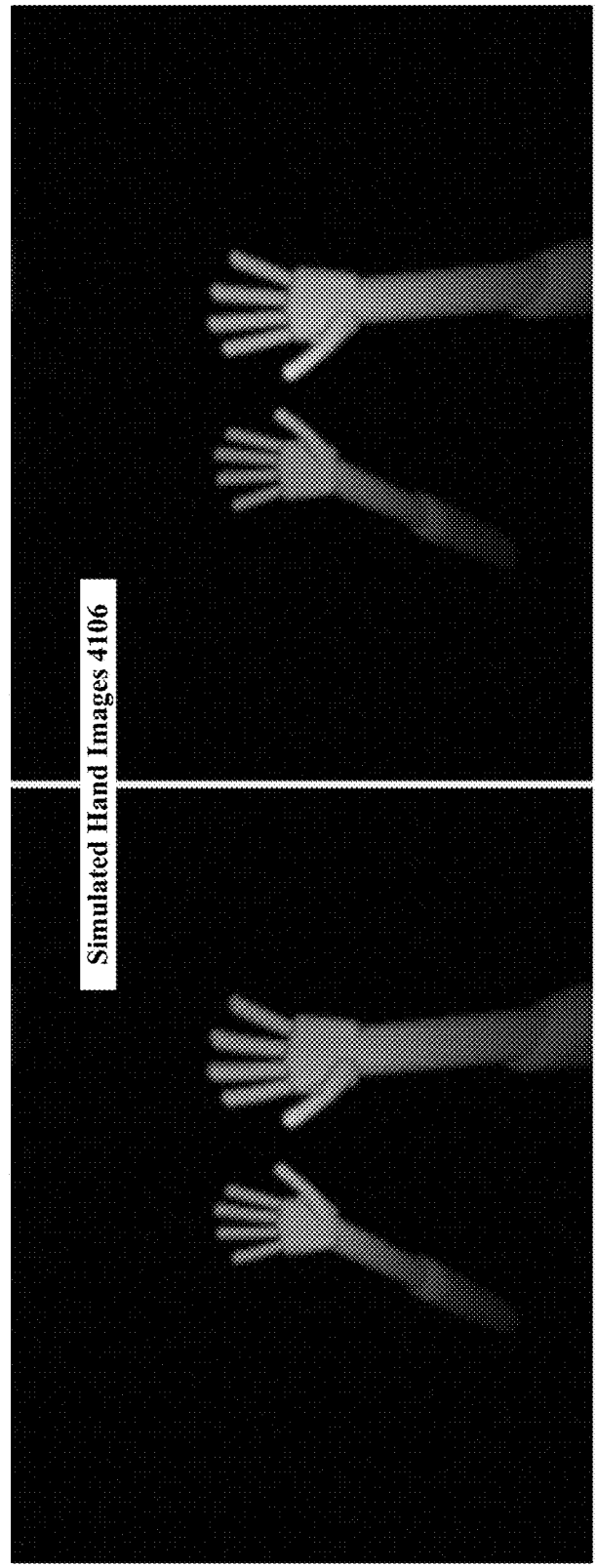

FIG. 52 is one implementation of simulated hand images in the form of grayscale stereoscopic or binocular images based on a simulated 3D capsule hand model.

FIGS. 53A, 53B, 53C, 53D, 53E, 53F, 53G, 53H, 53I, 53J and 53K are different examples of automated range-based simulations of different hand poses generated by a computer graphics simulator.

Figure 54:
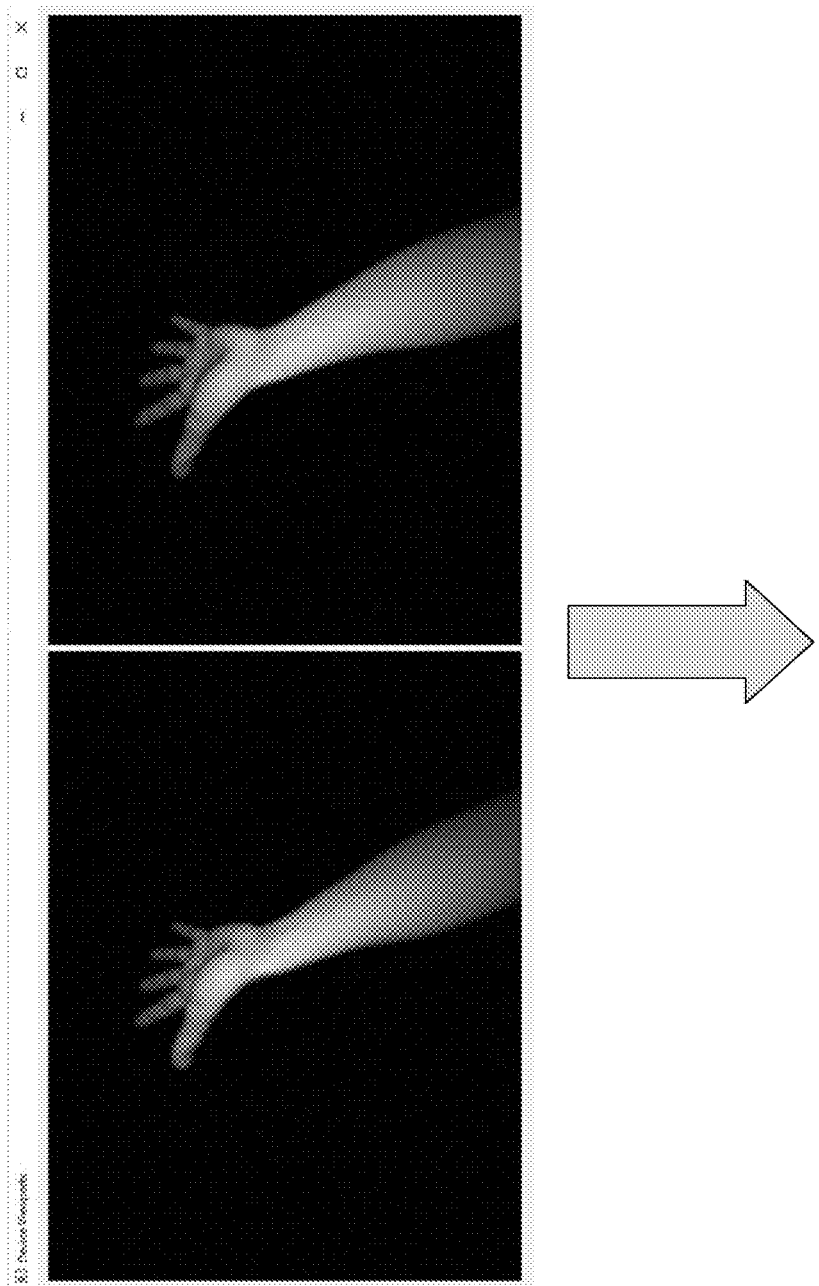

FIG. 54 shows one implementation of simulated hand images (left and right, (l, r)) generated by a computer graphics simulator and corresponding label assigned or mapped to the images in the form of the ground truth 84 (28×3) dimensional pose vector of 3D joint locations of twenty-eight (28) hand joints.

Figure 55:
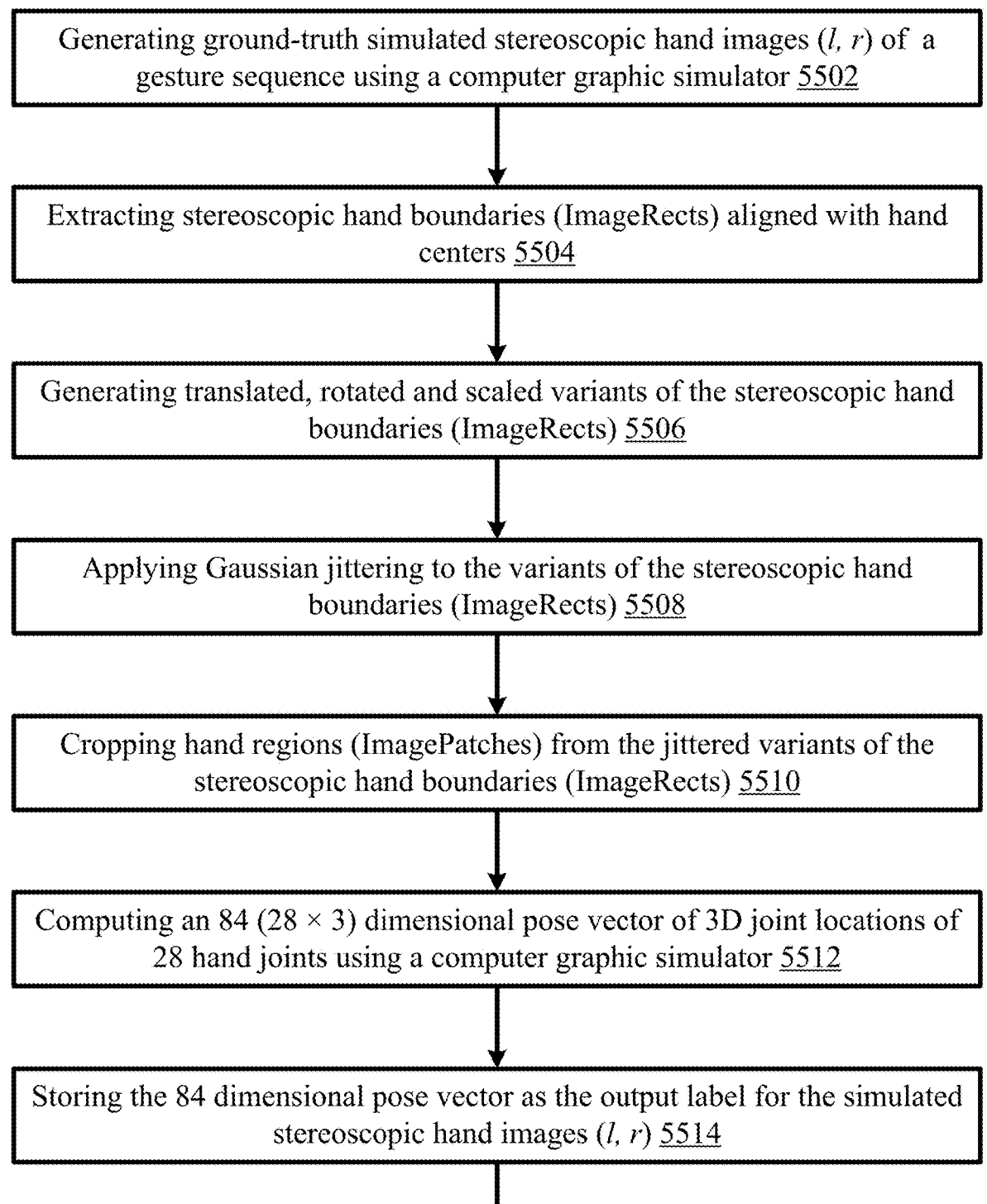

FIG. 55 shows a representative method of generating training data in accordance with one implementation of the technology disclosed.

Figure 56:
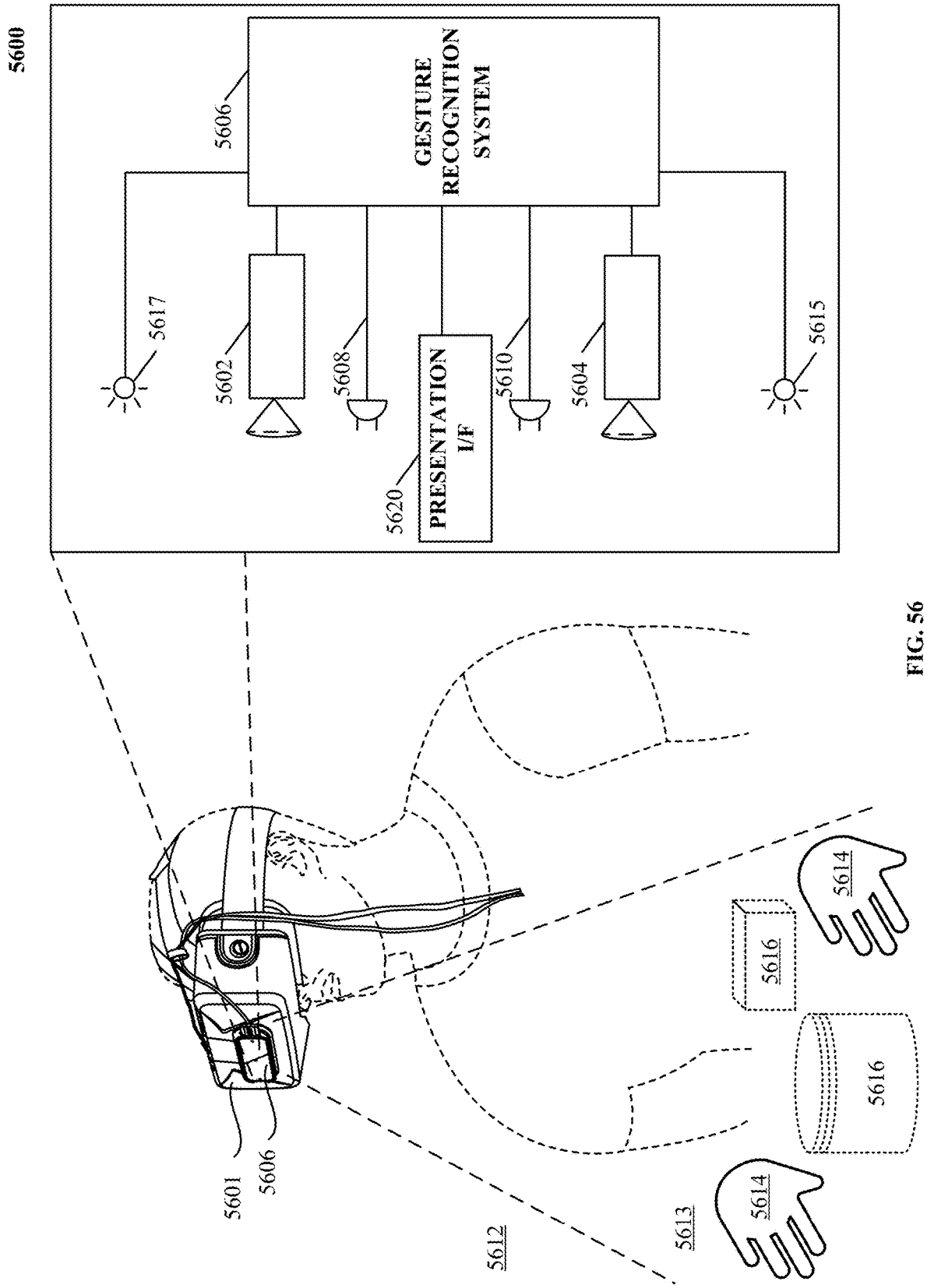

FIG. 56 illustrates an augmented reality (AR)/virtual reality (VR) environment with a gesture recognition system for capturing image data according to one implementation of the technology disclosed.

Figure 57:
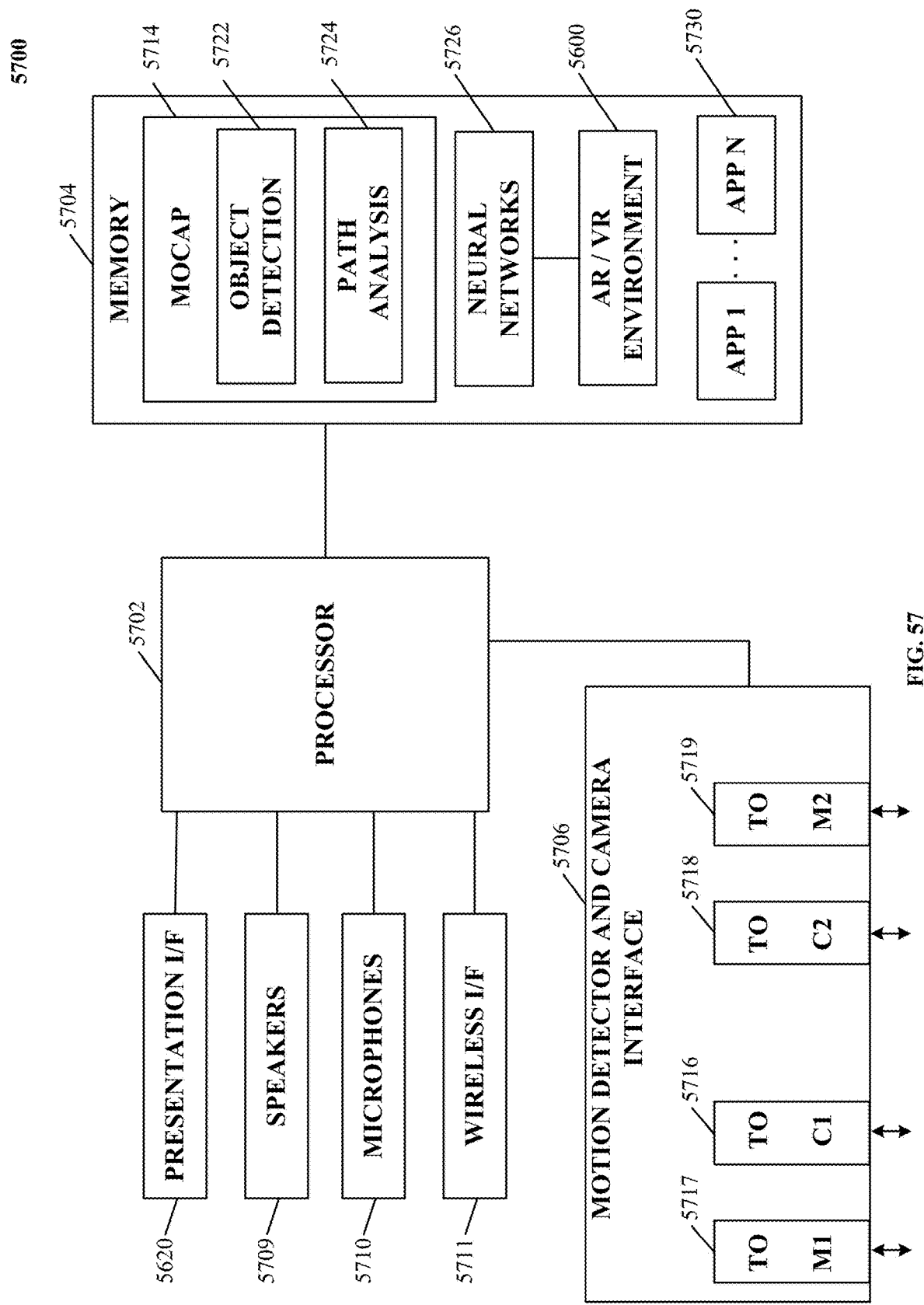

FIG. 57 shows a simplified block diagram of a computer system for implementing a gesture recognition system.

INTRODUCTION

A Human hand is a non-rigid articulated structure that changes in shape in various ways, making it an intricate and complex object. The human hand is made up of 27 bones, numerous muscles, tendons and ligaments that provide it 30-50 degrees of freedom and varying constrains on motion and flexibility. However, motion ability, visual attribute and structure of a hand vary significantly between individuals. As well, the hand is also subject to complex occlusion, both caused by the hand itself (self-occlusion), e.g. from crossing ones fingers or clinching the hand into a closed fist, and from other objects that the hand is interacting with, e.g. grasping an object. In addition, the fingers are adjacent to other that leads to self-occlusions. Also, a hand has many self-similar parts (e.g., fingers) and large variations in terms of shape, size and skin tone. Further, because hand postures and gestures are highly variable from one person to another, it is a challenge to capture the invariant properties of the hands and use this information to represent them. Moreover, the human hand is capable of an enormous range of poses, which are also difficult to simulate or to account for.

While humans are able to naturally detect the presence and pose of hand even during complex gestures and strong occlusion, the task is relatively difficult for machines and computer vision systems compared to e.g. face detection and head pose estimation. This is because the complex and articulated structure of the hand makes the mapping from hand appearance in an image to pose estimation highly non-linear. The high level of non-linearity makes the task difficult for classic feature based machine learning methods.

However, in recent years, machine learning methods capable of performing deep learning have been used for hand detection and pose estimation. Supervised learning is based on the system trying to predict outcomes for known examples and is a commonly used training method. It compares its predictions to the target answer and "learns" from its mistakes. The data start as inputs to the input layer neurons. The neurons pass the inputs along to the next nodes. As inputs are passed along, the weighting, or connection, is applied and when the inputs reach the next node, the weightings are summed and either intensified or weakened. This continues until the data reaches the output layer where the model predicts an outcome. In a supervised learning system, the predicted output is compared to the actual output for that case. If the predicted output is equal to the actual output, no change is made to the weights in the system. But, if the predicted output is higher or lower than the actual outcome in the data, the error is propagated back through the system and the weights are adjusted accordingly. This feeding errors backwards through the network is called "back propagation." Both the multi-layer perceptron and the radial basis function are supervised learning techniques. The multi-layer perceptron uses the back-propagation while the radial basis function is a feed-forward approach which trains on a single pass of the data.

Deep learning refers to a subfield of machine learning that is based on learning levels of representations, corresponding to a hierarchy of features, factors or concepts, where higher-lever concepts are defined from lower-lever ones, and the same lower-lever concepts define many higher-lever concepts. Deep learning is learning multiple levels of representation and abstraction of data such as images, audio and text. The concept of deep learning comes from the study of artificial neural networks, and in particular from deep neural networks with multilayer perceptron that forms many hidden layers of a deep learning structure.

The technology disclosed provides a new architecture for human hand pose estimation using multi-layer convolutional neural networks and new learning techniques that demonstrate improvement over the current, state of the art gesture recognition architectures. In particular, the technology disclosed applies convolutional neural networks to the technical problem of hand detection and hand pose estimation. The convolutional neural networks are trained to perform regression over simulated data generated from images in the order of 100,000 and a billion. The systems and methods to generate the simulated data are also disclosed. The disclosed convolutional neural networks are fully connected deep neural networks that perform end to end feature learning and are trained with the back propagation algorithm.

The technology disclosed introduces two types of neural networks: "master" or "generalists" networks and "expert" or "specialists" networks. Both, master networks and expert networks, are fully connected neural networks that take a feature vector of an input hand image and produce a prediction of the hand pose. Master networks and expert networks differ from each other based on the data on which they are trained. In particular, master networks are trained on the entire data set. In contrast, expert networks are trained only on a subset of the entire dataset. In regards to the hand poses, master networks are trained on the input image data representing all available hand poses comprising the training data (including both real and simulated hand images). Expert networks are individually trained on specific classes of hand poses such as open-hand poses, first poses, grab poses, V-shaped poses or pinch poses. This distinction allows the convolutional neural networks to have "generalists" in the form of master networks that are trained over the entire available training data, which nearly cover the space of all possible poses and hence generalize better over unseen hand poses, not present in the training data. Furthermore, within each of the master networks and expert networks, there are two kinds of neural networks: "temporal" networks and "atemporal" networks. The temporal networks also take into account prior pose information when predicting a new pose.

The technology disclosed performs hand pose estimation on a so-called "joint-by-joint" basis. So, when a plurality of estimates for the 28 hand joints are received from a plurality of expert networks (and from master experts in some high-confidence scenarios), the estimates are analyzed at a joint level and a final location for each joint is calculated based on the plurality of estimates for a particular joint. This is a novel solution discovered by the technology disclosed because nothing in the field of art determines hand pose estimates at such granularity and precision. Regarding granularity and precision, because hand pose estimates are computed on a joint-by-joint basis, this allows the technology disclosed to detect in real time even the minutest and most subtle hand movements, such a bend/yaw/tilt/roll of a segment of a finger or a tilt an occluded finger, as demonstrated supra in the Experimental Results section of this application.

Further, the outlier-robust covariance propagation prevents erroneous or less accurate estimates from influencing the final hand pose estimates. For instance, if out of thirty (30) expert networks 112, twenty-seven (27) give erroneous estimates that are detected as outliers, then that would not negatively influences the estimation of the final hand pose and the three (3) correct and accurate estimates, that were detected as inliers, would dominate the final hand pose estimation.

The technology disclosed also initializes a new hand that enters the field of view of a gesture recognition system using a parallax detection module. The parallax detection module determines candidate regions of interest (ROI) for a given input hand image and computes depth, rotation and position information for the candidate ROI. Then, for each of the candidate ROI, an ImagePatch, which includes the hand, is extracted from the original input hand image to minimize processing of low-information pixels. Further, a hand classifier neural network is used to determine which ImagePatch most resembles a hand. For the qualified, most-hand like ImagePatch, a 3D virtual hand is initialized with depth, rotation and position matching that of the qualified ImagePatch.

The technology disclosed also discloses a computer graphics simulator that automatically generates simulated hand poses and gesture sequences in the order of 100,000 and a billion. The hand poses and gesture sequences are generated across a variety of simulation parameters that represent various anatomical features and motions of a real hand. Also, a range-based automation is employed that includes instantiating a plurality of simulation parameters between a range of anatomically correct hand poses and gesture sequences to automatically generate numerous hand poses and gesture sequences between the ranges. In addition, various backgrounds, rendering models and noises are applied to the hand poses and gesture sequences to better represent the space of all possible hand poses and gestures.

System and methods in accordance herewith generally utilize information about the motion of a control object, such as a user's hand, finger or a stylus, in three-dimensional (3D) space to operate a physical or virtual user interface and/or components thereof based on the motion information. Various implementations take advantage of motion-capture technology to track the motions of the control object in real time (or near real time, i.e., sufficiently fast that any residual lag between the control object and the system's response is unnoticeable or practically insignificant). Other implementations can use synthetic motion data (e.g., generated by a computer game) or stored motion data (e.g., previously captured or generated). References to motions in "free-form in-air", "free-space", "in-air", or "touchless" motions or gestures are used herein with reference to an implementation to distinguish motions tied to and/or requiring physical contact of the moving object with a physical surface to effect input; however, in some applications, the control object can contact a physical surface ancillary to providing input, in such case the motion is still considered a "free-form in-air" motion.

Further, in some implementations, a virtual environment can be defined to co-reside at or near a physical environment. For example, a virtual touch screen can be created by defining a (substantially planar) virtual surface at or near the screen of a display, such as an HMD, television, monitor, or the like. A virtual active table top can be created by defining a (substantially planar) virtual surface at or near a table top convenient to the machine receiving the input.

Among other aspects, implementations can enable quicker, crisper gesture based or "free-form in-air" (i.e., not requiring physical contact) interfacing with a variety of machines (e.g., a computing systems, including HMDs, smart phones, desktop, laptop, tablet computing devices, special purpose computing machinery, including graphics processors, embedded microcontrollers, gaming consoles, audio mixers, or the like; wired or wirelessly coupled networks of one or more of the foregoing, and/or combinations thereof), obviating or reducing the need for contact-based input devices such as a mouse, joystick, touch pad, or touch screen.

Implementations of the technology disclosed also relate to methods and systems that facilitate free-form in-air gestural interactions in a virtual reality (VR) and augmented reality (AR) environment. The technology disclosed can be applied to solve the technical problem of how the user interacts with the virtual screens, elements, or controls displayed in the AR/VR environment. Existing AR/VR systems restrict the user experience and prevent complete immersion into the real world by limiting the degrees of freedom to control virtual objects. Where interaction is enabled, it is coarse, imprecise, and cumbersome and interferes with the user's natural movement. Such considerations of cost, complexity and convenience have limited the deployment and use of AR technology.

The systems and methods described herein can find application in a variety of computer-user-interface contexts, and can replace mouse operation or other traditional means of user input as well as provide new user-input modalities. Free-form in-air control object motions and virtual-touch recognition can be used, for example, to provide input to commercial and industrial legacy applications (such as, e.g., business applications, including Microsoft Outlook™; office software, including Microsoft Office™, Windows™, Excel, etc.; graphic design programs; including Microsoft Visio™ etc.), operating systems such as Microsoft Windows™; web applications (e.g., browsers, such as Internet Explorer™); other applications (such as e.g., audio, video, graphics programs, etc.), to navigate virtual worlds (e.g., in video games) or computer representations of the real world (e.g., Google Street View™), or to interact with three-dimensional virtual objects (e.g., Google Earth™). In some implementations, such applications can be run on HMDs or other portable computer devices and thus can be similarly interacted with using the free-form in-air gestures.

A "control object" or "object" as used herein with reference to an implementation is generally any three-dimensionally movable object or appendage with an associated position and/or orientation (e.g., the orientation of its longest axis) suitable for pointing at a certain location and/or in a certain direction. Control objects include, e.g., hands, fingers, feet, or other anatomical parts, as well as inanimate objects such as pens, styluses, handheld controls, portions thereof, and/or combinations thereof. Where a specific type of control object, such as the user's finger, is used hereinafter for ease of illustration, it is to be understood that, unless otherwise indicated or clear from context, any other type of control object can be used as well.

A "virtual environment," may also referred to as a "virtual construct," "virtual touch plane," or "virtual plane," as used herein with reference to an implementation denotes a geometric locus defined (e.g., programmatically) in space and useful in conjunction with a control object, but not corresponding to a physical object; its purpose is to discriminate between different operational modes of the control object (and/or a user-interface element controlled therewith, such as a cursor) based on whether the control object interacts the virtual environment. The virtual environment, in turn, can be, e.g., a virtual environment (a plane oriented relative to a tracked orientation of the control object or an orientation of a screen displaying the user interface) or a point along a line or line segment extending from the tip of the control object.

Using the output of a suitable motion-capture system or motion information received from another source, various implementations facilitate user input via gestures and motions performed by the user's hand or a (typically handheld) pointing device. For example, in some implementations, the user can control the position of a cursor and/or other object on the interface of an HMD by with his index finger in the physical environment outside the HMD's virtual environment, without the need to touch the screen. The position and orientation of the finger relative to the HMD's interface, as determined by the motion-capture system, can be used to manipulate a cursor symbol. As will be readily apparent to one of skill in the art, many other ways of mapping the control object position and/or orientation onto a screen location can, in principle, be used; a particular mapping can be selected based on considerations such as, without limitation, the requisite amount of information about the control object, the intuitiveness of the mapping to the user, and the complexity of the computation. For example, in some implementations, the mapping is based on intersections with or projections onto a (virtual) plane defined relative to the camera, under the assumption that the HMD interface is located within that plane (which is correct, at least approximately, if the camera is correctly aligned relative to the screen), whereas, in other implementations, the screen location relative to the camera is established via explicit calibration (e.g., based on camera images including the screen).

Aspects of the system and methods, described herein provide for improved machine interface and/or control by interpreting the motions (and/or position, configuration) of one or more control objects or portions thereof relative to one or more virtual environments disposed (e.g., programmatically) at least partially within a field of view of an image-capture device. In implementations, the position, orientation, and/or motion of control object(s) (e.g., a user's finger(s), thumb, etc.; a suitable hand-held pointing device such as a stylus, wand, or some other control object; portions and/or combinations thereof) are tracked relative to the virtual environment to facilitate determining whether an intended free-form in-air gesture has occurred. Free-form in-air gestures can include engaging with a virtual control (e.g., selecting a button or switch), disengaging with a virtual control (e.g., releasing a button or switch), motions that do not involve engagement with any virtual control (e.g., motion that is tracked by the system, possibly followed by a cursor, and/or a single object in an application or the like), environmental interactions (i.e., gestures to direct an environment rather than a specific control, such as scroll up/down), special-purpose gestures (e.g., brighten/darken screen, volume control, etc.), as well as others or combinations thereof.

Free-form in-air gestures can be mapped to one or more virtual controls, or a control-less screen location, of a display device associated with the machine under control, such as an HMD. Implementations provide for mapping of movements in three-dimensional (3D) space conveying control and/or other information to zero, one, or more controls. Virtual controls can include imbedded controls (e.g., sliders, buttons, and other control objects in an application), or environmental-level controls (e.g., windowing controls, scrolls within a window, and other controls affecting the control environment). In implementations, virtual controls can be displayable using two-dimensional (2D) presentations (e.g., a traditional cursor symbol, cross-hairs, icon, graphical representation of the control object, or other displayable object) on, e.g., one or more display screens, and/or 3D presentations using holography, projectors, or other mechanisms for creating 3D presentations. Presentations can also be audible (e.g., mapped to sounds, or other mechanisms for conveying audible information) and/or haptic.

As used herein, a given signal, event or value is "responsive to" a predecessor signal, event or value of the predecessor signal, event or value influenced by the given signal, event or value. If there is an intervening processing element, step or time period, the given signal, event or value can still be "responsive to" the predecessor signal, event or value. If the intervening processing element or step combines more than one signal, event or value, the signal output of the processing element or step is considered "responsive to" each of the signal, event or value inputs. If the given signal, event or value is the same as the predecessor signal, event or value, this is merely a degenerate case in which the given signal, event or value is still considered to be "responsive to" the predecessor signal, event or value. "Responsiveness" or "dependency" or "basis" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Among other aspects, the technology described herein with reference to example implementations can provide for automatically (e.g., programmatically) cancelling out motions of a movable sensor configured to capture motion and/or determining the path of an object based on imaging, acoustic or vibrational waves. Implementations can enable gesture detection, virtual reality and augmented reality, and other machine control and/or machine communications applications using portable devices, e.g., head mounted displays (HMDs), wearable goggles, watch computers, smartphones, and so forth, or mobile devices, e.g., autonomous and semi-autonomous robots, factory floor material handling systems, autonomous mass-transit vehicles, automobiles (human or machine driven), and so forth, equipped with suitable sensors and processors employing optical, audio or vibrational detection. In some implementations, projection techniques can supplement the sensory based tracking with presentation of virtual (or virtualized real) objects (visual, audio, haptic, and so forth) created by applications loadable to, or in cooperative implementation with, the HMD or other device to provide a user of the device with a personal virtual experience (e.g., a functional equivalent to a real experience).

Some implementations include optical image sensing. For example, a sequence of images can be correlated to construct a 3-D model of the object, including its position and shape. A succession of images can be analyzed using the same technique to model motion of the object such as free-form gestures. In low-light or other situations not conducive to optical imaging, where free-form gestures cannot be recognized optically with a sufficient degree of reliability, audio signals or vibrational waves can be detected and used to supply the direction and location of the object as further described herein.

DETAILED DESCRIPTION

FIG. 1 illustrates a training pipeline 100 of one implementation of the technology disclosed. Training pipeline 100 includes training data 102, pre-processing 103, convolution layers 104, sub-sampling layers 106, non-linear layers 108, master networks 110, expert networks 112, pose estimation 114 and hand model fitting 116. Pipeline 100 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 1. Multiple actions can be combined in some implementations. For convenience, this pipeline is described with reference to the system that carries out a method. The system is not necessarily part of the method.

FIG. 2 illustrates a testing pipeline 200 of one implementation of the technology disclosed. Testing pipeline 200 includes testing data 202, initialization 206, pre-processing 103, convolution layers 104, sub-sampling layers 106, non-linear layers 108, master networks 110, expert networks 112, pose estimation 114, hand model fitting 116 and augmented reality (AR) and/or virtual reality (VR) interaction 208. In this application, "testing" or "testing pipeline 200" refers to real time tracking of a hand, i.e., "tracking," which is done by feeding the convolutional neural network 101 real world hand images captured by a gesture recognition system at run time. Pipeline 200 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 2. Multiple actions can be combined in some implementations. For convenience, this pipeline is described with reference to the system that carries out a method. The system is not necessarily part of the method.

Convolutional Neural Network

FIG. 3 shows one implementation of a fully connected neural network 300 with multiple layers. Neural network 300 is a system of interconnected artificial neurons (e.g., $a_1$, $a_1$, $a_3$) that exchange messages between each other. Specifically, neural network 300 has three inputs, two neurons in the hidden layer and two neurons in the output layer. The hidden layer has an activation function $f(\bullet)$ and the output layer has an activation function $g(\bullet)$. The connections have numeric weights (e.g., $w_{11}$, $w_{21}$, $w_{12}$, $w_{31}$, $w_{22}$, $w_{32}$, $v_{11}$, $v_{22}$) that are tuned during the training process, so that a properly trained network responds correctly when fed an image to recognize. The input layer processes the raw input fed to the convolutional neural network 101, the hidden layer processes the output from the input layer based on the weights of the connections between the input layer and the hidden layer. The output layer takes the output from the hidden layer and processes it based on the weights of the connections between the hidden layer and the output layer. The network includes multiple layers of feature-detecting neurons. Each layer has many neurons that respond to different combinations of inputs from the previous layers. These layers are constructed so that the first layer detects a set of primitive patterns in the input image data, the second layer detects patterns of patterns and the third layer detects patterns of those patterns.

Convolutional neural network 101 is a special type of neural network. Convolutional neural network 101 learns highly non-linear mappings by interconnecting layers of artificial neurons arranged in many different layers with activation functions that make the layers dependent. It includes one or more convolutional layers 104, with one or more sub-sampling layers 106 and non-linear layers 108, which are followed by one or more fully connected layers 118 as in a neural network. Each element of convolutional neural network 101 receives inputs from a set of features in the previous layer. Specifically, convolutional neural network 101 learns concurrently because the neurons in the same feature map have identical weights. These local shared weights reduce the complexity of the network such that when multi-dimensional input image data enters the network, convolutional neural network 101 avoids the complexity of data reconstruction in feature extraction and regression or classification process.

Training a Convolutional Neural Network

FIG. 4 depicts a block diagram of training 400 a convolutional neural network 101 in accordance with one implementation of the technology disclosed. Convolutional neural network 101 is adjusted or trained so that particular input image data 402 (e.g., binocular images) lead to a specific target hand pose estimates 406. Convolutional neural network 101 is adjusted 410 using back propagation 408 based on a comparison of the output 404 and the target 406 until the network output 404 matches the target 406. Convolutional neural network 101 is trained using labeled dataset 500A and 500B in a wide assortment of representative input image patterns that are mapped to their intended output 406 of ground truth hand pose estimates 500A. The target hand pose estimates 500A are labeled with twenty-eight (28) joint locations of the hand in three-dimensions (3D). One implementation of the ground truth hand pose 500A with twenty-eight joint locations in 3D is graphically illustrated in FIGS. 5A and 5B. In some implementations, the points for the fingers and thumb are located at the endpoints of the bones, from the tip of the distal bone down to where the metacarpals meet the wrist. As shown in FIG. 5B, the ground truth hand pose 500A is labeled with twenty-eight 3D joint locations 500B. The twenty-eight joints include four joints for the thumb, five joints for each of the index, middle, ring and pinkie fingers and four joints for the wrist or arm. In other implementations, the actual output and the ground truth desired output are not in joint space but instead in angle space. In such an implementation, the target hand pose estimates are labeled with joint angles. In yet other implementations, the actual output and the ground truth desired output are in the form of capsule hand models, skeleton hand models, volumetric hand models and/or mesh hand models, muscle hand models, each in 2D and/or 3D space.

Learning 400 in convolutional neural network 101 is done by adjusting 410 the weights by the difference between the desired target hand pose estimates 406 and the actual output hand pose estimates 410. This is mathematically described as:

$$\Delta w_i = e_i \delta$$

where $\delta$=(desired output)−(actual output)

During learning 400, convolutional neural network 101 adjusts the weights to generate the desired output, or target hand pose estimates 406, given some inputs like input image data 402 that generate that specific target. In one implementation, the learning rule is defined as:

$$w_{nm} \leftarrow w_{nm} + \alpha(t_m - \varphi_m)a_n$$

In the equation above: the arrow indicates an update of the value; $t_m$ is the target value of neuron m; $\varphi_m$ is the computed current output of neuron m; $a_n$ is input n; and $\alpha$ is the learning rate.

The intermediary step in learning 400 includes generating a feature vector from input image data 402 using convolution layers 104. The feature vector is then fed to the fully connected layers 118, where the activation of all the neurons in the fully connected layers is computed and stored to generate an output, i.e. prediction of twenty-eight (28) joint locations of a hand in 3D. This referred to as the forward pass, or going forward. Then, an error 412 between the output prediction 404 and the desired target 406 is measured. Advancing further, the gradient with respect to the weights in each layer, starting at the output, is calculated. This is referred to as the backward pass, or going backwards. The weights in the network are updated using a combination of the negative gradient and previous weights.

In one implementation, convolutional neural network 101 uses an algorithm that performs backward propagation of errors by means of gradient descent. One example of a sigmoid function based back propagation algorithm is described below:

$$\varphi = f(h) = \frac{1}{1+e^{-h}}$$

In the sigmoid function above, h is the weighted sum computed by a neuron. The sigmoid function has the following derivative:

$$\frac{\partial \varphi}{\partial h} = \varphi(1-\varphi)$$

The algorithm includes computing the activation of all neurons in the network, yielding an output for the forward pass. The activation of neuron m in the hidden layers is described as:

$$\varphi_m = \frac{1}{1+e^{-hm}}$$

$$h_m = \sum_{n=1}^{N} a_n w_{nm}$$

This is done for all the hidden layers to get the activation described as:

$$\varphi_k = \frac{1}{1+e^{hk}}$$

$$h_k = \sum_{m=1}^{M} \varphi_m v_{mk}$$

Then, the error and the correct weights are calculated per layer. The error at the output is computed as:

$$\delta_{ok} = (t_k - \varphi_k)\varphi_k(1-\varphi_k)$$

The error in the hidden layers is calculated as:

$$\delta_{hm} = \varphi_m(1-\varphi_m)\sum_{k=1}^{K} v_{mk}\delta_{ok}$$

The weights of the output layer are updated as:

$$vmk \leftarrow vmk + \alpha \delta ok \varphi m$$

The weights of the hidden layers are updated using the learning rate a as:

$$vnm \leftarrow wnm + \alpha \delta hman$$

In one implementation, convolutional neural network 101 uses a gradient descent optimization to compute the error across all the layers. In such an optimization, for an input feature vector x and the predicted output ŷ, the loss function is defined as l for the cost of predicting ŷ when the target is y, i.e. l(ŷ, y). The predicted output ŷ is transformed from the input feature vector x using function $f$. Function $f$ is parameterized by the weights of convolutional neural network 101, i.e. $\hat{y}=f_w(x)$. The loss function is described as l(ŷ, y)=l($f_w$(x), y), or Q(z, w)=l($f_w$(x), y) where z is an input and output data pair (x, y). The gradient descent optimization is performed by updating the weights according to:

$$v_{t+1} = \mu v_t - \alpha \frac{1}{n}\sum_{i=1}^{N} \nabla w_t Q(z_t, w_t)$$

$$w_{t+1} = w_t + v_{t+1}$$

In the equations above, $\alpha$ is the learning rate. Also, the loss is computed as the average over a set of 12 data pairs.

The computation is terminated when the learning rate α is small enough upon linear convergence. In other implementations, the gradient is calculated using only selected data pairs fed to a Nesterov's accelerated gradient and an adaptive gradient to inject computation efficiency.

In one implementation, convolutional neural network 101 uses a stochastic gradient descent (SGD) to calculate the cost function. A SGD approximates the gradient with respect to the weights in the loss function by computing it from only one, randomized, data pair, $z_t$, described as:

$$v_{t+1} = \mu v - \alpha \nabla w Q(z_t m, w_t)$$

$$w_{t+1} = w_t + v_{t+1}$$

In the equations above: α is the learning rate; μ is the momentum; and t is the current weight state before updating. The convergence speed of SGD is approximately O(1/t) when the learning rate α are reduced both fast and slow enough. In other implementations, convolutional neural network 101 uses different loss functions such as Euclidean loss and softmax loss. In a further implementation, an Adam stochastic optimizer is used by the convolutional neural network 101.

In one implementation, convolutional neural network 101 uses as input two channels of stereoscopic or binocular images. In other implementations, it uses only a monocular image as input. In some other implementation, it uses a single two-dimensional (2D) image along with depth information as the sole input channel. In yet another implementation, it uses three input channels for a single image, such that the channels correspond to the red (R), blue (B) and green (G) components of the single image. In some implementations, the input image data 402 are pre-processed to generate one of, a combination of, or all of a grayscale map, a saliency map and a disparity map of the input image data 402, which substitute as the actual input image data 402 fed to convolutional neural network 101.

Convolution Layers

Convolution layers 104 of convolutional neural network 101 serve as feature extractors. Convolution layers 104 act as adaptive feature extractors capable of learning and decomposing input image data 402 into hierarchical features. In one implementation, convolution layers 104 take two images as input and produce a third image as output. In such an implementation, convolution operates on two images in two-dimension (2D), with one image being the input image and the other image, called the "kernel", applied as a filter on the input image, producing an output image. Thus, for an input vector $f$ of length n and a kernel g of length m, the convolution $f*g$ of $f$ and g is defined as:

$$(f*g)(i) = \sum_{j=1}^{m} g(j) \cdot f(i - j + m/2)$$

The convolution operation includes sliding the kernel over the input image. For each position of the kernel, the overlapping values of the kernel and the input image are multiplied and the results are added. The sum of products is the value of the output image at the point in the input image where the kernel is centered. The resulting different outputs from many kernels are called feature maps.

Once the convolutional layers 104 are trained, they are applied to perform recognition tasks on new testing data 202. Since the convolutional layers 104 learn from training data 102, they avoid explicit feature extraction and implicitly learn from the training data 102. Convolution layers 104 use convolution filter kernel weights, which are determined and updated as part of the training process 400. Convolution layers 104 extract different features of a hand, which are combined at higher layers. In one implementation, the convolution filters or kernels used by convolution layers 104 are hand-specific and extract relevant information from the input image data 402 and eliminate irrelevant variabilities. Some examples of global and local hand features extracted by the convolution layers 104 include oriented edges, end points, corners, lines and intersections.

Convolutional neural network 101 uses various number of convolution layers 104 ranging from one (1) to thirty-three (33), each with different convolving parameters such as kernel size, strides, padding, number of feature maps and weights. In some implementations, only a set of convolution layers 104 are used instead of the all the convolutional layers 104 to avoid overfitting and loss of generalization performance.

Sub-Sampling Layers

FIG. 6 is one implementation of sub-sampling layers 106 in accordance with one implementation of the technology disclosed. Sub-sampling layers 106 reduce the resolution of the features extracted by the convolution layers 104 to make the extracted features or feature maps 602 robust against noise and distortion. In one implementation, sub-sampling layers 106 employ two types of pooling operations, average pooling 604 and max pooling 606. The pooling operations divide the input into non-overlapping two-dimensional spaces. For average pooling 604, the average of the four values in the region is calculated. For max pooling 604, the maximum value of the four values is selected.

In one implementation, sub-sampling layers 106 include pooling operations on a set of neurons in the previous layer by mapping its output to only one of the inputs in max pooling 606 and by mapping its output to the average of the input in average pooling 604. In max pooling 606, the output of the pooling neuron is the maximum value that resides within the input, as described by:

$$\varphi_o = \max(\varphi_1, \varphi_2 \ldots \varphi_N)$$

In equation above, N is the total number of elements within a neuron set.

In average pooling 604, the output of the pooling neuron is the average value of the input values that reside with the input neuron set, as described by:

$$\varphi_o = \frac{1}{N} \sum_{n=1}^{N} \varphi_n$$

In equation above, N is the total number of elements within input neuron set.

In FIG. 6, the input is of size 4×4. For 2×2 sub-sampling, a 4×4 image is divided into four non-overlapping matrices of size 2×2. For average pooling 604, the average of the four values is the whole-integer output. For max pooling 606, the maximum value of the four values in the 2×2 matrix is the whole-integer output.

Non-Linear Layers

FIG. 7 shows one implementation of non-linear layers 108 in accordance with one implementation of the technology disclosed. Non-linear layers 108 use different non-linear trigger functions to signal distinct identification of likely features on each hidden layer. Non-linear layers 108 use a variety of specific functions to implement the non-linear triggering, including the rectified linear units (ReLUs), hyperbolic tangent, absolute of hyperbolic tangent, sigmoid and continuous trigger (non-linear) functions. In one implementation, a ReLU activation implements the function y=max(x, 0) and keeps the input and output sizes of a layer the same. The advantage of using ReLU is that convolutional neural network 101 is trained many times faster. ReLU is a non-continuous, non-saturating activation function that is linear with respect to the input if the input values are larger than zero and zero otherwise. Mathematically, a ReLU activation function is described as:

$$\varphi(h) = \max(h, 0)$$

$$\varphi(h) = \begin{cases} h \text{ if } h > 0 \\ 0 \text{ if } h \leq 0 \end{cases}$$

In other implementations, convolutional neural network 101 uses a power unit activation function, which is a continuous, non-saturating function described by:

$$\varphi(h) = (a+bh)^c$$

In the equation above, a, b and c are parameters controlling the shift, scale and power respectively. The power activation function is able to yield x and y-antisymmetric activation if c is odd and y-symmetric activation if c is even. In some implementations, the unit yields a non-rectified linear activation.

In yet other implementations, convolutional neural network 101 uses a sigmoid unit activation function, which is a continuous, saturating function described by the following logistic function:

$$\varphi(h) = \frac{1}{1 + e^{-\beta h}}$$

In the equation above, $\beta=1$. The sigmoid unit activation function does not yield negative activation and is only antisymmetric with respect to the y-axis.

Convolution Examples

FIG. 8 depicts one implementation of a two-layer convolution of the convolution layers 104. In FIG. 8, two input channels of 32×32 stereoscopic (left and right) grayscale images are used, making the input image data 402 of 2048 dimensions {[(32)×(32)=1024]+[(32)×(32)=1024]=2048}. At convolution 1, each of the 32×32 grayscale images are convolved by a convolutional layer comprising of two channels of sixteen kernels of size 3×3. The resulting sixteen feature maps are then rectified by means of the ReLU activation function at ReLU 1 and then pooled in Pool 1 by means of average pooling using a sixteen channel pooling layer with kernels of size 3×3. At convolution 2, the output of Pool 1 is then convolved by another convolutional layer comprising of sixteen channels of thirty kernels with a size of 3×3. This is followed by yet another ReLU2 and average pooling in Pool 2 with a kernel size of 2×2. Convolution layers 104 use varying number of strides and padding, for example, zero, one, two and three. The resulting feature vector is five hundred and twelve (512) dimensions, according to one implementation.

In other implementations, convolutional neural network 101 uses different numbers of convolution layers 104, sub-sampling layers 106, non-linear layers 108 and fully connected layers 118. In one implementation, convolutional neural network 101 is a shallow network with fewer layers and more neurons per layer, for example, one, two or three fully connected layers with hundred (100) to two hundred (200) neurons per layer. In another implementation, convolutional neural network 101 is a deep network with more layers and fewer neurons per layer, for example, five (5), six (6) or eight (8) fully connected layers with thirty (30) to fifty (50) neurons per layer. In yet another implementation, convolutional neural network 101 is a multi-scale network with three (3) scaled inputs representing depth data.

In another example, the input images are of different dimensions like 96×96 and the preprocessing converts the input images into size 32×32. A CNN of seven layers includes an input layer, a convolution layer C1, a sub-sampling layer S1, another convolution layer C2, another sub-sampling layer S2, a hidden layer H and an output layer F. Convolution layer C1 uses six convolution kernels, each of size 5×5, to produce six feature maps. Each feature map includes seven hundred and eighty four neurons {28×28=784}. At convolution layer C1, one hundred and fifty six parameters are trained {(6)×[(5)×(5)+(1)]=156}. Sub-sampling layer S1 also includes six feature maps, with each feature map having one hundred and ninety six neurons {14×14=196}. The sub-sampling window is a 2×2 matrix and since the sub-sampling step size is one, layer S1 includes five thousand eight hundred and eighty connections {(6)×(196)×[(2)×(2)+(1)]=5880}. Every feature map in the S1 layer includes a weight and bias, making the trained parameters twelve (12).

Convolution layer C2 includes sixteen feature maps and each feature map includes hundred neurons {{[(14)−(5)+(1)]×[(14)−(5)+(1)]=100} and adopts a full connection. Each feature map of layer C2 has one hundred and fifty weights and a bias, making the trained parameters one hundred and fifty. Sub-sampling layer S2 includes sixteen feature maps. Each feature map has twenty five neurons, making the total neurons in layer S2 four hundred. The sub-sampling window is a 2×2 matrix, making the trained parameters thirty two.

The hidden layer H includes one hundred and seventy neurons, each neuron connected to four hundred neurons of layer S2. As a result, layer H includes forty eight thousand one hundred and twenty trained parameters. The output layer F includes eighty four neurons, making the trained parameters fourteen thousand three hundred and sixty four {84×[(170)+(1)]=14364}.

Forward Pass

The output of a neuron of row x, column y in the $l^{th}$ convolution layer and $k^{th}$ feature map for $f$ number of convolution cores in a feature map is determined by the following equation:

$$O_{x,y}^{(l,k)} = \tanh\left(\sum_{t=0}^{f-1}\sum_{r=0}^{k_h}\sum_{c=0}^{k_w} W_{(r,c)}^{(k,t)} O_{(x+r,y+c)}^{(l-1,t)} + \text{Bias}^{(l,k)}\right)$$

The output of a neuron of row x, column y in the $l^{th}$ sub-sample layer and $k^{th}$ feature map is determined by the following equation:

$$O_{x,y}^{(l,k)} = \tanh\left(W^{(k)}\sum_{r=0}^{S_h}\sum_{c=0}^{S_w} O_{(x\times S_h+r, y\times S_w+c)}^{(l-1,k)} + \text{Bias}^{(l,k)}\right)$$

The output of an $i^{th}$ neuron of the $l^{th}$ output layer is determined by the following equation:

$$O_{(l,i)} = \tanh\left(\sum_{j=0}^{H} O_{(l-1,j)} W_{(i,j)}^{l} + \text{Bias}^{(l,i)}\right)$$

Back Propagation

The output deviation of a $k^{th}$ neuron in the output layer is determined by the following equation:

$$d(O_k^o) = y_k - t_k$$

The input deviation of a $k^{th}$ neuron in the output layer is determined by the following equation:

$$d(I_k^o) = (y_k - t_k)\varphi'(v_k) = \varphi'(v_k)d(O_k^o)$$

The weight and bias variation of a $k^{th}$ neuron in the output layer is determined by the following equation:

$$\Delta W_{k,x}^o = d(I_k^o)y_{k,x}$$

$$\Delta \text{Bias}_k^o = d(I_k^o)$$

The output bias of a $k^{th}$ neuron in the hidden layer is determined by the following equation:

$$d(O_k^H) = \sum_{i=0}^{i<84} d(I_i^o)W_{i,k}$$

The input bias of a $k^{th}$ neuron in the hidden layer is determined by the following equation:

$$d(I_k^H) = \varphi'(v_k)d(O_k^H)$$

The weight and bias variation in row x, column y in an $m^{th}$ feature map of a prior layer receiving input from k neurons in the hidden layer is determined by the following equation:

$$\Delta W_{m,x,y}^{H,k} = d(I_k^H)y_{x,y}^m$$

$$\Delta \text{Bias}_k^H = d(I_k^H)$$

The output bias of row x, column y in an $m^{th}$ feature map of sub-sample layer S is determined by the following equation:

$$d(O_{x,y}^{S,m}) = \sum_{k}^{170} d(I_{m,x,y}^H)W_{m,x,y}^{H,k}$$

The input bias of row x, column y in an $m^{th}$ feature map of sub-sample layer S is determined by the following equation:

$$d(I_{x,y}^{S,m}) = \varphi'(v_k)d(O_{x,y}^{S,m})$$

The weight and bias variation in row x, column y in an $m^{th}$ feature map of sub-sample layer S and convolution layer C is determined by the following equation:

$$\Delta W^{S,m} = \sum_{x=0}^{fh} \sum_{y=0}^{fw} d(I_{[x/2],[y/2]}^{S,m})O_{x,y}^{C,m}$$

-continued $$\Delta \text{Bias}^{S,m} = \sum_{x=0}^{fh} \sum_{y=0}^{fw} d(O_{x,y}^{S,m})$$

The output bias of row x, column y in an $k^{th}$ feature map of convolution layer C is determined by the following equation:

$$d(O_{x,y}^{C,k}) = d(I_{[x/2],[y/2]}^{S,k})W^k$$

The input bias of row x, column y in an $k^{th}$ feature map of convolution layer C is determined by the following equation:

$$d(I_{x,y}^{C,k}) = \varphi'(v_k)d(O_{x,y}^{C,k})$$

The weight and bias variation in row r, column c in an $m^{th}$ convolution core of a $k^{th}$ feature map of $l^{th}$ convolution layer C:

$$\Delta W_{r,c}^{k,m} = \sum_{x=0}^{fh} \sum_{y=0}^{fw} d(I_{x,y}^{C,k})O_{x+r,y+c}^{l-1,m}$$

$$\Delta \text{Bias}^{C,k} = \sum_{x=0}^{fh} \sum_{y=0}^{fw} d(I_{x,y}^{C,k})$$

In one implementation, convolutional neural network 101 includes five (5) to seven (7) fully connected layers, each with hundred (100) to two hundred (200) neurons. In other implementations, convolutional neural network 101 includes any number of fully connected layers, each with any number of neurons. For instance, convolutional neural network 101 includes three (3) fully connected layers with seven thousand one hundred eighty-eight neurons (7188) in the first and second layer and eighty-four (84) neurons in the output layer.

In regards to pre-processing 103, input image data 402 are pre-processed before they are fed into the convolutional neural network 101. In one implementation, the input image data 402 is made brightness, contrast and distance invariant to prevent the convolutional neural network 101 from having to differentiate between darker and brighter hand images and in turn closer and farther hands. Normalizing the image brightness also reduces the number of parameters the convolutional neural network 101 has to learn. Other examples of such pre-processing include noise reduction, color space conversion, image scaling and Gaussian pyramid. In one implementation, pre-processing 103 includes extracting regions of interest from the input image data 402, which include the hand. These regions of interest are referred to as "ImagePatches" and are used to determine bounded hand places called "ImageRects." In other implementations, techniques such as background subtraction, image segmentation and connected component labeling are used to extract the ImagePatches. In one implementation, training data 102 is divided by the palm width of the hand in order to make the units scale-invariant. This is useful because, during testing pipeline 200, the depth of a hand is determined based on its scale since a large object viewed from further away looks mostly the same as a small object closer to the camera of the gesture recognition system. Thus, input image data 402 is fed to the fully connected layers or networks 118 as Image-Patches for further processing.

FIG. 9 illustrates real images 900 of two sets of sixteen (16) 3×3 convolution kernels learned and used for feature extraction from stereoscopic images. FIG. 10 illustrates a real image 1000 of the resulting feature map produced by the convolution kernels shown in FIG. 9. Real image 1000 is the convolved result of the image pair which, in one implementation, is fed to the fully connected layers or networks 118. Real image 1000 includes sixteen (16) sub-images that represent different features of the hand pose identified and extracted by the convolution kernels shown in FIG. 9. FIG. 11 illustrates how the learned convolution kernels applied locally 1100 to an input image (on the left) produce a convolved image (on the right) that is robust to the background and the clutter, i.e., ignores the background and the clutter and only extracts the hand features.

In another implementation, global features of the hand are extracted using a principal component analysis (PCA) or Karhunen-Loeve transformation technique, illustrated in FIG. 12. PCA exploits the covariance of pixel values to reduce the dimensionality of the input image data while retraining the majority of variation present in the image. A real image of an example PCA basis 1200 for an open-hand pose is shown in FIG. 12. In FIG. 12, a one thousand and twenty-four [(32)×(32)=1024] dimensional image was reduced to sixty-four (64) most dominant dimensions using the PCA technique. As depicted in FIG. 12, the sixty-four (64) most dominant dimensions include more discernable patterns and correlations of the hand. Therefore, data reduction techniques like PCA and convolution greatly improve the tracking performance by transforming the input into a space that is more conducive for learning of the fully connected layers or networks 118.

Fully Connected Layers or Networks

In a fully connected layer of a neural network, all the elements of all the features of the previous layer get used in the calculation of each element of each output feature. Convolutional neural network 101 includes fully connected layers or networks 118 that are comprised of two types of neural networks: "master" or "generalists" networks 110 and "expert" or "specialists" networks 112. Both, master networks 110 and expert networks 112, are fully connected neural networks that take a feature vector of an input hand image and produce a prediction of the hand pose. Both, master networks 110 and expert networks 112, respectively include eight (8) to twelve (12) fully connected layers and each of these fully connected layers has between hundred (100) to two hundred (200) neurons. In one implementation, an exponential linear unit (ELU) activation function is used by the master networks 110 and expert networks 112. In another implementation, a rectified linear unit (ReLU) activation function is used by the master networks 110 and expert networks 112. In yet another implementation, a leaky rectified linear unit (LReLU) activation function is used by the master networks 110 and expert networks 112. In some implementations, ELU activation function improves the learning of master networks 110 and expert networks 112 better compared to other activation functions. More information about ELU activation function can be obtained from Djork-Arne Clevert, Thomas Unterthiner and Sepp Hochreiter, *Fast and Accurate Deep Network Learning by Exponential Linear Units* (*ELUs*), Version v5, Feb. 22, 2016, accessible at http://arxiv.org/abs/1511.07289, which is incorporated herein in its entirety. Furthermore, within each of the master networks 110 and expert networks 112, there are two kinds of neural networks: "temporal" networks and "atemporal" networks, as discussed supra.

FIG. 13 illustrates one implementation of a fully connected master network 110 or a fully connected expert network 112. Fully connected neural network 1300 includes twelve (12) layers (L), L1 to L12, and each of the layers L1 to L2 includes between hundred (100) and two hundred (200) neurons. Furthermore, the last layer L12 includes eighty-four (84) output neurons that produce 84 (28×3) estimates for 3D joint locations of twenty-eight (28) hand joints illustrated in FIGS. 5A and 5B. Thus, the final layer of every master network 110 and every expert network 112, irrespective of the total number of layers, includes 84 output neurons estimating the 28 hand joint locations in 3D space.

Master networks 110 and expert networks 112 differ from each other based on the data on which they are trained. In particular, master networks 110 are trained on the entire data set. In contrast, expert networks 112 are trained only on a subset of the entire dataset. In regards to the hand poses, master networks 110 are trained on the input image data representing all available hand poses comprising the training data 102 (including both real and simulated hand images). Expert networks 112 are individually trained on specific classes of hand poses such as open-hand poses, first poses, grab poses, V-shaped poses or pinch poses. This distinction allows convolutional neural network 101 to have "generalists" in the form of master networks 110 that are trained over the entire available training data 102, which nearly cover the space of all possible poses and hence generalize better over unseen hand poses (not present in the training data 102). For example, when convolutional neural network 101 receives testing data 202 on which it has never been trained, it invokes the master networks 110 to get a rough pose estimate of the unseen hand image. In addition to the generalists, convolutional neural network 101 also has "specialists" in the form of expert networks 112 that are trained only on specific pose-types. These specialists allow convolutional neural network 101 to generate accurate hand pose estimates for the unseen hand image once the master networks 110 have roughly predicted which pose-type the unseen hand image best corresponds to. In one example, one or more master networks 110 predict that a particular hand image corresponds to a curled-finger pose. Convolutional neural network 101 uses this rough estimate to invoke three (3) expert networks 112 that have been only trained on curled-finger-type poses such as pinch poses, grab poses and punch poses (all with curled-in fingers and thumb). Then, the expert networks 112 accurately predict not only whether the particular hand image is a pinch pose, a grab pose or a punch pose, but also what kind of pinch pose, grab pose or punch pose the particular hand image is, for example, a leftward/rightward/centered pinch pose, leftward/rightward/centered grab pose or leftward/rightward/centered punch pose.

According to one implementation, the master networks 110 and expert networks 112 serve as "regressors" for the convolutional neural network 101. In such an implementation, the outputs of the master networks 110 and expert networks 112 are not in the form of pose class names like a pinch pose, a grab pose or a punch pose. Instead, the master networks 110 and expert networks 112 generate, as output, estimates of "hand position parameters." These hand position parameters are in the form of joint location models, joint angel models, capsule models, skeleton models, volumetric models and/or mesh models, muscle hand models, each in 2D and/or 3D space. In other implementations, the master networks 110 and expert networks 112 serve as "classifiers" for the convolutional neural network 101 and classify an input hand images into one or more pose classes like leftward/rightward/centered pinch pose, leftward/rightward/centered grab pose or and leftward/rightward/centered punch pose.

Master or Generalists Networks

As discussed infra, master or generalists networks 110 are fully connected neural networks that are trained over the entire available training data 102 of hundred thousand (100,000) and one billion (1,000,000,000) hand images to generate rough hand poses estimates. In one implementation, training data 102 is split into training data 102 and validation data. This validation data is carved out of the training data 102 in order to test the generalization performance of the convolutional neural network 101 by feeding it hand images on which it has not been trained. Based on the cross-validation performance of the convolutional neural network 101 on the validation data, different hyper-parameters of the convolutional neural network 101 are tuned. Some examples of these hyper-parameters include learning rate, batch size for the gradient descent solver, pooling windows, strides, padding, convolutional kernels, momentum, number of layers, number of neurons per layer, and others.

In some implementations, the training data 102 is split into a 90:10 split proportion such that ninety (90) percent of the training data 102 is retained and ten (10) percent of the training data 102 is used as validation data. In other implementations, the split proportions are configured to different ratios. Convolutional neural network 101 initiates these splits randomly such that different combinations of the hundred thousand (100,000) to one billion (1,000,000,000) hand images are bucketed as training data 102 or validation data on every split. Thus, since the composition of the training data 102 changes randomly from one split to the next, different versions of the training data 102 comprising of different images are used to train the master networks 110. This results in the convolutional neural network 101 having multiple master networks 110 that are trained on different versions of training data 102. FIG. 14 depicts one implementation of three (3) master networks that are trained on different versions 1400 of training data 102 created by the validation data split. In FIG. 14, the circles represent the entire training data 102 before validation data (dark-grey) is carved out of it to produce a diminished composition of the training data 102 (off-white). In each of the circles, a different portion of the training data 102 makes up the validation data and the diminished training 102, thus creating different versions of the training data 102. Each of the different versions of the training data 102 are used train separate ones of the master networks 110 such as the first, second and third master networks shown in FIG. 14. Furthermore, the training hyper-parameters are also varied between the different master networks 110. Consequently, the master networks 110 are able to generalize better because they cover unique varieties of hand images and produce as outputs different rough pose estimates for the same input hand image.

Convolutional neural network 101 comprises of twenty (20) to hundred (100) master networks 110. In one implementation, the number of splits or master networks 110 is tunable. As a result, the number of master networks 110 in convolutional neural network 101 is configurable based on the available computation resources and the computation platform. In one implementation, one (1) to three (3) master networks 110 are used for a mobile device application. In another implementation, three (3) to five (5) master networks 110 are used for a head-mounted display application.

In yet another implementation, five (5) to eight (8) master networks 110 are used for a personal computer (PC) or laptop application. In a further implementation, eight (8) to twelve (12) master networks 110 are used for an automobile application.

Expert or Specialists Networks

As discussed infra, expert or specialist networks 112 are fully connected neural networks that are trained over a subset of training data 102 corresponding to specific pose-types. This concept is illustrated in FIG. 15. For clarity's sake, FIG. 15 characterize the expert networks 112 as classifiers that classify the output hand pose estimates into one or more pose classes. Such a characterization is made only to distinguish between the master networks 110 and the expert networks 112. In other implementations, the master networks 110 and expert networks 112 are not classifiers, but instead regressors that generate 84 (28×3) estimates for 3D joint locations of twenty-eight (28) hand joints illustrated in FIGS. 5A and 5B. In FIG. 15, circle 1500 represents the entire available training data 102 of hundred thousand (100,000) and one billion (1,000,000,000) hand images (including both real and simulated hand images). Circle 1500 is further partitioned into clusters using eleven (11) arches. Each of these eleven (11) arches represents a separate pose-type (P), P1 to P11. Furthermore, each of the pose-type (P) overlaps to some degree with one or more other pose types (Ps). In circle 1500, each pose-type (P) (e.g., pinch pose, first pose, flat-hand pose) represents a separate expert network 112, as illustrated in the pose-to-expert network mapping shown in FIG. 15. Thus, the overlapped spaces like "P5, P4, P3" in circle 1500 represent intersection of one or more similar poses (e.g., loose-pinch pose, loose-tilted-fist pose, loose-tilted-grab pose) on which multiple expert networks are trained. In one implementation, the pose-types (Ps) are mapped in memory to their corresponding input hand images. Thus, according to one implementation, each of the expert networks 112 are trained on at least three (3) pose-types and the numerous variants associated with each of the three (3) pose-types. In another implementation, each of the expert networks 112 are trained on at least five (5) pose-types and the numerous variants associated with each of the five (5) pose-types. In yet another implementation, each of the expert networks 112 are trained on at least eight (8) pose-types and the numerous variants associated with each of the eight (8) pose-types. The overlapping between the expert networks 112 prevents them from being over-trained from a particular pose-type and allows them to generalize over multiple pose-types. The overlap also prevents discontinuity and harsh cut-offs between the expert networks 112. As a result, multiple expert networks 112 that have been trained on similar input images are invoked for each input hand image so as to get multiple estimates for the hand position parameters. Thus, for every input hand image, at least three (3) expert networks 112 are invoked and three (3) accurate estimates of hand position parameters are computed. In another implementation, for every input hand image, at least five (5) expert networks 112 are invoked and five (5) accurate estimates of hand position parameters are computed. In yet another implementation, for every input hand image, at least eight (8) expert networks 112 are invoked and eight (8) accurate estimates of hand position parameters are computed. Furthermore, training the expert networks 112 on focused image types makes them more robust to specific poses, different backgrounds and hand shapes.

Convolutional neural network 101 comprises of fifty (50) to two hundred (200) expert networks 112, according to one implementation. In one implementation, the number of partitions or expert networks 112 is tunable. As a result, the number of expert networks 112 in convolutional neural network 101 is configurable based on the available computation resources and the computation platform. In one implementation, three (3) to five (5) expert networks 112 are used for a mobile device application. In another implementation, five (5) to ten (10) expert networks 112 are used for a head-mounted display application. In yet another implementation, eight (8) to twelve (12) expert networks 112 are used for a personal computer (PC) or laptop application. In a further implementation, fifty (50) to two hundred (200) expert networks 112 are used for an automobile application. Furthermore, the expert networks 112 are configurable based on the specificity of a particular pose-type on which they are trained. For example, a given expert network 112 is trained on all pinch poses, according to one implementation. In another implementation, it is trained only on vertical-pinch poses and not on horizontal-pinch poses. In other implementations, the amount of overlap between the expert networks 112 is also configurable such that a specification is set on how many and which different pose-types are used to train a particular expert network 112.

Synergy Between Master and Expert Networks During Testing

In one implementation, the hand position parameters predicted by both the master networks 110 and expert networks 112 are used to generate the final hand pose estimation. In such an implementation, the dimensionality-reduced feature vector (e.g., 512 dimensions), received from the convolution layers 104, sub-sampling layers 106 and non-linear layers 108, is provided to multiple master networks 110 during testing pipeline 200. FIG. 16 illustrates one implementation of synergy 1600 between the master networks 110 and expert networks 112 during testing 200. In the example shown in FIG. 16, the feature vector is provided to three separate fully-connected master networks 110. Each of the master networks 110 generates rough hand position parameters (e.g., 84 (28×3) estimates for 3D joint locations of twenty-eight (28) hand joints). Each of these rough hand position parameters are used to invoke separate sets of expert networks 112 that are respectively similar to the corresponding master networks 110. In the example shown in FIG. 16, three (3) expert networks 112 are invoked for each of the three (3) expert networks 112. Once the nine (9) expert networks 112 are identified, the dimensionality-reduced feature vector (e.g., 512 dimensions) initially provided to the master networks 110, is provide to the nine (9) expert networks 112 to generate nine (9) different accurate estimates of the hand position parameters (e.g., 84 (28×3) estimates for 3D joint locations of twenty-eight (28) hand joints). In yet another implementation, some of the master networks 110 serve as classifiers that first determine whether the input image is of a hand or not. In such an implementation, the determination made by a hand-classifier master network 110 about a feature vector's similarity to a hand shape is used prior to invoking other master networks 110 and/or expert networks 112.

FIG. 17 illustrates one implementation of a pose space 1700 of training data 102 in an eighty-four (d1-d84) dimensional coordinate system representing eighty-four (84) dimensional hand poses comprised of twenty-eight (28) 3D $(x_0, Y_0, z_0)$ hand joints. In pose space 1700, each point represents a single eighty-four (84) dimensional hand pose comprised of twenty-eight (28) 3D $(x_0, Y_0, z_0)$ hand joints. In other implementations, pose space 1700 is based on other hand position parameters such as joint angles, segment lengths, wrist length, palm length, and the like. As shown in FIG. 17, there is significant overlap between the pose-points to represent similarity between the corresponding hand poses. In one implementation, the poses or pose-types represented by the pose-points are mapped in memory to their corresponding input hand images.

Master experts 110 are trained on one or more versions of training data 102 represented by pose-points depicted in pose space 1700 determined by which portion of training data 102 is used as validation data. In contrast, expert networks 112 are trained on specific poses or pose-types in the pose space 1700. The different poses or pose-types are differentiated or partitioned in pose space 1700 using one or more segmentation models, including but not limited to k-means, overlapping k-means, kx-trees, density estimation, k-nearest neighbors, Kohonen net, self-organizing maps modeling (SOM), adaptive resonance theory models (ART), as well as other feature extraction techniques. In other implementations, a variety of clustering techniques are applied to the pose space 1700, such as unsupervised clustering techniques, where the task is to develop classification and sorting of the poses or pose-types without regards to a predefined number of groups or clusters to be generated. Such unsupervised clustering techniques seek to identify similarities between portions of the poses or pose-types within the pose space 1700 in order to determine whether the poses or pose-types are characterized as forming a cluster. Furthermore, the similarity between poses or pose-types is based on one or more hand position parameters like hand sub-elements position such as fingers, device position, device rotation, device viewpoint, background, hand position, occlusion, pitch, yaw, roll, path, trajectory, joint locations, joint angles, palm position, palm orientation, finger segment length, wrist positions, wrist orientation, curling, stubbiness, translation, rotation, and other parameters discussed infra. In other implementations, the number of clusters in configurable by a human.

FIG. 18 illustrates one implementation of a clustered pose space 1800. As shown in FIG. 18, each pose or pose-type in pose space 1800 is clustered in at least one cluster. In other implementations, each pose or pose-type in pose space 1800 is clustered in multiple clusters such as two, three, five, eight and so on. Also shown in FIG. 18 is that each pose cluster is represented by a centroid, depicted with an "X" (white) in each cluster of pose space 1800. The centroid represents the best candidate pose for a given set of poses or pose-types grouped in a pose cluster. For example, if a pose cluster includes loose-pinch poses, loose-tilted-fist poses, loose-tilted-grab poses, the representative centroid pose (X) is a curled-finger-closed-hand pose, in one implementation, or a pinch, first or grab pose in another implementation.

Specifically, each of the expert networks 112 are trained on a different pose cluster shown in pose space 1800. In the example shown in FIG. 18, there are thirty-five (35) pose-clusters. This means thirty-five (35) separate expert networks 112 are trained. Also, as discussed supra, there are significant overlaps between the clusters so that each of the expert networks 112 are trained on multiple pose or pose-types. In other words, input hand images corresponding to a give pose or pose-type are fed to multiple expert networks 112. This is done to prevent the expert networks 112 from becoming too focused on a given pose or pose-type and not be able to generalize. As well, this overlapping between pose clusters allows convolutional neural network 101 to invoke multiple expert networks 112 for a single input hand image, and thus generate multiple pose estimates, which are in turn used for final pose estimation, as discussed supra.

FIG. 19 shows one implementation of synergy between master networks 110 and expert networks 112 in pose space 1900. As, discussed supra, one or more master networks 110 processes a dimensionally-reduced feature vector to generate rough estimates of hand position parameters. In representative FIG. 19, these rough estimates are depicted as different triangles. So, in the example used in FIG. 19, three (3) master networks 110 have estimated that an input feature vector produces an output hand pose located at the triangles in pose space 1900. In other implementations, more or less pose estimates are received from fewer or greater number of master networks 110. Advancing further, each of the master pose estimates 1, 2 and 3, invokes one or more representative centroid poses (X) that is nearest to it. The proximity between a given master pose estimate and representative centroid poses (X) of different pose clusters in the pose space 1900 is determined using a variety of distance measures, such as Euclidean distance, standardized Euclidean distance, weighted Euclidean distance, squared Euclidean distance, Manhattan distance, Minkowski distance, Mahalanobis distance, or Chi-square distance. Further, the number of proximate representative centroid poses (X) to select is configurable such that one, two or three of the nearest pose clusters are selected based on their corresponding representative centroid poses (X).

Moving ahead, the purpose of selecting multiple representative centroid poses (X) proximate to a given master pose estimate is to identify which pose cluster and its poses or pose-types are most similar to the given master pose estimate. Once one or more nearby pose clusters are identified for a given master pose estimate, the corresponding expert networks 112 that are trained on the identified pose clusters are invoked to generate their respective pose estimates. Thin invocation includes feeding to the invoked expert networks 112, the original feature vector used by the one or more master networks 110 to generate the master pose estimates 1, 2 and 3. In the example shown in FIG. 19, three (3) pose nearby poses clusters are identified for each of the master pose estimates 1, 2 and 3 based on respective distances D1, D2, D3, D4, D5, D6, D7, D8 and D9. This results in identification of nine (9) expert networks 112 that are now used to generate nine (9) new expert pose estimates in addition to the three (3) master pose estimates 1, 2 and 3. As shown in FIG. 16, the new expert pose estimates are generated by feeding the dimensionally-reduced feature vector to the identified expert poses 112. In one example, the master pose estimates represent a pinch pose. Then, multiple nearby pose clusters relating to a pinch pose, such as a leftward-pinch pose, a rightward-pinch pose, a full-finger pinch pose, etc. are selected so that the corresponding expert networks 112 generate the accurate and precise hand pose estimates that represent the exact hand pose of the input hand images.

The following section discusses how the master pose estimates and the expert pose estimates are used to generate a final pose estimate.

In one implementation, the master pose estimates are rough estimates of hand position parameters that are used to generate accurate and precise estimates of the hand position parameters using the expert networks 112. In other implementations, the master pose estimates themselves are accurate estimates of hand position parameters and are used directly for the final hand pose estimation without reliance on the expert networks 112. Such a "master-only" implementation is used during testing 200 under so-called "high-confidence" scenarios to generate initial hand pose estimates. Such an implementation is depicted in FIGS. 1 and 2 by the alternative arrows directly from the master networks 110 to the hand pose estimation 114.

FIG. 20 shows a representative method 2000 of synergy between atemporal master networks 110 and atemporal expert networks 112 in accordance with one implementation of the technology disclosed. Flowchart 2000 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 20. Multiple actions can be combined in some implementations. For convenience, this flowchart is described with reference to the system that carries out a method. The system is not necessarily part of the method.

At action 2002, a first set of atemporal generalist neural networks are trained using simulated hand position images, as discussed infra.

At action 2004, the simulated hand position mages are subdivided into overlapping specialist categories, as discussed infra.

At action 2006, a first set of atemporal specialist neural networks are trained using the specialist categories of the simulated hand position images, as discussed infra.

At action 2008, during testing, a first set of estimates of hand position parameters are received from the atemporal generalist neural networks, as discussed infra.

At action 2010, during testing, a second set of atemporal specialist neural networks are identified based on the first set of estimates of hand position parameters provided by the atemporal generalist neural networks, as discussed infra.

At action 2012, during testing, a second set of estimates of hand position parameters are received from the identified atemporal specialist neural networks, as discussed infra.

At action 2014, during testing, a final set of estimates of hand position parameters is determined based on the first and second set of estimates, as discussed infra.

Temporal Networks

Master networks 110 and expert networks 112 are further divided into two classes of neural networks: atemporal neural networks and temporal neural networks. The neural networks discussed supra are mostly atemporal neural networks. This section discusses temporal neural networks. Like atemporal neural networks, temporal neural networks are also fully connected layers or networks. In one implementation, temporal neural networks are trained separately from the atemporal neural networks during training 100. This is done because the input to the temporal neural networks differs from the input to the atemporal neural networks.

Temporal neural networks are used for learning gesture sequences and predicting the next pose in the subsequent frame based on the prior pose in the previous frame. In one implementation, temporal neural networks memorize the past poses for given hand that has entered the field of view of a gesture recognition system. Further, the temporal neural networks include feedback loops that produce recurrent connections between the neurons of the temporal neural networks. In one implementation, the temporal neural networks are trained on sequential inputs to produce sequential outputs that are mapped and synchronized based on their time-variance. In some implementations, temporal neural networks are recurrent neural networks (RNNs) based on long short term memory (LSTM). In another implementation, temporal networks are bidirectional recurrent neural networks (BRNNs) based on long short term memory (LSTM) that maintain gesture sequences in forwards and backwards format in separate hidden layers.

At training 100, temporal neural network are trained using a combination of two feature vectors. The first feature vector is the 512-dimensional feature convolved from the convolution layers 102, as discussed infra. The second feature vector represents the 84-dimensional prior pose estimate determined by the temporal master networks 110 and temporal expert networks 112. Thus, in one implementation, atemporal master and expert networks differ from the temporal master and expert networks in the sense that the former is trained on the current 512-dimensional feature vector extracted from the current image and the latter is trained on a 596-dimensional feature vector [(512)+(84)=596] composed of the current image (512D) and the prior estimate pose (84D). The combination of the current feature vector and the prior pose feature vector allows the temporal neural networks to learn ambiguous poses during training 100 and resolve them during training 200. For example, when the input hand image represents a vertical hand from the point of view of the gesture recognition system, convolutional neural network 101 may not be able to differentiate between a supine hand (front-facing) or a prone hand (back-facing). In such circumstances, convolutional neural network 101 uses temporal master networks 110 and temporal expert networks 112 to resolve the ambiguity by using the prior pose estimation. So, continuing the supine and prone example, if the prior pose was a supine pose, then temporal master networks 110 and temporal expert networks 112 produce a vertical supine pose. On the other hand, if the prior pose was a prone pose, then temporal master networks 110 and temporal expert networks 112 produce a vertical prone pose. These results are consistent with the natural motions of a human hand and the constraints of the hand anatomy because the gesture recognition system disclosed herein captures between hundred (100) and three hundred (300) frames per second and it is very unlikely that a human hand traverses from a supine pose to a prone pose within hundredth or three hundredth of a second. Other examples of ambiguous poses include different hand poses that have similar input hand images, highly occluded poses, ambiguously rotated poses, and others.

In one implementation, the temporal master networks 110 and temporal expert networks 112 are Jordan or Elman networks that are trained using a regularization technique shown in FIG. 21. According to regularization 2100, during time $t_0$ of training 100, the input fed to the temporal master networks 110 and temporal expert networks 112 is contaminated with noise (e.g., extra 84 dimensions) that serves as a bias. In this implementation, the noise or the extra dimensions of the extra feature vector are not from the prior pose but instead randomly generated. This is done to prevent the temporal master networks 110 and temporal expert networks 112 from giving unnecessary weight to the prior pose and generating an over-fitted output that matches the prior pose. Using the randomly generated noise during training 100 allows the temporal master networks 110 and temporal expert networks 112 to give adequate weight to the current input image during testing 200. However, during testing 200, the extra information is not noise, but instead the feature vector representing the 84D prior pose and previous frame. As illustrated in FIG. 22, at time $t_1$ of testing 200, temporal neural networks 2200 store the prior pose estimate 1 calculated from feature vector 1 extracted from input hand images 1. At time $t_2$ of testing 200, temporal neural networks 2200 combine the prior pose estimate 1 with the current feature vector 2 extracted from the current input hand images 2 and generate the new pose estimate 2.

In other implementations, temporal neural networks store the pose information across multiple frames and time variances. As discussed supra, simulator 4100 generates simulated gesture sequences and dedicated sequences that mimic realistic and most common hand gestures and motions. These simulated gesture sequences allow the temporal neural networks to train and learn on a series of hand poses during training 100 that represent the series of hand poses received during testing 200. As a result, during testing 200, temporal neural networks maintain a memory of a series of hand poses across many frames and time variances. Further, these stored hand poses are used in the predicting of a current hand pose. During instances of ambiguous poses, temporal neural networks, being trained on simulated gesture sequences and dedicated sequences that represent realistic and most common hand gestures and motions, know what the next temporally likely pose estimation should be. Thus, pose estimates that are beyond a threshold of the next temporally likely pose estimation or contradict the next temporally likely pose estimation are discarded in favor of more consistent pose estimations. As illustrated in FIG. 23, temporal master and expert neural networks 2300 use a sequence of temporally varied $t_1$ to $t_5$ frames 1 to 4 and their corresponding poses estimates 1 to 4 to generate a current pose estimate 5 at time $t_5$ based on the current feature vector 5 extracted from the current hand images 5.

In some implementations, temporal master and expert neural networks synergize analogous to the temporal master and expert neural networks.

FIG. 24 shows a representative method 2400 of synergy between temporal master networks 110 and temporal expert networks 112 in accordance with one implementation of the technology disclosed. Flowchart 2400 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 24. Multiple actions can be combined in some implementations. For convenience, this flowchart is described with reference to the system that carries out a method. The system is not necessarily part of the method.

At action 2402, a first set of temporal generalist neural networks are trained using a current set of simulated hand position images and one or more prior pose estimates temporally linked as a gesture sequence and/or randomly generated image data, as discussed infra. In one implementation, the randomly generated image data is used as noise.

At action 2404, a dataset of simulated hand position images is subdivided into overlapping specialist categories, as discussed infra.

At action 2406, a first set of temporal specialist neural networks are trained using the specialist categories of the simulated hand position images and corresponding one or more prior pose estimates in the specialist categories temporally linked as a gesture sequence, as discussed infra.

At action 2408, during testing, a first set of estimates of hand position parameters are received from the temporal generalist neural networks based on at least one real hand position image and one or more prior pose estimates made during the testing, as discussed infra.

At action 2410, during testing, a second set of temporal specialist neural networks are identified based on the first set of estimates of hand position parameters provided by the generalist neural networks, as discussed infra.

At action 2412, during testing, a second set of estimates of hand position parameters are received from the identified temporal specialist neural networks, as discussed infra.

At action 2414, during testing, a final set of estimates of hand position parameters is determined based on the first and second set of estimates, as discussed infra.

Hand Pose Estimation

As discussed infra, each of the master networks 110 and expert networks 112 produce as output 84 (28×3) estimates for 3D joint locations of twenty-eight (28) hand joints. The technology disclosed performs hand pose estimation 114 on a so-called "joint-by-joint" basis. So, when a plurality of estimates for the 28 hand joints are received from a plurality of expert networks 112 (and from master experts 110 in some high-confidence scenarios), the estimates are analyzed at a joint level and a final location for each joint is calculated based on the plurality of estimates for a particular joint. This is a novel solution discovered by the technology disclosed because nothing in the field of art determines hand pose estimates at such granularity and precision. Regarding granularity and precision, because hand pose estimates are computed on a joint-by-joint basis, this allows the technology disclosed to detect in real time even the minutest and most subtle hand movements, such a bend/yaw/tilt/roll of a segment of a finger or a tilt an occluded finger, as demonstrated supra in the Experimental Results section of this application.

Outlier-Robust Covariance Propagation

For a single joint, each set of joint location estimates produced by multiple expert networks 112 maintains an outlier-robust covariance that is updated every tracking frame. For instance, for an individual joint that has twelve (12) incoming estimates from the expert networks 112 (and from master experts 110 in some high-confidence scenarios), the estimates are combined together using a covariance distribution. Once the covariance distribution is calculated for a prior frame, Mahalanobis distances of the new incoming estimates in the current frame are determined, according to one implementation. In other implementations, other distance measures such as projection statistics and Euclidean distances are used. The distances are determined from the covariance distribution calculated in the prior frame. The distances are then converted into probabilities (e.g., using a Gaussian probability distribution or Chi-square p-values). These probabilities are then used as weights to compute the new covariance distribution of all the new points for the current frame. This way, the estimates that are further from the prior covariance distribution are detected as outliers and given very low weights and are ignored. In contrast, the inliers are given high weights and contribute more to the updated covariance distribution of the current frame. In one implementation, to prevent singularities, a regularization factor is used which extends the covariance and prevents the covariance from becoming dedicated to a local minima in the fast moving gestures like rapid grabbing and releasing motions.

As discussed infra, for each individual joint, an outlier-robust estimate of the mean and covariance of estimate distributions is calculated based on a weighted form of the mean and covariance, where the weights depend on probabilities formed in the course of an outlier identification scheme. First, a multivariate Gaussian covariance of 3D joint location estimates for each of the individual joints of the 28 hand joints is calculated separately and simultaneously. For a single joint J, E joint location estimates are received from E expert networks 112 across F frames. Also, $x_{(j)}^{(f)}$, $y_{(j)}^{(f)}$ and $z_{(j)}^{(f)}$ represent the x, y and z coordinates of the $j^{th}$ joint at frame $f$. Further, sequence vector V represents the E joint location estimates received from E expert networks 112, mathematically represented as $V=[x_1, \ldots, x_E, y_1, \ldots y_E, z_1, \ldots, z_E]'$. Thus, the sample covariance matrix for the sequence vector V is described as:

$$COV(V) = \frac{1}{F-1} \sum_{f=1}^{F} (V - \bar{V})(V - \bar{V})'$$

In the equation above, $\bar{V}$ is the sample mean of V and ' is the transpose operator (T).

In one implementation, a Mahalanobis distance outlier rejection scheme is used.

Mahalanobis distance is a distance measure based on the weighted Euclidean norm of the separation between a possible outlier and the sample mean, which takes into account the sample covariance matrix. Thus, for m points in an n-dimensional multivariate sample represented by the vectors $x_i$ (i=1, \ldots, m), the outlier rejection scheme based on Mahalanobis distances is defined using:

$$MD_i = ((x_i - \mu)^T COV^{-1}(x_i - \mu))^{1/2} \text{ for } i = 1, \ldots, n$$

$$\mu = \frac{1}{m} \sum_{i=1}^{m} x_i$$

$$MD_i = ((x_i - t)^T C^{-1}(x_i - t))^{1/2} \text{ for } i = 1, \ldots, n$$

$$COV = \frac{1}{m-1} \sum_{i=1}^{m} (x_i - \mu)(x_i - \mu)'$$

In the equations above, p is the estimated multivariate arithmetic mean and COV is the estimated covariance matrix or sample covariance matrix. In some implementations, for multivariate normally distributed data, the values are approximately Chi-square distributed with n degrees of freedom ($\chi^2$). Multivariate outliers are then defined as observations having a large (squared) Mahalanobis distance. In one implementation, the Mahalanobis Distances represent the surface of an n-dimensional ellipsoid centered at the sample mean. The square of the Mahalanobis distances follow a $\chi_2$ distribution with n degrees of freedom for Gaussian input data.

In another implementation, a weighted robust Kalman filter operation is performed on the 3D joint location estimates for individual joints of the 28 hand joints. In such an implementation, the outliers in the 3D joint location estimates are determined by thresholding the propagated covariance using a Kalman gain matrix based on the Mahalanobis distance. If the Mahalanobis distance is less than a certain threshold value, then it is considered an inlier and processed. Otherwise, it is an outlier and ignored. Therefore, an outlier rejection scheme based on a Kalman filter considers all points satisfying to be outliers as:

$$MD_i = (\chi_{n,\alpha}^2)$$

In the equation above, α is the probability that a value falls inside the ellipse or ellipsoid (for example, α=0.80). In another implementation, a Projection Statistics $PS_i$ distance measure is used in which the sample mean and covariance are replaced by the sample median and the median absolute deviation.

Covariance Propagation

Regarding covariance propagation, a robust form of the covariance matrix of the 3D joint location estimates is maintained by using a weighting scheme that depends on the probabilities determined by $MD_i$ or $PS_i$. In particular, the robust mean $\mu_R$ and the robust covariance $COV_R$ are determined as:

$$\mu_R = \left[\sum_{i=1}^{m} w_i\right]^{-1} \cdot \left[\sum_{i=1}^{m} w_i x_i\right]$$

$$COV_R = \left[\sum_{i=1}^{m} w_i - 1\right]^{-1} \cdot \left[\sum_{i=1}^{m} (w_i x_i - \mu)(w_i x_i - \mu)'\right]$$

In equations above, $w_i$ are weights computed from the probabilities by means of:

$w_i = \min[1, (\chi_{n,\alpha}^2 / MD_i^2)]$ $w_i = \min[1, (\chi_{n,\alpha}^2 / PS_i^2)]$ In the equations above, $\alpha$ represents the probabilities.

FIG. 25 shows one implementation of a probability distribution function (sample covariance matrix) 2500 that illustrates outlier-robust covariance propagation in accordance with one implementation of the technology disclosed. In FIG. 25, the X-axis represents the covariance distribution from a prior frame 1 at time $t_1$. The Y-axis represents 3D joint estimates (circles) for a single joint from multiple expert networks 112 in the current frame 2 at time $t_2$. The dashed lines in FIG. 25 represent the distances of the 3D joint estimates (circles) from the probability distribution function (sample covariance matrix) 2500. $\mu$ represents the mean of the probability distribution function 2500 in the prior frame 1 at time $t_1$. FIG. 26 illustrates the probabilities 2600 of the distances of the 3D joint estimates (circles) in current frame 2 at time $t_2$ from the probability distribution function (sample covariance matrix) 2500 calculated in FIG. 25. Probabilities 4100 serve as weights that are applied to each of the 3D joint estimates (circles) in current frame 2 at time $t_2$ when an updated sample covariance matrix is calculated for the next frame. This way, the 3D joint estimates (circles) that are farther from the probability distribution function (sample covariance matrix) 2500 and have lower probabilities 2600 and in turn lower weights contribute less to the updated sample covariance matrix that is propagated to the next frame. In the example shown in FIG. 26, the 3D joint estimates (circles) have low weights and thus contribute less to the updated sample covariance matrix shown in FIG. 27. In contrast, the 3D joint estimates (circles) in the center contribute most to the updated sample covariance matrix shown in FIG. 27.

FIG. 27 shows one implementation of a sample covariance matrix 2700 propagated from a prior frame 2 to a current frame 3 at time $t_3$. In FIG. 27, the black-lined curve represents the updated covariance distribution from prior frame 2. The grey-lined-dashed curve represents the previous covariance distribution from prior-prior frame 1 shown in FIG. 25 and FIG. 26. The difference between the black-lined curve and the grey-lined-dashed curve illustrates how the sample covariance matrix propagates and updates from one frame to the next. In addition, the mean of the probability distribution also updates from one frame to the next. This is illustrated by the new updated mean $\mu'$ shown as grey ellipse compared to the prior mean p shown in a transparent grey ellipse.

Thus, the outlier-robust covariance propagation prevents erroneous or less accurate estimates from influencing the final hand pose estimates. For instance, if out of thirty (30) expert networks 112, twenty-seven (27) give erroneous estimates that are detected as outliers, then that would not negatively influences the estimation of the final hand pose and the three (3) correct and accurate estimates, that were detected as inliers, would dominate the final hand pose estimation.

FIG. 28 shows one implementation of a plurality of 3D joint location estimates 2800 produced by a plurality of expert networks 112 for a single hand joint. In the example shown in FIG. 28, nine (9) expert networks 1-9 produced nine (9) 3D joint location estimates for the same particular hand joint. In FIG. 29, a covariance distribution 2900 and mean $\mu$ for the 3D joint location estimates 2800 is calculated for current frame 1 at time $t_1$. In FIG. 30, new 3D joint location estimates 3000 produced by a plurality of expert networks 112 for the same hand joints shown in FIGS. 28 and 29 are received. New 3D joint location estimates 3000 are captured in current frame 2 at time $t_2$. In FIG. 30, previous 3D joint location estimates 2800 are represented using dotted-line ellipses and new 3D joint location estimates 3000 are represented by light-grey and dark-grey ellipses. Light-grey ellipses represent those new 3D joint location estimates 3000 that are determined to be inliers based on their distance from the mean $\mu$ and the prior covariance distribution 2900. Dark-grey ellipses represent those new 3D joint location estimates 3000 that are determined to be outliers based on their distance from the mean p and the prior covariance distribution 2900. In FIG. 31, the distances of the inlier and outlier 3D joint locations of frame 2 are converted into probability-based weights and are used to determine a new covariance distribution 3100 at time $t_3$. In FIG. 31, the difference between the previous covariance distribution 2900 (dotted-grey-transparent ellipse) and the new covariance distribution 3000 (bold-black ellipse) is also depicted. Also depicted is the updated mean $\mu'$. In the discussion infra, for clarity's sake, the outlier-robust covariance propagation was illustrated for only a single joint. But, the outlier-robust covariance propagation is simultaneously and concurrently calculated for all twenty-eight (28) joints of the hand.

FIGS. 32A, 32B, 32C and 32D show a temporal sequence of the outlier-robust covariance propagations 3200A, 3200B, 3200C and 3200D simultaneously and concurrently calculated for all twenty-eight (28) joints of the hand. In FIGS. 32A, 32B, 32C and 32D, the big spheres/ellipsoids represent the 28 hand joints and smaller spheres/ellipsoids within each of the 28 hand joints represent joint locations estimated by the expert networks 112 for the respective 28 hand joints. From FIG. 32A up to FIG. 32D, the covariance propagation changes and in turn updates the joint locations and the pose of the hand as new estimates are received from expert networks. As discussed infra, this joint-by-joint estimation detects even the most granular and subtle of hand movements such as fingertip bend and changes in joint angles and joint locations. Also shown in FIGS. 32A, 32B, 32C and 32D is that the outlier-robust covariance propagations 3200A, 3200B, 3200C and 3200D form a valid anatomically-correct hand.

In other implementations, the outlier-robust covariance propagation is performed using other hand parameters such as joint angles, finger segment lengths, and others discussed supra.

FIG. 33 shows a representative method 3300 of hand pose estimation using outlier-robust covariance propagation in accordance with one implementation of the technology disclosed. Flowchart 3300 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 33. Multiple actions can be combined in some implementations. For convenience, this flowchart is described with reference to the system that carries out a method. The system is not necessarily part of the method.

At action 3302, a first set of estimates of hand position parameters are received from multiple generalist and/or specialist neural networks for each of a plurality of hand joints, as discussed infra.

At action 3304, for each individual hand joint, simultaneously determining a principal distribution of the first set of estimates, as discussed infra. In one implementation, a principal distribution is determined using a covariance of the first set of estimates.

At action 3306, a second set of estimates of hand position parameters are received from multiple generalist and/or specialist neural networks for each of the plurality of hand joints, as discussed infra.

At action 3308, for each individual hand joint, simultaneously calculating a similarity measure between the second set of estimates and the principal distribution of the first set of estimates, as discussed infra. In one implementation, the similarity measure is a distance measure such as a Mahalanobis distance and/or Euclidean distance.

At action 3310, for each individual hand joint, simultaneously identifying outliers and inliers in the second set of estimates based on the similarity measure, as discussed infra.

At action 3312, for each individual hand joint, simultaneously calculating contribution weights for the outliers and the inliers based on the similarity measure, as discussed infra.

At action 3314, for each individual hand joint, simultaneously determining a principal distribution of the second set of estimates based on the contribution weights of the outliers and the inliers, as discussed infra. In some implementations, final hand position parameters are determined by minimizing an approximation error between the multiple set of estimates.

Hand Model Fitting

In one implementation, a single hand is computed and fitted 116 from the tracked covariance by minimizing approximation error between corresponding 3D joint estimates. In some implementations the covariance updates are performed in absolute 3D coordinates. When covariance updates are completed using absolute 3D coordinates, some covariance centers may not necessarily form a valid anatomically-correct hand. This technical problem is resolved by applying various smoothing techniques to such covariance centers, including, but not limited to, additive smoothing, Kalman filter, kernel smoother, Laplacian smoothing, recursive filter, Savitzky-Golay smoothing filter, local regression, smoothing spline, Ramer-Douglas-Peucker algorithm, exponential smoothing, Kolmogorov-Zurbenko filter, or any combination thereof.

Once the final joint locations for each of the twenty-eight (28) hand joints are determined, the depth information for each of the joints is computed by calculating the 3D offsets of the respective joints relative to the center of the so-called "ImageRect." This is particularly useful because the depth information is determined using a single ImageRect computed for a single camera and thus obviates the need of stereoscopic images or multiple cameras. Furthermore, convolutional neural network 101 also determines, during training 100, whether particular joints are below or above the ImageRect. In other implementations, the depth information for each of the joints is augmented by the use of stereo information in the input image data 402 as a multi-channel input. In yet other implementations, the depth information for each of the joints is augmented by the use of RGB components in the input image data 402 as a multi-channel input.

Once the depth information of each of the twenty-eight (28) joints is determined using their respective 3D offsets from the singular ImageRect, the 3D joint locations of the twenty-eight (28) hand joints are converted from image coordinates into world coordinates using inverse transformation. In one implementation, the D joint locations of the twenty-eight (28) hand joints are multiplied by a hand scale (e.g., based on palm width) to project them into a world coordinate system.

Once the 3D joint locations of the twenty-eight (28) hand joints are represented in a world coordinate system, different hand fitting techniques are applied to generate the final fitted hand. In implementation, a rigid alignment of the palm is calculated using the Kabsch algorithm. In such an implementation, determining a transformation can include calculating a rotation matrix that provides a reduced RMSD (root mean squared deviation) between two paired sets of 3D joint locations. One implementation can include using Kabsch Algorithm to produce a rotation matrix. The Kabsch algorithm can be used to find an optimal rotation R and translation T that minimizes the error:

$$\text{RMS} = \text{sqrt}(\Sigma(R^*x_i + T - y_i)^{t*}(R^*x_i + T - y_i))w_i$$

The transformation (both R and T) are applied rigidly to the 3D joint locations of the twenty-eight (28) hand joints, according to one implementation. The 3D joint location matching and rigid alignment is repeated until convergence. In one implementation, the Kabsch is extended to co-variances by the following minimizing:

$$\Sigma(R^*x_i + T - y_i)^{t*}M_i^*(R^*x_i + T - y_i)$$

In the equation above, $M_i$ is a positive definite symmetric matrix. In other implementations and by way of example, one or more force lines can be determined from one or more portions of a virtual surface.

Further, a robust inverse-kinematic (IK) solver is used to determine the finger angles based on the 3D joint locations of the twenty-eight (28) hand joints. Finally, arm angle parameters are determined using a separate filtered elbow position. FIG. 34 illustrates one implementation of a fitted hand 3400 based on the 3D joint locations of the twenty-eight (28) hand joints. In FIG. 34, the left and right ImageRects are shown in yellow, the 3D joint locations of the twenty-eight (28) hand joints are shown in different colors, the individual master and expert pose estimates are shown inside each covariance in different colors and the final fitted hand 5200 is shown in pale yellow-green.

Initialization

During testing 200, in one implementation, initialization 206 includes detecting a new hand entering a field of view of the gesture recognition system and rendering a virtual hand pose based on the 3D position and rotation of the hand detected in an image comprising testing data 202. In some implementations, a parallax candidate module is used to generate a parallax map for each of the detected stereoscopic images comprising testing data 202. In other implementations, a low or high resolution saliency map or disparity map for each of the detected stereoscopic images comprising testing data 202 is generated. However, a parallax map has advantage over a saliency map or disparity map because a parallax map is computationally inexpensive. The parallax map highlights objects that are closer to the cameras of the gesture recognition system and represents such objects as bright point clouds. In other implementations, gradient images and/or temporal difference images are used to generate the bright point clouds.

In one implementation, one or more hands, along with other objects in the images, are represented in the parallax maps as bright point clouds. Further, candidate boxes are drawn around each of these bright point clouds in the parallax maps, which are referred to as "candidate regions of interest (ROI)." Advancing ahead, for each such candidate ROI in both the parallax maps, a depth parameter is determined by first converting the two-dimensional (2D) candidate ROI into one-dimensional (1D) signals. These 1D signals are generated for each candidate ROI in both the parallax maps by summing the pixel rows of the respective candidate ROI into 1D waveforms that represent the respective 2D candidate ROI. Once the 1D waveform signals are generated from the parallax maps for each of the 2D candidate ROI, they are respectively convoluted across the alternative stereoscopic image to find the most matching counterparts of the 1D waveform signals based on the horizontal offset. In one implementation, a normalized cross-correlation (NCC) and/or a weighted NCC is used to determine, for each 1D waveform signal, the most matching counterpart in the alternative stereoscopic image. Further, the 1D waveform signals and their respective most matching counterparts are used to perform stereo matching and generate depth estimates for each of the candidate ROI.

In addition, for each of the candidate ROI, a spatial normalization is performed to determine an initial rotation of the candidate ROI. Spatial normalization includes detecting the pixel gradients of the candidate ROI and computing a gradient-direction for those pixel gradients, according to one implementation. The gradient-direction provides the dominant or principal orientation for each of the candidate ROI. Further, a so-called "ImagePatch" is generated based on the dominant or principal orientation of the contents of the candidate ROI. FIG. 35A illustrates one implementation of spatial normalization 3500A. In FIG. 35A, the asterisks (*) in white represent the gradient points of the candidate ROI 3501. In addition, the arrows represent the principal vector (PV) 3506 of rotation calculated based on the gradient-direction and the circle represents the center of mass 3504 of the candidate ROI 3501. As shown, the principal vector (PV) 3506 has a rotation different from the candidate ROI 3501. Thus, a 3D ImagePatch 3508 (pitch black) is generated with a rotation matching the rotation of PV 3506 and center matching the center of mass 3504. Further, an in-plane rotation is performed so that the PV 3506 points upwards after the rotation. Then, a matching in-plane rotation is performed on the ImagePatch 3508. Finally, the rotated ImagePatch 3508 is extracted, as shown in FIG. 35B. FIG. 35C shows other examples of extracted ImagePatches 3500C. In one implementation, ImagePatches are extracted for both, left and right, stereoscopic images, which in turn is used to compute depth information. In some implementations, ImagePatches are assigned a fixed size of 32×32 and are grayscale images. In one implementation, ImagePatches are extracted from training data 102 (including both real and simulated images) during training 100 as part of pre-processing 103. In another implementation, ImagePatches are extracted from testing data 102 (including real images) during testing 200 as part of pre-processing 103.

Once the ImagePatches are extracted, they are subjected to a plurality of initialization heuristics that determine one or more characters of the ImagePatches. In one implementation, these heuristics determine how far the hand is based on the 3D depth information of the ImagePatches. In another implementation, the heuristics check a trajectory of the hand to determine whether the hand is a right or a left hand. In yet another implementation, the heuristics determine whether the hand is an anatomically correct hand. In a further implementation, the heuristics determine whether the hand is at arm-length from the camera(s) of the gesture recognition system. In another implementation, the heuristics determine whether the hand overlaps with another hand. In some implementations, these heuristics are maintained as "IF STATEMENTS."

Advancing further, the extracted 3D ImagePatches and the results of the heuristics are fed to a so-called "classifier neural network" that is trained on a plurality of real and simulated hand images. The task of the classifier neural network is to determine, using the pixel contents of the 3D ImagePatches and the outcomes of the heuristics, whether the ImagePatches represent a hand or not. 3D ImagePatches, which pass the classifier as hands (determined from threshold scores), are instantiated using a 3D virtual hand. This 3D virtual hand has a rotation matching the rotation of the ImagePatches and a 3D position based on the 2D positions of the corresponding candidate ROI 3501 and their respective 3D depth information determined from the 1D signal waveforms, as discussed infra. A 3D virtual hand 3500D initialized for the ImagePatch 3508 is shown in FIG. 35D.

In some implementations, a pitch angle of the ImagePatch 3508 is determined between a negative z-axis of the gesture recognition system and the projection of a normal vector onto the y-z plane. The pitch represents the rotation of the ImagePatch 3508 around the x-axis. In one implementation, if the normal vector points upward, the returned angle is between 0 and pi radians (180 degrees). In another implementation, if the normal vector points downward, the returned angle is between 0 and −pi radians. In some implementations, a yaw angle of the ImagePatch 3508 is determined between a negative z-axis of the gesture recognition system and the projection of a normal vector onto the x-z plane. The yaw represents the rotation of the ImagePatch 3508 around the y-axis. In one implementation, if the normal vector points to the right of the negative z-axis, then the returned angle is between 0 and pi radians (180 degrees). In another implementation, if the normal vector points to the left, then the returned angle is between 0 and −pi radians. In some implementations, a roll angle of the ImagePatch 3508 is determined between a y-axis of the gesture recognition system and the projection of a normal vector onto the x-y plane. The roll represents the rotation of the ImagePatch 3508 around the z-axis. In one implementation, if the normal vector points to the left of the y-axis, then the returned angle is between 0 and pi radians (180 degrees). In another implementation, if the normal vector points to the right, then the returned angle is between 0 and −pi radians. For example, if the normal vector represents the normal to the palm region of the ImagePatch 3508, then the roll angle provides the tilt or roll of the palm plane compared to the horizontal (x-z) plane.

Further, bounded hand place referred to as an "ImageRect" is defined based on the extracted ImagePatch, both during training 100 and testing 200. In one implementation, ImageRect has a rectangle center that matches the palm center of the ImagePatch 3508. Then, an axis is defined from this rectangle center to one or more cameras of the gesture recognition center. Advancing ahead, one or more normal vectors are projected on to the planes formed by the rectangle center and normal vectors. Then, a principal direction of the ImagePatch 3508 is used to compute an angle of rotation for pitch, yaw and roll, as discussed infra. In some implementations, the normal vectors point perpendicularly out of the ImagePatch 3508 and the principal direction vector points forward. In one implementation, ground truth ImageRects are calculated for the ground truth hand in the training data 102. In some implementations, jitter is added to these ground truth ImageRects in the form of Gaussian noise to the position and rotation angles and the jitter results are added to the training data 102 and fed to the convolutional neural network 101. During testing 200, the ImageRects are used without the jitter. The jittered ground truth ImageRects during training 100 allow the convolutional neural network 101 to better handle misaligned ImageRects during testing 200. In particular, during testing 200, this allows the convolutional neural network 101 to better track fast hand movements from one frame to the next. FIG. 36 shows one implementation of ImageRects 3600 fitted on an ImagePatch (in yellow).

During training 200, once the hand is initialized, tracking is performed by updating each ImageRect across frames using prior hand movements to extrapolate the ImageRect forward in time. These predictions allows tracking of the very fast and sudden hand movements without the hand leaving the ImageRect. When the hand completely exits the field of view, the corresponding ImageRect and ImagePatch are removed from the list of tracked objects to be updated and processed, according to one implementation. Furthermore, after initialization 206, the ImageRect is updated from frame to frame based on the direction and center of the last estimated hand pose estimates. In some instances, if the ImageRect is not aligned with the direction and center of the tracked hand pose estimate, in the subsequent frame, the ImageRect is updated to having direction and center of the last tracked hand pose estimate. As a result, a fast moving hand that causes misalignment of the ImageRect and the captured hand images is accounted for by updating, the ImageRect's position and center based on the hand poses estimate of the fast moving hand calculated by the convolutional neural network 101 in the subsequent frame.

Thus, according to one implementation, the previous frame's fitted hand model (multi-colored ellipses/ellipsoid) is extrapolated 3700 into the current frame's timestamp (shown in FIG. 37), followed by extraction of ImageRects and ImagePatches based on the predicted hand model, followed by extraction of features from the ImagePatches by convolution layers 104, followed by pose estimation by the fully connected layers or networks 118, followed by a combination of individual point estimates using outlier-robust covariance propagation, and fitting of a final hand model to the updated covariance positions.

FIG. 38 shows a representative method 3800 of initialization 206 of a hand in accordance with one implementation of the technology disclosed. Flowchart 3800 can be implemented at least partially with a computer or other data processing system, e.g., by one or more processors configured to receive or retrieve information, process the information, store results, and transmit the results. Other implementations may perform the actions in different order and/or with different, fewer or additional actions than those illustrated in FIG. 38. Multiple actions can be combined in some implementations. For convenience, this flowchart is described with reference to the system that carries out a method. The system is not necessarily part of the method.

At action 3802, a new hand is detected in a field of view of a gesture recognition system, as discussed infra.

At action 3804, one or more candidate regions of interest (ROI) are identified for an image including the new hand, as discussed infra.

At action 3806, depth information for each of the candidate ROI is determined, as discussed infra.

At action 3808, a gradient direction and center of mass is determined for each of the candidate ROI, as discussed infra.

At action 3810, for each candidate ROI, an ImagePatch is initialized based on the gradient direction and the center of mass, as discussed infra.

At action 3812, the ImagePatch is extracted for each of the ImagePatch and a plurality of hand heuristics are applied on each of the extracted ImagePatch, as discussed infra.

At action 3814, for each candidate ROI, the extracted ImagePatch and the results of the hand heuristics are fed to a hand classifier neural network that determines whether the extracted ImagePatch resembles a hand, as discussed infra.

At action 3816, a 3D virtual hand is initialized that matches the rotation and 3D position of a particular ImagePatch identified as a hand by the hand classifier neural network, as discussed infra.

Experimental Results

FIGS. 39A, 39B, 39C, 39D, 39E, 39F, 39G, 39H, 39I, 39J, 39K, 39L, 39M, 39N and 39O show multiple frames in a time continuous gesture sequence of hand poses 3900A, 3900B, 3900C, 3900D, 3900E, 3900F, 3900G, 3900H, 3900I, 3900J, 3900K, 3900L, 3900M, 3900N and 3900O represented by skeleton hand models fitted to joint covariances in for the gesture sequences. In FIGS. 39A, 39B, 39C, 39D, 39E, 39F, 39G, 39H, 39I, 39J, 39K, 39L, 39M, 39N and 39O, both the joint covariances and the corresponding fitted skeleton hand are shown for respective estimated hand poses. As demonstrated by the variety of poses 3900A, 3900B, 3900C, 3900D, 3900E, 3900F, 3900G, 3900H, 3900I, 3900J, 3900K, 3900L, 3900M, 3900N and 3900O, the technology disclosed tracks in real time the most subtle and minute hand gestures, along with most extreme hand gestures.

Augmented Reality (AR)/Virtual Reality (VR) Interactions

FIGS. 40A, 40B and 40C show one implementation of skeleton hand models fitted to estimated joint covariances interacting with and manipulating 4000A, 4000B and 4000C virtual objects (e.g., depicted boxes) in an augmented reality (AR)/virtual reality (VR) environment 5600.

Generating Training Data

The major difficulty in hand pose estimation is that the human hand is capable of an enormous range of poses, which are difficult to simulate or account for. For a neural network to accurately generalize over a wide assortment of hand poses, it must be trained over huge volumes of hand pose variants. Researchers have created libraries of real-world hand poses, but these libraries are restricted to only a few hundred thousand or few million hand images and the space of hand poses is much greater. In addition, the task of accurately labelling thousands and millions of images with the desired output is impractical. The impracticality stems not only from the enormity of the task of labeling millions of images but also from the fact that, due to occlusion and low resolution, annotators disagree on what pose label should be assigned to a hand image. As a result, the technical problem of collecting and accurately labeling enormous amount of hand pose data remains unsolved.

The technology disclosed provides a computer graphic simulator 4100 that prepares sample simulated hand positions of gesture sequences for training of neural networks. Simulator 4100 includes simulation parameters that specify a range of hand positions and gesture sequences. It also specifies a range of hand anatomies, including palm size, fattiness, stubbiness and skin stone. Simulator 4100 also generates and applies different combinations of backgrounds to the hand positions and gesture sequences. Simulator 4100 also sets simulation parameters for camera perspective specification, including focal length, horizontal and vertical field of view of the camera, wavelength sensitivity, field distortions and artificial light conditions.

The technology disclosed generates between hundred thousand (100,000) and one billion (1,000,000,000) simulated hand positions and gesture sequences with varying hand-anatomy and hand-background simulations. Furthermore, each simulation is labeled with fifteen (15) to forty-five (45) hand position parameters such as 3D joint locations, according to one implementation. In other implementations, different hand position parameters are used for labeling the ground truth feature vector, including joint angles, capsule hand models, skeleton hand models, volumetric hand models and/or mesh hand models, muscle hand models, each in 2D and/or 3D space.

Also, the technology disclosed applies the camera perspective specification to render from the simulations at least a corresponding hundred thousand (100,000) and one billion (1,000,000,000) simulated hand images. In one implementation, these simulated hand images are a monocular image. In another implementation, these simulated hand images are binocular pairs of images. In one implementation, a simulated gesture sequence of poses connected by hand motions over a short time span is generated. A simulated gesture sequence comprises of a plurality of simulated hand images organized in a sequence of frames. Once generated, the simulated hand images along with the labelled hand position parameters from corresponding simulations are used for training convolutional neural network 101.

Computer Graphics Simulator

First, computer graphics simulator 4100 obviates the problem of manual labeling of hand images because it automatically generates simulated hand images along with precise hand position parameters. Second, simulator 4100 nearly covers the entire space of all possible hand poses by generating unbounded number of varying hand poses. In one implementation, simulator 4100 receives a specification of a range of simulation parameters and uses the specification to automatically generate different combinations of hand images with varying values within the range. FIG. 41 illustrates one implementation of a computer graphics simulator 4100 that includes a simulated coordinate system 4101, simulated hand 4102, simulated perspective 4104 of a simulated gesture recognition system (GRS) 4105, simulated hand images 4106, gesture sequence player 4108, gesture sequence objects 4110, device, image, hand and scene attributes 4112 and rendering attributes 4114. In other implementations, simulator 4100 may not have the same elements as those listed above and/or may have other/different elements instead of, or in addition to, those listed above. The different elements can be combined into single software modules and multiple software modules can run on the same hardware.

Ground Truth Pose Vector

FIG. 54 shows one implementation of the simulated hand images (left and right, (l, r)) 4106 generated by simulator 4100 and the corresponding label assigned or mapped 5400 to the images 4106 in the form of the ground truth 84 (28×3) dimensional pose vector 5412 of 3D joint locations of twenty-eight (28) hand joints. Because the simulator 4100 knows the hand position parameters of the simulated hand 4102 in the simulated coordinate system 4101, the pose vector 5412 is computed by the simulator 4100 as the ground truth label corresponding to the simulated hand images 4106. Simulated hand 4102 has twenty-seven (27) degrees of freedom, four (4) in each finger, three (3) for extension and flexion and one (1) for abduction and adduction, according to one implementation. The thumb of the simulated hand 4102 has five (5) degrees of freedom, with six (6) degrees of freedom for the rotation and translation of the wrist, according to one implementation. Thus, simulated hand 4102 closely mimics the poses and motions of a real hand. Regarding simulated coordinate system 4101, in one implementation, it is a right-handed Cartesian coordinate system, with the origin centered at the top of the simulated gesture recognition system 4105. In one implementation, the x- and z-axes of the simulated coordinate system 4101 lie in the horizontal plane, with the x-axis running parallel to the long edge of the simulated gesture recognition system 4105. In one implementation, the y-axis is vertical, with positive values increasing upwards or downwards. In one implementation, the z-axis has positive values increasing towards the simulated hand 4102. The images 4106 and the corresponding pose vector 5412 are stored by simulator 4100 in memory as pairs 5400 during training 100. So, when convolutional neural network 101 receives as input images similar to or like images 4106, it invokes the memory for the corresponding pose vector 5412 and produces it as output. In other implementations, pose vector 5412 is comprised of joint angles, capsule hand model parameters, skeleton hand model parameters, volumetric hand model parameters and/or mesh hand model parameters, muscle hand model parameters, each in 2D and/or 3D space.

In one implementation, simulator 4100 defines pose vector 5412 in terms of angles of skeleton model such as yaw, pitch, roll, bend, tilt, and others. In such an implementation, a yaw, pitch, roll, bend or title for each of the twenty-eight (28) joints of the simulated hand 4102 are defined, for example, four (4) parameters for each of fingers and three (3) parameters for the thumb of the simulated hand 4102, along with rotation and translation of the palm of the simulated hand 4102. Further, other parameters of the simulated hand 4102, discussed supra, such as scale, fattiness, skin tone, stubbiness (which controls the ratio of the fingers to palm) are defined. Once the simulation parameters are defined, they are used by a rendering engine to generate the simulated hand 4102. In one implementation, a rendering type of the simulated hand 4102 is defined by the rendering attributes 4114. Rendering attributes 4114 are configured to generate a realistic 3D mesh model or a rigged mesh hand, according to one implementation of the simulated hand 4102 shown in FIG. 41. In another implementation of the simulated hand 4102 shown in FIG. 50, rendering attributes 4114 are configured to generate a 3D capsule model. FIG. 50 shows one implementation of generating simulated hand poses and gesture sequences as 3D capsule hand models 5000 using a computer graphic simulator 4100. In other implementations, different hand models, such as volumetric models, muscle models, skeleton models are used to generate the simulated hand 4102. In one implementation, the ground truth pose vector 5412 is divided by the palm width of the simulated hand 4102 in order to make the units scale-invariant and stored in memory. This is useful because, during testing pipeline 200, the depth of a hand is determined based on its scale since a large object viewed from further away looks mostly the same as a small object closer to the camera of the gesture recognition system.

In addition to be being used for generating the simulated hand 4102, the defined simulation parameters are also used to compute the ground truth hand position parameters of the pose vector 5412. These hand position parameters include simulation parameters like joint locations and joint angles, and others, as discussed supra. In one implementation, the pose vector 5412 is generated by computing, for capsule solids representing each individual hand bones (e.g., fingers, thumb, palm, wrist, elbow), joint angles and joint locations. Once computed, the ground truth hand position parameters of the pose vector 5412 such as joint angles and joint locations are stored in memory to label the simulated input hand images 4106 with the pose vector 5412.

Simulated Hand Positions and Gesture Sequences

Simulator 4100 generates simulation hand images 4106 from the perspective or viewpoint of the simulated gesture recognition system 4105 that represents a real gesture recognition system used by the technology disclosed and trained as part of convolutional neural network 101. In the example shown in FIG. 41, such as real gesture recognition system is a Leap Motion Controller™, which is a motion sensing device introduced by Leap Motion, Inc., San Francisco, Calif. In one implementation, the real gesture recognition system is a dual-camera motion controller that is positioned and oriented to monitor a region where hand motions normally take place. In some implementations, the gesture recognition system uses one or more LED emitters to illuminate the surrounding space with IR light, which is reflected back from the nearby objects and captured by two IR cameras. In another implementation, the real gesture recognition system is a 3D time-of-flight camera that illuminates the scene with a modulated light source to observe the reflected light. In yet another implementation, the real gesture recognition system is a structured-light 3D scanner that uses infrared structured-light pattern to determine geometric reconstruction of the object shape. In some implementations, the real gesture recognition system captures between hundred (100) and three hundred (300) frames per second. Thus, during training pipeline 100, simulator 4100 generates simulated training data 102 from a perspective or viewpoint that almost exactly matches the perspective or viewpoint of the actual gesture recognition system from which the testing data 202 is captured and fed into the convolutional neural network 101 during testing pipeline 200. As a result, convolutional neural network 101 generates hand pose estimates that accurately represent a hand gesture in an image because discrepancy or the inconsistency between the training data 102 and the testing data 202 is minimized with regards to the perspective or viewpoint of the gesture recognition system.

FIG. 46 shows one implementation of generating a simulated gesture sequence 4600 of simulated mesh hands 4102. In FIG. 46, simulation parameters 4110, 4112 and 4114 of a simulated mesh hand 4102 are edited or modified by selecting the simulated hand 4102. The selection is marked by a visual coding (e.g., green) of the selected hand (right hand shown in FIG. 46). In other implementations, different visual codings such as patterns or notifications, etc. are used. Once a hand is selected, various simulation parameters 4110, 4112 and 4114 of the selected hand such as position, shape, size, etc. are adjusted by moving or re-shaping the hand or its sub-components like fingers, thumb, palm, elbow in the simulated coordinate system 4101. Thus, in this implementation, the simulation parameters 4110, 4112 and 4114 are not set or modified using input field values, but instead by moving the hand or hands in the simulated coordinate system 4101 using a point and selection command generated by an input device. This non-input-field definition is referred to as "natural traversing" of the simulated hands 4102 and is used to generate various trajectories of different simulated gesture sequences 4600, 4700, 4800, 5000 and 5100 that mimic realistic gesture movements of a real hand. As shown in FIG. 46, FIG. 47 and FIG. 48, moving the simulated hands 4102 in the simulated coordinate system 4101 automatically updates the simulation parameters 4110, 4112 and 4114 of the hands without requiring explicit field input. In addition, natural traversing not only updates the location parameters of the hands but also updates other parameters like biometrics-related simulation parameters, stubbiness-related simulation parameters, joint-location-relation simulation parameters, joint-angle-related simulation parameters, orientation-relation simulation parameters, palm-orientation-related simulation parameters, palm-width-related simulation parameters, finger-bend/yaw/roll/tilt/roll/path-related simulation parameters, finger-length-related simulation parameters (elongation), and others, as discussed supra. FIGS. 50 and 51 represent the simulated hand 4102 using 3D capsule hand models as opposed to mesh rigged hand models discussed infra. From FIG. 50 to FIG. 51, the angles of hand sub-components like fingers, palm, wrist and elbow of the selected hand (selection indicated by green visual coding) are changed by moving one or more of these sub-components in the simulated coordinate system 4101 from a first key frame 5000 to a second key frame 5100. In one implementation, an update to a particular simulation parameter or sub-component automatically updates other simulation parameters or sub-components to correspond to realistic hand gestures and correct hand anatomies. For example, bending of multiple fingers also automatically cascades into bending of the palm and the elbow of the simulated hands 4102.

Gesture sequences are defined using key frames, according to one implementation. In one implementation, a series of key frames define flag point hand position parameters of the simulated hands 4102 and the gesture sequences are then generated by running the simulated hands 4102 across each of the defined flag points. For instance, in FIG. 46, a start key frame is set when the right hand is at a rest position. In FIG. 47, an intermediate key frame is set when the right hand is still at an elevated position. In FIG. 48, a terminal key frame is set when the right hand is still at a leftward-elevated position. Once the key frames and the corresponding hand position parameters for each of the key frames (e.g., right or left hand, position of the hand) are set, then the gesture sequence is instantiated and automatically rendered across the key frames, for instance, the right hand starts at a rest position, then elevates and then moves to the left. In other implementations, multiple simulation parameters are defined per key frame and a plurality of key frames (five, ten, fifty, or hundred) are defined for each gesture sequence. For instance, for the same gesture sequence, a first key frame defines the joint location of the fingers, the second key frame defines the bend of the palm, the third key frame defines the joint angles of the fingers and the thumb and the fourth key frame defines the bend of the elbow. In other implementations, different variations of the simulation parameters discussed supra, and different values and ranges of the simulation parameters are defined across any number of key frames to specify one or more gesture sequences. An example of modification of a simulation parameter in a given key frame 5100 is shown in FIG. 51. Once a gesture sequence is defined, it is stored in memory and re-rendered upon invocation.

In some implementations, the gesture sequences are also captured using the simulated hand images 4106 that mimic real world images fed to the convolutional neural network 101. Simulated hand images 4106 represent the real world images captured by the real world gesture recognition systems digitally represented by the simulated gesture recognition system (GRS) 4105. This representation is based on various device and image parameters, such as simulation attributes 4112 (e.g., device field of view, perspective, depth, image size, image type, image count) and others discussed supra. For example, in FIG. 46, FIG. 47 and FIG. 48, the simulated hand image 4106 is a grayscale monocular image based on a mesh model. In FIG. 49, the simulated hand images 4106 are grayscale stereoscopic or binocular images 4900 based on a mesh model. In FIG. 52, the simulated hand images 4106 are grayscale stereoscopic or binocular images 5200 based on a capsule model. This variation across the simulated hand images 4106, which are used as the input hand images, allow the convolutional neural network 101 to train across an assortment of inputs and thus generalize better over unseen inputs (not present in the training data 102). Furthermore, the simulated hand images 4106 are updated simultaneously as each of the simulation parameters are updated from one key frame to the next. Thus, the simulated hand images 4106 are sensitive even to the minutest updates to the simulation parameters such as a bend of an index finger of the left hand and are updated accordingly to match the simulated hands 4102. This is illustrated between FIG. 46, FIG. 47, and FIG. 48, where updates to the simulation parameters generated corresponding different simulated hand images 4106.

Simulation Parameters

A sample set of configurable simulation parameters used by simulator 4100 to generate simulated hand positions and gesture sequences includes the following:

| Gesture Sequence Objects | |
|---|---|
| Name | Type |
| Left Hand | Hand |
| Thumb | Finger |
| Index | Finger |
| Middle | Finger |
| Ring | Finger |
| Pinky | Finger |
| Right Hand | Hand |
| Thumb | Finger |
| Index | Finger |
| Middle | Finger |
| Ring | Finger |
| Pinky | Finger |
| Device | Device |

| Device, Image, Hand and Scene Attributes | |
|---|---|
| Name | Device |
| Position | X, Y, Z Coordinates |
| Rotation | X, Y, Z Coordinates |
| Horizontal Field of View (HFOV) | Value |
| Vertical Field of View (VFOV) | Value |
| Baseline (distance between cameras) | Value |
| D. Noise (field distortion) (e.g., Gaussian Noise, Poisson)) | Value |
| S. Noise (field distortion) (e.g., Gaussian Noise, Poisson)) | Value |
| Gamma (field distortion) | Value |
| Background Color | Value |
| Lighting Strength (artificial light conditions) | Value |
| Left Background | Value |
| Right Background | Value |
| Image Type (e.g., greyscale, color, depth) | Value |
| Image Size (e.g., pixels count) | Value |
| Image Count (e.g., stereo, mono) | Value |
| Image Model (e.g., mesh, capsule) | Value |
| Name | Right Hand |
| Position | X, Y, Z Coordinates |
| Rotation | X, Y, Z Coordinates |
| Occlusion | Value |
| Pitch | Value |
| Yaw | Value |
| Roll | Value |
| Path | Value |
| Trajectory | Value |
| Angular Velocity | Value |
| Velocity | Value |
| Euler Angles | Value |
| Orientation | Value |
| Torque | Value |
| Stress | Value |
| Strain | Value |
| Shear | Value |
| Finger Positions | Value |
| Fingers | Value |
| Palm Position | Value |
| Palm Orientation | Value |
| Palm Velocity | Value |
| Palm Normal | Value |
| Palm Width | Value |
| Direction | Value |
| Grab Strength | Value |
| Pinch Strength | Value |
| Finger Segment Length | Value |
| Joint Locations | Value |
| Joint Angles | Value |
| Finger Segment Orientation | Value |
| Wrist Positions | Value |
| Wrist Orientation | Value |
| Arm | Value |
| Confidence | Value |
| Curling | Value |
| Torsion | Value |
| Acceleration | Value |
| Stubbiness | Value |
| Gender | Value |
| Skin Tone | Value |
| Translation | Value |
| Distance (e.g., mmil) | Value |
| Time (e.g., msec) | Value |
| Speed (e.g., mmil/sec) | Value |
| Angle (e.g., radians) | Value |
| Name | Left Hand |
| Position | X, Y, Z Coordinates |
| Rotation | X, Y, Z Coordinates |
| Occlusion | Value |
| Pitch | Value |
| Yaw | Value |
| Roll | Value |
| Path | Value |
| Trajectory | Value |
| Angular Velocity | Value |
| Velocity | Value |

-continued

| Device, Image, Hand and Scene Attributes | |
|---|---|
| Euler Angles | Value |
| Orientation | Value |
| Torque | Value |
| Stress | Value |
| Strain | Value |
| Shear | Value |
| Finger Positions | Value |
| Fingers | Value |
| Palm Position | Value |
| Palm Orientation | Value |
| Palm Velocity | Value |
| Palm Normal | Value |
| Palm Width | Value |
| Direction | Value |
| Grab Strength | Value |
| Pinch Strength | Value |
| Finger Segment Length | Value |
| Joint Locations | Value |
| Joint Angles | Value |
| Finger Segment Orientation | Value |
| Wrist Positions | Value |
| Wrist Orientation | Value |
| Arm | Value |
| Confidence | Value |
| Curling | Value |
| Torsion | Value |
| Acceleration | Value |
| Stubbiness | Value |
| Gender | Value |
| Skin Tone | Value |
| Translation | Value |
| Distance (e.g., mmil) | Value |
| Time (e.g., msec) | Value |
| Speed (e.g., mmil/sec) | Value |
| Angle (e.g., radians) | Value |

| Rendering Attributes | |
|---|---|
| Data Transfer | |
| Transfer Depths and Normals | X, Y, Z Coordinates |
| Transfer Labels | X, Y, Z Coordinates |
| Transfer Masks | Value |
| Playback | |
| Time Between Frames (e.g., msec) | Value (e.g., 20) |
| Frames per Second | Value (e.g., 50) |
| Number of Frames | Value (e.g., 500000) |
| Interpolation | Value (e.g., Cubic) |
| Wraparound | Value (e.g., Clamp) |
| Multiple Device Timing | Value (e.g., Synchronized) |
| Playback Speed | Value (e.g., Normal) |
| Rendering | |
| Render Mode | Type (e.g., FBX, Capsule) |

The simulation parameters are configured using interface input fields, in one implementation. In other implementations, the simulation parameters are configured using different interface input methods such as scroll bars, scroll down menus, lists, voice commands, optical commands, buttons, widgets, tabs, and the like. FIG. 42 illustrates a graphical user interface (GUI) implementation of computer graphics simulator 4100 visually rendering gesture sequence objects 4110 for configuration and specification. FIG. 43 illustrates a graphical user interface (GUI) implementation of computer graphics simulator 4100 visually rendering device, image, hand and scene attributes 4112 for configuration and specification. FIG. 44 illustrates a graphical user interface (GUI) implementation of computer graphics simulator 4100 visually displaying rendering attributes 4114 for configuration and specification. FIG. 45 illustrates a graphical user interface (GUI) implementation of computer graphics simulator 4100 visually rendering hand attributes 4112 for configuration and specification.

Automated Range-Based Simulation

Simulator 4100 automatically generates simulations of one-handed or two-handed poses by using ranges that serve as specified constraints of anatomically correct "realistic" hand poses. In one implementation, simulator 4100 instantiates simulation parameters discussed infra across a range of values to automatically generate hundred thousand (100,000) to one billion (1,000,000,000) simulated unique hand positions and gestures sequences with varying hand poses, hand anatomies, backgrounds and camera perspectives. Further, simulator 4100 automatically labels or maps each of the simulated unique hand positions and gestures sequences to corresponding ground truth hand position parameters like pose vector 5412. These ranges are defined between maximum and minimum values of particular simulation parameters, such as anatomically correct joint locations and joint angles of hand components (e.g., distal phalanges, intermediate phalanges, proximal phalanges and metacarpals for each of the fingers and thumb, wrist and arm movements), anatomical poses based on hand components (e.g., distal phalanges, intermediate phalanges, proximal phalanges and metacarpals for each of the fingers and thumb, wrist and arm movements). In one implementation, such maximum and minimum values are expressed in pitch, yaw, scale, translation, rotation, bend, elongation, and the like.

In one implementation of biometrics-related simulation parameters like hand stubbiness, fattiness and skin tone, simulator 4100 automatically generates unique hand positions and gestures sequences with variety of values of such biometrics-related simulation parameters defined within a specified range. In another implementation of background-related simulation parameters like field distortion using Gaussian noise or Poisson noise, simulator 4100 automatically generates unique hand positions and gesture sequences with a variety of values of such background-related simulation parameters defined within a specified range.

Figure 53A:
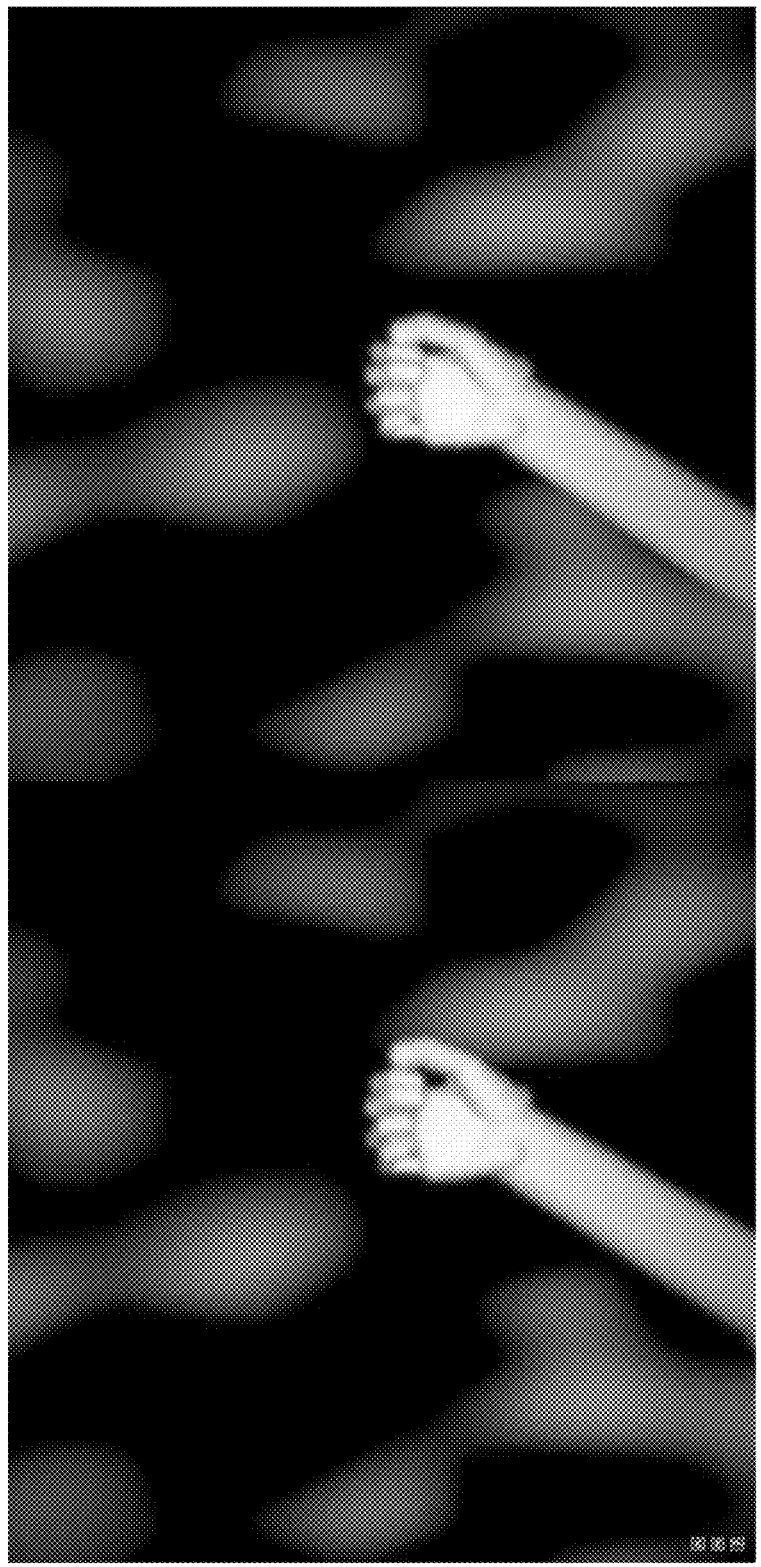
Figure 53B:
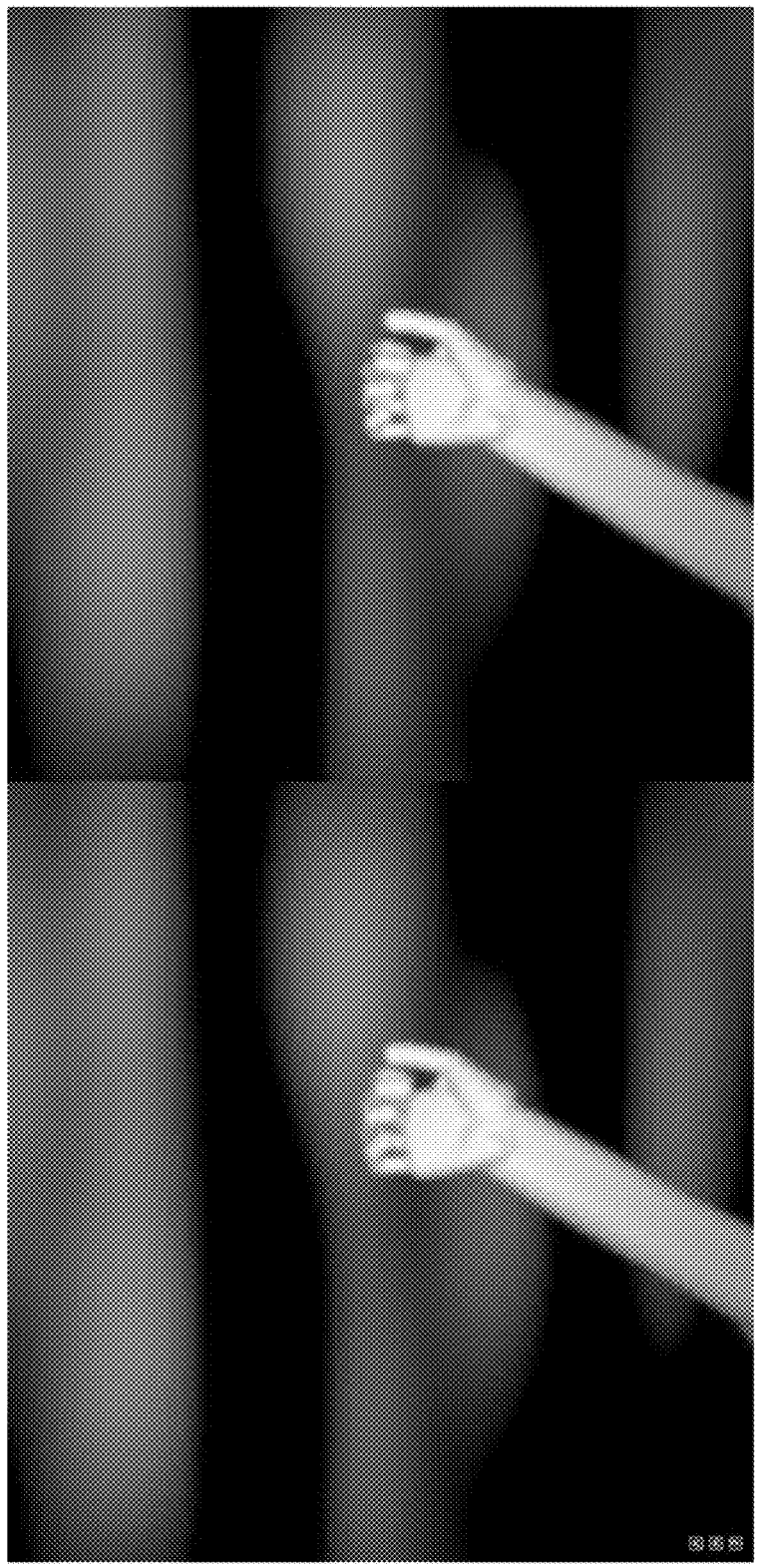
Figure 53C:
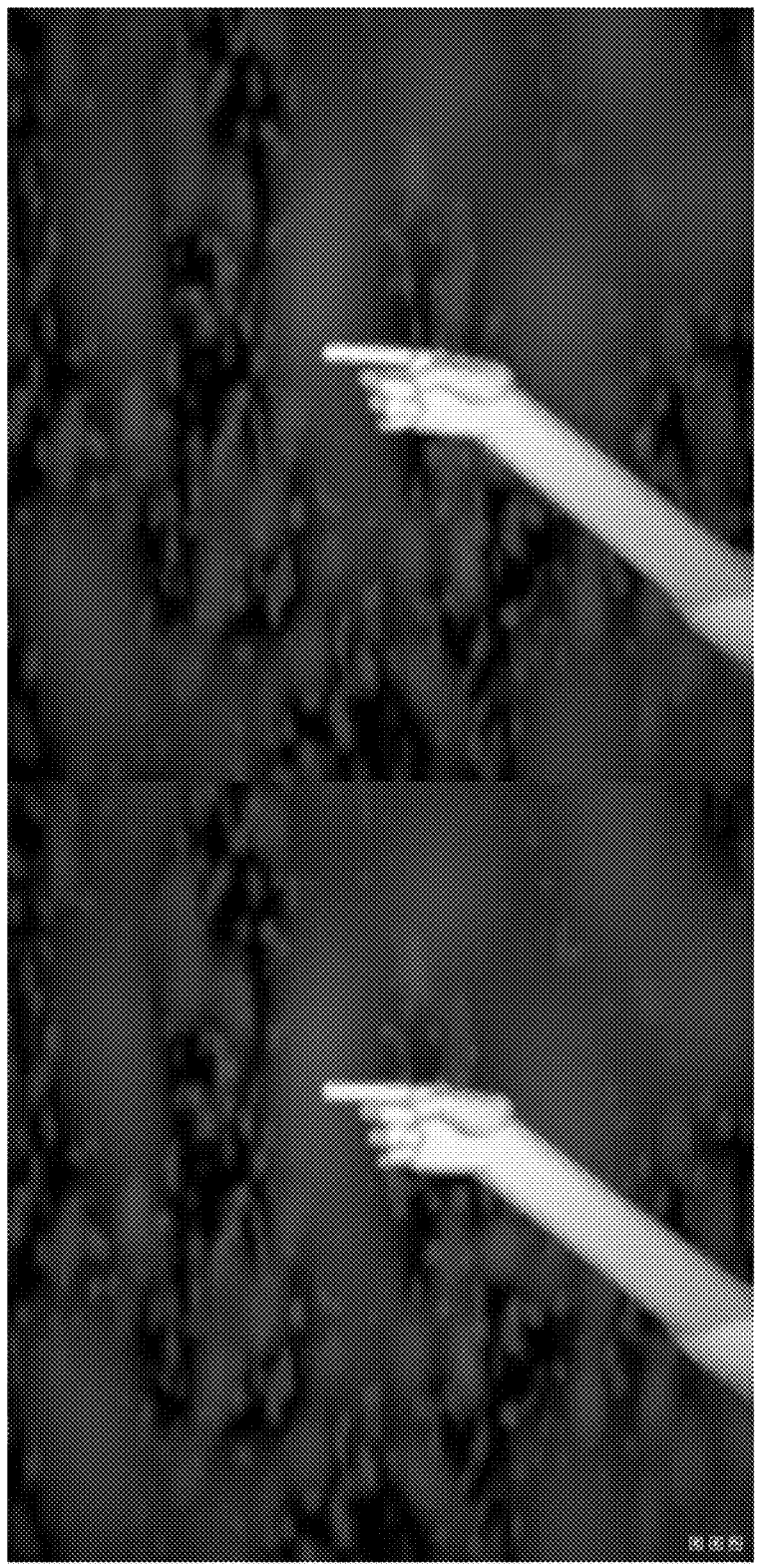
Figure 53D:
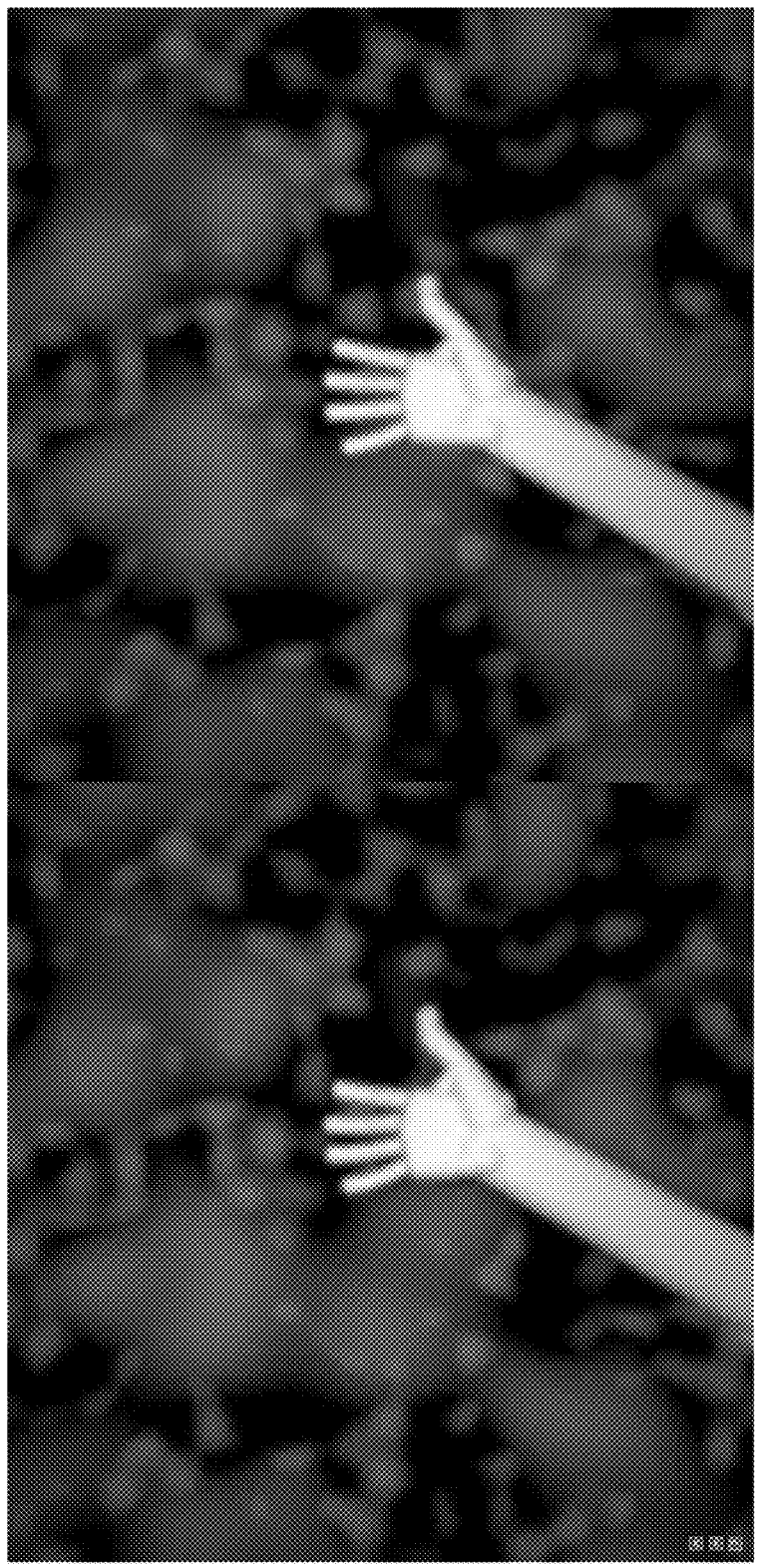
Figure 53E:
Figure 53F:
Figure 53G:
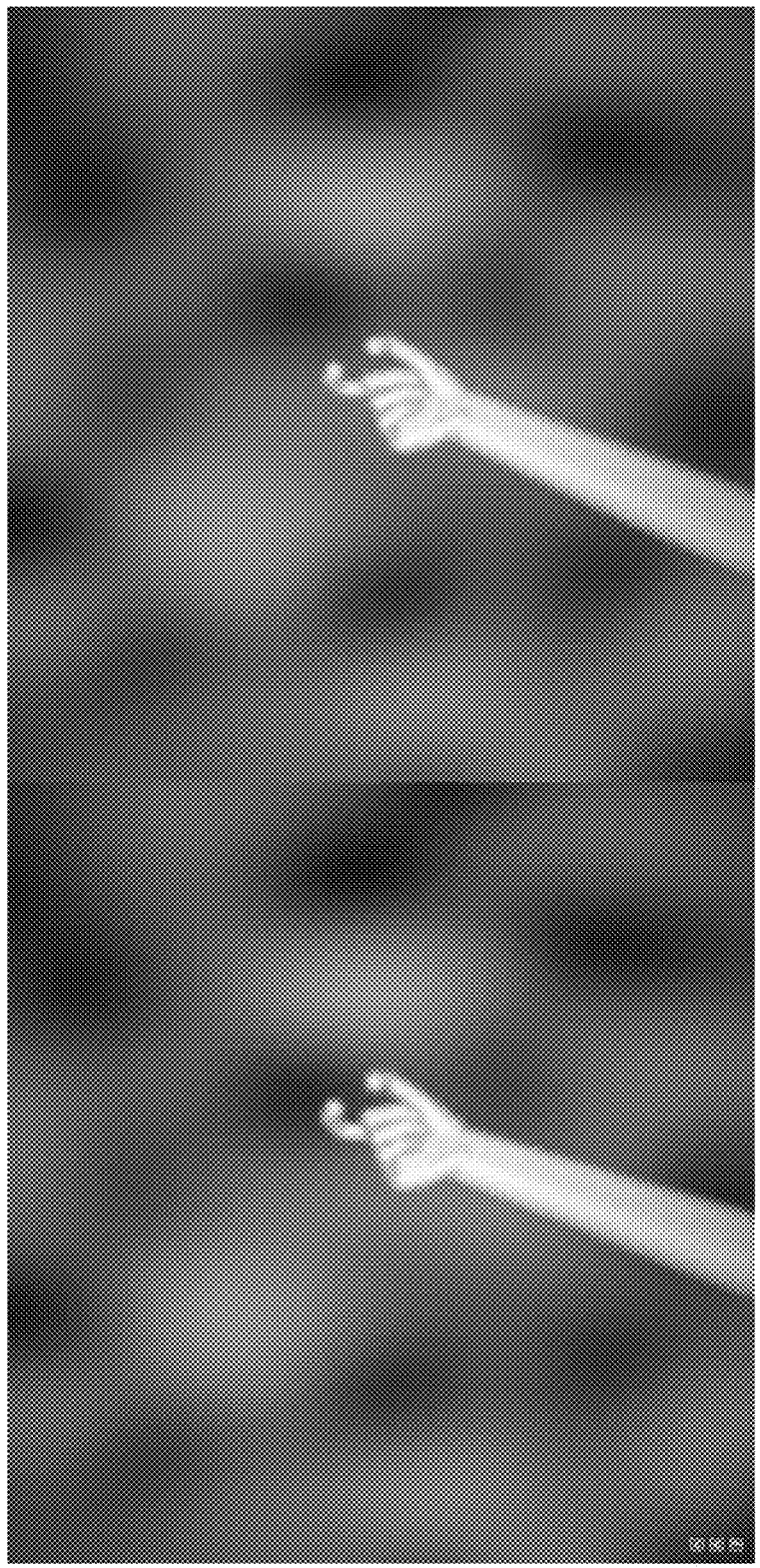
Figure 53H:
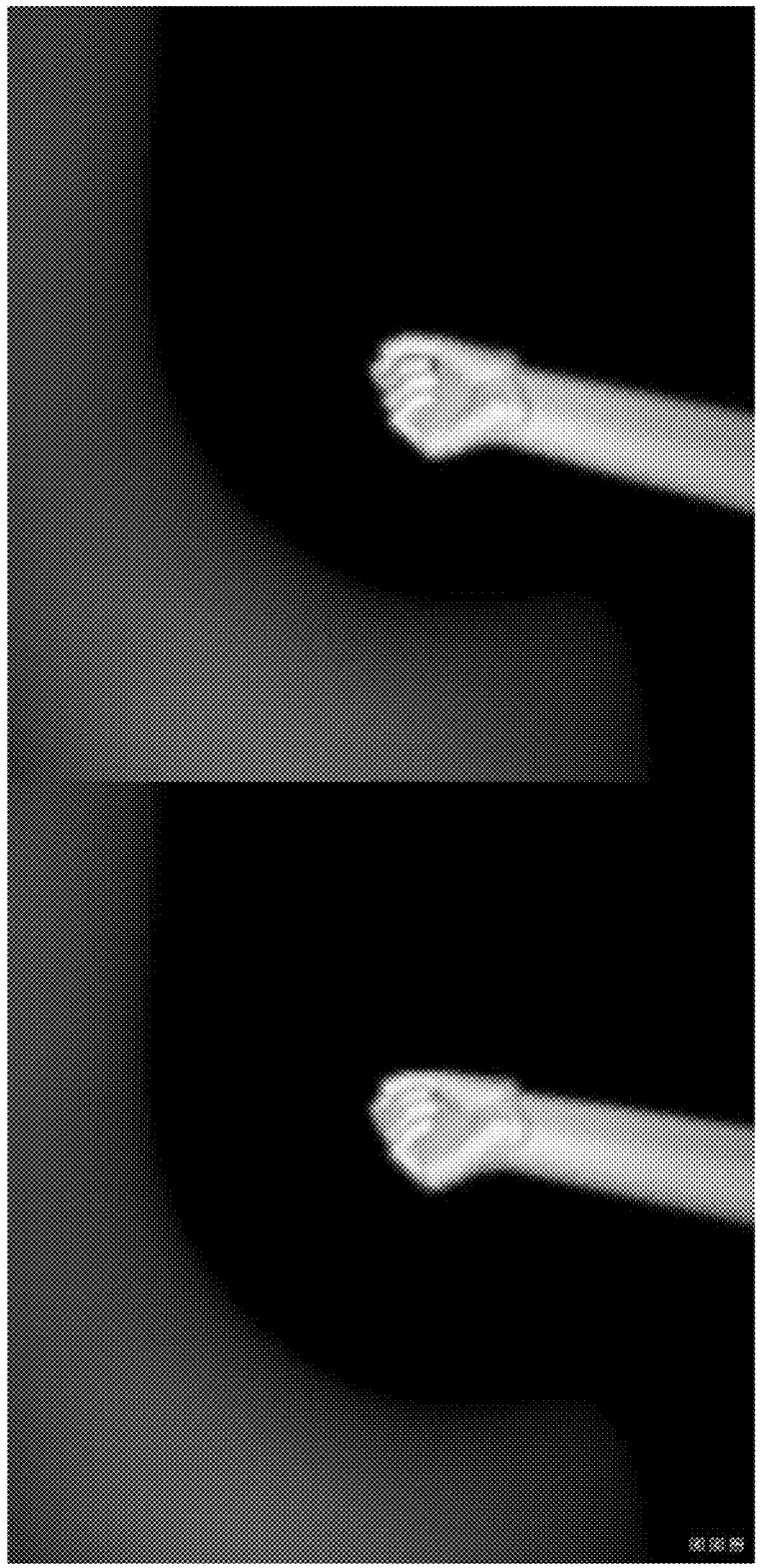
Figure 53I:
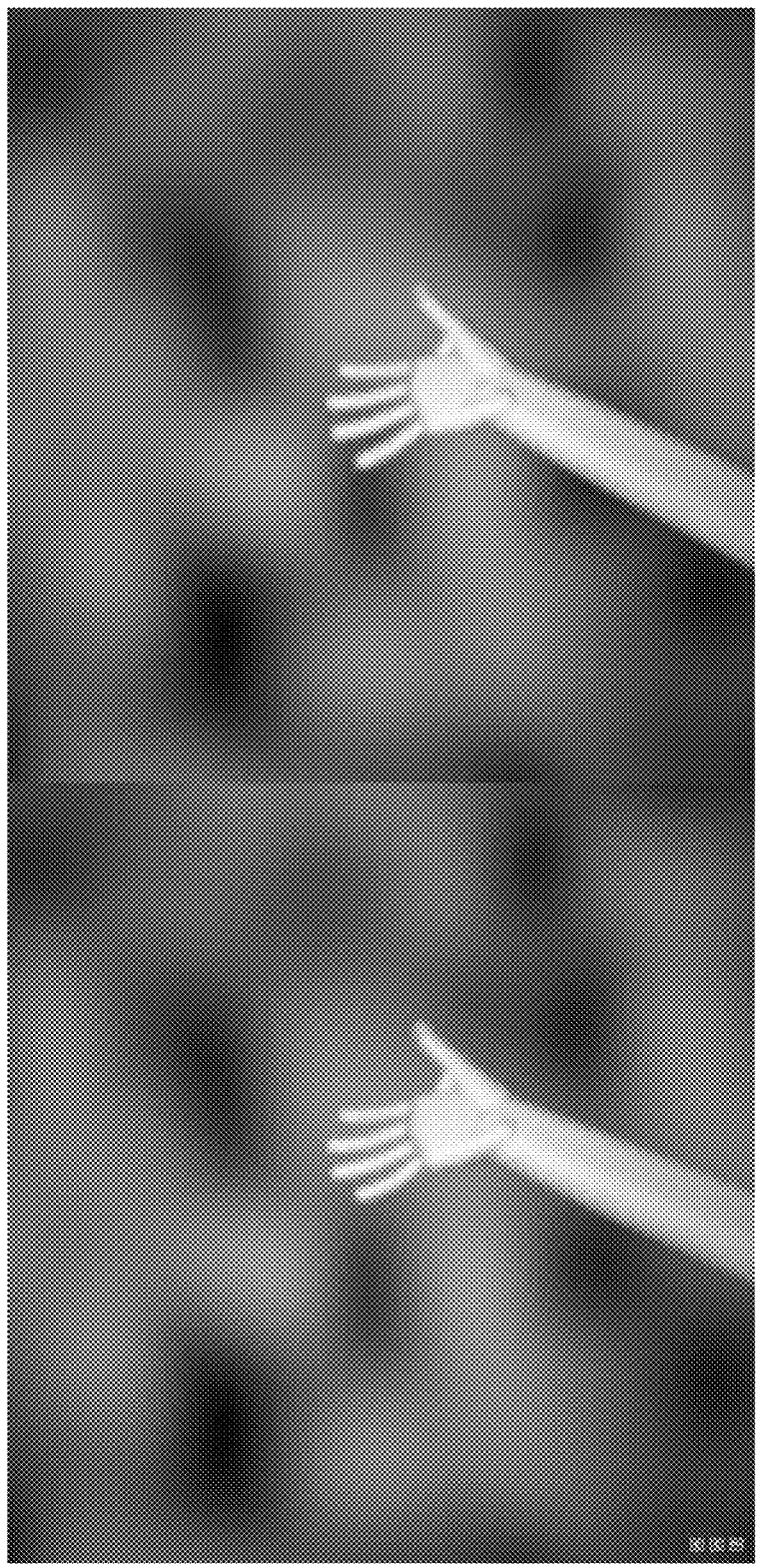
Figure 53J:
Figure 53K:

FIGS. 53A, 53B, 53C, 53D, 53E, 53F, 53G, 53H, 53I, 53J and 53K are different examples of automated range-based simulations of different hand poses generated by simulator 4100. Also, each of the examples has a different background that is automatically and randomly applied to it based on defined background-range simulation parameter. For example, FIG. 53A is a curled-finger pose 5300A with background 1, FIG. 53B is a semi-curled-finger pose 5300B with background 2, FIG. 53C is a one-finger pose 5300C with background 3, FIG. 53D is an open-hand pose 5300D with background 4, FIG. 53E is an open-hand plus curled-thumb pose 5300E with background 5, FIG. 53F is a loose-fist pose 5300F with background 6, FIG. 53G is a loose-fist plus curled-index-finger and curled-thumb pose 5300G with background 7, FIG. 53H is a hollow-loose-fist pose 5300H with background 8, FIG. 53I is a right-titled-open-hand pose 5300I with background 9, and FIG. 53J is a left-titled-open-hand plus curled-middle-finger pose 5300J with background 10. FIG. 53K is a finger-point plus thumb-out pose 5300K with background 11 in the form a 3D mesh model instead of the 3D capsule models of FIGS. 53A-53J. In other implementations, each of these example poses have different values for the different simulation parameters (like biometrics-related simulation parameters, artificial-light-conditions-related simulation parameters), as discussed infra.

Regarding gesture sequences, in one implementation, simulator 4100 automatically generates gesture sequences by combining various range-based simulated poses. For example, each of the individual simulated poses 5300A, 5300B, 5300C, 5300D, 5300E, 5300F, 5300G, 5300H, 5300I, 5300J and 5300K are combined to form a single gesture sequence across multiple image frames. Simulated gesture sequences are configured using rendering attributes 4114 and assigned simulation parameters like time between frames of the gesture sequence, number of frames per second in the gesture sequence, number of frames in the gesture sequence, and others, according to one implementation. In another implementation, simulated gesture sequences are replayed forward or backward and broken down temporally by individual hand poses or individual frames using a gesture sequence player 4108. Using the gesture sequence player 4108, individual hand poses or individual frames of a gesture sequence are examined and investigated at a given timestamp. In some implementations, such examination and investigation includes editing the different simulation parameters discussed infra at a given hand pose, frame or timestamp to generate and store a new simulated gesture sequence, variant simulated gesture sequence, morphed simulated gesture sequence or altered or modified simulated gesture sequence. In one implementation, such editing it done using the GUI representations of the simulated coordinate system 4101, simulated hand 4102, simulated perspective 4104 of a simulated gesture recognition system 4105, gesture sequence objects 4110, device, image, hand and scene attributes 4112 and rendering attributes 4114.

Simulated Dedicated Gesture Sequences

In one implementation, simulator 4100 mimics commonly performed hand poses and gestures and generates corresponding simulated "dedicated" hand positions and gesture sequences. Some examples of such commonly performed hand poses and gestures include a fist, grabbing, open-hand, pinching, finger point, one finger click, two finger point, two finger click, prone one finger point, prone one finger click, prone two finger point, prone two finger click, medial one finger point, medial two finger point, a point and grasp, a grip-and-extend-again motion of two fingers of a hand, grip-and-extend-again motion of a finger of a hand, holding a first finger down and extending a second finger, a flick of a whole hand, flick of one of individual fingers or thumb of a hand, flick of a set of bunched fingers or bunched fingers and thumb of a hand, horizontal sweep, vertical sweep, diagonal sweep, a flat hand with thumb parallel to fingers, closed, half-open, pinched, curled, fisted, mime gun, okay sign, thumbs-up, ILY sign, one-finger point, two-finger point, thumb point, pinkie point, flat-hand hovering (supine/prone), bunged-fingers hovering, or swirling or circular sweep of one or more fingers and/or thumb and/arm.

Each of the simulated dedicated hand positions and gesture sequences is then subjected to variations of other simulation parameters discuss infra, including biometrics-related simulation parameters, background-related simulation parameters, artificial-light-conditions-related simulation parameters, and others. This generates many more permutations and combinations of each of the simulated dedicated hand positions and gesture sequences. For example, for every simulated dedicated hand position and gesture sequence, one hundred and twenty (120) variations are generated and stored. In addition, different simulated dedicated hand positions are combined in different orders to generate different gesture sequences so as to increasingly cover the space of all possible poses and gestures. For instance, a first simulated gesture sequence starts with an open-hand, followed by a pinch, which is followed by a release. Another simulated sequence starts with an open-hand, followed by a grasp, which is followed by a release. All these hand positions and gesture sequences are generated for both hands, right and left. Furthermore, simulator 4100 adds another layer of variation to the training data 102 by generating the resulting output in the forms of joint location models, joint angle models, capsule hand models, skeleton hand models, volumetric hand models and/or mesh hand models, muscle hand models, each in 2D and/or 3D space. A sample list of dedicated hand poses in Python programming language is presented below:

"clustered",
"fist",
"finger-movement-0",
"finger-movement-1",
"finger-movement-2",
"grabbing",
"hmdFieldPoses1_R",
"hmdFieldPoses2_R",
"hmdFieldPoses3_R",
"hmdFieldPoses4_R",
"hmdFieldPoses5_R",
"open-hand",
"pinching",
"pointing-new",
"poses3_extended",
"posesMixed_extended",
"sim-long",
"super-long",
"highangle-0",
"highangle-1",
"highangle-2",
"twohand-0", The variety of simulation parameters discussed infra and the combination of various simulated hand positions and gesture sequences make convolutional neural network 101 very robust against different types of hands and hand poses in different backgrounds and clutters. Thus, training convolutional neural network 101 on such a huge and varied training data 102 allow it to generalize better on instances of hand poses and gestures that it has not seen before. As well, being trained on realistic and common gesture sequences allows convolutional neural network 101 to benefit from the knowledge of most likely next or succeeding pose. Convolutional neural network 101 uses this knowledge in its prediction of the actual next or succeeding pose such that when the prediction differs from the knowledge beyond a set threshold, convolutional neural network 101 automatically corrects the prediction to output a pose estimate that is consistent with the learned gesture sequences of realistic gestures. In other implementations, convolutional neural network 101 ignores this knowledge and continues to output a pose estimate based on its actual prediction.

Training data 102 also allows convolutional neural network 101 to train and test data that is generalized to different image types. In one implementation, training 100 is performed on grayscale infrared brightness images. In another implementation, training 100 is performed on color images. In yet another implementation, training 100 is performed on depth maps to eliminate the need for stereo image processing and background segmentation. To generalize the training data 102, simulator 4100 generates simulated grayscale infrared brightness images, color images and depth maps or images.

Also, in addition to the simulated data discussed infra, training data 102 also includes millions of real world images and frames of hands and gestures collected from the field by Leap Motion, Inc., San Francisco, Calif. Leap Motion, Inc.'s Leap Motion Controller is used by millions of users, including a robust developer community of thousands of developers. Developers use application programming interfaces (APIs) provided by Leap Motion, Inc. to create gesture recognition applications. This ecosystem puts Leap Motion, Inc. in a unique position of accumulating millions of hand images and hand gestures from the real world, which, along with their rotated, translated and scaled variants, ultimately contribute to and enrich training data 102. This in turn allows convolutional neural network 101 to generalize and train over a larger space of realistic hand poses and gestures.

In some implementations, to solve the problem of "overfitting," i.e. to prevent certain areas in the pose space from being too densely populated, a conservative sparsification pass is applied to the training data 102 based on pose similarity. In one implementation, such a sparsification pass eliminates between ten (10) to (20) percent of the training data 102. This allows the convolutional neural network 101 to generalize better over the entire space of possible poses, as opposed to focusing too heavily on particular over-represented hand poses and gestures.

FIG. 55 shows a representative method 5500 of generating training data 102 in accordance with one implementation of the technology disclosed. Flowchart 5500 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 55. Multiple actions can be combined in some implementations. For convenience, this flowchart is described with reference to the system that carries out a method. The system is not necessarily part of the method.

At action 5502, ground-truth simulated stereoscopic hand images (l, r) for gesture sequences are generated using a computer graphic simulator, as discussed infra.

At action 5504, stereoscopic hand boundaries, referred to as "ImageRects," are extracted and aligned with hand centers, as discussed infra.

At action 5506, translated, rotated and scaled variants of the stereoscopic hand boundaries (ImageRects) are generated, as discussed infra.

At action 5508, Gaussian jittering is applied to the variants of the stereoscopic hand boundaries (ImageRects) to generate additional jittered ImageRects, as discussed infra.

At action 5510, hand regions, referred to as "ImagePatches," are cropped from the jittered variants of the ImageRects, as discussed infra.

At action 5512, an 84 (28×3) dimensional pose vector of 3D joint locations of twenty-eight (28) hand joints is computed using the computer graphic simulator, as discussed infra.

At action 5514, the 84 dimensional pose vector is stored as the output label for the simulated stereoscopic hand images (l, r), as discussed infra.

Gesture Recognition

Referring to FIG. 56, which illustrates an augmented reality (AR)/virtual reality (VR) environment 5600 with a gesture recognition system 5606 for capturing image data according to one implementation of the technology disclosed. System 5600 is preferably coupled to a wearable device 5601 that can be a personal head mounted device (HMD) having a goggle form factor such as shown in FIG. 56, a helmet form factor, or can be incorporated into or coupled with a watch, smartphone, or other type of portable device.

In various implementations, the system and method for capturing 3D motion of an object as described herein can be integrated with other applications, such as a HMD or a mobile device. Referring again to FIG. 56, a HMD 5601 can include an optical assembly that displays a surrounding environment or a virtual environment to the user; incorporation of the gesture recognition system 5606 in the HMD 5601 allows the user to interactively control the displayed environment. For example, a virtual environment can include virtual objects that can be manipulated by the user's hand gestures, which are tracked by the gesture recognition system 5606. In one implementation, the gesture recognition system 5606 integrated with the HMD 5601 detects a position and shape of user's hand and projects it on the display of the gesture recognition system 5606 such that the user can see her gestures and interactively control the objects in the virtual environment. This can be applied in, for example, gaming or internet browsing.

Environment 5600 includes any number of cameras 5602, 5604 coupled to a gesture recognition system 5606. Cameras 5602, 5604 can be any type of camera, including cameras sensitive across the visible spectrum or with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 5602, 5604 are preferably capable of capturing video images (i.e., successive image frames at a constant rate of at least 15 frames per second), although no particular frame rate is required. The capabilities of cameras 5602, 5604 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on each side.

As shown, cameras 5602, 5604 can be oriented toward portions of a region of interest 5612 by motion of the device 5601, in order to view a virtually rendered or virtually augmented view of the region of interest 5612 that can include a variety of virtual objects 5616 as well as contain an object of interest 5614 (in this example, one or more hands) that moves within the region of interest 5612. One or more sensors 5608, 5610 capture motions of the device 5601. In some implementations, one or more light sources 5615, 5617 are arranged to illuminate the region of interest 5612. In some implementations, one or more of the cameras 5602, 5604 are disposed opposite the motion to be detected, e.g., where the hand 5614 is expected to move. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Gesture recognition system 5606, which can be, e.g., a computer system, can control the operation of cameras 5602, 5604 to capture images of the region of interest 5612 and sensors 5608, 5610 to capture motions of the device 5601. Information from sensors 5608, 5610 can be applied to models of images taken by cameras 5602, 5604 to cancel out the effects of motions of the device 5601, providing greater accuracy to the virtual experience rendered by device 5601. Based on the captured images and motions of the device 5601, gesture recognition system 5606 determines the position and/or motion of object 5614.

For example, as an action in determining the motion of object 5614, gesture recognition system 5606 can determine which pixels of various images captured by cameras 5602, 5604 contain portions of object 5614. In some implementations, any pixel in an image can be classified as an "object" pixel or a "background" pixel depending on whether that pixel contains a portion of object 5614 or not. Object pixels can thus be readily distinguished from background pixels based on brightness. Further, edges of the object can also be readily detected based on differences in brightness between adjacent pixels, allowing the position of the object within each image to be determined. In some implementations, the silhouettes of an object are extracted from one or more images of the object that reveal information about the object as seen from different vantage points. While silhouettes can be obtained using a number of different techniques, in some implementations, the silhouettes are obtained by using cameras to capture images of the object and analyzing the images to detect object edges. Correlating object positions between images from cameras 5602, 5604 and cancelling out captured motions of the device 5601 from sensors 5608, 5610 allows gesture recognition system 5606 to determine the location in 3D space of object 5614, and analyzing sequences of images allows gesture recognition system 5606 to reconstruct 3D motion of object 5614 using conventional motion algorithms or other techniques. See, e.g., U.S. patent application Ser. No. 13/414,485, filed on Mar. 7, 2012 and Ser. No. 13/742,953, filed on Jan. 16, 2013, and U.S. Provisional Patent Application No. 61/724,091, filed on Nov. 8, 2012, which are hereby incorporated herein by reference in their entirety.

Presentation interface 5620 employs projection techniques in conjunction with sensory based tracking in order to present virtual (or virtualized real) objects (visual, audio, haptic, and so forth) created by applications loadable to, or in cooperative implementation with, the device 5601 to provide a user of the device with a personal virtual experience. Projection can include an image or other visual representation of an object.

One implementation uses motion sensors and/or other types of sensors coupled to a motion-capture system to monitor motions within a real environment. A virtual object integrated into an augmented rendering of a real environment can be projected to a user of a portable device 5601. Motion information of a user body portion can be determined based at least in part upon sensory information received from imaging devices (e.g., cameras 5602, 5604) or acoustic or other sensory devices. Control information is communicated to a system based in part on a combination of the motion of the portable device 5601 and the detected motion of the user determined from the sensory information received from imaging devices (e.g., cameras 5602, 5604) or acoustic or other sensory devices. The virtual device experience can be augmented in some implementations by the addition of haptic, audio and/or other sensory information projectors. For example, an optional video projector 5620 can project an image of a page (e.g., a virtual device) from a virtual book object superimposed upon a real world object, e.g., a desk 5616 being displayed to a user via live video feed; thereby creating a virtual device experience of reading an actual book, or an electronic book on a physical e-reader, even though no book nor e-reader is present. Optional haptic projector can project the feeling of the texture of the "virtual paper" of the book to the reader's finger. Optional audio projector can project the sound of a page turning in response to detecting the reader making a swipe to turn the page. Because it is a virtual reality world, the back side of hand 5614 is projected to the user, so that the scene looks to the user as if the user is looking at their own hand(s).

A plurality of sensors 5608, 5610 are coupled to the gesture recognition system 5606 to capture motions of the device 5601. Sensors 5608, 5610 can be any type of sensor useful for obtaining signals from various parameters of motion (acceleration, velocity, angular acceleration, angular velocity, position/locations); more generally, the term "motion detector" herein refers to any device (or combination of devices) capable of converting mechanical motion into an electrical signal. Such devices can include, alone or in various combinations, accelerometers, gyroscopes, and magnetometers, and are designed to sense motions through changes in orientation, magnetism or gravity. Many types of motion sensors exist and implementation alternatives vary widely.

The illustrated environment 5600 can include any of various other sensors not shown in FIG. 56 for clarity, alone or in various combinations, to enhance the virtual experience provided to the user of device 5601. For example, in low-light situations where free-form gestures cannot be recognized optically with a sufficient degree of reliability, gesture recognition system 5606 may switch to a touch mode in which touch gestures are recognized based on acoustic or vibrational sensors. Alternatively, gesture recognition system 5606 may switch to the touch mode, or supplement image capture and processing with touch sensing, when signals from acoustic or vibrational sensors are sensed. In still another operational mode, a tap or touch gesture may act as a "wake up" signal to bring the gesture recognition system 5606 from a standby mode to an operational mode. For example, the gesture recognition system 5606 may enter the standby mode if optical signals from the cameras 5602, 5604 are absent for longer than a threshold interval.

It will be appreciated that the figures shown in FIG. 56 are illustrative. In some implementations, it may be desirable to house the environment 5600 in a differently shaped enclosure or integrated within a larger component or assembly. Furthermore, the number and type of image sensors, motion detectors, illumination sources, and so forth are shown schematically for clarity, but neither the size nor the number is the same in all implementations.

Referring now to FIG. 57, which shows a simplified block diagram of a computer system 5700 for implementing gesture recognition system 5606. Computer system 5700 includes a processor 5702, a memory 5704, a motion detector and camera interface 5706, a presentation interface 5620, speaker(s) 5709, a microphone(s) 5710, and a wireless interface 5711. Memory 5704 can be used to store instructions to be executed by processor 5702 as well as input and/or output data associated with execution of the instructions. In particular, memory 5704 contains instructions, conceptually illustrated as a group of modules described in greater detail below, that control the operation of processor 5702 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENACTION operating system, iOS, Android or other mobile operating systems, or another operating system of platform.

The computing environment may also include other removable/non-removable, volatile/nonvolatile computer storage media. For example, a hard disk drive may read or write to non-removable, nonvolatile magnetic media. A magnetic disk drive may read from or write to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 5702 may be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that are capable of implementing the actions of the processes of the technology disclosed.

Motion detector and camera interface 5706 can include hardware and/or software that enables communication between computer system 5700 and cameras 5602, 5604, as well as sensors 5608, 5610 (see FIG. 56). Thus, for example, motion detector and camera interface 5706 can include one or more camera data ports 5716, 5718 and motion detector ports 5717, 5719 to which the cameras and motion detectors can be connected (via conventional plugs and jacks), as well as hardware and/or software signal processors to modify data signals received from the cameras and motion detectors (e.g., to reduce noise or reformat data) prior to providing the signals as inputs to a motion-capture ("mocap") program 5714 executing on processor 5702. In some implementations, motion detector and camera interface 5706 can also transmit signals to the cameras and sensors, e.g., to activate or deactivate them, to control camera settings (frame rate, image quality, sensitivity, etc.), to control sensor settings (calibration, sensitivity levels, etc.), or the like. Such signals can be transmitted, e.g., in response to control signals from processor 5702, which may in turn be generated in response to user input or other detected events.

Instructions defining mocap program 5714 are stored in memory 5704, and these instructions, when executed, perform motion-capture analysis on images supplied from cameras and audio signals from sensors connected to motion detector and camera interface 5706. In one implementation, mocap program 5714 includes various modules, such as an object analysis module 5722 and a path analysis module 5724. Object analysis module 5722 can analyze images (e.g., images captured via interface 5706) to detect edges of an object therein and/or other information about the object's location. In some implementations, object detection module 5722 can also analyze audio signals (e.g., audio signals captured via interface 5706) to localize the object by, for example, time distance of arrival, multilateration or the like. ("multilateration is a navigation technique based on the measurement of the difference in distance to two or more stations at known locations that broadcast signals at known times. See Wikipedia, at <http://en.wikipedia.org/w/index.php?title=Multilateration&oldid=523281858>, on Nov. 16, 2012, 06:07 UTC). Path analysis module 5724 can track and predict object movements in 3D based on information obtained via the cameras. Some implementations include an augmented reality (AR)/virtual reality (VR) environment 5600 provides integration of virtual objects reflecting real objects (e.g., hand 5614) as well as synthesized objects 5616 for presentation to user of device 5601 via presentation interface 5620 to provide a personal virtual experience. One or more applications 5730 can be loaded into memory 5704 (or otherwise made available to processor 5702) to augment or customize functioning of device 5601 thereby enabling the system 5700 to function as a platform. Successive camera images are analyzed at the pixel level to extract object movements and velocities. Audio signals place the object on a known surface, and the strength and variation of the signals can be used to detect object's presence. If both audio and image information is simultaneously available, both types of information can be analyzed and reconciled to produce a more detailed and/or accurate path analysis. In some implementations, a video feed integrator provides integration of live video feed from the cameras 5602, 5604 and one or more virtual objects. Video feed integrator governs processing of video information from disparate types of cameras 5602, 5604. For example, information received from pixels sensitive to IR light and from pixels sensitive to visible light (e.g., RGB) can be separated by integrator and processed differently. Image information from IR sensors can be used for gesture recognition, while image information from RGB sensors can be provided as a live video feed via presentation interface 5620. Information from one type of sensor can be used to enhance, correct, and/or corroborate information from another type of sensor. Information from one type of sensor can be favored in some types of situational or environmental conditions (e.g., low light, fog, bright light, and so forth). The device can select between providing presentation output based upon one or the other types of image information, either automatically or by receiving a selection from the user. Integrator in conjunction with AR/VR environment 5600 control the creation of the environment presented to the user via presentation interface 5620.

Presentation interface 5620, speakers 5709, microphones 5710, and wireless network interface 5711 can be used to facilitate user interaction via device 5601 with computer system 5700. These components can be of generally conventional design or modified as desired to provide any type of user interaction. In some implementations, results of motion capture using motion detector and camera interface 5706 and mocap program 5714 can be interpreted as user input. For example, a user can perform hand gestures or motions across a surface that are analyzed using mocap program 5714, and the results of this analysis can be interpreted as an instruction to some other program executing on processor 5702 (e.g., a web browser, word processor, or other application). Thus, by way of illustration, a user might use upward or downward swiping gestures to "scroll" a webpage currently displayed to the user of device 5601 via presentation interface 5620, to use rotating gestures to increase or decrease the volume of audio output from speakers 5709, and so on. Path analysis module 5724 may represent the detected path as a vector and extrapolate to predict the path, e.g., to improve rendering of action on device 5601 by presentation interface 5620 by anticipating movement.

It will be appreciated that computer system 5700 is illustrative and that variations and modifications are possible. Computer systems can be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some implementations, one or more cameras and two or more microphones may be built into the computer rather than being supplied as separate components. Further, an image or audio analyzer can be implemented using only a subset of computer system components (e.g., as a processor executing program code, an ASIC, or a fixed-function digital signal processor, with suitable I/O interfaces to receive image data and output analysis results).

While computer system 5700 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired. Thus, for example, execution of object detection module 5722 by processor 5702 can cause processor 5702 to operate motion detector and camera interface 5706 to capture images and/or audio signals of an object traveling across and in contact with a surface to detect its entrance by analyzing the image and/or audio data.

In one implementation, the neural network module 5726 stores the convolutional neural network 101, which operates in conjunction with the AR/VR environment 5600 and applications 5730.

CONCLUSION AND ADDITIONAL IMPLEMENTATIONS

We describe a system and various implementations for detecting hand poses and gestures using a convolutional neural network.

Some additional implementations and features include:

Because all the pose estimation networks use the same coordinate system and feature extractor, the disclosed convolutional neural network is highly flexible to computation requirements and demands for a desired level of accuracy and robustness.

In some implementations, a model-parallel training is used, which automatically performs hyper-parameter sweeps over the learning rate and batch size to determine the optimal settings for a particular dataset and network architecture.

In some implementations, an adaptive algorithm is used, which reduces the learning rate for a particular training job over time in order to precisely specify an optimal network instead of overshooting.

In some implementations, the technology disclosed provides greater robustness to cluttered backgrounds and ambient light interference (e.g., bright background scenes).

In some implementations, the technology disclosed provides enhanced tracking range that extends to the full length of the arms.

In some implementations, the technology disclosed provides faster initialization for splayed hands and pointing fingers.

In some implementations, the technology disclosed accurately and precisely tracks free form gestures in real time with negligible latency.

In some implementations, the technology disclosed accurately and precisely tracks varied complex gestures like grab-and-drop interactions.

In some implementations, the technology disclosed reduces the overall CPU usage suitable for embedded systems.

In some implementations, the technology disclosed provides enhanced finger flexibility for better tracking of hand poses.

In some implementations, the technology disclosed provides for improved handling of occluded hand poses.

In some implementations, the technology disclosed provides image-based tracking using minimally processed image features to estimate hand motion.

In some implementations, the technology disclosed simultaneously estimates both rigid and non-rigid states of a hand.

In some implementations, the technology disclosed provides improved tracking on the edge of the field of view.

Some particular implementations and features are described in the following discussion.

In one implementation, described is method of preparing a plurality of neural network systems to recognize hand positions. The method includes generating from 100,000 to 1 billion simulated hand position images, each hand position image labeled with 15 to 45 hand position parameters, the simulated hand position images organized as gesture sequences, applying a multilayer convolution and pooling processor and producing reduced dimensionality images from the simulated hand position images, training a first set of atemporal generalist neural networks with the simulated hand position images to produce estimated hand position parameters, using the reduced dimensionality images and the labeled hand position parameters for the reduced dimensionality images, subdividing the simulated hand position images into 5 to 250 overlapping specialist categories and training 5 to 250 corresponding atemporal specialist neural networks to produce estimated hand position parameters, training a first set of atemporal specialist neural networks using the reduced dimensionality images from the corresponding specialist categories using the reduced dimensionality images from the simulated hand position images and the labeled hand position parameters for the reduced dimensionality images and saving parameters from training the atemporal generalist neural networks and the atemporal specialist neural networks in tangible machine readable memory for use in image recognition.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as convolutional neural network, master or generalists networks, expert or specialists networks, hand pose estimation, outlier-robust covariance propagation, experimental results, augmented reality (AR)/virtual reality (VR) interactions, generating training data, computer graphics simulator, gesture recognition, etc.

In one implementation, the simulated hand position images are stereoscopic images with depth map information. In another implementation, the hand position parameters are a plurality of joint locations in three-dimensional (3D) space. In yet another implementation, the hand position parameters are a plurality of joint angles in three-dimensional (3D) space. In yet another implementation, the hand position parameters are a plurality of hand skeleton segments in three-dimensional (3D) space.

In some implementations, the overlapping specialist categories are generated using unsupervised classification. In one implementation, the generalist neural networks are trained an entire dataset of simulated hand position images and the specialist neural networks are trained on parts of the dataset corresponding to the specialist categories. In other implementations, the method includes calculating at least one characterization for each of the specialist neural networks that positions a particular specialist neural networks in distinction from other specialist neural networks.

In some implementations, the method includes receiving a first set of hand position parameters from one or more trained generalist neural networks and identifying specialist categories with centroids proximate to the received hand position parameter, receiving a second set of hand position parameters from a multitude of trained specialist neural networks corresponding to the identified specialist categories and combining the first and second set of hand position parameters to generate a final hand pose estimate.

In some implementations, the method includes combining the first and second set of hand position parameters to generate a final hand pose estimate using an outlier-robust covariance propagation scheme. In one implementation, each of the generalist and specialist neural networks generate 84 outputs representing 28 hand joint locations in three-dimensional (3D) space.

Other implementations may include a computer implemented system to perform any of the methods described above, the system including a processor, memory coupled to the processor, and computer instructions loaded into the memory. Yet another implementation may include a tangible computer readable storage medium impressed with computer program instructions; the instructions, when executed on a processor cause a computer to implement any of the methods described above.

In another implementation, described is a method of preparing a plurality of neural network systems to recognize hand positions. The method includes generating from 100,000 to 1 billion simulated hand position images, each hand position image labeled with 15 to 45 hand position parameters, the simulated hand position images organized as gesture sequences, applying a multilayer convolution and pooling processor and producing reduced dimensionality images from the simulated hand position images, training a first set of temporal generalist neural networks with the simulated hand position images to produce estimated hand position parameters, using pairs of first and second reduced dimensionality images, estimated or actual hand position parameters for the first reduced dimensionality image, image data for the second reduced dimensionality image, and the labeled hand position parameters for the second reduced dimensionality image, subdividing the simulated hand position images into 5 to 250 overlapping specialist categories and training 5 to 250 corresponding temporal specialist neural networks to produce estimated hand position parameters and training a first set of temporal specialist neural networks using pairs of first and second reduced dimensionality images from the corresponding specialist categories. In one implementation, training the first set of temporal specialist neural networks includes estimated or actual hand position parameters for the first reduced dimensionality image, image data for the second reduced dimensionality data and the labeled hand position parameters for the second reduced dimensionality image. The method further includes saving parameters from training the temporal generalist neural networks and the temporal specialist neural networks in tangible machine readable memory for use in image recognition.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as convolutional neural network, master or generalists networks, expert or specialists networks, hand pose estimation, outlier-robust covariance propagation, experimental results, augmented reality (AR)/virtual reality (VR) interactions, generating training data, computer graphics simulator, gesture recognition, etc.

In one implementation, the temporal generalist neural networks and the temporal specialist neural networks are recursive neural networks (RNN) based on long short term memory (LSTM). In another implementation, the temporal generalist neural networks and the temporal specialist neural networks are trained using a combination of current simulated hand position images and additional noise hand position data. In yet another implementation, the temporal generalist neural networks and the temporal specialist neural networks are trained using a series of simulated hand position images that are temporally linked as gesture sequences representing real world hand gestures. In a further implementation, the temporal generalist neural networks and the temporal specialist neural networks, during testing, utilize a combination of a current simulated hand position image and a series of prior estimated hand position parameters temporally linked in previous frames to generate a current set of hand position parameters.

Other implementations may include a computer implemented system to perform any of the methods described above, the system including a processor, memory coupled to the processor, and computer instructions loaded into the memory. Yet another implementation may include a tangible computer readable storage medium impressed with computer program instructions; the instructions, when executed on a processor cause a computer to implement any of the methods described above.

In yet another implementation, described is a method of recognizing hand positions in image sequences, including occluded portions of the hand positions. The method includes receiving a temporal sequence of images from a field of view, applying a multilayer convolution and pooling processor and producing reduced dimensionality images, including successive first and second reduced dimensionality images, from the temporal sequence of images, processing a pair of first and second reduced dimensionality images using a second temporal generalist neural network to produce estimated hand position parameters, using pairs of first and second reduced dimensionality images, estimated hand position parameters for the first reduced dimensionality image and image data for the second reduced dimensionality data, and the labeled hand position parameters for the second reduced dimensionality image, processing a second image a first atemporal generalist neural network with the simulated hand position images to produce estimated hand position parameters, using the reduced dimensionality images and the labeled hand position parameters for the reduced dimensionality image, using the estimated hand position parameters from the first atemporal generalist neural network and the second temporal generalist neural network to select among 5 to 250 overlapping specialist neural networks, reprocessing at least a second reduced dimensionality image using the selected specialist neural networks to estimate positions of between 15 and 45 hand position parameter, including hand portions that are occluded by other hand portions in the second reduced dimensionality image and saving parameters from training the atemporal generalist neural network, the temporal generalist neural network, the atemporal specialist neural networks, and the atemporal specialist neural networks in tangible machine readable memory for use in image recognition.

Other implementations may include a computer implemented system to perform any of the methods described above, the system including a processor, memory coupled to the processor, and computer instructions loaded into the memory. Yet another implementation may include a tangible computer readable storage medium impressed with computer program instructions; the instructions, when executed on a processor cause a computer to implement any of the methods described above.

In one implementation, described is a method of preparing sample hand positions for training of neural network systems. The method includes accessing simulation parameters that specify a range of hand positions and position sequences, a range of hand anatomies, including palm size, fattiness, stubbiness, and skin tone and a range of backgrounds. The method also includes accessing a camera perspective specification that specifies a focal length, a field of view of the camera, a wavelength sensitivity, field distortions and artificial lighting conditions. The method further includes generating between 100,000 and 1 billion hand position-hand anatomy-background simulations, each simulation labeled with 15 to 45 hand position parameters, the simulations organized in sequences, applying the camera perspective specification to render from the simulations at least a corresponding 100,000 to 1 billion simulated hand position images and saving the simulated hand position images with the labelled hand position parameters from the corresponding simulations for use in training a hand position recognition system.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as convolutional neural network, master or generalists networks, expert or specialists networks, hand pose estimation, outlier-robust covariance propagation, experimental results, augmented reality (AR)/virtual reality (VR) interactions, generating training data, computer graphics simulator, gesture recognition, etc.

In one implementation, the simulated hand position images are stereoscopic images with depth map information. In another implementation, the simulated hand position images are binocular pairs of images. In another implementation, the hand position parameters are a plurality of joint locations in three-dimensional (3D) space. In yet another implementation, the hand position parameters are a plurality of joint angles in three-dimensional (3D) space. In yet another implementation, the hand position parameters are a plurality of hand skeleton segments in three-dimensional (3D) space.

Other implementations may include a computer implemented system to perform any of the methods described above, the system including a processor, memory coupled to the processor, and computer instructions loaded into the memory. Yet another implementation may include a tangible computer readable storage medium impressed with computer program instructions; the instructions, when executed on a processor cause a computer to implement any of the methods described above.

In another implementation, described is a method of preparing sample hand positions for training of neural network systems. The method includes generating ground truth simulated stereoscopic hand images using a computer graphic simulator, extracting stereoscopic hand boundaries for the hand images and aligning the hand boundaries with hand centers included in the hand images, generating translated, rotated and scaled variants of the hand boundaries and applying Gaussian jittering to the variants, extracting hand regions from the jittered variants of the hand boundaries, computing ground truth pose vectors for the hand regions using the computer graphic simulator and storing the pose vectors in tangible machine readable memory as output labels for the stereoscopic hand images for use in image recognition.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as convolutional neural network, master or generalists networks, expert or specialists networks, hand pose estimation, outlier-robust covariance propagation, experimental results, augmented reality (AR)/virtual reality (VR) interactions, generating training data, computer graphics simulator, gesture recognition, etc.

In one implementation, the computer graphic simulator generates three-dimensional (3D) simulated hands in mesh models and/or capsule hand skeleton models. In another implementation, the computer graphic simulator generates a simulated coordinate system to determine hand position parameters of a simulated hand in three-dimensional (3D). In yet another implementation, the computer graphic simulator generates a simulated perspective of a simulated gesture recognition system to determine hand position parameters of a simulated hand in three-dimensional (3D). In some implementations, the ground truth pose vectors are 84 dimensional representing 28 hand joints in three-dimensional (3D) space.

Other implementations may include a computer implemented system to perform any of the methods described above, the system including a processor, memory coupled to the processor, and computer instructions loaded into the memory. Yet another implementation may include a tangible computer readable storage medium impressed with computer program instructions; the instructions, when executed on a processor cause a computer to implement any of the methods described above.

In one implementation, described is a method of determining a hand pose using neural network systems. The method includes receiving a first set of estimates of hand position parameters from multiple generalist neural networks and/or specialist neural networks for each of a plurality of hand joints, for each individual hand joint, simultaneously determining a principal distribution of the first set of estimates and receiving a second set of estimates of hand position parameters from the generalist neural networks and/or specialist neural networks for each of the plurality of hand joints. The method also includes, for each individual hand joint, simultaneously, calculating a similarity measure between the second set of estimates and the principal distribution of the first set of estimates, identifying outliers and inliers in the second set of estimates based on the similarity measure, calculating contribution weights of the outliers and the inliers based on the similarity measure and determining a principal distribution of the second set of estimates based on the contribution weights of the outliers and inliers.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as convolutional neural network, master or generalists networks, expert or specialists networks, hand pose estimation, outlier-robust covariance propagation, experimental results, augmented reality (AR)/virtual reality (VR) interactions, generating training data, computer graphics simulator, gesture recognition, etc.

In some implementations, the method includes determining a hand pose by minimizing an approximation error between principal distributions of each of the hand joints. In another implementation, the hand position parameters are a plurality of joint locations in three-dimensional (3D) space. In yet another implementation, the hand position parameters are a plurality of joint angles in three-dimensional (3D) space. In yet another implementation, the hand position parameters are a plurality of hand skeleton segments in three-dimensional (3D) space.

In some implementations, the principal distribution is a covariance matrix of the hand position parameter estimates. In other implementations, the similarity measure is a Mahalanobis distance from the principal distribution. In yet other implementations, the similarity measure is a projection statistic from the principal distribution.

In some implementations, the covariance matrix is determined using a Kalman filter operation. In other implementations, the covariance matrix is updated between frames based on contribution weights of outliers and inliers of a current set of estimates of hand position parameters. In yet other implementations the contribution weights are determined by converting the similarity measure into probability distributions.

Other implementations may include a computer implemented system to perform any of the methods described above, the system including a processor, memory coupled to the processor, and computer instructions loaded into the memory. Yet another implementation may include a tangible computer readable storage medium impressed with computer program instructions; the instructions, when executed on a processor cause a computer to implement any of the methods described above.

In yet another implementation, described is a method of initializing a hand for neural network systems to recognize hand positions. The method includes detecting a hand in a field of view of at least one camera and capturing stereoscopic images of the hand, generating feature maps from the stereoscopic images based on parallax and identifying one or more two-dimensional (2D) candidate regions of interest (ROI) in the feature maps, determining a depth parameter for each of the candidate ROI by converting the 2D candidate ROI into one-dimensional (1D) waveform signals and convolving the 1D waveform signals across one of the stereoscopic images, extracting hand regions from the candidate ROI based on a rotated principal orientation of pixel data in each of the candidate ROI, subjecting the extracted hand regions to a plurality of hand-heuristic analysis and feeding the hand regions and results of the analysis to a hand classifier neural network and for a particular hand region qualified by the hand classifier neural network, rendering a three-dimensional (3D) virtual hand based on a 2D position and depth parameter of a corresponding candidate region of interest.

In one implementation, the hand-heuristic analysis determines consistency of the extracted hand regions with hand anatomies. In another implementation, the hand-heuristic analysis determines whether the detected hand is positioned above another previously detected hand based on a 2D position and depth parameter of the particular hand region. In yet another implementation, the hand-heuristic analysis determines whether the detected hand is a right hand or a left hand based on an estimated trajectory of the particular hand region.

In some implementations, the feature maps are at least one of parallax maps, low resolution saliency maps and disparity maps. In other implementations, the 1D waveform signals are generated using at least one of normalized cross-correlation (NCC) and weighted NCC. In yet other implementations, the method includes performing an in-plane rotation to generate upright hand regions using a combination of a principal orientation vector determined from a gradient direction of the pixel data and at least one outward normal vector projecting from the hand regions onto a camera plane.

Other implementations may include a computer implemented system to perform any of the methods described above, the system including a processor, memory coupled to the processor, and computer instructions loaded into the memory. Yet another implementation may include a tangible computer readable storage medium impressed with computer program instructions; the instructions, when executed on a processor cause a computer to implement any of the methods described above.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of preparing sample hand positions for training of neural network systems, the method including:
  generating ground truth simulated stereoscopic hand images using a computer graphic simulator;
  extracting hand boundaries for the hand images and aligning the hand boundaries with hand centers included in the hand images;
  generating translated, rotated and scaled variants of the hand boundaries and applying Gaussian jittering to at least some variants;
  extracting hand regions from the at least some variants of the hand boundaries to which Gaussian jittering was applied;
  computing ground truth pose vectors for the hand regions using the computer graphic simulator; and
  storing the ground truth pose vectors in tangible machine readable memory as output labels for the ground truth simulated stereoscopic hand images for use in training a machine learning classifier neural network to perform image recognition.

2. The method of claim 1, wherein the computer graphic simulator generates three-dimensional (3D) simulated hands in mesh models and/or capsule hand skeleton models.

3. The method of claim 1, wherein the computer graphic simulator generates a simulated coordinate system to determine hand position parameters of a simulated hand in three-dimensional (3D).

4. The method of claim 1, wherein the computer graphic simulator generates a simulated perspective of a simulated gesture recognition system to determine hand position parameters of a simulated hand in three-dimensional (3D).

5. The method of claim 1, wherein ground truth pose vectors are 84 dimensional representing 28 hand joints in three-dimensional (3D) space.

6. The method of claim 1, wherein generating ground truth simulated stereoscopic hand images using a computer graphic simulator further includes:
  accessing simulation parameters that specify at least one of:
    a range of hand positions and position sequences,
    a range of hand anatomies, including palm size, fattiness, stubbiness, and skin tone, and
    a range of backgrounds;
  accessing a camera perspective specification that specifies one or more of:
    a focal length,
    a field of view,
    a wavelength sensitivity, and
    artificial lighting conditions; and
  generating a plurality of hand position-hand anatomy-background simulations, each simulation labeled with hand position parameters, the simulations organized in sequences.

7. The method of claim 6, wherein extracting stereoscopic hand boundaries for the hand images further includes:
  applying the camera perspective specification to render from the simulations at least a corresponding set of simulated hand position images.

8. The method of claim 7, further including:
  saving simulated hand position images as labelled with hand position parameters from corresponding simulations for use in training a hand position recognition system.

9. The method of claim 7, wherein simulated hand position images are stereoscopic images with depth map information.

10. The method of claim 7, wherein simulated hand position images are binocular pairs of images.

11. The method of claim 7, wherein hand position parameters are a plurality of joint locations in three-dimensional (3D) space.

12. The method of claim 7, wherein hand position parameters are a plurality of joint angles in three-dimensional (3D) space.

13. The method of claim 7, wherein hand position parameters are a plurality of hand skeleton segments in three-dimensional (3D) space.

14. A non-transitory computer readable storage medium impressed with computer program instructions to prepare sample hand positions for training of neural network systems, which instructions, when executed on a processor, implement a method comprising:
  generating ground truth simulated stereoscopic hand images using a computer graphic simulator;
  extracting hand boundaries for the hand images and aligning the hand boundaries with hand centers included in the hand images;
  generating translated, rotated and scaled variants of the hand boundaries and applying Gaussian jittering to at least some variants;
  extracting hand regions from the variants of the hand boundaries to which Gaussian jittering was applied;
  computing ground truth pose vectors for the hand regions using the computer graphic simulator; and
  storing the ground truth pose vectors in tangible machine readable memory as output labels for the ground truth simulated stereoscopic hand images for use in training a machine learning classifier neural network to perform image recognition.

15. The non-transitory computer readable storage medium of claim 14, wherein generating ground truth simulated stereoscopic hand images using a computer graphic simulator further includes:
  accessing simulation parameters that specify at least one of:
    a range of hand positions and position sequences,
    a range of hand anatomies, including palm size, fattiness, stubbiness, and skin tone, and
    a range of backgrounds;
  accessing a camera perspective specification that specifies one or more of:
    a focal length,
    a field of view,
    a wavelength sensitivity, and
    artificial lighting conditions; and
  generating a plurality of hand position-hand anatomy-background simulations, each simulation labeled with hand position parameters, the simulations organized in sequences.

16. The non-transitory computer readable storage medium of claim 15, wherein extracting stereoscopic hand boundaries for the hand images further includes:

applying the camera perspective specification to render from the simulations at least a corresponding set of simulated hand position images.

17. The non-transitory computer readable storage medium of claim 16, wherein the simulated hand position images are selected from: stereoscopic images with depth map information and binocular pairs of images.

18. The non-transitory computer readable storage medium of claim 16, wherein hand position parameters are selected from a plurality of joint locations in three-dimensional (3D) space, a plurality of joint angles in three-dimensional (3D) space, and a plurality of hand skeleton segments in three-dimensional (3D) space.

19. A system including one or more processors coupled to memory loaded with computer instructions, which instructions, when executed on the processors, implement actions comprising:

generating ground truth simulated stereoscopic hand images using a computer graphic simulator;

extracting hand boundaries for the hand images and aligning the hand boundaries with hand centers included in the hand images;

generating translated, rotated and scaled variants of the hand boundaries and applying Gaussian jittering to at least some variants;

extracting hand regions from the variants of the hand boundaries to which Gaussian jittering was applied;

computing ground truth pose vectors for the hand regions using the computer graphic simulator; and storing the ground truth pose vectors in tangible machine readable memory as output labels for the ground truth simulated stereoscopic hand images for use in training a machine learning classifier neural network to perform image recognition.

20. A method of preparing sample hand positions for training of neural network systems, the method including:

obtaining ground truth simulated stereoscopic hand images using a computer graphic simulator;

obtaining hand regions from translated, rotated and scaled variants of hand boundaries extracted from the ground truth simulated stereoscopic hand images and aligned with hand centers included in the hand images;

computing ground truth pose vectors for the hand regions using the computer graphic simulator; and storing the ground truth pose vectors in tangible machine readable memory as output labels for the ground truth simulated stereoscopic hand images for use in training a machine learning classifier neural network to perform image recognition.

21. A non-transitory computer readable storage medium impressed with computer program instructions to prepare sample hand positions for training of neural network systems, which instructions, when executed on a processor, implement a method comprising:

using a computer graphic simulator, obtaining ground truth pose vectors for a set of hand regions obtained from translated, rotated and scaled variants of hand boundaries extracted from a set of ground truth simulated stereoscopic hand images and aligned with hand centers included in the hand images; and storing the ground truth pose vectors in tangible machine-readable memory as output labels for the ground truth simulated stereoscopic hand images for use in training a machine learning classifier neural network to perform image recognition.

\* \* \* \* \*